United States Patent
Buitron et al.

(10) Patent No.: US 7,322,098 B2
(45) Date of Patent: *Jan. 29, 2008

(54) METHOD OF SIMULTANEOUS TWO-DISK PROCESSING OF SINGLE-SIDED MAGNETIC RECORDING DISKS

(75) Inventors: Gerardo Buitron, San Jose, CA (US);
Clarence Gapay, Tracy, CA (US);
John Grow, Gilroy, CA (US); Bruce Hachtmann, San Martin, CA (US);
Kwang Kon Kim, San Jose, CA (US);
Huan Nguyen, San Jose, CA (US);
Tom O'Hare, San Jose, CA (US)

(73) Assignee: Maxtor Corporation, Scotts Valley, CA (US)

( * ) Notice: Subject to any disclaimer, the term of this patent is extended or adjusted under 35 U.S.C. 154(b) by 451 days.

This patent is subject to a terminal disclaimer.

(21) Appl. No.: 10/435,572

(22) Filed: May 9, 2003

(65) Prior Publication Data
US 2003/0211275 A1    Nov. 13, 2003

Related U.S. Application Data

(60) Provisional application No. 60/379,227, filed on May 9, 2002, provisional application No. 60/378,970, filed on May 9, 2002.

(51) Int. Cl.
*H01F 3/00*    (2006.01)
*H01F 41/02*    (2006.01)

(52) U.S. Cl. .............................. 29/604; 29/458; 29/559; 29/90.1; 29/603.03; 206/710; 206/711; 206/712; 206/454; 257/E21.012; 360/135; 428/34.1; 428/35.7; 428/156; 428/303; 428/367; 414/404; 414/811

(58) Field of Classification Search ............... 29/90.1, 29/603.03, 603.04, 604, 458, 559; 206/710–712, 206/454; 428/34.1, 35.7, 156, 303, 367, 428/922; 360/135; 257/E21.012; 414/404, 414/811
See application file for complete search history.

(56) References Cited

U.S. PATENT DOCUMENTS

| 3,382,647 | A | 5/1968 | Davey et al. |
| 3,505,777 | A | 4/1970 | Tsutsumi ..................... 53/168 |
| 4,573,851 | A | 3/1986 | Butler ......................... 414/404 |

(Continued)

FOREIGN PATENT DOCUMENTS

| EP | 0 177 073 | 8/1985 |

(Continued)

OTHER PUBLICATIONS

"DVD technology"; Tsinberg, M.; Eggers, C.; Image Processing, 1998. ICIP 98. Proceedings. 1998 International Conference on vol. 1,; Oct. 4-7, 1998; p. 2 vol. 1.*
Pang, S.I. et al., "Effects of Nitrogenated NiP Seedlayer on Co-Alloy Thin Film Media," 1494-96, IEEE Transactions on Magnetics, vol. 37, No. 4 (Jul. 2001).

(Continued)

*Primary Examiner*—Paul D. Kim
(74) *Attorney, Agent, or Firm*—McCarthy & Associates

(57) ABSTRACT

Various methods and apparatus for simultaneously processing two single-sided hard memory disks is provided. Disks are positioned in pairs, with one surface of one disk positioned adjacent one surface of the second disk, with the disk surfaces touching or with a slight separation between them. In this back-to-back orientation, the disk pairs may be processed using conventional double-sided disk processing equipment and techniques. However, each disk will not have two active surfaces. Because of the positioning of the disks during processing, only one surface of each disk will be subjected to full processing. Therefore, each disk will only have one active side.

36 Claims, 103 Drawing Sheets

U.S. PATENT DOCUMENTS

| | | | |
|---|---|---|---|
| 4,669,612 A | 6/1987 | Mortensen | 206/454 |
| 4,676,008 A | 6/1987 | Armstrong | 34/237 |
| 4,694,778 A | 9/1987 | Learn et al. | 118/728 |
| 4,695,217 A | 9/1987 | Lau | 414/404 |
| 4,724,963 A | 2/1988 | Mortensen | 206/454 |
| 4,768,328 A | 9/1988 | Mims | 53/532 |
| 4,808,456 A | 2/1989 | Yamada et al. | |
| 4,819,579 A | 4/1989 | Jenkins | 118/728 |
| 4,840,530 A | 6/1989 | Nguyen | 414/404 |
| 4,856,957 A | 8/1989 | Lau et al. | 414/404 |
| 4,939,891 A | 7/1990 | Podini | |
| 4,947,624 A | 8/1990 | Cones, Sr. et al. | 53/540 |
| 4,947,784 A | 8/1990 | Nishi | 414/404 |
| 4,949,848 A | 8/1990 | Kos | 211/41 |
| 4,958,982 A | 9/1990 | Champet et al. | 414/751.1 |
| 4,962,879 A | 10/1990 | Goesele et al. | 228/116 |
| 4,981,222 A | 1/1991 | Lee | 211/41 |
| 4,987,407 A | 1/1991 | Lee | 340/540 |
| 5,007,788 A | 4/1991 | Asano et al. | 414/416.09 |
| 5,111,936 A | 5/1992 | Kos | 206/334 |
| 5,125,784 A | 6/1992 | Asano | 414/404 |
| 5,188,499 A | 2/1993 | Tarng et al. | 414/404 |
| 5,250,339 A | 10/1993 | Tani et al. | |
| 5,269,643 A | 12/1993 | Kodama et al. | 414/416 |
| 5,314,107 A | 5/1994 | D'Aragona et al. | 228/116 |
| 5,348,151 A | 9/1994 | Dressen | 206/334 |
| 5,351,156 A | 9/1994 | Gregory et al. | |
| 5,430,992 A | 7/1995 | Olson | 53/399 |
| 5,476,176 A | 12/1995 | Gregerson et al. | 206/711 |
| 5,478,622 A * | 12/1995 | Nakamura et al. | 428/848.2 |
| 5,486,134 A | 1/1996 | Jones et al. | 451/209 |
| 5,497,085 A | 3/1996 | Tian et al. | |
| 5,501,568 A | 3/1996 | Ono | 414/417 |
| 5,612,830 A | 3/1997 | Gregory et al. | |
| 5,620,295 A | 4/1997 | Nishi | 414/416.11 |
| 5,664,407 A | 9/1997 | Cooper, III et al. | 53/542 |
| 5,665,478 A | 9/1997 | Suzuki et al. | |
| 5,773,124 A | 6/1998 | Ishikawa et al. | 428/141 |
| 5,780,127 A | 7/1998 | Mikkelsen | 428/35.7 |
| 5,820,449 A | 10/1998 | Clover | 451/287 |
| 5,906,469 A | 5/1999 | Oka et al. | 414/416 |
| 5,926,352 A | 7/1999 | Murayama et al. | |
| 5,928,759 A | 7/1999 | Arita et al. | 428/141 |
| 5,956,317 A | 9/1999 | Komiyama et al. | 369/286 |
| 5,976,255 A | 11/1999 | Takaki et al. | 118/500 |
| 5,991,104 A | 11/1999 | Bonyhard | |
| 6,007,896 A * | 12/1999 | Bhushan | 428/834 |
| 6,022,837 A | 2/2000 | Oowaki | 510/165 |
| 6,033,486 A | 3/2000 | Andros | |
| 6,033,522 A | 3/2000 | Iwata et al. | 156/345 |
| 6,086,961 A | 7/2000 | Bonyhard | |
| 6,107,599 A | 8/2000 | Baumgart et al. | 219/121.77 |
| 6,117,570 A | 9/2000 | Chen et al. | |
| 6,120,890 A | 9/2000 | Chen et al. | 428/332 |
| 6,150,015 A | 11/2000 | Bertero et al. | 428/332 |
| 6,182,814 B1 | 2/2001 | Koehler | 198/418.7 |
| 6,230,891 B1 | 5/2001 | Usui et al. | 206/454 |
| 6,345,947 B1 | 2/2002 | Egashira | 414/225.01 |
| 6,354,794 B2 | 3/2002 | Sato et al. | 414/811 |
| 6,368,040 B1 | 4/2002 | Yamasaki et al. | 414/222 |
| 6,427,850 B2 | 8/2002 | Mendiola | 211/41.18 |
| 6,457,929 B2 | 10/2002 | Sato et al. | 414/404 |
| 6,498,086 B1 | 12/2002 | Zheng | 438/597 |
| 6,582,279 B1 | 6/2003 | Fox et al. | 451/37 |
| 6,595,028 B1 | 7/2003 | Miyamoto et al. | |
| 6,596,083 B2 | 7/2003 | Cromwell et al. | |
| 6,612,801 B1 | 9/2003 | Koguchi | 414/416.02 |
| 6,625,835 B1 | 9/2003 | Frost et al. | 15/77 |
| 6,626,744 B1 | 9/2003 | White et al. | 451/66 |
| 6,664,503 B1 | 12/2003 | Hsieh et al. | |
| 6,769,855 B2 | 8/2004 | Yokomori et al. | 414/416.02 |
| 6,818,331 B2 | 11/2004 | Sakawaki et al. | |
| 6,821,189 B1 | 11/2004 | Coad et al. | 451/141 |
| 6,821,653 B2 | 11/2004 | Fukushima et al. | |
| 6,926,977 B2 | 8/2005 | Osawa et al. | |
| 6,942,933 B2 | 9/2005 | Osawa | |
| 7,052,739 B2 * | 5/2006 | Buitron et al. | 427/430.1 |
| 2001/0049031 A1 | 12/2001 | Bajorek et al. | |
| 2001/0053444 A1 | 12/2001 | Yokoyama et al. | |
| 2002/0006324 A1 | 1/2002 | Sato et al. | 414/416.12 |
| 2002/0054976 A1 | 5/2002 | Nakamura et al. | |
| 2002/0055017 A1 | 5/2002 | Fukushima et al. | |
| 2002/0081181 A1 | 6/2002 | Yokomori et al. | |
| 2002/0100132 A1 | 8/2002 | McMullen et al. | 15/102 |
| 2002/0132043 A1 | 9/2002 | Cromwell et al. | |
| 2002/0142707 A1 | 10/2002 | Shimada et al. | |
| 2002/0159177 A1 | 10/2002 | Aoki et al. | |
| 2003/0082407 A1 | 5/2003 | Sakawaki et al. | |
| 2003/0104253 A1 | 6/2003 | Osawa et al. | |
| 2003/0179692 A1 | 9/2003 | Ohotomo | |
| 2003/0208899 A1 | 11/2003 | Grow et al. | 29/458 |
| 2003/0209389 A1 | 11/2003 | Buitron et al. | 184/6 |
| 2003/0209421 A1 | 11/2003 | Buitron et al. | 204/192.2 |
| 2003/0210498 A1 | 11/2003 | Kim et al. | 360/135 |
| 2003/0211361 A1 | 11/2003 | Kim et al. | 428/694 R |
| 2004/0005481 A1 | 1/2004 | Osawa | |
| 2004/0013011 A1 | 1/2004 | Valeri | 365/200 |
| 2004/0016214 A1 | 1/2004 | Buitron | 53/474 |
| 2004/0023074 A1 | 2/2004 | Shimizu et al. | |
| 2004/0035737 A1 | 2/2004 | Buitron et al. | 206/454 |
| 2004/0037005 A1 | 2/2004 | Osawa | |
| 2004/0068862 A1 | 4/2004 | Buitron et al. | 29/604 |
| 2004/0069662 A1 | 4/2004 | Buitron et al. | 206/307.1 |
| 2004/0070092 A1 | 4/2004 | Buitron et al. | 264/1.33 |
| 2004/0070859 A1 | 4/2004 | Crofton et al. | 360/1 |
| 2004/0071535 A1 | 4/2004 | Crofton et al. | 414/416.09 |
| 2004/0072029 A1 | 4/2004 | Lowery et al. | |
| 2004/0170870 A1 | 9/2004 | Yokoyama et al. | |
| 2005/0003106 A1 | 1/2005 | Isozaki | |
| 2005/0037140 A1 | 2/2005 | Sakawaki et al. | |
| 2005/0121839 A1 | 6/2005 | Fukushima et al. | |
| 2005/0132958 A1 | 6/2005 | Leng et al. | |

FOREIGN PATENT DOCUMENTS

| | | |
|---|---|---|
| EP | 0 192 244 | 2/1986 |
| EP | 768704 | 4/1997 |
| JP | 08273210 | 10/1986 |
| JP | 63122527 A | 5/1988 |
| JP | 04067333 A | 3/1992 |
| JP | 05028533 A | 2/1993 |
| JP | 06076384 A | 3/1994 |
| JP | 7-263521 | 10/1995 |
| JP | 07296418 A | 11/1995 |
| JP | 08249802 A | 9/1996 |
| JP | 10228674 A | 8/1998 |
| JP | 11265506 A | 9/1999 |
| JP | 2001232667 | 8/2001 |
| WO | WO 9836867 A1 * | 8/1998 |

OTHER PUBLICATIONS

Australian Written Opinion and Search Report, Dec. 17, 2004, Singapore Application No. SG200302857-8.

Mar. 12, 2005 Invitation to Respond to Written Opinion from Intellectual Property Office of Singapore to Tan Jinhwee, Eunice & Lim Chooeng.

"Design of an active memory system for network applications"; Asthana, A.; Cravatts, M.; Krzyzanowski, P.; Memory Technology, Design and Testing, Aug. 8-9, 1994; p. 58-63.

US 5,762,201, 06/1998, Whalen (withdrawn)

* cited by examiner

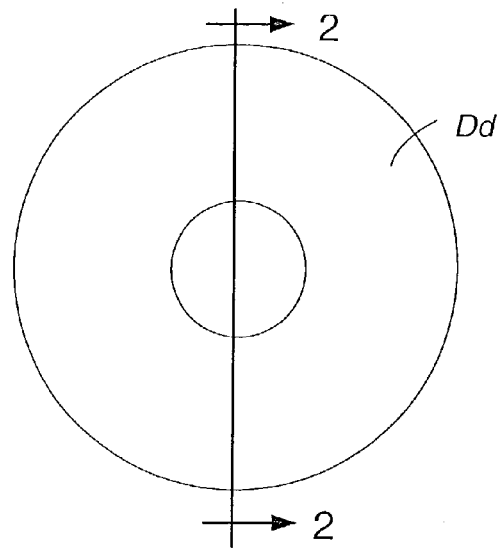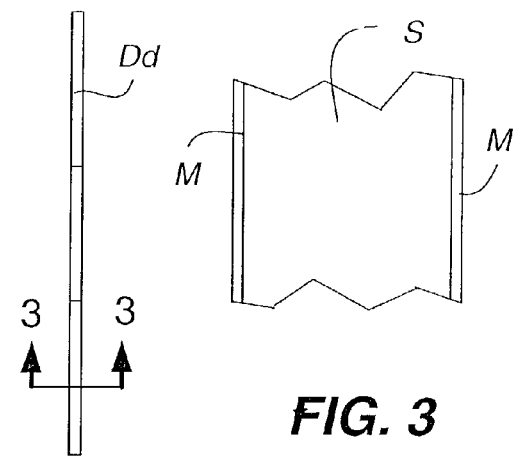
FIG. 1  FIG. 2  FIG. 3
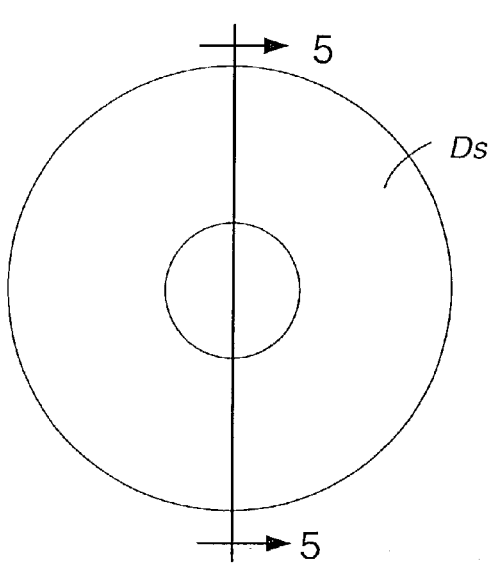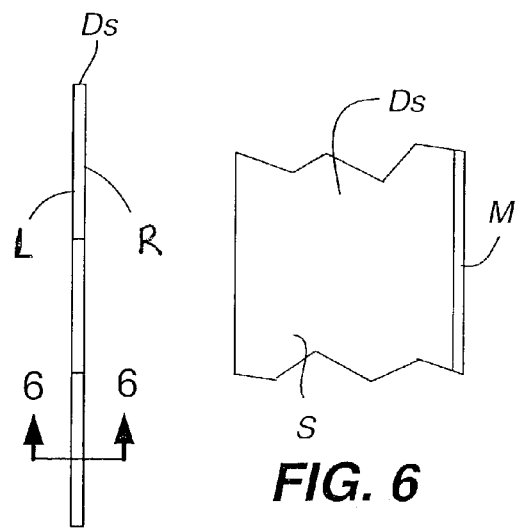
FIG. 4  FIG. 5  FIG. 6

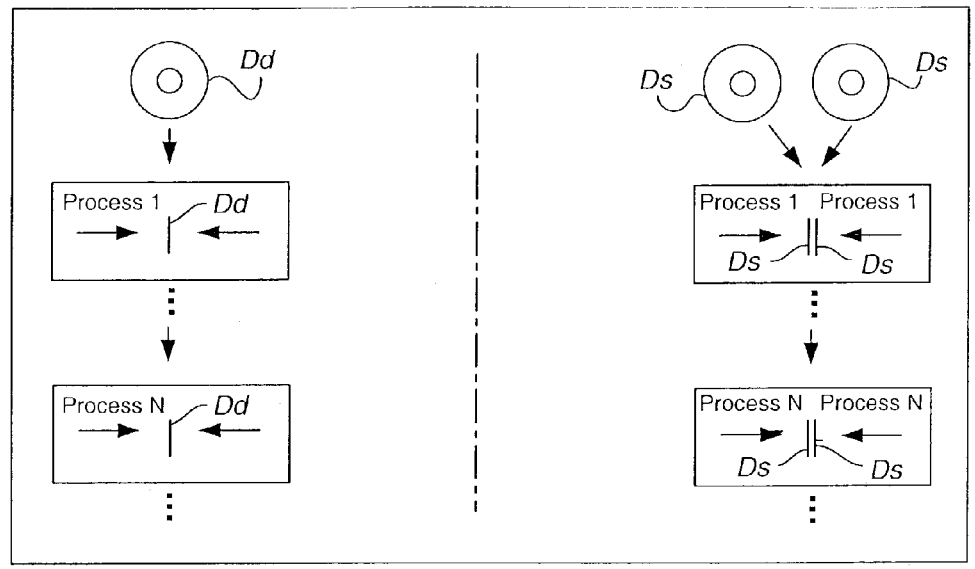
FIG. 7
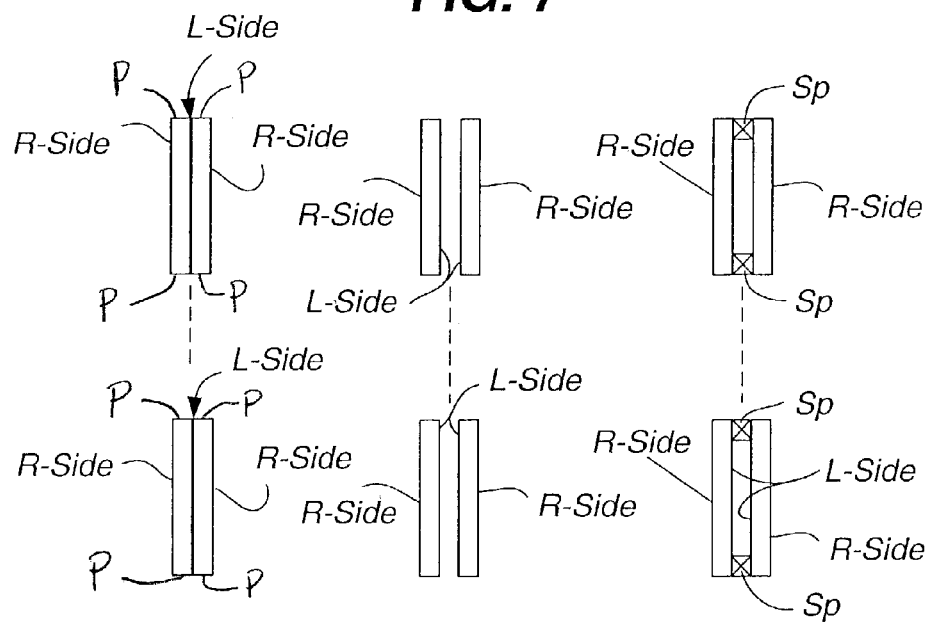
FIG. 8  FIG. 9  FIG. 10

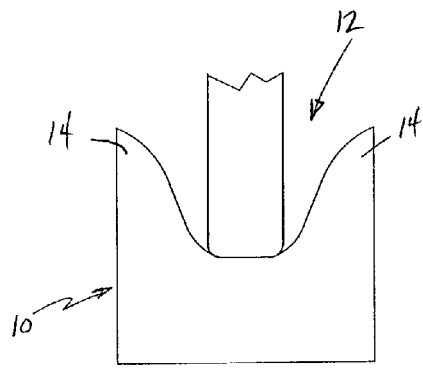
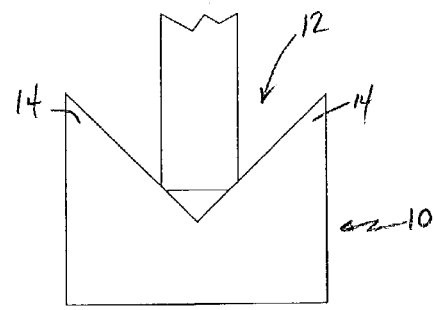
FIG. 11        FIG. 12
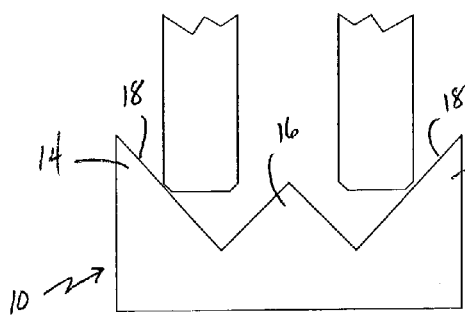
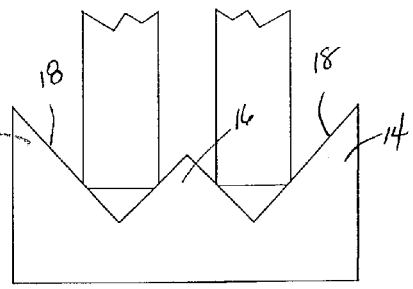
FIG. 17A        FIG. 17B
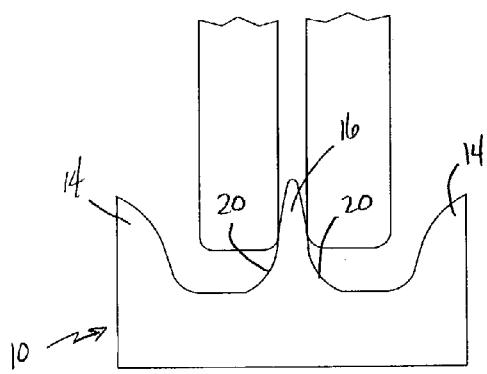
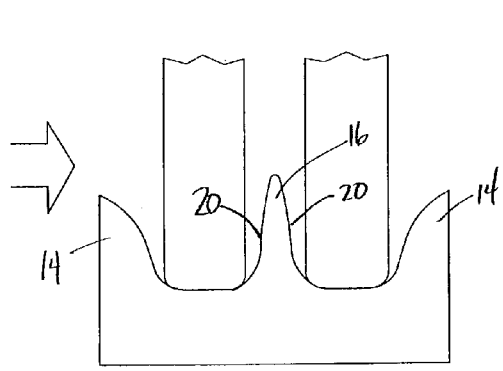
FIG. 19A        FIG. 19B

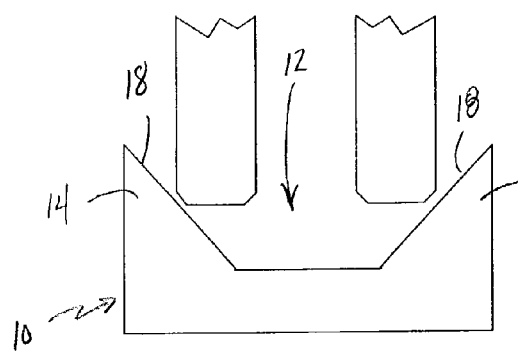
FIG. 18A
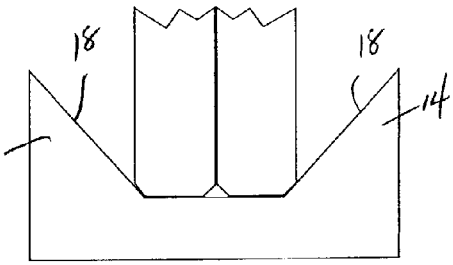
FIG. 18B
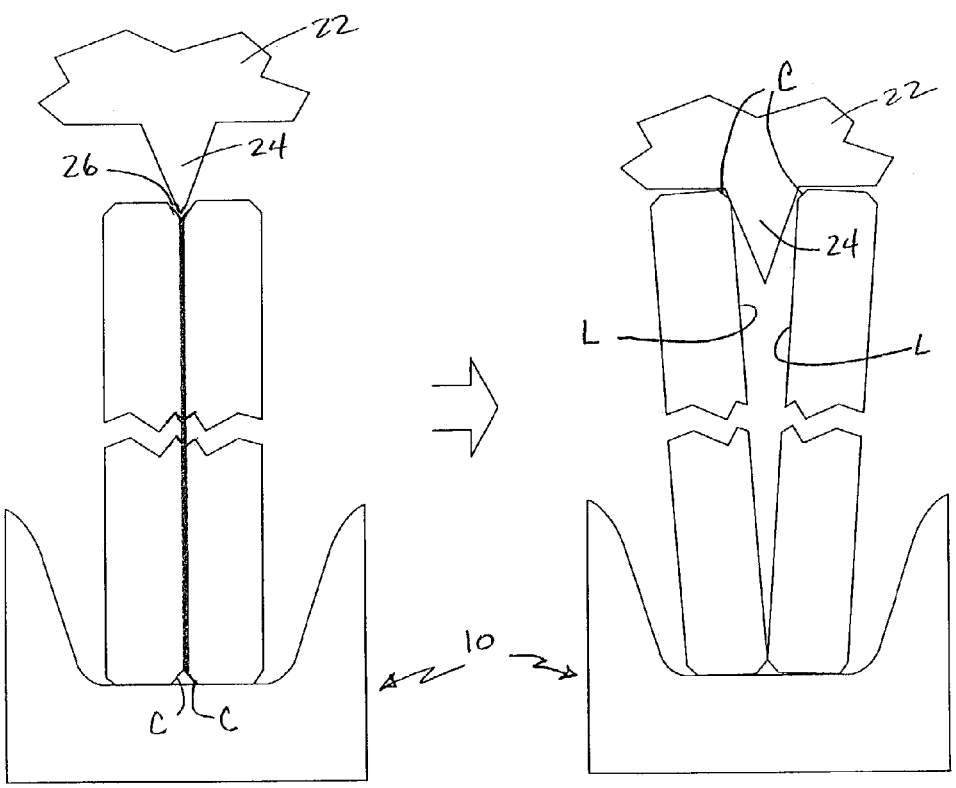
FIG. 20A  FIG. 20B

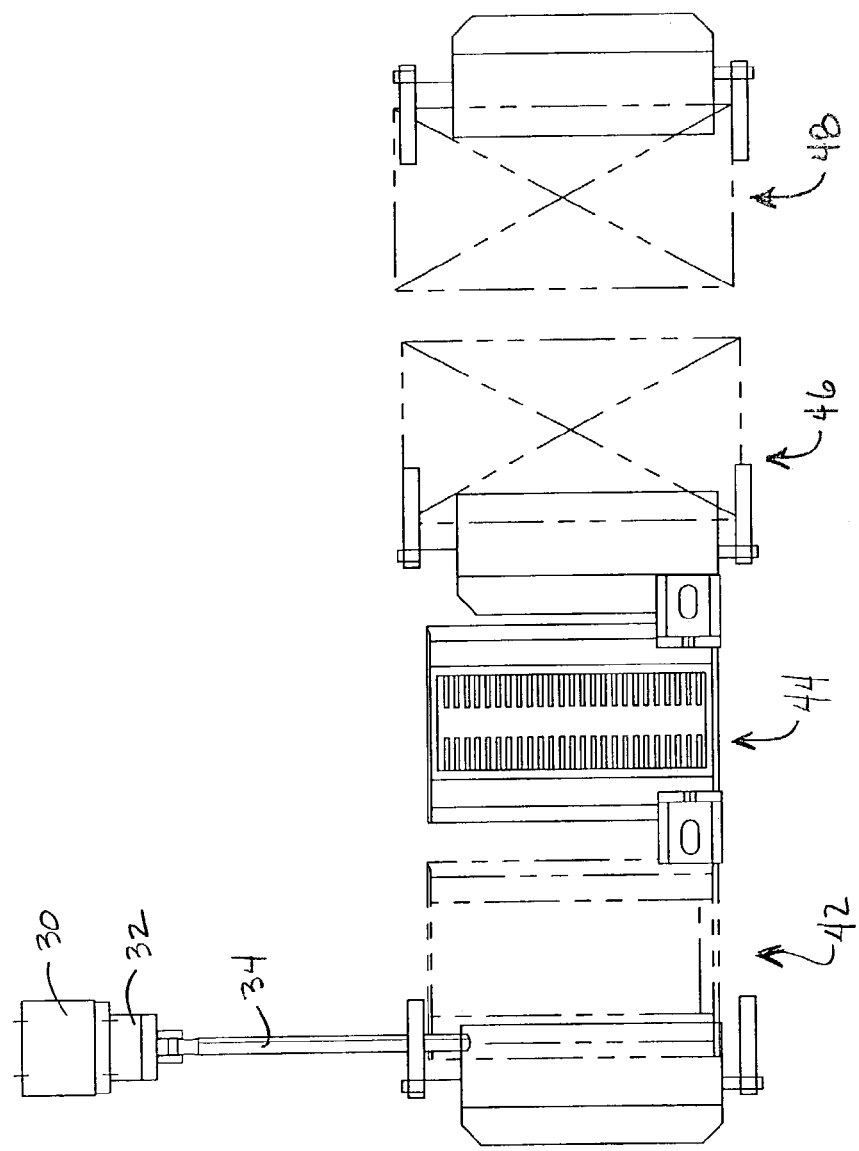

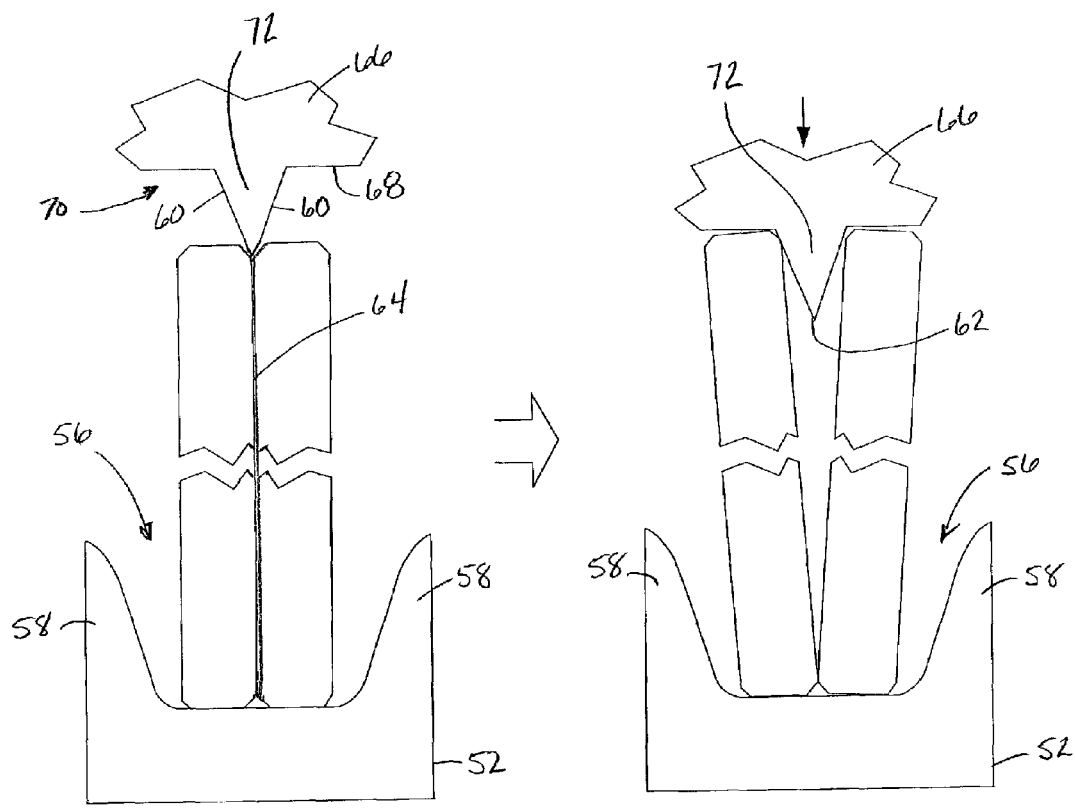
FIG. 29  FIG. 30

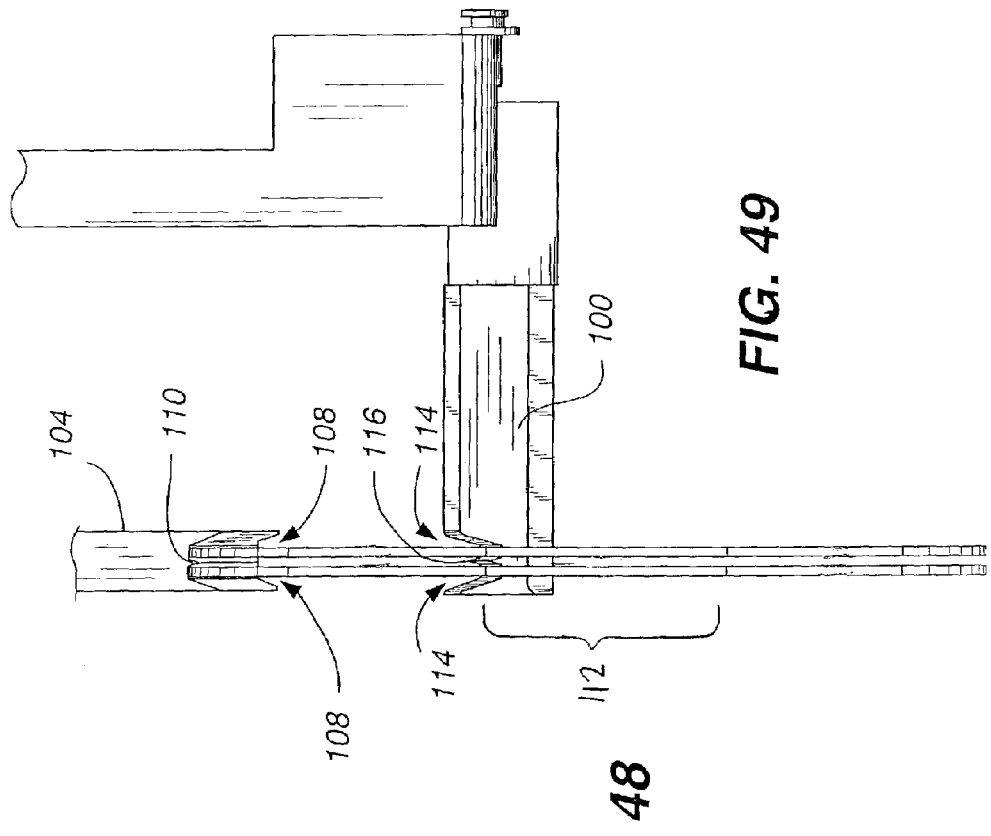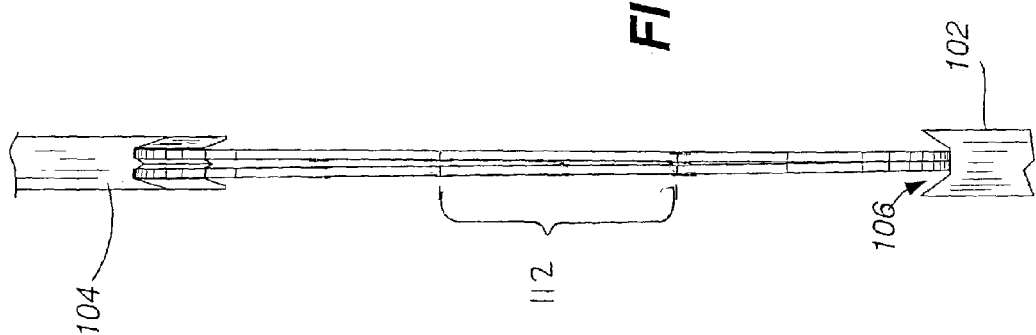

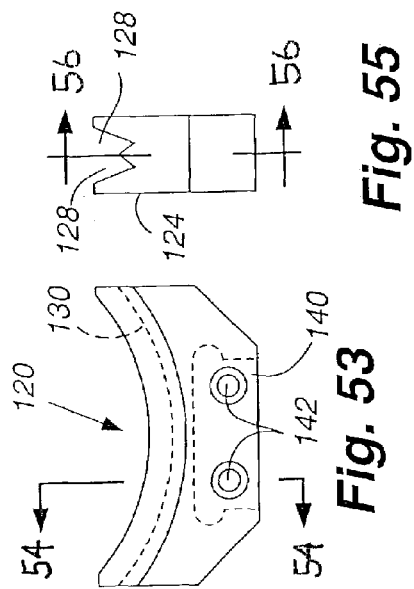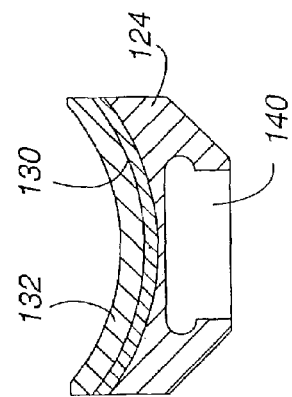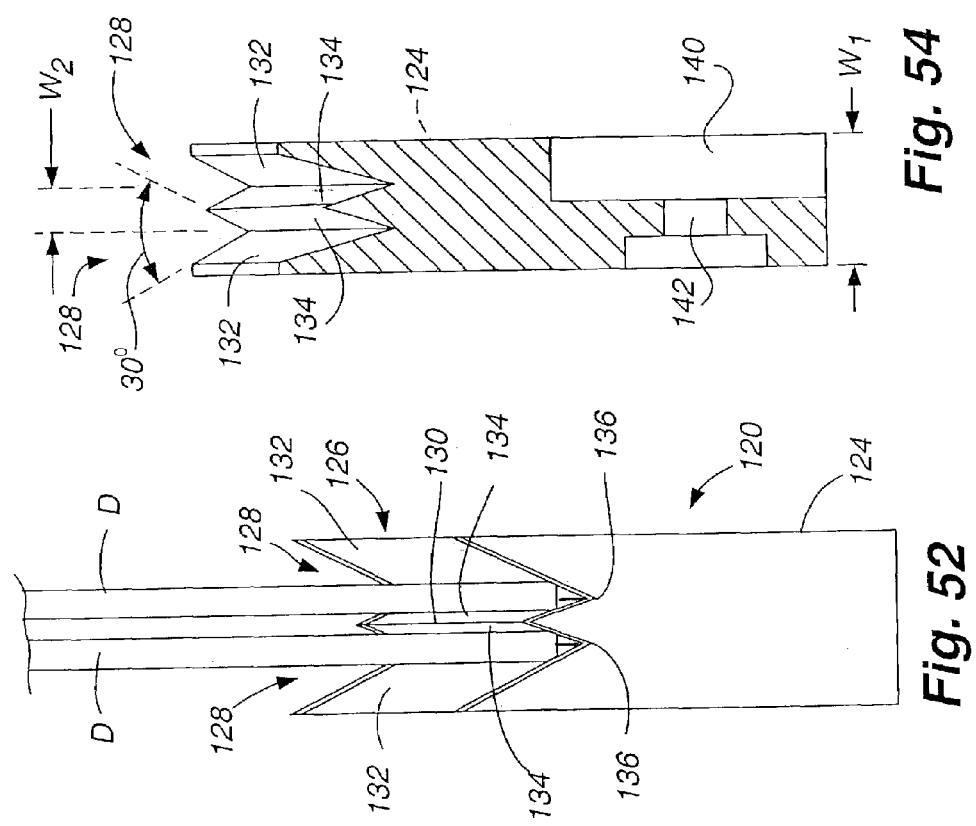

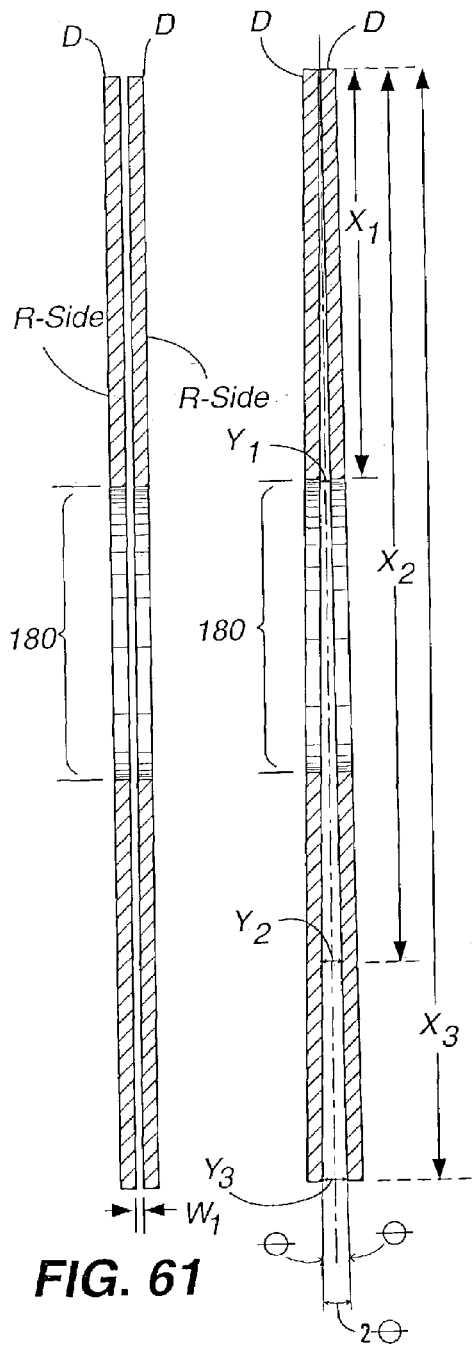
FIG. 61
FIG. 62
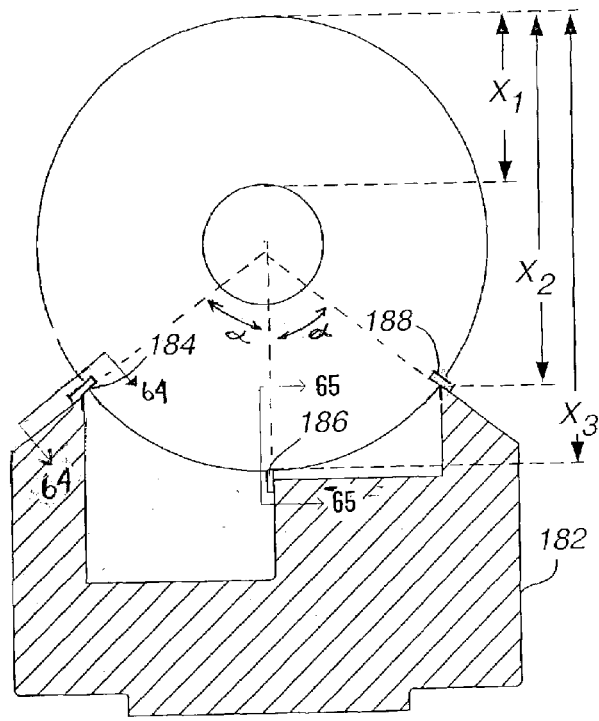
FIG. 63
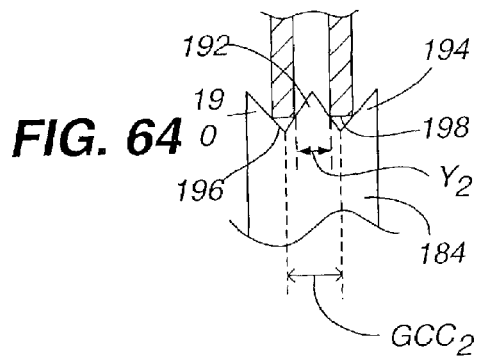
FIG. 64
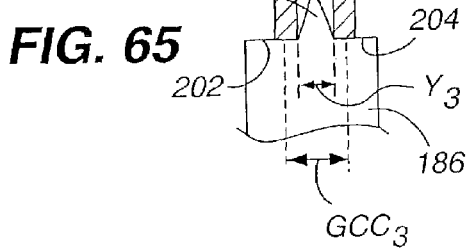
FIG. 65

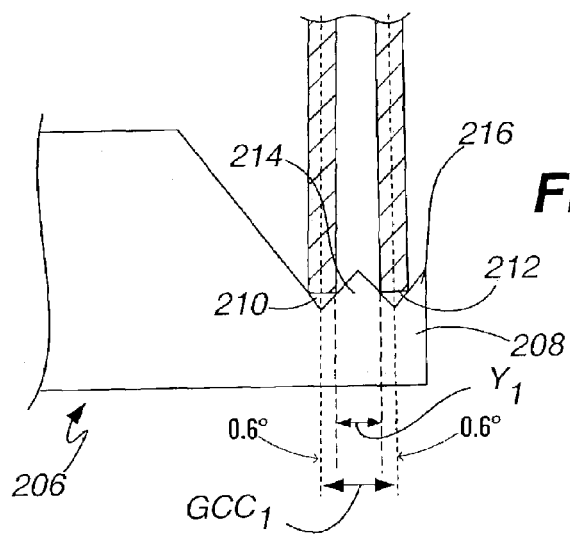
FIG. 66
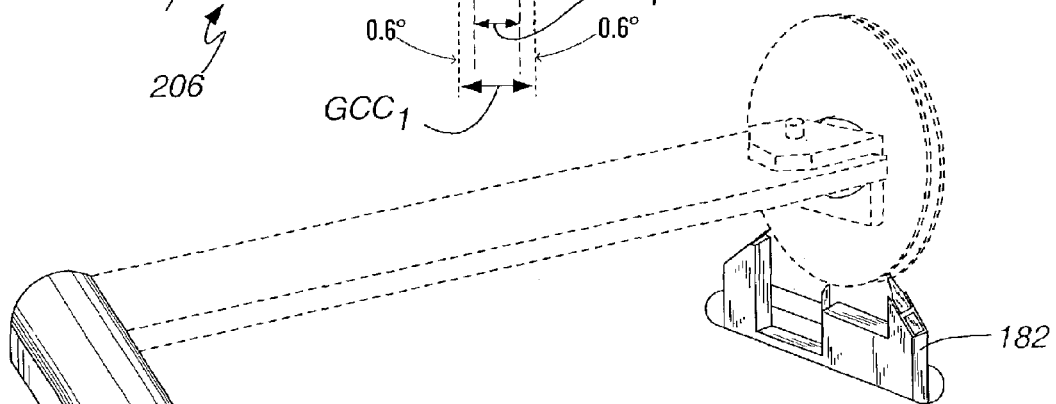
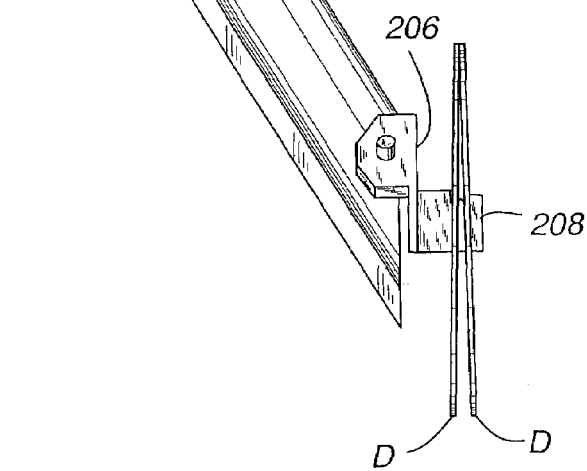
FIG. 67

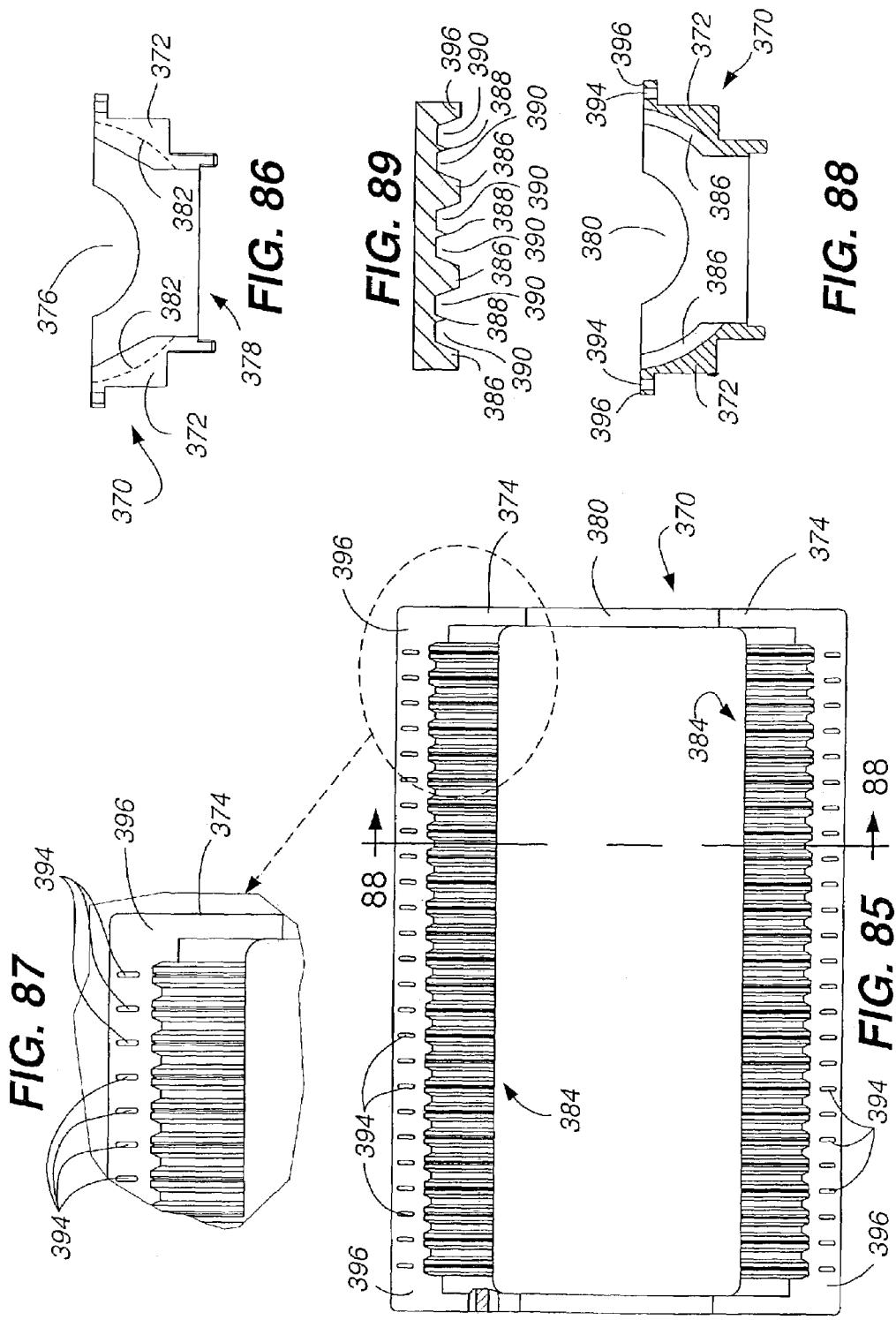

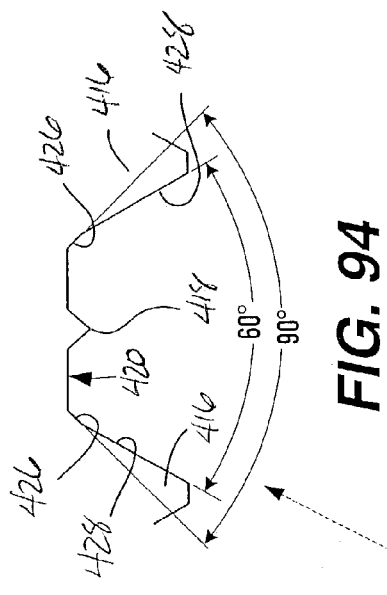
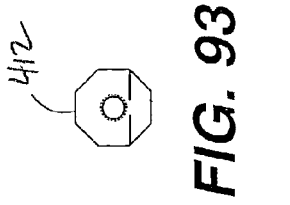
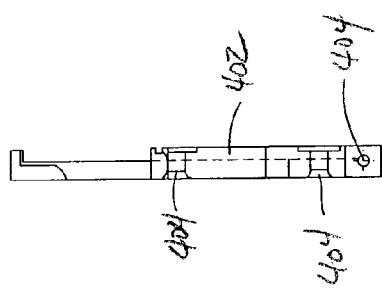
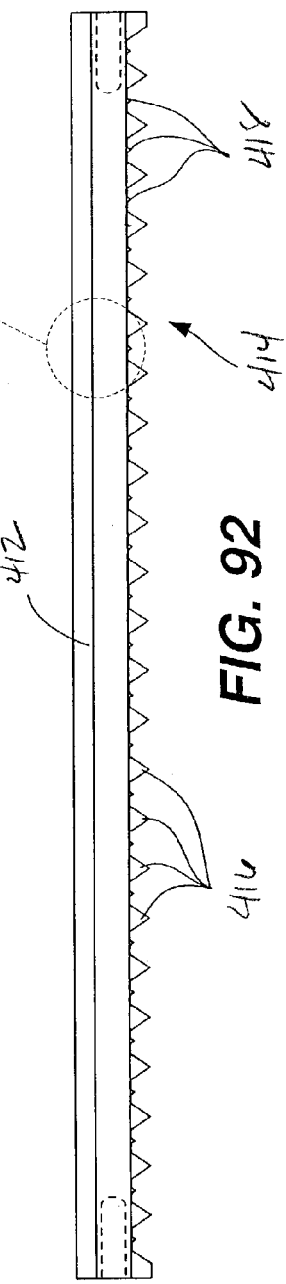
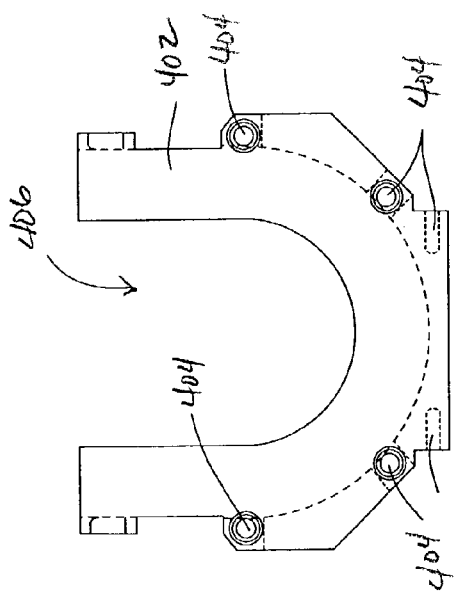

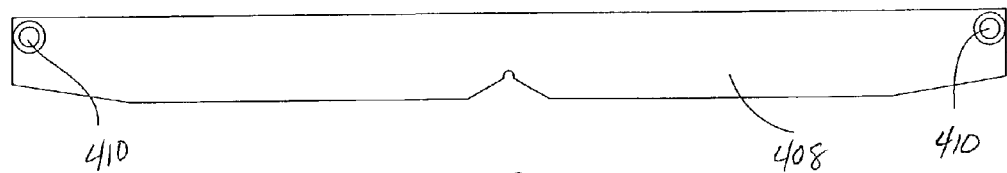
FIG. 95
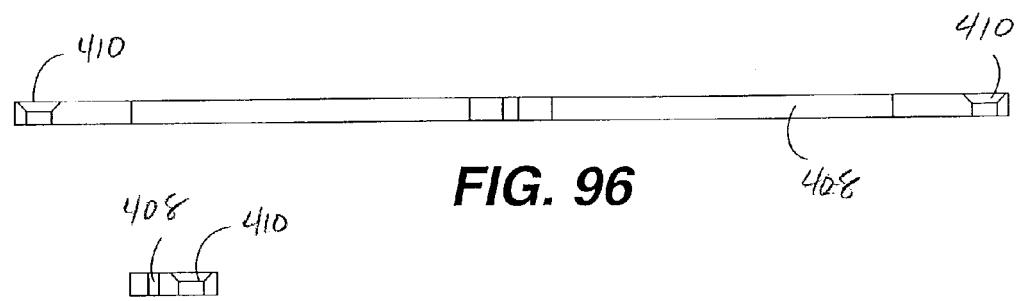
FIG. 96
FIG. 97
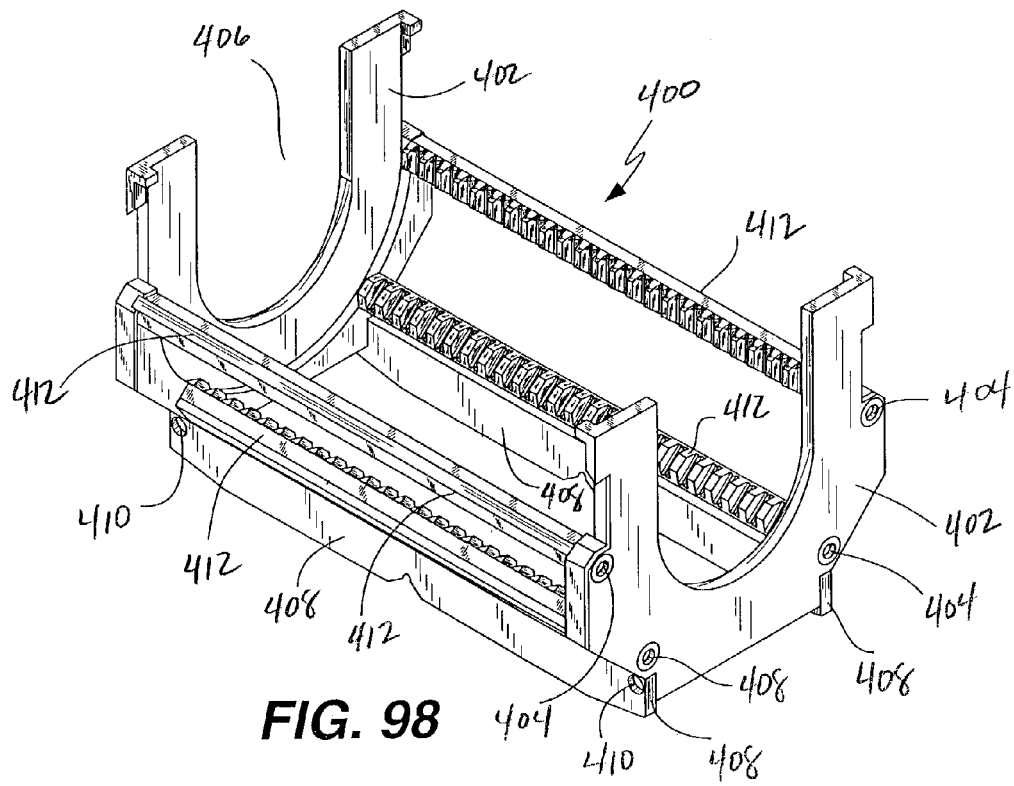
FIG. 98

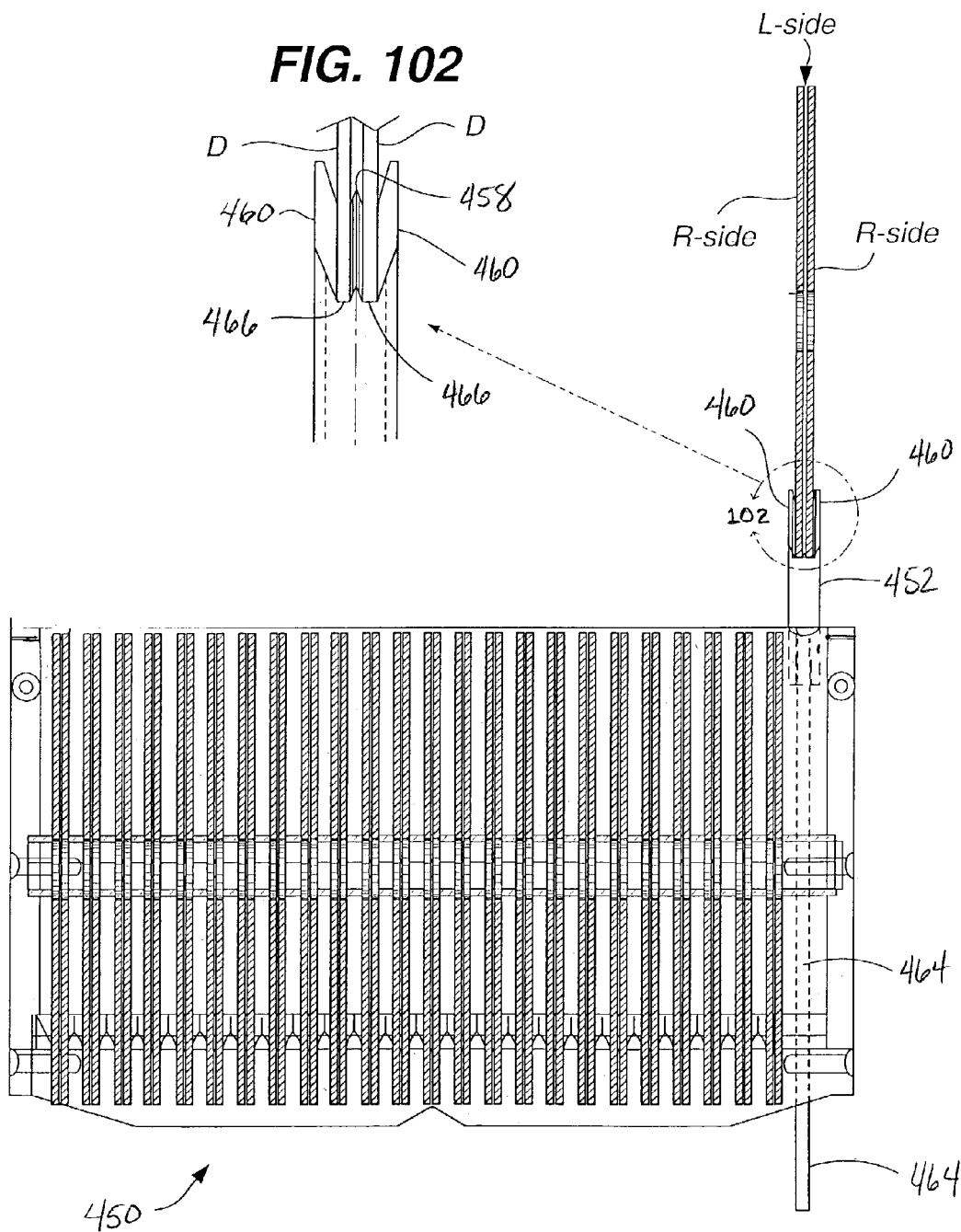

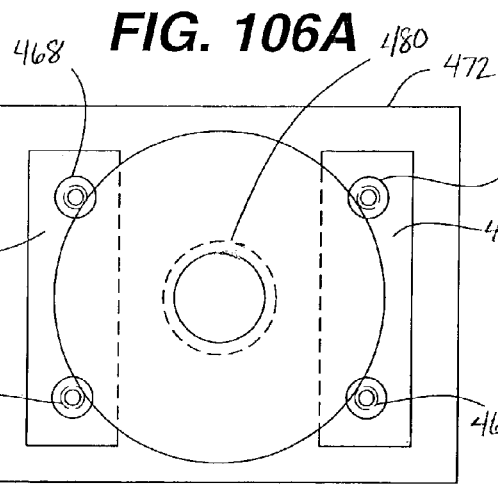
FIG. 106A
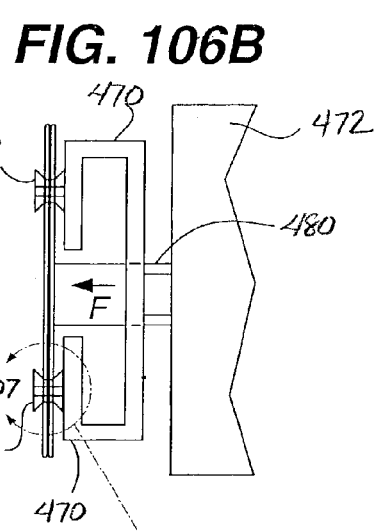
FIG. 106B
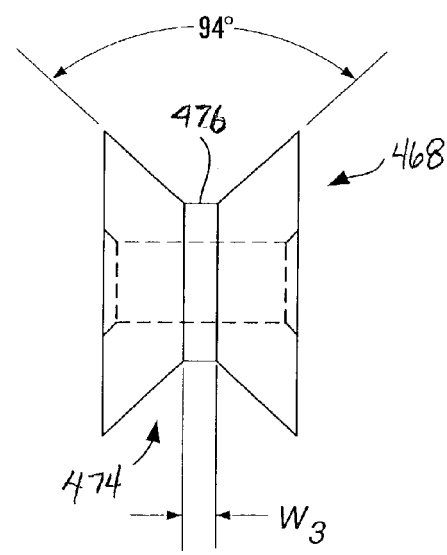
FIG. 108
FIG. 107

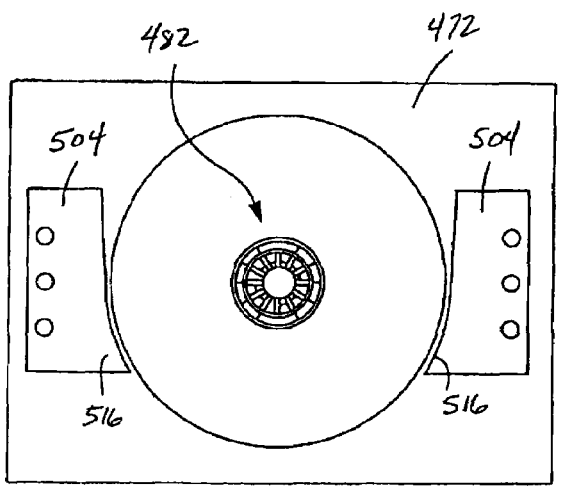
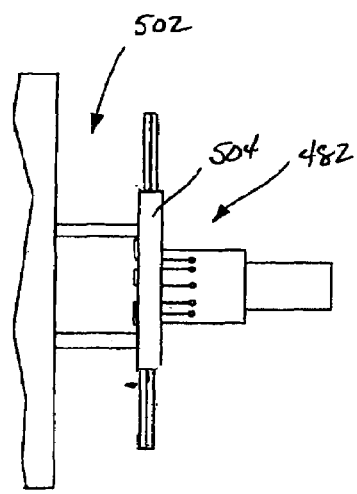
FIG. 113A  FIG. 113B
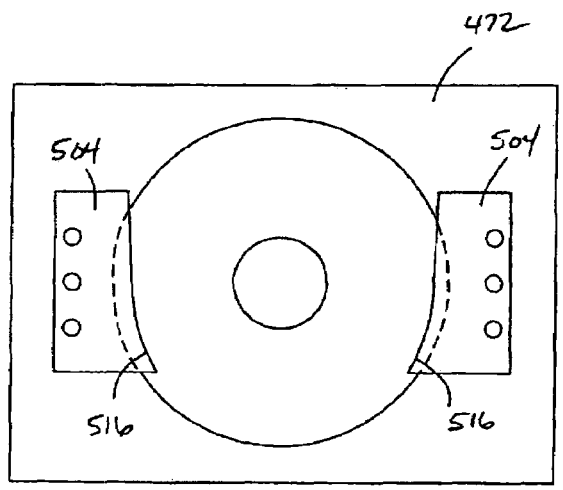
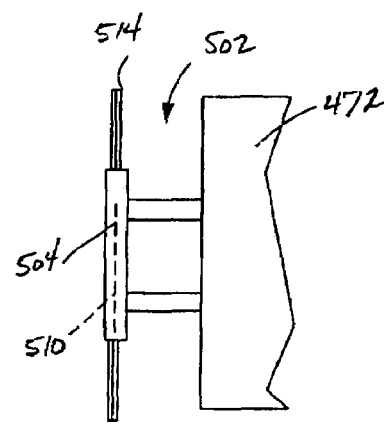
FIG. 114A  FIG. 114B

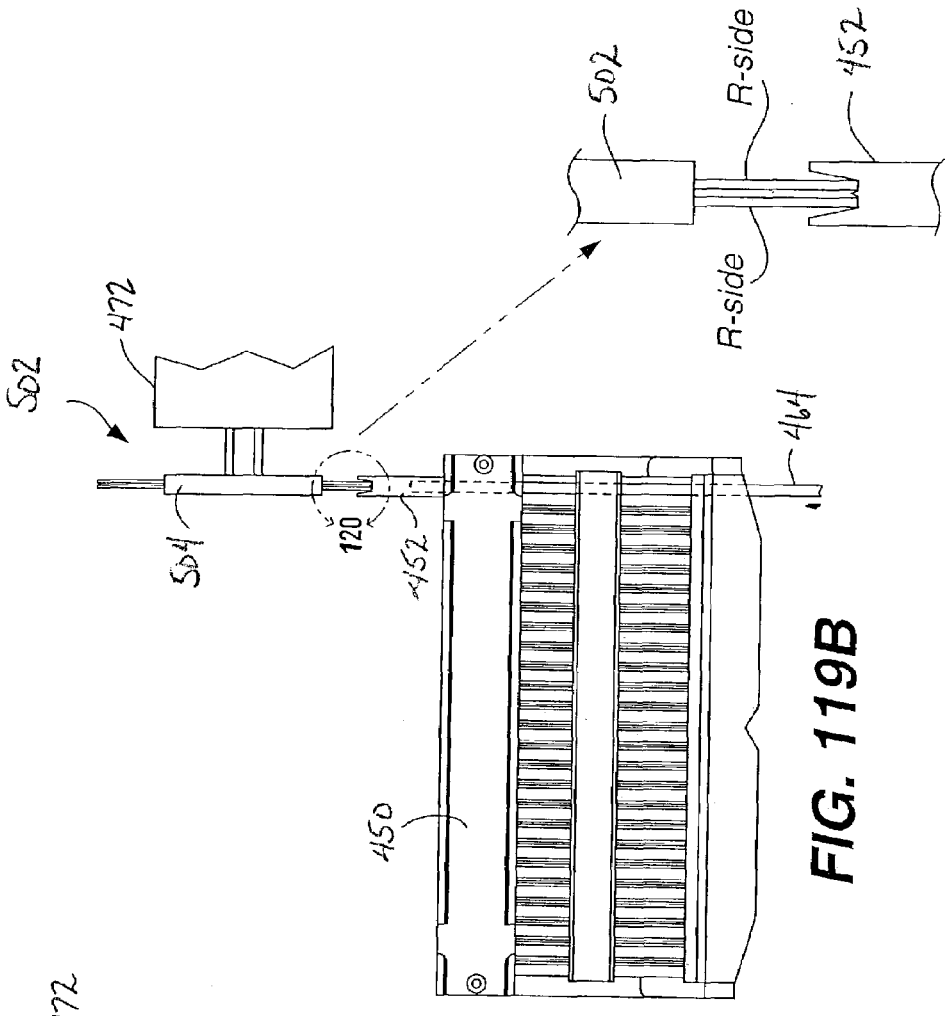
FIG. 119B
FIG. 120
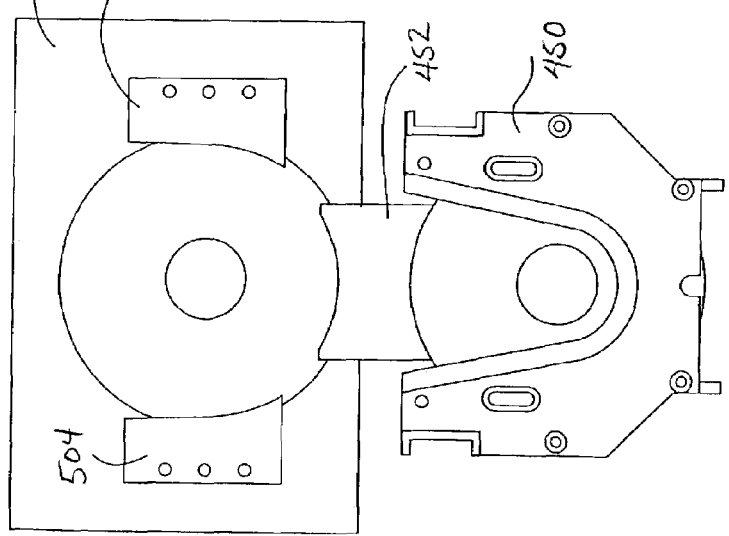
FIG. 119A

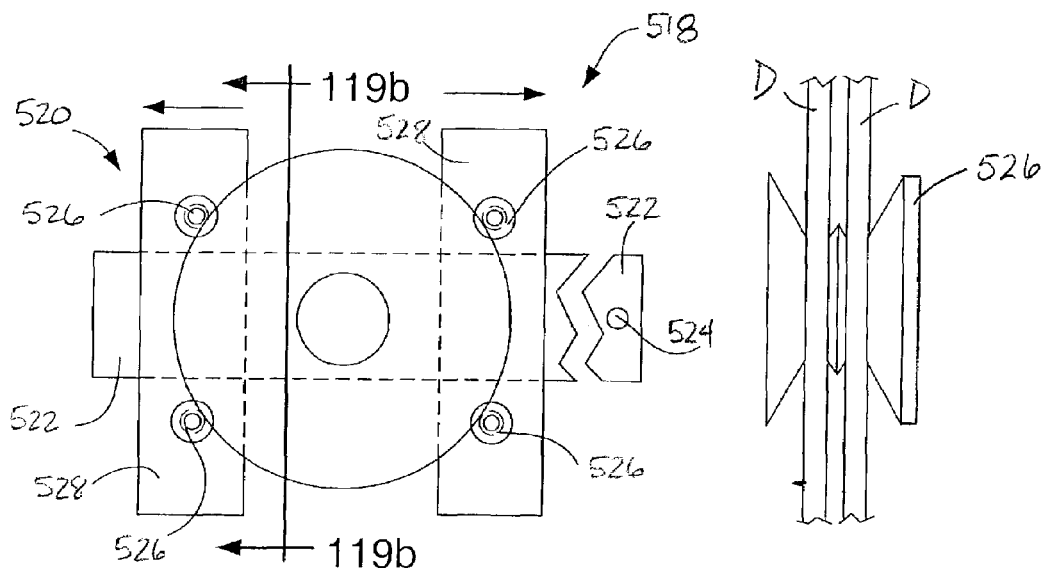
FIG. 121     FIG. 122
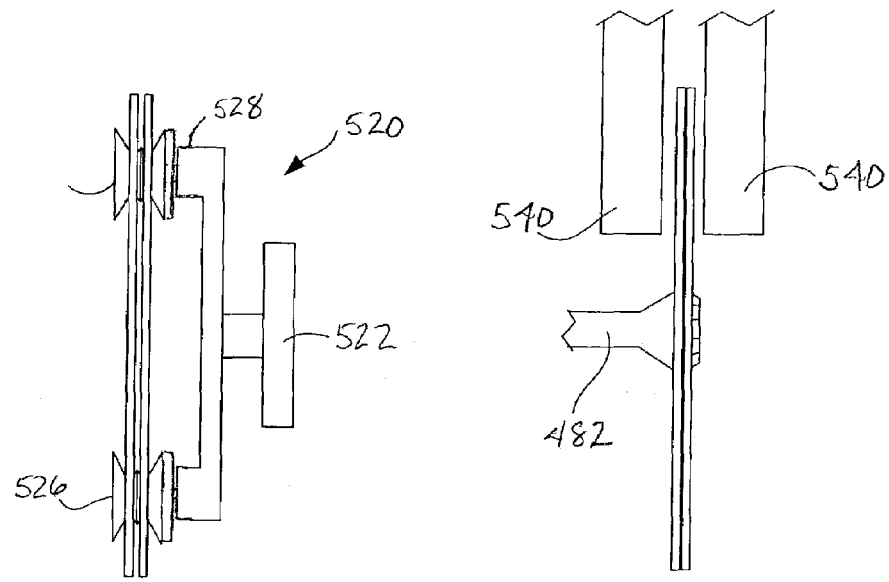
FIG. 123     FIG. 124

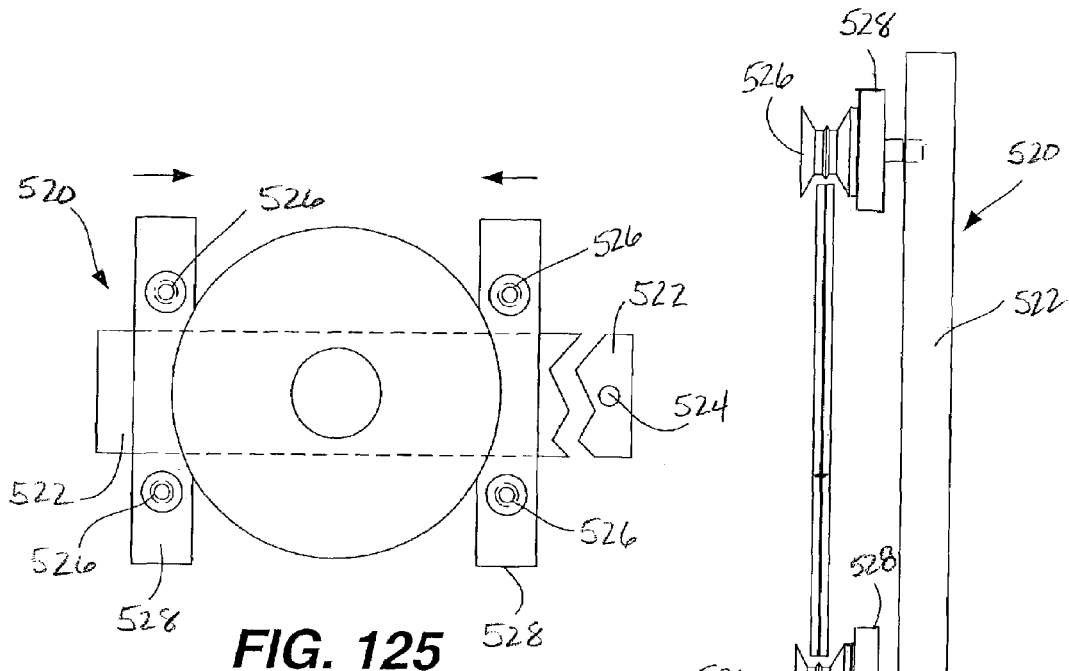
FIG. 125
FIG. 126
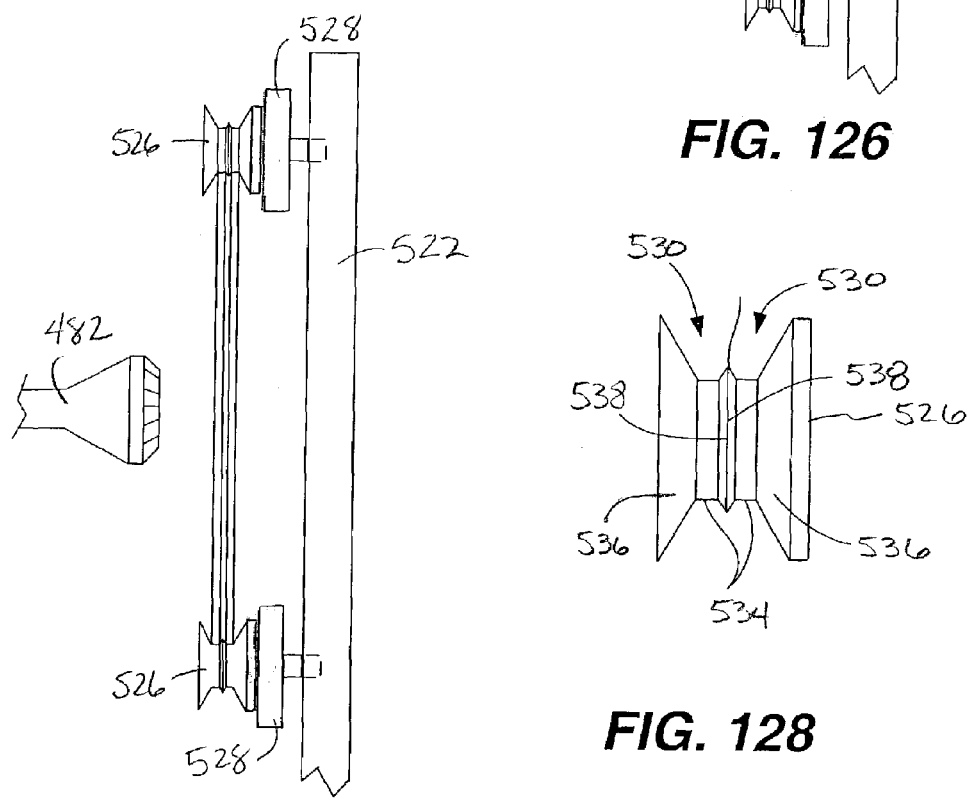
FIG. 127
FIG. 128

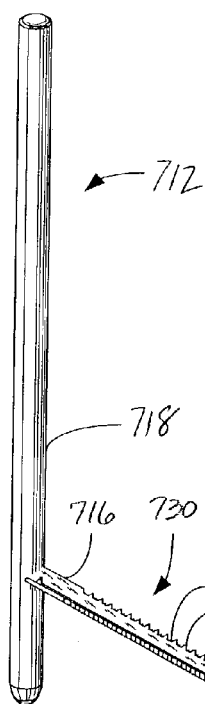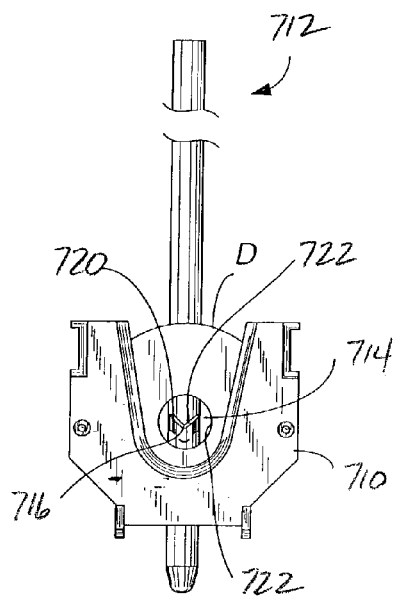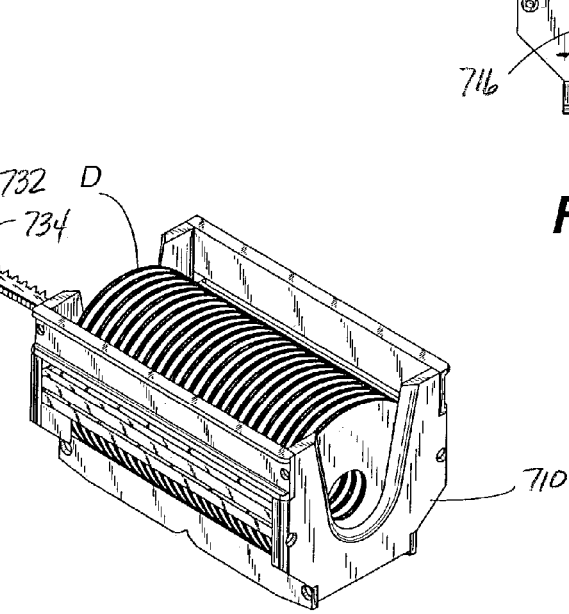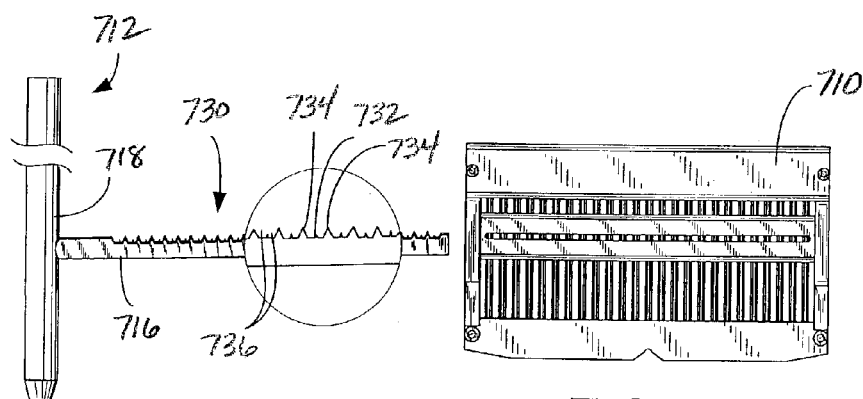
FIG. 137
FIG. 138
FIG. 139

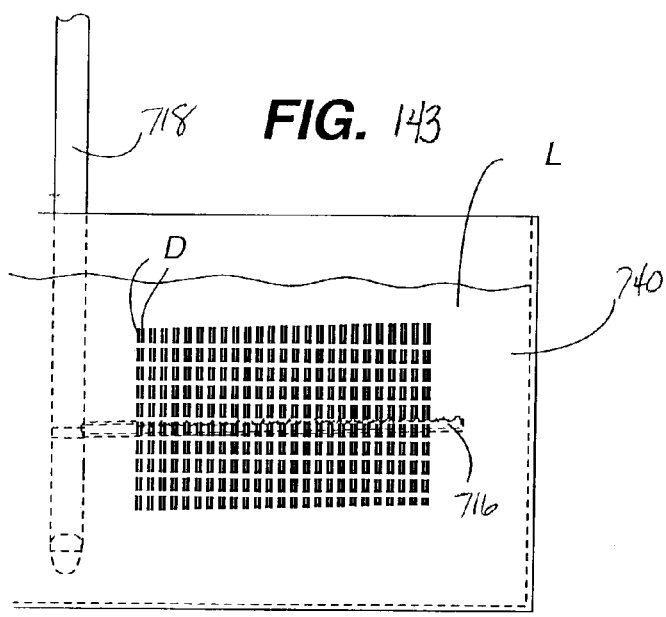
FIG. 143
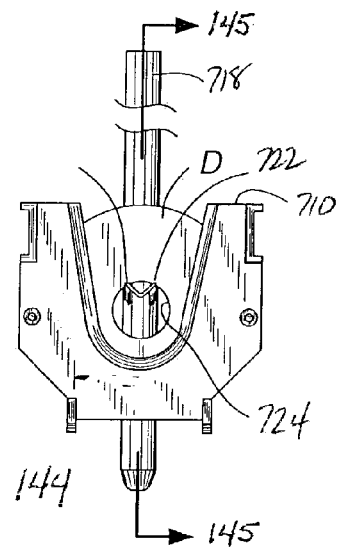
FIG. 144
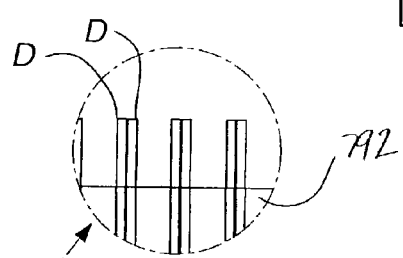
FIG. 147
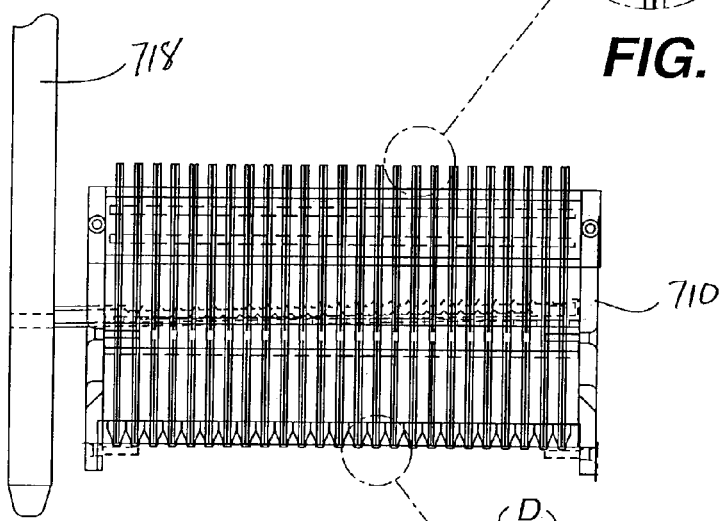
FIG. 145
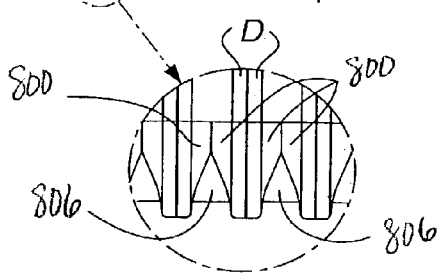
FIG. 146

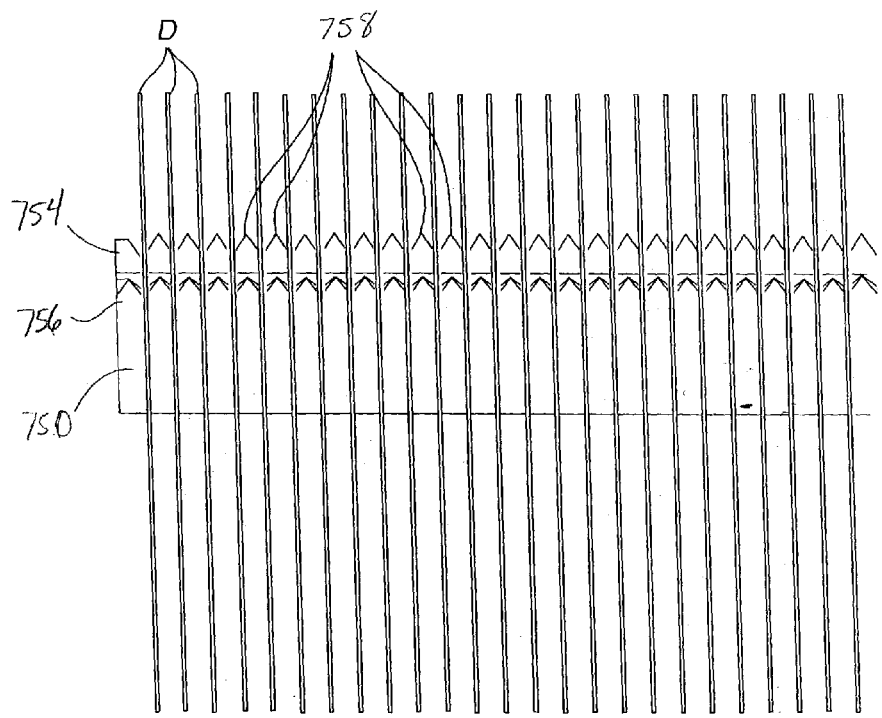
FIG. 150
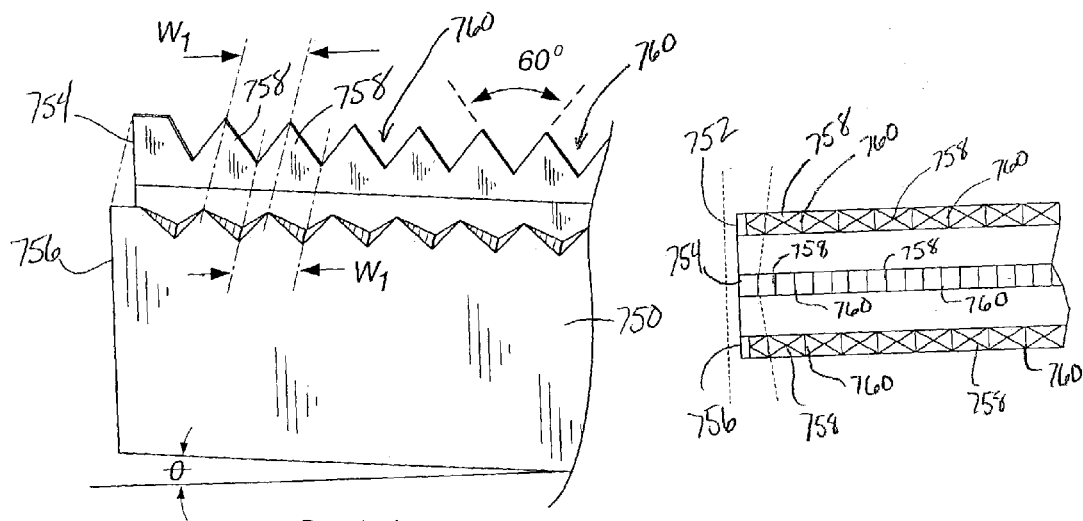 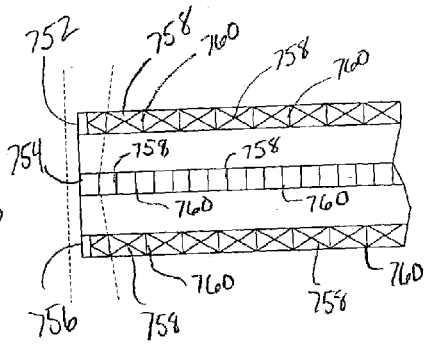
FIG. 151a  FIG. 151b

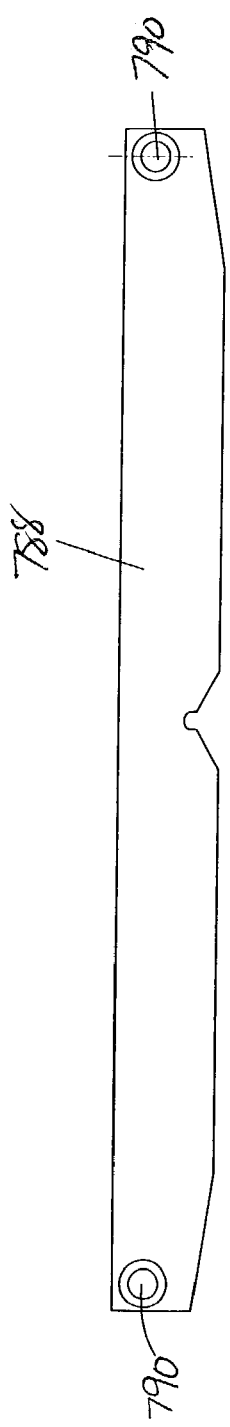
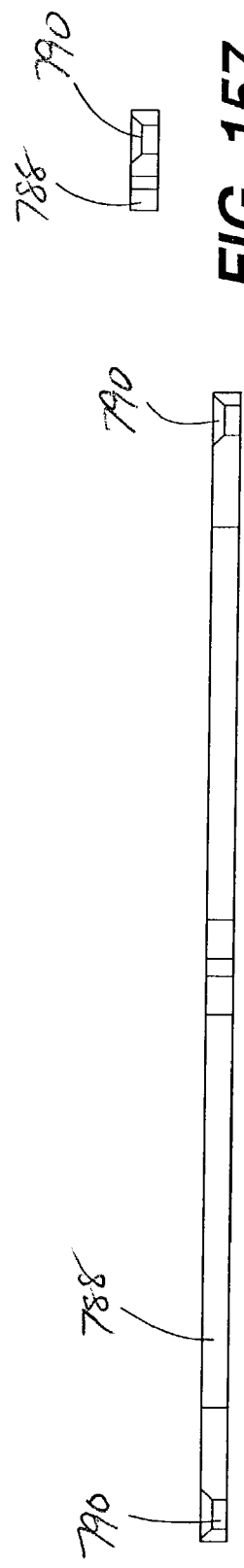
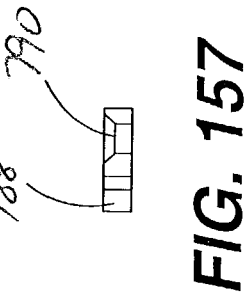
FIG. 157
FIG. 156
FIG. 158

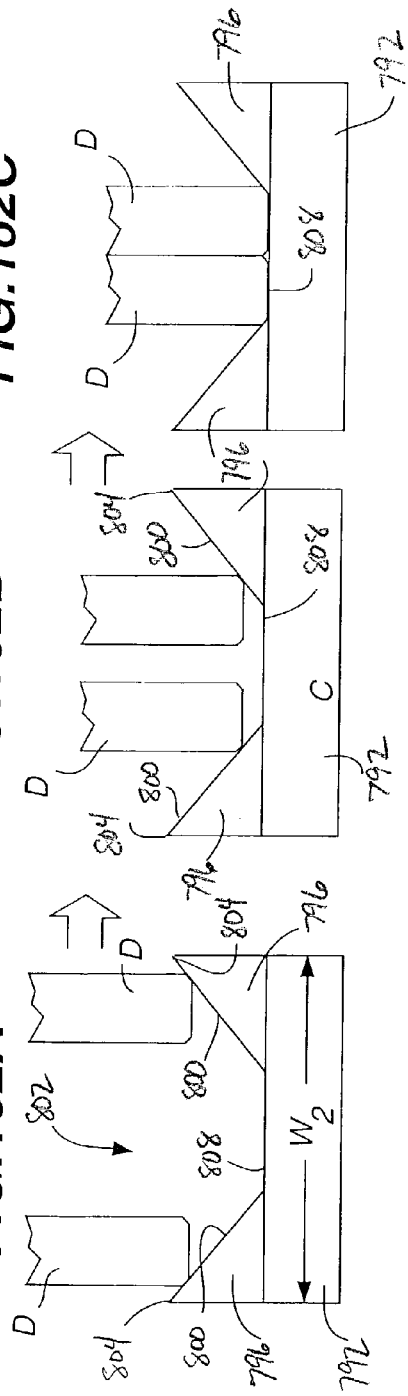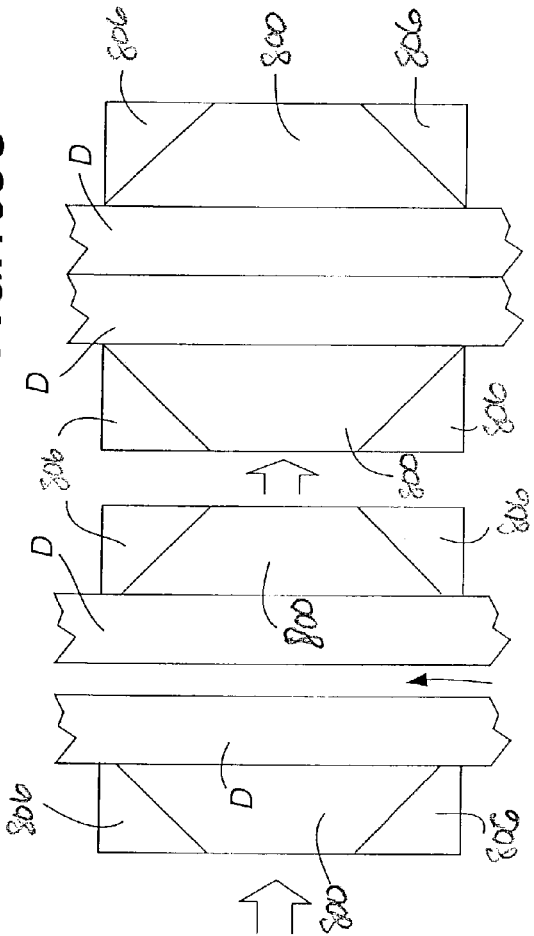

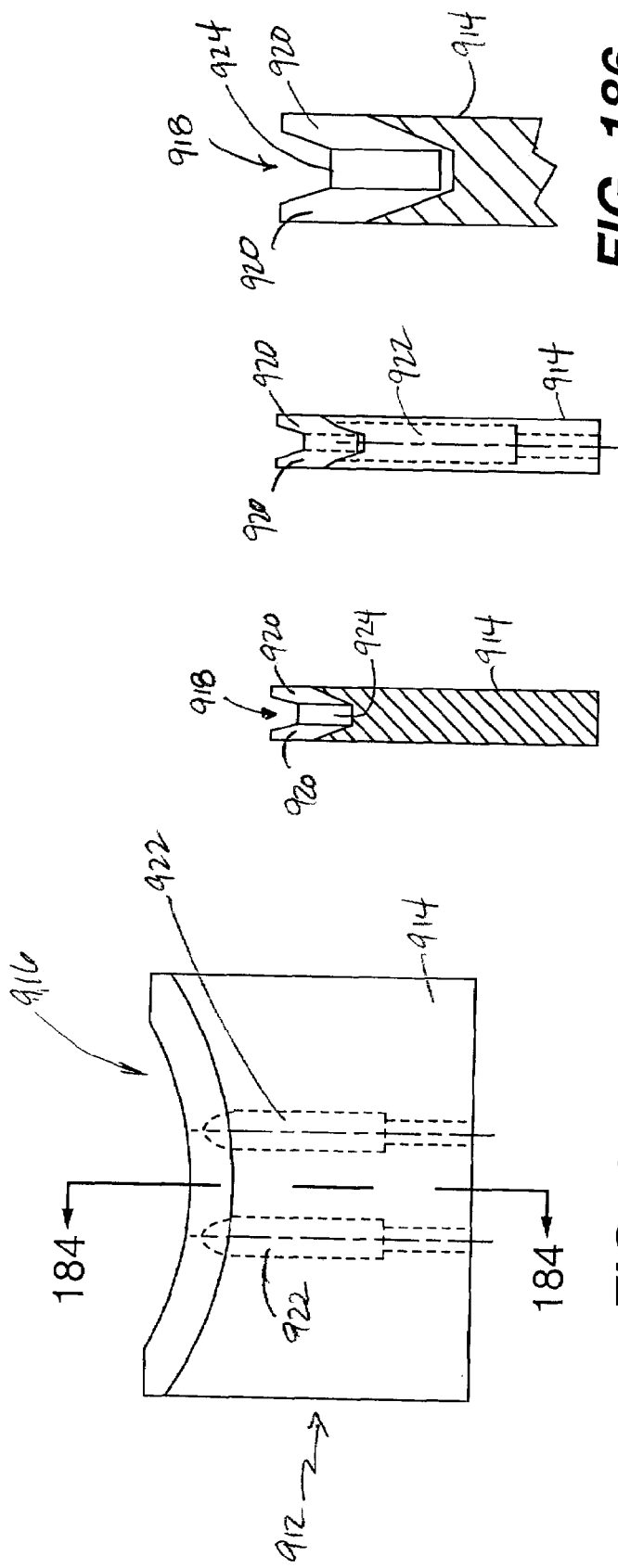
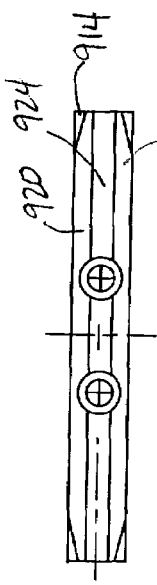
FIG. 182  FIG. 183  FIG. 184  FIG. 185  FIG. 186

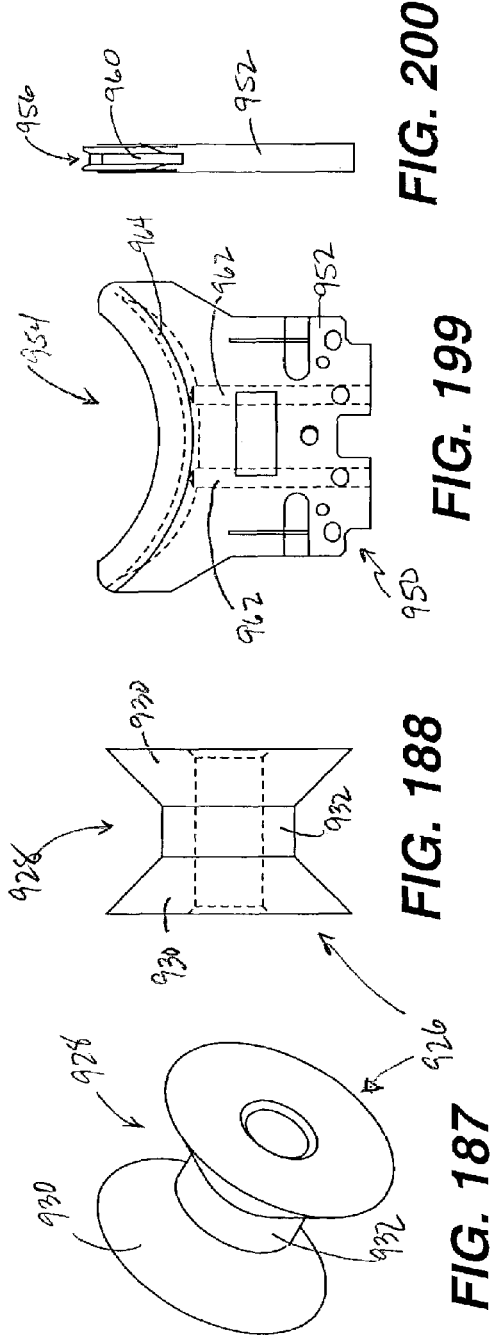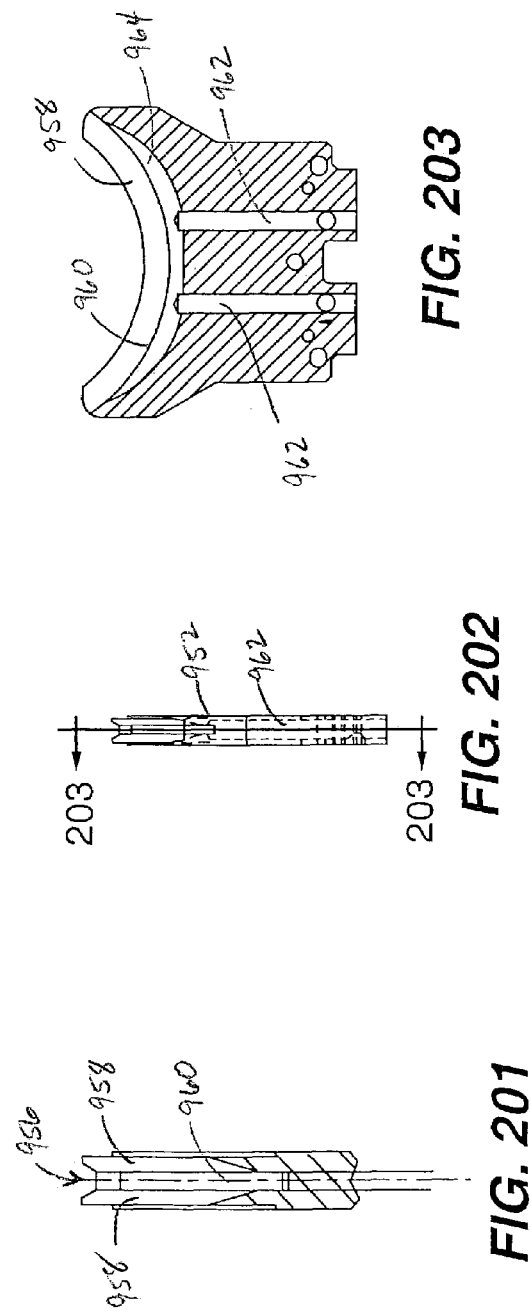

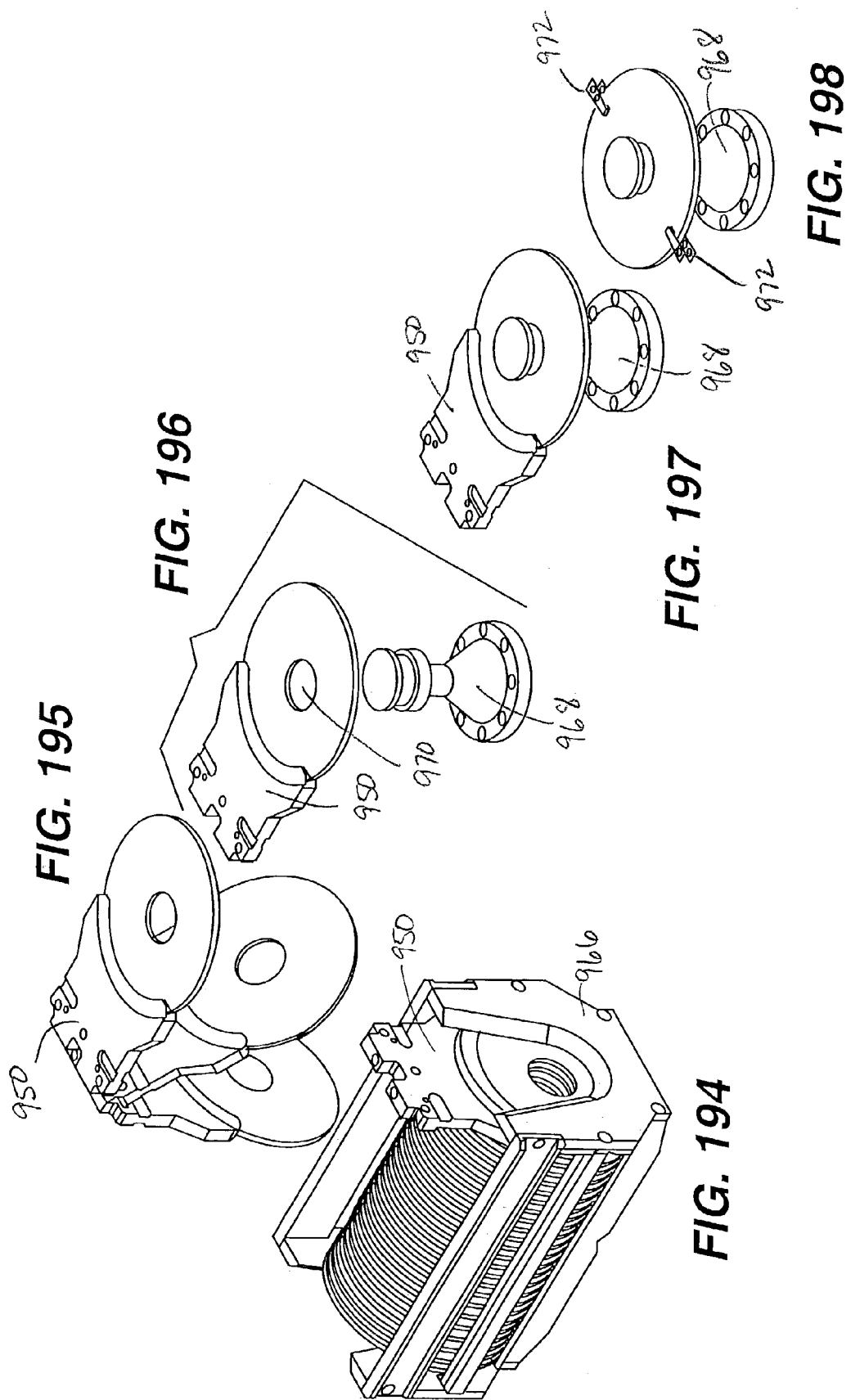

Fig. 210   FIG. 211

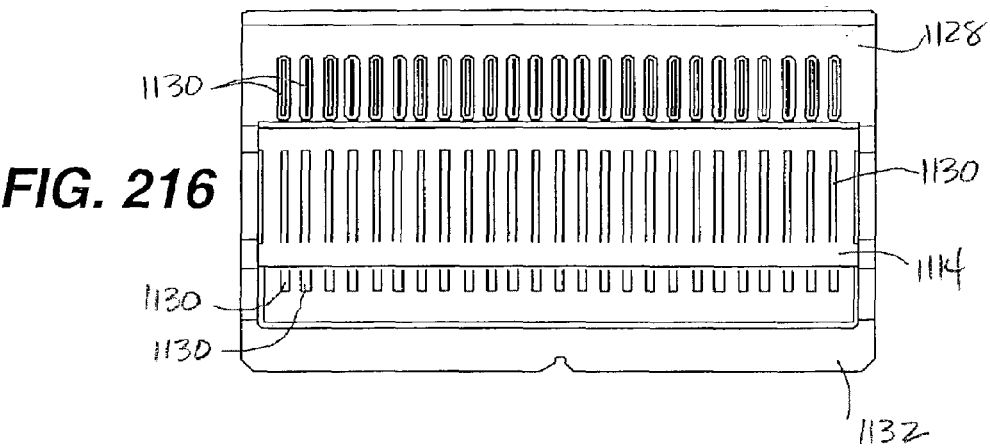
FIG. 216
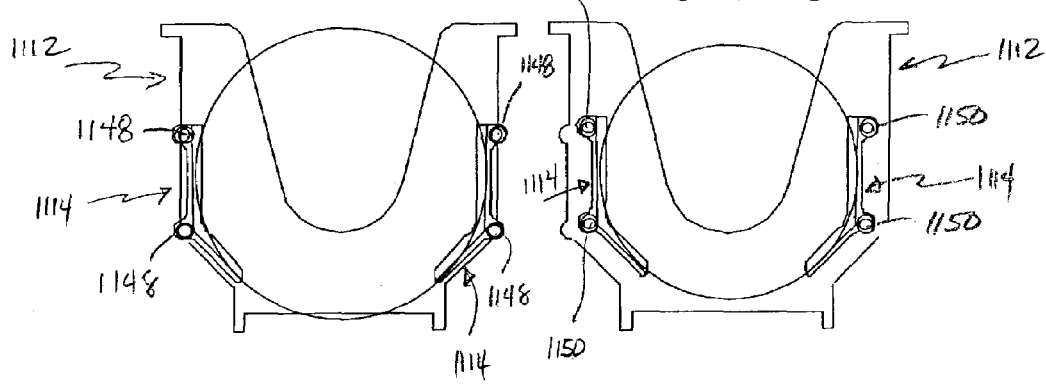
FIG. 217  FIG. 218
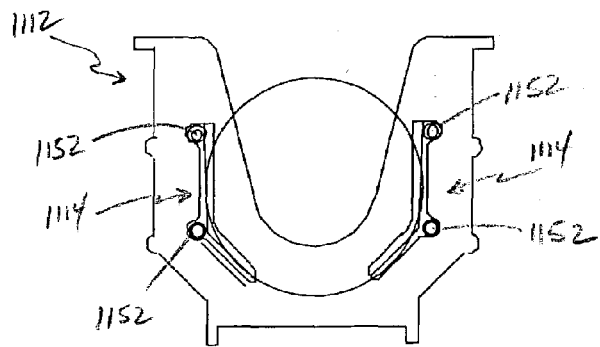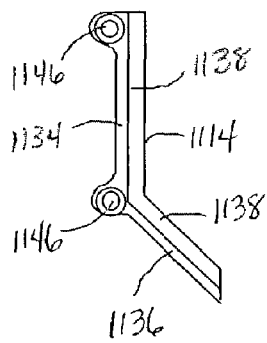
FIG. 219  FIG. 220

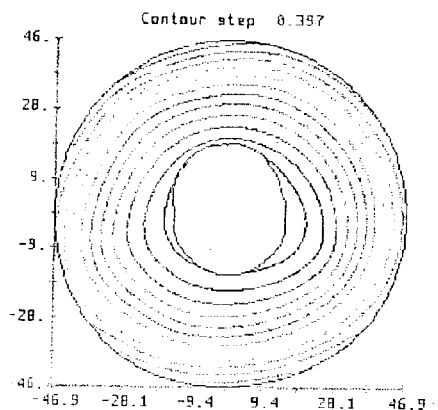 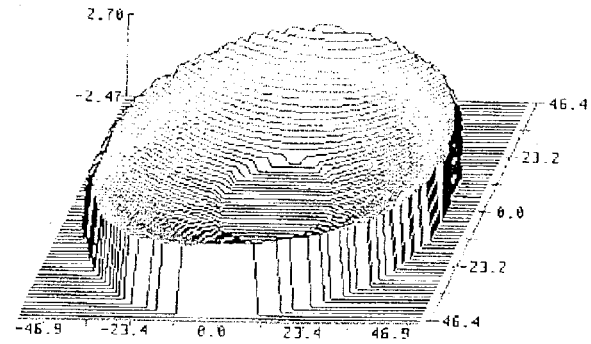
FIG. 233A          FIG. 233B
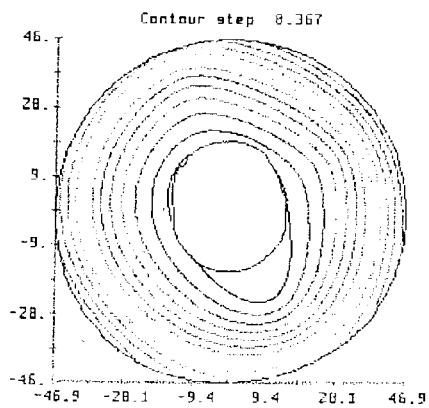 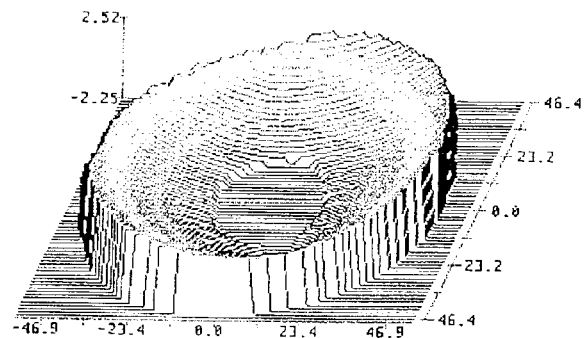
FIG. 234A          FIG. 234B

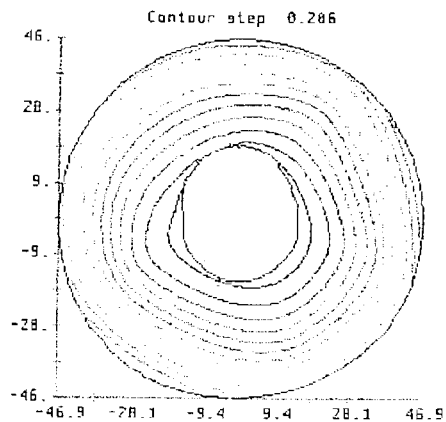 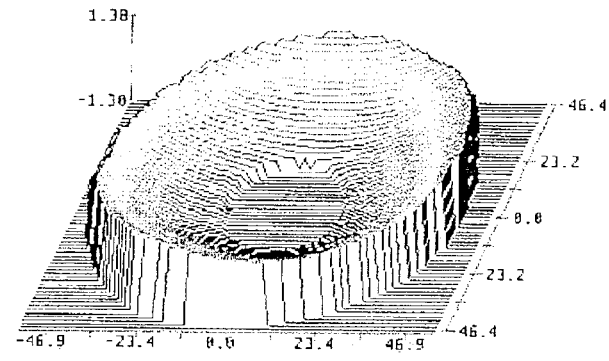
FIG. 235A  FIG. 235B
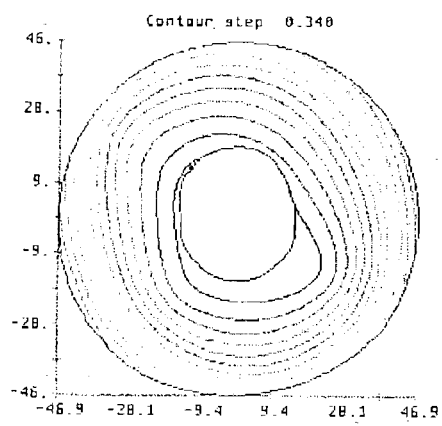 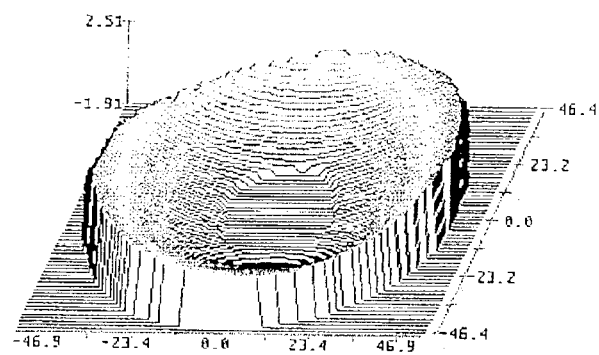
FIG. 236A  FIG. 236B

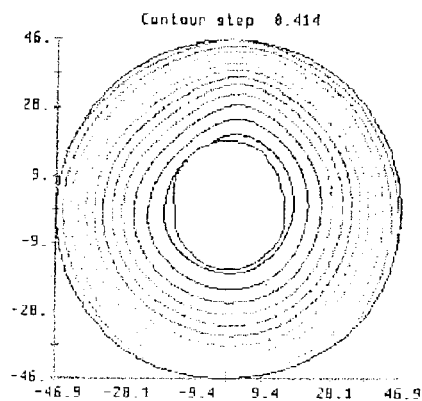
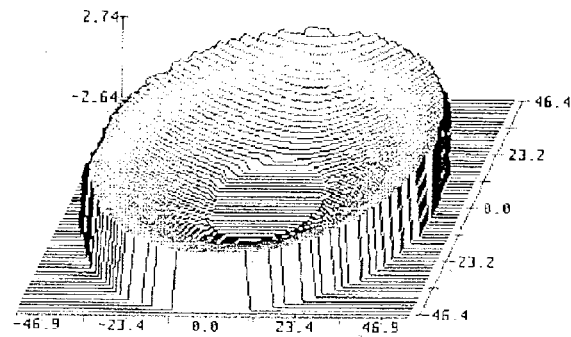
FIG. 237A  FIG. 237B
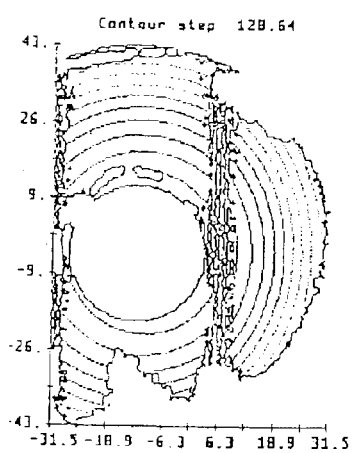
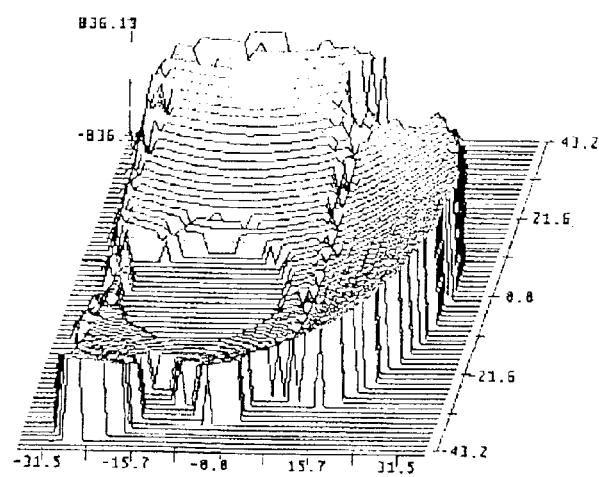
FIG. 238A  FIG. 238B

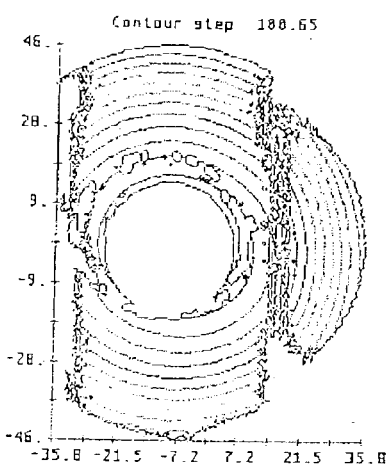 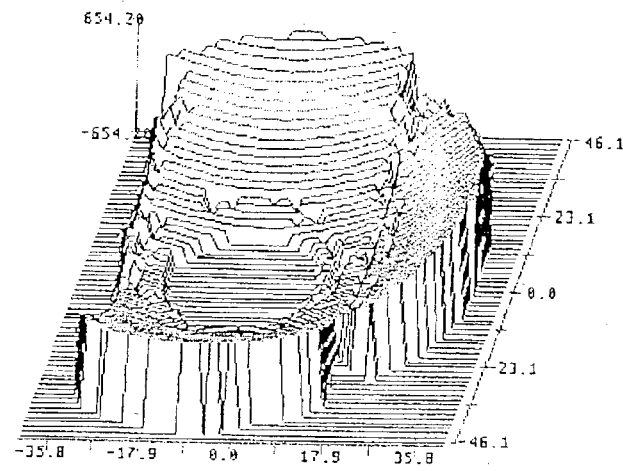
FIG. 239A    FIG. 239B
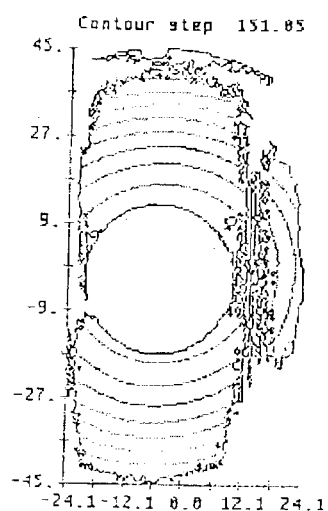 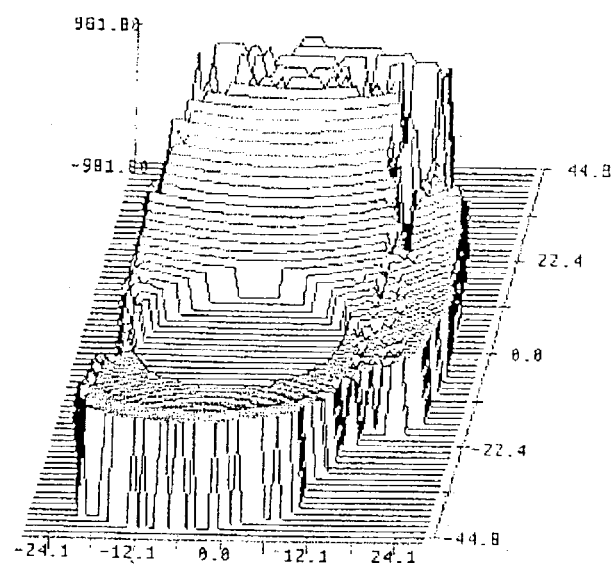
FIG. 240A    FIG. 240B

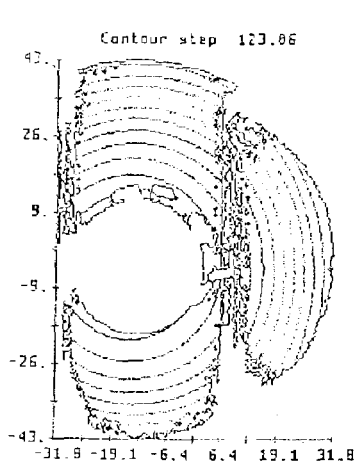 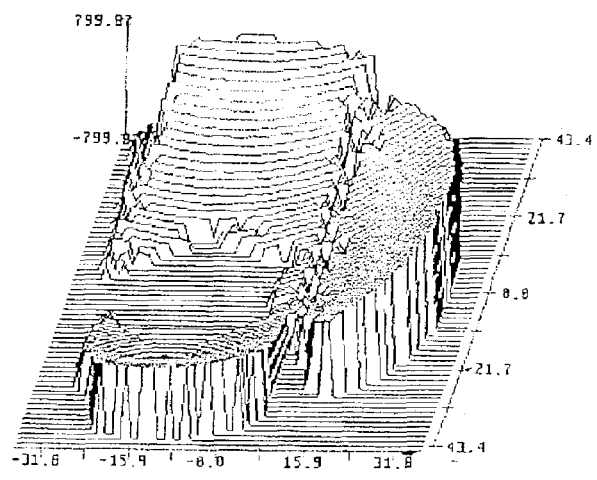
FIG. 241A   FIG. 241B
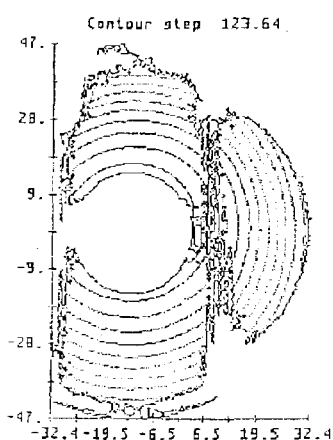 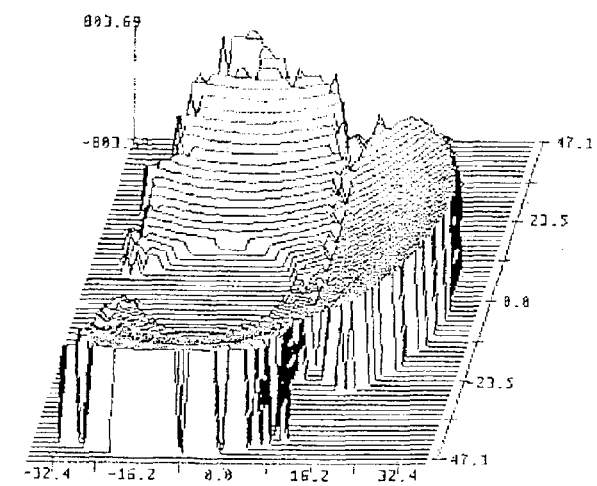
FIG. 242A   FIG. 242B

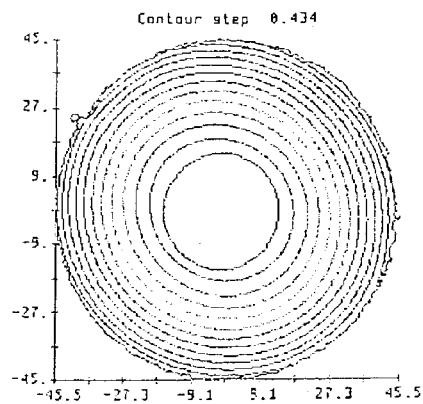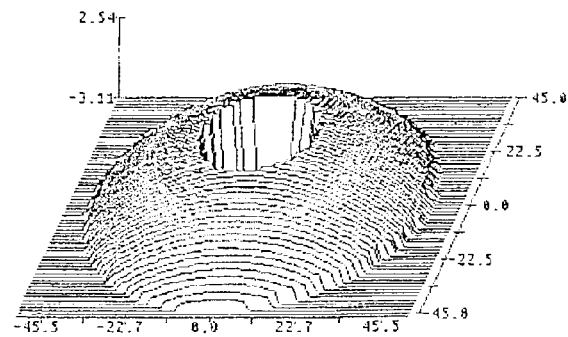
FIG. 243A  FIG. 243B
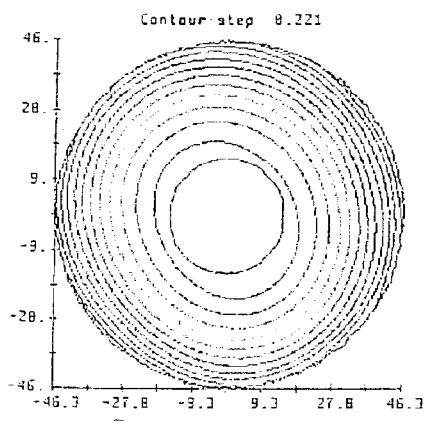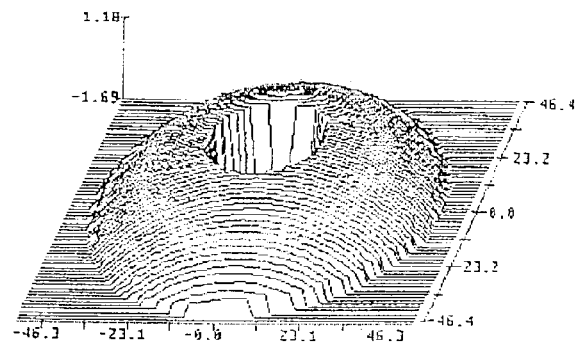
FIG. 244A  FIG. 244B

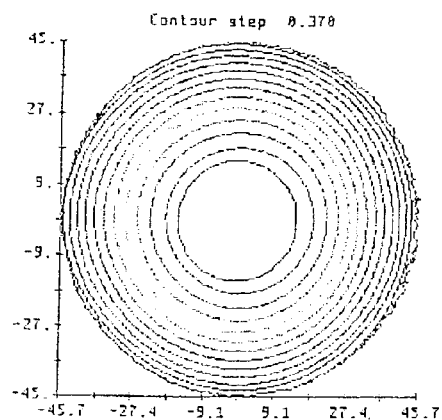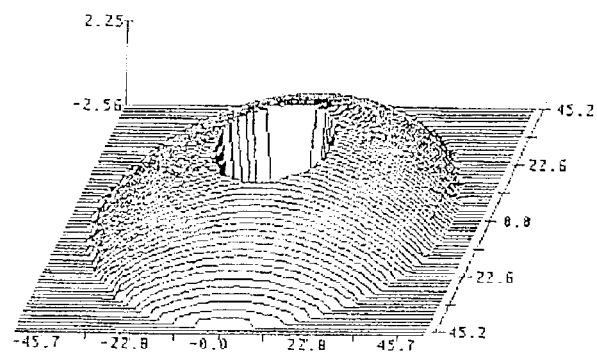
FIG. 245A  FIG. 245B
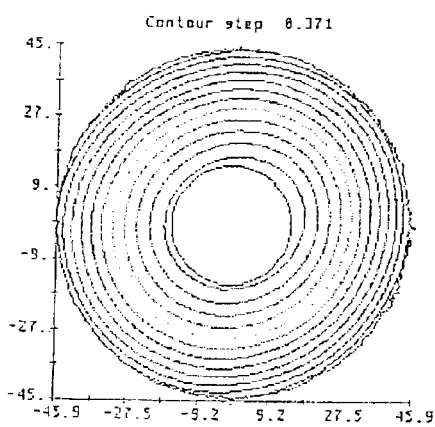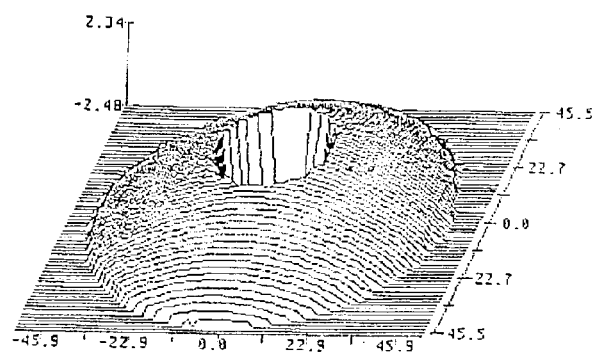
FIG. 246A  FIG. 246B

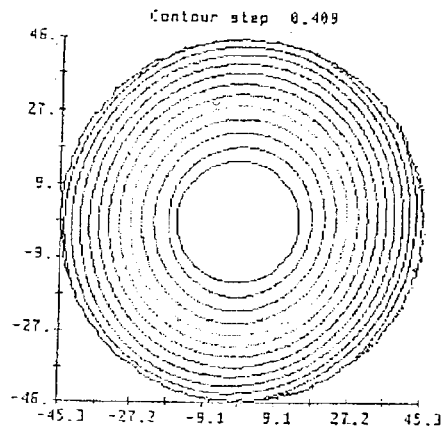 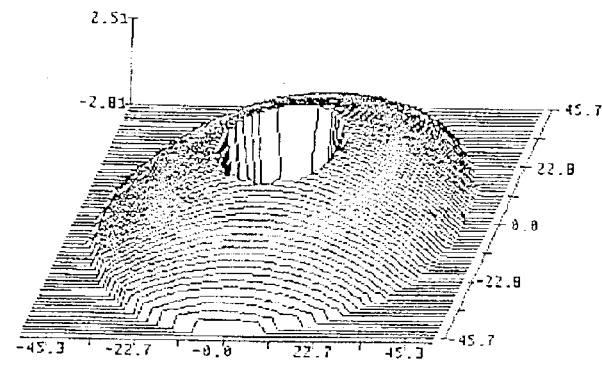
FIG. 247A  FIG. 247B
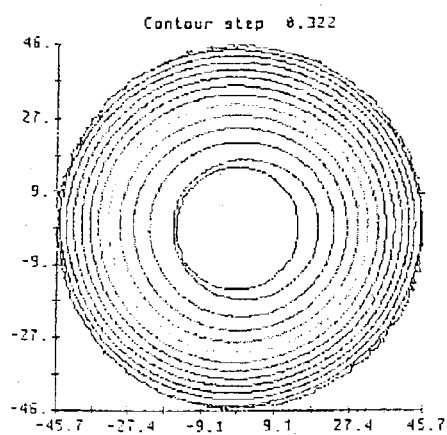 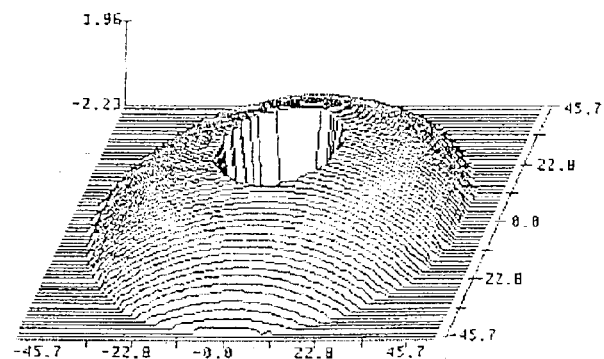
FIG. 248A  FIG. 248B

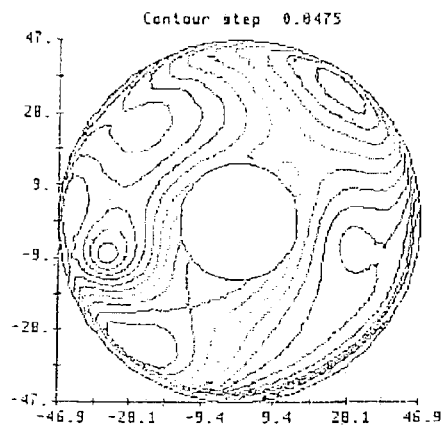 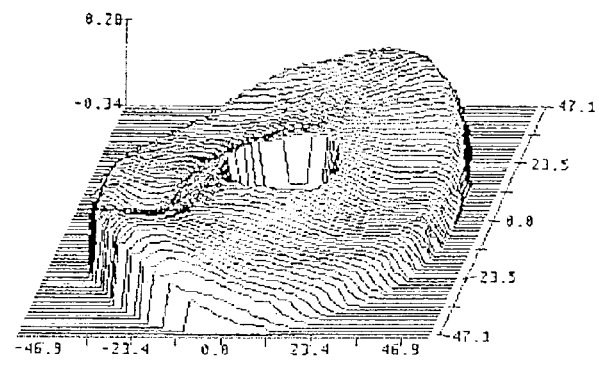
FIG. 249A    FIG. 249B
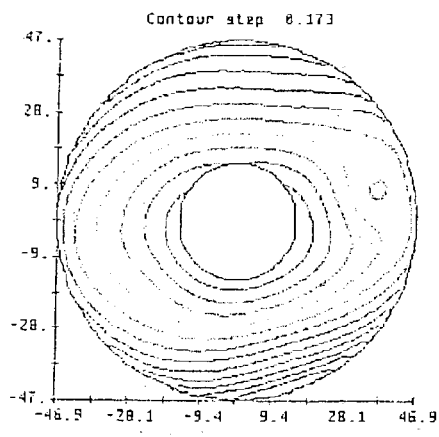 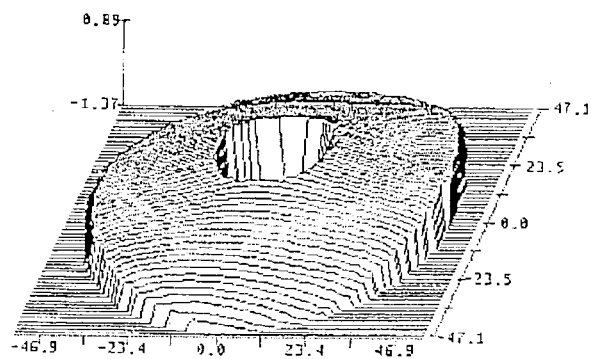
FIG. 250A    FIG. 250B

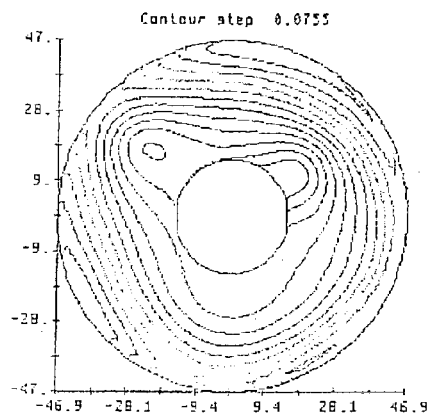 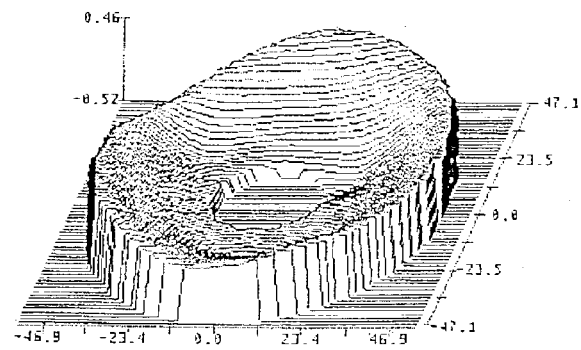
FIG. 251A  FIG. 251B
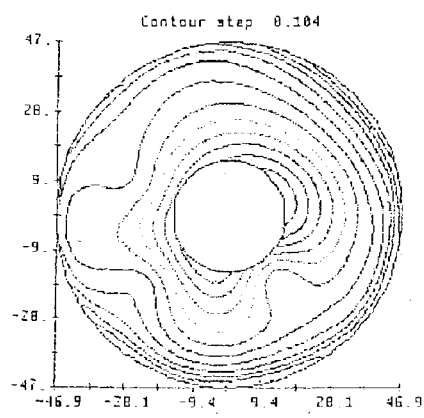 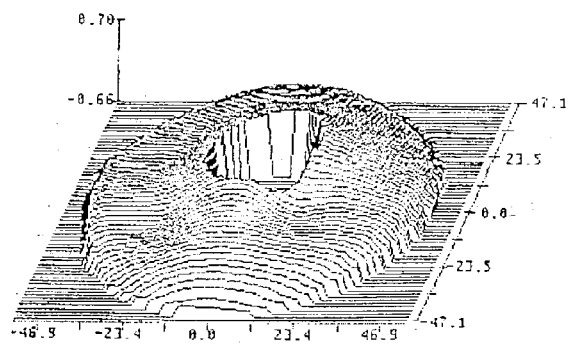
FIG. 252A  FIG. 252B

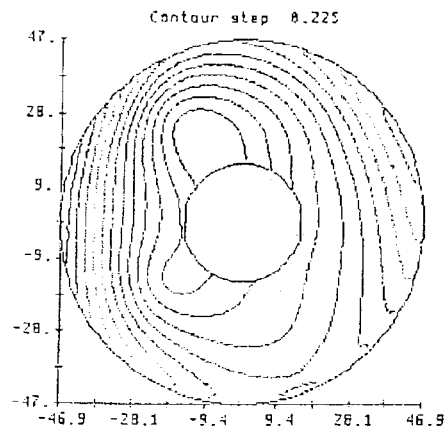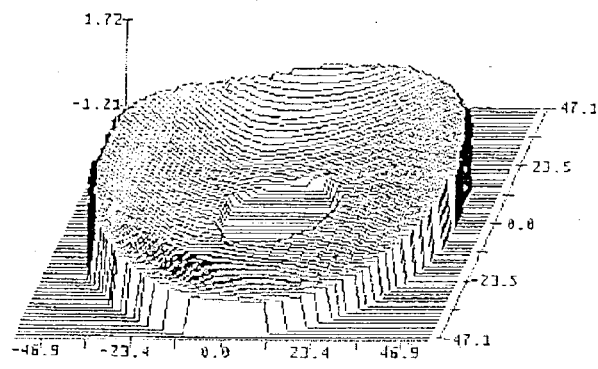
FIG. 253A  FIG. 253B
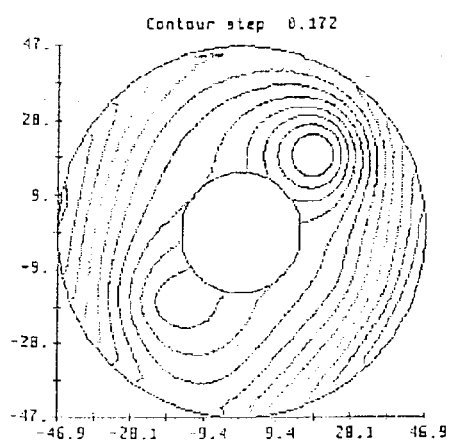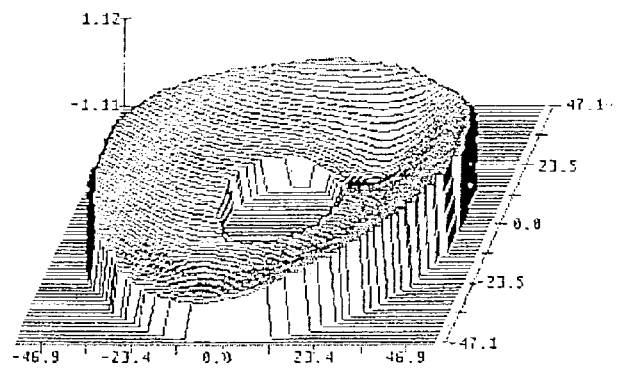
FIG. 254A  FIG. 254B

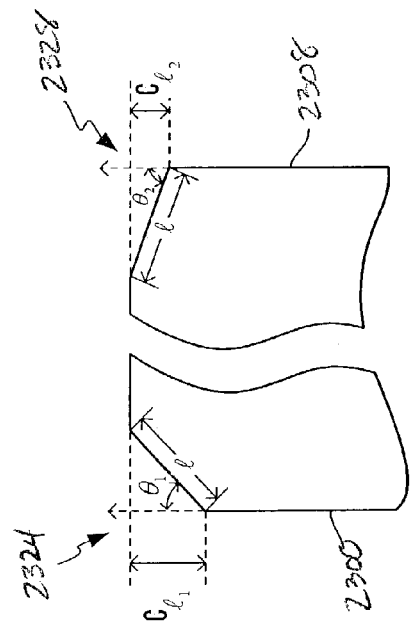
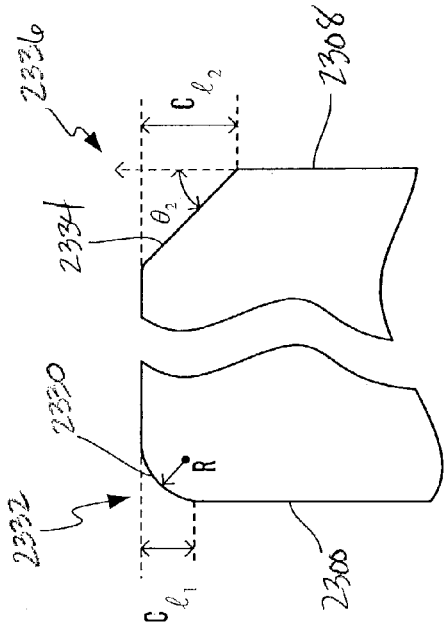
FIG. 257A
FIG. 257B
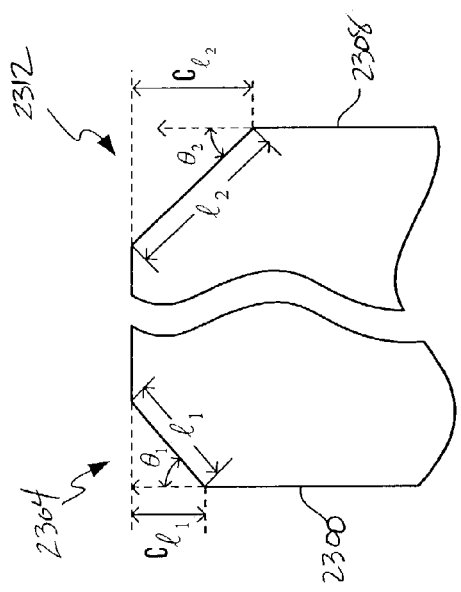
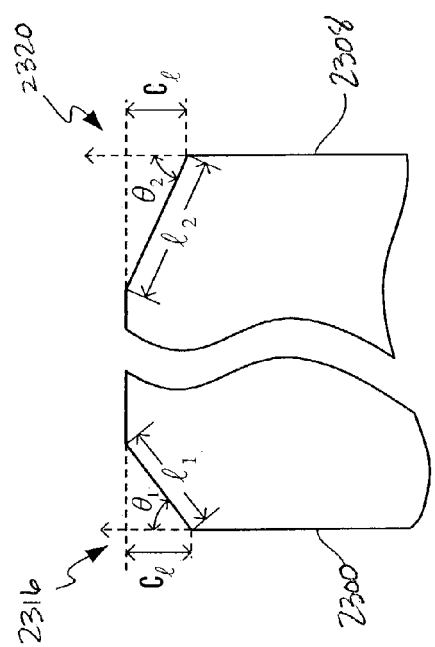
FIG. 257C
FIG. 257D

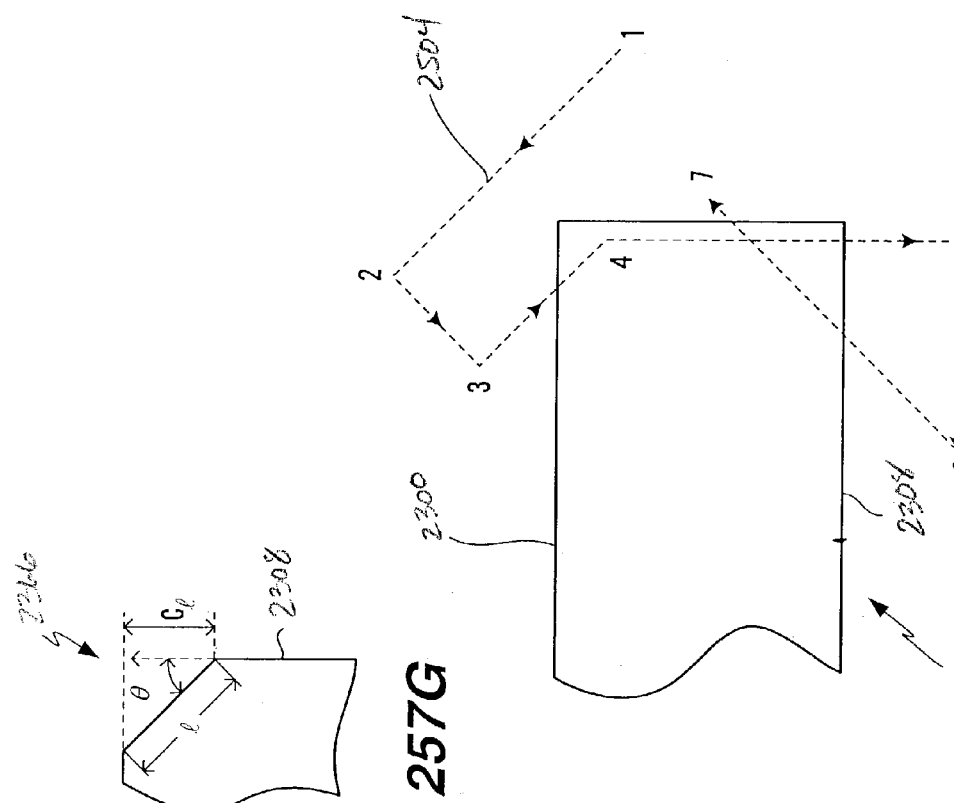
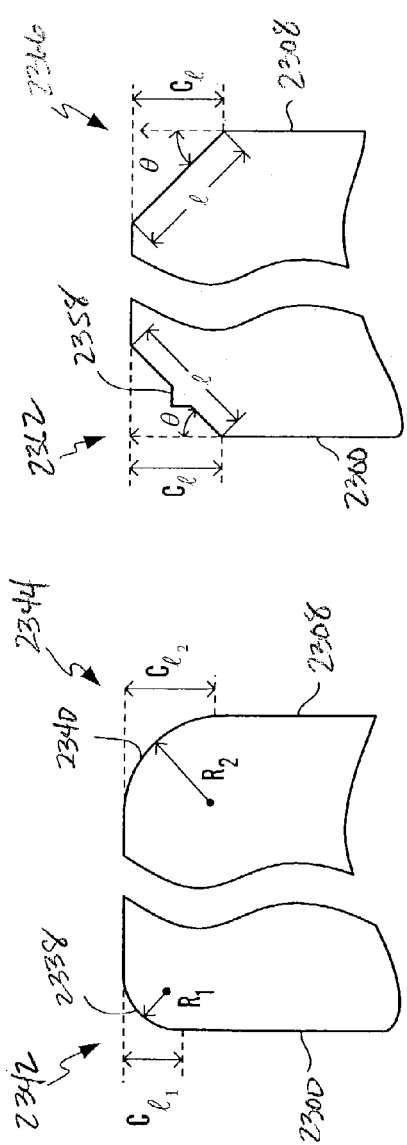
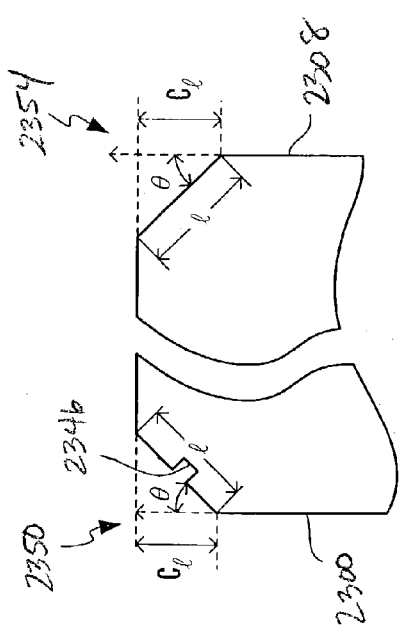

METHOD OF SIMULTANEOUS TWO-DISK PROCESSING OF SINGLE-SIDED MAGNETIC RECORDING DISKS

CROSS REFERENCE TO RELATED APPLICATIONS

Priority is claimed from U.S. Provisional Patent Application Serial Nos. 60/379,227 and 60/378,970, both filed May 9, 2002, which are incorporated by reference herein in their entirety.

The subject matter of the present application is related to the following applications, each of which has a filing date of May 9, 2003: application Ser. No. 10/434,550 entitled Single-Sided Sputtered Magnetic Recording Disks to Clasara et al. (Publication No. US-2003-0211361-A1); application Ser. No. 10/435,361 entitled Dual Disk Transport Mechanism Processing Two Disks Tilted Toward Each Other to Grow et al. (Publication No. US-2003-0208899-A1); application Ser. No. 10/435,358 entitled Information-Storage Media With Dissimilar Outer Diameter and/or Inner Diameter Chamfer Designs On Two Sides to Clasara et al. (Publication No. US-2003-0210498-A1); application Ser. No. 10/435,360 entitled Method of Merging Two Disks Concentrically Without Gap Between Disks to Buitron (Publication No. US-2004-0016214-A1); application Ser. No. 10/434,551 entitled Apparatus for Combining or Separating Disk Pairs Simultaneously to Buitron et al. (Publication No. US-2004-003537-A1); application Ser. No. 10/435,161 entitled W-Patterned Tools for Transporting/Handling Pairs of Disks to Buitron et al. (Publication No. US-2003-0209421-A1); application No. 10/435,295 entitled Method for Servo Pattern Application on Single-Side Processed Disks in a Merged State to Valeri (Publication No. US-2004-0013011-A1); application Ser. No. 10/434,547 entitled Method for Simultaneous Two-Disk Texturing to Buitron et al. (Publication No. US-2004-0070092-A1); application Ser. No. 10/435,227 entitled Cassette for Holding Disks of Multiple Form Factors to Buitron et al. (Publication No. US-2004-0069662A1); application Ser. No. 10/434,546 entitled Automated Merge Nest for Pairs of Magnetic Storage Disks to Crofton et al. (Publication No. US-2004-0071535A1); application Ser. No. 10/435,293 entitled Apparatus for Simultaneous Two-Disk Scrubbing and Washing to Crofton et al. (Publication No. US-2004-0070859-A1); application Ser. No. 10/435,362 entitled Cassette Apparatus for Holding 25 Pairs of Disks for Manufacturing Process to Buitron et al. (Publication No. US-2004-0068862-A1); and application Ser. No. 10/434,540 entitled Method of Lubricating Multiple Magnetic Storage Disks in Close Proximity to Buitron et al. (Publication No. US-2003-0209389-A1). Each of these applications is incorporated by reference in its entirety as if stated herein. All of these applications are commonly owned by the Assignee.

FIELD OF THE INVENTION

The present invention relates to the manufacture of hard memory disks, typically used in hard disk drives. More specifically, it relates to the processing of what are referred to as single-sided disks in which only one of the two surfaces of a disk is fully processed to provide functional or active memory capability. Still further, the present invention relates to the processing of single-sided disks in pairs, where two disks are processed simultaneously.

BACKGROUND OF THE INVENTION

Hard disk drives are an efficient and cost effective solution for data storage. Depending upon the requirements of the particular application, a disk drive may include anywhere from one to eight hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

Typically, hard memory disks are produced with functional magnetic recording capabilities on both sides or surfaces of the disk. In conventional practice, these hard disks are produced by subjecting both sides of a raw material substrate disk, such as glass, aluminum or some other suitable material, to numerous manufacturing processes. Active materials are deposited on both sides of the substrate disk and both sides of the disk are subject to full processing such that both sides of the disk may be referred to as active or functional from a memory storage stand point. The end result is that both sides of the finished disk have the necessary materials and characteristics required to effect magnetic recording and provide data storage. These are generally referred to as double-sided process disks. A schematic representation of a double-sided process disk $D_d$ is shown in FIGS. 1-3. As illustrated in FIG. 3, materials M are deposited on both sides of the substrate disk S. Assuming both surfaces pass certification testing and have no defects, both sides of the disk may be referred to as active or functional for memory storage purposes. These disks are referred to as double-sided test pass disks. Double-sided test pass disks may be used in a disk drive for double-sided recording.

Conventional double-sided processing of hard memory disks involves a number of discrete steps. Typically, twenty-five substrate disks are placed in a plastic cassette, axially aligned in a single row. Because the disk manufacturing processes are conducted at different locations using different equipment, the cassettes are moved from work station to work station. For most processes, the substrate disks are individually removed from the cassette by automated equipment, both sides or surfaces of each disk are subjected to the particular process, and the processed disk is returned to the cassette. Once each disk has been fully processed and returned to the cassette, the cassette is transferred to the next work station for further processing of the disks.

More particularly, in a conventional double-sided disk manufacturing process, the substrate disks are initially subjected to data zone texturing. Texturing prepares the surfaces of the substrate disks to receive layers of materials which will provide the active or memory storage capabilities on each disk surface. Texturing may typically be accomplished in two ways: fixed abrasive texturing or free abrasive texturing. Fixed abrasive texturing is analogous to sanding in which a fine grade sand paper or fabric is pressed against both sides of a spinning substrate disk to roughen or texturize both surfaces. Free abrasive texturing involves applying a rough woven fabric against the disk surfaces in the presence of a slurry. The slurry typically contains diamond particles, which perform the texturing, a coolant to reduce heat generated in the texturing process and deionized water as the base solution. Texturing is typically followed by washing to remove particulate generated during texturing.

Washing is a multi-stage process and usually includes scrubbing of the disk surfaces. The textured substrate disks are then subjected to a drying process. Drying is performed on an entire cassette of disk devices at a time. Following drying, the textured substrate disks are subjected to laser zone texturing. Laser zone texturing does not involve physically contacting and applying pressure against the substrate disk surfaces like data zone texturing. Rather, a laser beam is focused on and interacts with discrete portions of the disk surface, primarily to create an array of bumps for the head and slider assembly to land on and take off from. Laser zone texturing is performed one disk at a time. The disks are then washed again. Following a drying step, the disks are individually subjected to a process which adds layers of material to both surfaces for purposes of creating data storage capabilities. This can be accomplished by sputtering, deposition or by other techniques known to persons of skill in the art. Following the addition of layers of material to each surface, a lubricant layer typically is applied. The lubrication process can be accomplished by subjecting an entire cassette of disks to a liquid lubricant; it does not need to be done one disk at a time. Drying is also performed on an entire cassette of disks at one time. Following lubrication, the disks are individually subjected to surface burnishing to remove asperities, enhance bonding of the lubricant to the disk surface and otherwise provide a generally uniform finish to the disk surface. Following burnishing, the substrate disks are also subjected to various types of testing. Examples of testing include glide testing to find and remove disks with asperities that could affect flying of the head/slider assembly and certification testing which is writing to and reading from the disk surfaces. Certification testing is also used to locate and remove disks with defects that make the surface unusable for data storage. The finished disks can then be subjected to a servo-writing process and placed in disk drives, or placed in disk drives and then subjected to servo-writing. The data zone texturing, laser zone texturing, scrubbing, sputtering, burnishing and testing processes are done one disk at a time, with each surface of a single disk being processed simultaneously.

Although the active materials and manufacturing processes, by their nature, are difficult and expensive to employ, over the years, the technology used to manufacture hard memory disks has rapidly progressed. As a result, the density of information that can be stored on a disk surface is remarkable. Indeed, double-sided test pass disks used in personal computers have much greater storage capacity than most consumers require during the useful life of the computer. Consumers thus are forced to pay substantial amounts for excess storage capacity and the components to access that excess storage capacity. This has caused some disk drive manufacturers, in some current applications, to manufacture and sell disk drives which utilize only one side of a double-sided test pass disk for storage purposes or which use the good side of a double-sided process disk where one surface passed certification testing and the second surface failed. In either case, the second surface, despite being fully processed, is unused. However, the disk drive manufacturer reduces its cost by eliminating the mechanical and electrical components needed to access the unused disk surface. These disk drives are referred to as single-side drives and are typically used in low-end or economy disk drives to appeal to the low cost end of the marketplace. Although this approach may reduce some cost, it does not reduce the wasted cost of manufacturing the unused storage surface of each disk. Thus, substantial savings can be achieved by not only manufacturing disks with a single active or functional side, but doing so in a cost-effective manner.

In contrast to a double-sided disk, a single-sided disk $D_s$ has only one functional memory surface with active recording materials M. (See, FIGS. 4-6.) It is not a double-sided process disk where one side is not accessed or where one side has failed testing. Rather, manufacturing processes are applied in a controlled manner only to one side of the disk using unique single-sided processing techniques. In contrast to conventional double-sided disks, active recording materials are only applied to, and full processing is only conducted on, one side of the disk. Thus, substantial savings are achieved by eliminating processing the second side of each disk.

Additionally, the present invention achieves advantages by utilizing conventional double-sided disk manufacturing equipment and processes, with limited modification. The present invention enables simultaneous processing of two substrate disks through the same equipment and processes used to manufacture double-sided disks. Simultaneously processing two substrate disks results in the production of two single-sided disks in the same time and using essentially the same equipment as currently is used in the production of one double-sided disk. However, each single-sided disk has only a single active or functional surface. For illustrative purposes FIG. 7 shows a side-by-side schematic representation of the processing of one double-sided disk $D_d$, depicted on the left side of FIG. 7, versus the simultaneous processing of two single-sided disks $D_s$, depicted on the right side of FIG. 7. In each case, the double-sided disk or the two single-sided disks are subjected to the same process steps 1 through N, but the single-sided disk processing produces two disks in the same time the double-sided disk processing produces one disk.

A benefit provided by simultaneous single-sided processing of disks is a substantial cost savings achieved by eliminating the application of materials to and processing of one side of each disk. A further, and potentially significant cost savings can be achieved by utilizing existing double-sided disk processing equipment, with limited modification, to process pairs of single-sided disks. A still further benefit is a substantial increase in production (or reduction in processing time depending upon perspective). By utilizing existing double-sided disk processing equipment, approximately twice the productivity of a conventional double-sided production process is achieved (on the basis of numbers of disks produced) in the production of single-sided disks. Moreover, these increased productivity levels are achieved at approximately the same material cost, excepting the substrate disk, as producing half as many double-sided disks.

The simultaneous processing is achieved by combining two substrate disks together into a substrate disk pair or disk pair. A disk pair is two substrate disks that are oriented in a back-to-back relationship with the back-to-back surfaces either in direct physical contact or closely adjacent with a slight separation. The separation can be achieved with or without an intervening spacer. The substrate disk pair progresses through each process step in much the same way as one double-sided disk, but with only the outwardly facing surface of each disk in the pair being subjected to the full process. Thus, the outwardly facing surface of each pair becomes the active or functional surface and the inwardly facing surface of each pair remain inactive or non-functional.

For convenience and understanding, the following terms will have the definitions set forth:

a) "R-side" and "L-side" refer to the active side and inactive side of a disk, respectively. R-side is the side that does or will have active recording materials and memory capability. The R-side may also be referred to as the active or functional side. The L-side is the side that has little or no active recording materials or memory capabilities; it is non-functional or inactive from a data storage stand point.

b) "Merge" means to bring two disks closer together to form a pair of disks, a disk pair or a substrate pair.

c) "Demerge," conversely, means that a merged pair of disks is separated from each other.

d) "Disk" means a finished memory disk and all predecessor configurations during the manufacturing process starting with a substrate disk and progressing to a finished memory disk, depending upon the context of the sentence in which it is used.

e) "Disk pair" or "substrate pair" means two disks positioned in contact merge, gap merge or spacer merge orientation.

f) "Double-sided disk" means a single disk which has been subjected to double-sided processing, whether or not both sides of the disk have passed testing or only one side has passed testing.

g) "Gap merge" means a pair of disks that have been merged, but a space is maintained between the two merged disks. One or more spacers may or may not be used to maintain the gap or space. Gap merge includes both concentric and non-concentric merge. It should be understood that there is no precise dimension or limit to the space between the disks that causes them to be gap merged. Gap merge also includes the situation where the gap between the disks gradually decreases from one perimeter edge to the opposite perimeter edge of the disks when the two disks are angled toward each other. An example is when the bottom perimeter edges of the disks are spaced apart and the upper perimeter edges are in contact.

h) "Single-sided disks" means a single disk which has been subjected to single-side processing, where only one surface of the disk is fully processed.

i) "Spacer merge" means a spacer body is used to create spacing between two gap-merged disks.

j) "Contact merge" means a merged pair of disks where the inside surface of each disk is in contact with the inside surface of the other disk. Contact merge includes concentric and non-concentric merge.

k) "Concentric merge" means that two merged disks have the same axis and, assuming the two disks have the same outside diameter and inside diameter (as defined by the center aperture), their outer and inner perimeter edges are aligned.

l) "Concentric contact merge" means a pair of disks that are oriented in both a contact merge and a concentric merge.

m) "Non-concentric merge" or "off-centered merge" means the two merged disks are not concentric to each other or their perimeter edges are not aligned.

n) "Non-concentric contact merge" means the two contact merged disks are not concentric to each other or their perimeter edges are not aligned.

Referring to FIG. 9, a cross-section of a pair of gap-merged disks is shown. The R-side (active or functional side) is the outwardly facing surface R of each disk within the pair. The L-side (inactive or nonfunctional side) is the inwardly facing surface L of each disk within the pair. In comparison, a cross-section of a pair of concentric contact merged disks is shown in FIG. 8. The relative orientation of the R-side and L-side of each disk remains the same, however, the L-side of each disk of the pair are in contact and the outer and inner perimeter P of each disk is aligned with the outer and inner perimeter P of the other disk.

A conventional double-sided disk is shown in FIG. 10. The left side surface is referred to as the "A" side and the right side surface is referred to as the "B" side. Both the A and B sides are subjected to processing, including the addition of active or magnetic materials. In contrast, with reference to FIGS. 8 and 9, the R-side of each disk in a pair of disks is oriented on the outside of the pair and is subjected to processing in the same fashion as the A and B sides of a double-sided disk. Conversely, the L-side of each disk in a pair of disks is oriented on the inside of the pair and is not subjected to full processing in the same fashion as the A and B sides of a double-sided disk.

SUMMARY OF THE INVENTION

These and other advantages are addressed by the various embodiments and configurations of the present invention. Two single-sided substrate disks are simultaneously processed using equipment designed and built for processing conventional double-sided disks one at a time. Substrate disks are positioned in pairs for handling, transport and processing. The substrate disks are positioned in close proximity with one surface of one substrate disk abutting or slightly spaced from one surface of the other substrate disk. This juxtaposition of the two disks permits simultaneous processing. As a result, only the outside surfaces, the R-sides, of the two disks are fully subjected to each and every process. Because the inside surfaces are not fully processed, they are inactive in the sense they are incapable of storing data.

In one embodiment, for data zone texturing and laser zone texturing, the disk pairs are handled and transported in a gap merge orientation and textured in a concentric contact orientation. For scrubbing and cleaning, the disk pairs are handled and transported in gap merge orientation and scrubbed in concentric contact merge orientation. For sputtering, the disk pairs are handled, transported and processed in a gap merge orientation. For lubrication, the disks are handled, transported and processed in an equally spaced relationship. Typically, all of the disks in a cassette are subjected to the lubrication process at the same time, much like a conventional lubrication process. Following lubrication, the disks are repositioned into pairs having a concentric contact merge orientation. In post-lubrication processes of tape burnishing, testing and servo-track writing, the disks are handled, transported and processed in concentric contact merge orientation. Following testing and removal of any failing disks, the disks are demerged or separated into cassettes where the individual disks are positioned (with their active and inactive surfaces oriented in the same direction). The disks are subsequently assembled into disk drives or similar equipment.

The single-sided disk processing of the present invention offers great flexibility. It will be appreciated that simultaneous single-sided disk processing techniques do not need to be utilized in each component process of the overall manufacturing process. For example, in other embodiments, the substrate disks may be textured and cleaned one substrate disk at a time, with both surfaces of each disk textured and cleaned. Sputtering, lubrication, burnishing and testing can utilize simultaneous single-sided disk processing techniques. While this slows the throughput of the overall manufacturing process, substantial cost savings are still achieved by commencing simultaneous two disk single-sided processing prior to sputtering. Sputtering only a single surface of each disk saves significant costs when the second surface will be unused in a single-side disk drive. Flexibility is enhanced because the present invention utilizes conventional double-sided disk processing equipment to simultaneously manufacture single-sided disks two at a time.

Single-sided sputtering techniques, including how the disks are handled and when changes in disk orientation are made, can also vary without jeopardizing cost savings and efficiencies. For example in one embodiment, lubrication may occur with the disks in a gap merge orientation rather than spaced equally apart. Following lubrication, but while the disks are still located at the lubrication station, the disks may be repositioned into a contact merge orientation or left in gap merge orientation or equal spacing orientation. Repositioning into a concentric contact merge orientation can, instead, occur at the burnishing station, such as when individual disk pairs are loaded on a spindle assembly or collet for burnishing. Alternatively, following sputtering, the disks may be fully demerged and placed in conventional process cassettes. Following lubrication, the disks may be merged into concentric contact merge orientation at the burnishing station. A further variation is to maintain a gap merge orientation of the disk pairs following sputtering, but to widen the size of the gap. This slight demerging facilitates lubrication. Following lubrication, the positioning of the disk pairs is converted into a concentric contact merge orientation.

Yet another variation involves placing the disks in a spacer merge orientation throughout the active process or, at least, in those instances that preferably call for a concentric contact merge orientation. An intervening spacer will permit the disks to undergo contact processing, such as data zone texturing, burnishing and, to a lesser extent, testing, without suffering adverse effects of disk bowing or warpage.

In one embodiment, the disks are subjected to burnishing and testing processes. Burnishing is intended to eliminate adverse asperities on the active surface of the disks, to assist in bonding the lubricant to the disks and to generally provide a uniform finish to the disk surface. Testing is conducted to verify proper processing with the disks. Glide testing checks surface smoothness with respect to flying characteristics needed for the head/slider assembly. Certification testing performs read and write tests on the surface of the disks. In both instances, it is preferable that the processing is accomplished with the disks in a concentric contact merge orientation. Therefore, for purposes of efficiency, it is desirable to position the disk pairs in concentric contact merge orientation following lubrication and to leave the disk pairs in concentric contact merge orientation throughout burnishing and testing.

Optionally, partial or complete servo-track writing may occur following testing. Simultaneous single-sided disk processing techniques may also be used for servo-track writing.

The above-described embodiments and configurations are not intended to be complete nor exhaustive. As will be appreciated, other embodiments of the invention are possible utilizing, alone or in combination, one or more features set forth above or described below.

BRIEF DESCRIPTION OF THE DRAWINGS

FIG. 1 is a front elevation of a double-sided processed disk.

FIG. 2 is a cross-section taken along line 2-2 of FIG. 1.

FIG. 3 is a partial cross-section taken along line 3-3 of FIG. 2.

FIG. 4 is a front elevation view of a single-sided processed disk.

FIG. 5 is a cross-section taken along line 5-5 of FIG. 4.

FIG. 6 is a partial cross-section taken along line 6-6 of FIG. 5.

FIG. 7 is a schematic of a process for manufacturing double-sided disks, on the left, and a schematic of a process for manufacturing single-sided disks, on the right.

FIG. 8 is a cross-section of a pair of disks in concentric contact merge.

FIG. 9 is a cross-section of a pair of single-sided disks in a gap merge orientation.

FIG. 10 is a cross-section of a pair of single-sided disks in a spacer merge orientation.

FIG. 11 is a schematic view of a disk handling tool engaging a single disk.

FIG. 12 is a schematic view of a second embodiment of the disk handling tool of FIG. 11.

FIG. 17A is a schematic view of a disk handling tool merging a pair of disks.

FIG. 17B is a schematic view of the disk handling tool of FIG. 17A, following merging of the disks.

FIG. 18A is a schematic view of a disk handling tool merging a pair of disks.

FIG. 18B is a schematic view of the disk handling tool of FIG. 18A, following merging of the disks.

FIG. 19A is a schematic view of a disk handling tool demerging a pair of disks.

FIG. 19B is a schematic view of the disk handling tool of FIG. 19A, following demerging of the disks.

FIG. 20A is a schematic view of a second embodiment of a disk handling tool for demerging a pair of contact merge disks.

FIG. 20B is a schematic view of the disk handling tool of FIG. 19A, following demerging of the disks.

FIG. 21 is a schematic top view of a transfer station illustrating one embodiment of a merging/demerging station.

FIG. 29 is an exploded front view of the demerge tool of FIG. 27, prior to demerging a pair of contact merge disks.

FIG. 30 is an exploded front view of the demerge tool of FIG. 27, showing a pair of disks in a demerged state.

FIG. 48 is a side elevation view of a second embodiment of a demerge tool.

FIG. 49 is a side elevation view of a pair of demerged disks or substrate disks engaged by a mandrel.

FIG. 52 is a front elevation of the tool of FIG. 51.

FIG. 53 is a side elevation of the embodiment of FIG. 52.

FIG. 54 is a cross-section taken along line 54-54 of FIG. 53.

FIG. 55 is an end plan view of the embodiment of FIG. 53.

FIG. 56 is a cross-section taken along line 56-56 of FIG. 53.

FIG. 61 is cross-section of a pair of gap merge disks in which the disks are parallel to each other and a uniform space is formed between the disks.

FIG. 62 is a cross-section of a pair of gap merge disks in which the disks do not have a uniform space between them and are touching at their upper perimeter edge.

FIG. 63 is a front plan view of a fourth embodiment of a tool for handling disk pairs.

FIG. 64 is a cross-section taken along line 64-64 of FIG. 63.

FIG. 65 is a cross-section taken along line 65-65 of FIG. 63.

FIG. 66 is a partial plan view of a mandrel engaging a pair of gap merge disks at center aperture.

FIG. 67 is a perspective view of the embodiments of FIGS. 61 and 66 working in combination as a disk transfer system.

FIG. 85 is a top plan view of a second embodiment of a disk handling and transport apparatus.

FIG. 86 is an end elevation view of the embodiment of FIG. 85.

FIG. 87 is a partial enlarged view of the embodiment of FIG. 85.

FIG. 88 is a cross-section taken along line 88-88 of FIG. 85.

FIG. 89 is an enlarged detail of the cross-section of a side wall of the embodiment shown in FIG. 85.

FIG. 90 is an end plan view of the disk handling and transport apparatus shown in FIG. 98.

FIG. 91 is a side plan view of the embodiment of FIG. 90.

FIG. 92 is a top plan view of a side wall member of the embodiment shown in FIG. 98.

FIG. 93 is an end plan view of the embodiment shown in FIG. 92.

FIG. 94 is an enlarged detail of the portion of the embodiment shown in FIG. 92.

FIG. 95 is a front plan view of the base member of the embodiment shown in FIG. 98.

FIG. 96 is a top plan view of the embodiment of FIG. 95.

FIG. 97 is an end plan view of the embodiment of FIG. 95.

FIG. 98 is a perspective view of a third embodiment of a disk handling and transport apparatus.

FIG. 101B is a cross-sectional view taken along the line 101B-101B of FIG. 101A.

FIG. 102 is an enlarged view of a portion of the apparatus for handling pairs of disks shown in FIG. 101B.

FIG. 1-5A is an enlarged view of the upper portion of the disk handling apparatus of FIG. 104.

FIG. 106A is a front elevation view of another embodiment of an apparatus for handling pairs of disks.

FIG. 106B is a side elevation view of the disk handling apparatus shown in FIG. 106A.

FIG. 107 is an enlarged view of a portion of the disk handling apparatus shown in FIG. 106B.

FIG. 108 is a plan view of a contact roller for engaging pairs of disks.

FIG. 111B is a front elevation view of the spindle of FIG. 111A.

FIG. 112A is a front elevation view of a pair of texturing rollers positioned to texture the surface of a disk.

FIG. 112B is a side elevation view of a pair of texturing rollers positioned to texture the surface of two disks.

FIG. 113A is a front elevation view of a demerge tool for demerging a pair of contact merge disks.

FIG. 113B is a left side elevation view of the apparatus of 113A.

FIG. 114A is a front elevation view of the demerge tool shown in FIG. 113A, showing the demerge tool engaging a pair of disks.

FIG. 114B is a right elevation plan view of the apparatus shown in FIG. 114A.

FIG. 115 is a front elevation view of the demerge saddle shown in FIG. 113A.

FIG. 116 is a top elevation view of the demerge saddle shown in FIG. 115.

FIG. 117 is a cross-section view taken along line 117-117 of FIG. 116.

FIG. 118 is a perspective view of the demerge tool shown in FIG. 115.

FIG. 119A is a front elevation view of a disk handling apparatus positioned to lower a pair of disks from a demerge tool to a cassette.

FIG. 119B is a side elevation view of the apparatus of FIG. 119A.

FIG. 120 is an enlarged portion of the disk handling apparatus and demerge tool shown in FIG. 119B.

FIG. 121 is a front elevation view of an alternative embodiment of a demerge tool, showing the demerge rollers engaging a pair of disks.

FIG. 122 is a side elevation view of a demerge roller engaging a pair of disks.

FIG. 123 is a cross-section view taken along line 123-123 of FIG. 121.

FIG. 124 is a side elevation view of a laser zone texturing apparatus.

FIG. 125 is a front elevation view of the demerge tool shown in FIG. 121, showing the demerge rollers disengaged from the disk pair.

FIG. 126 is a top elevation view of the demerge device tool of FIG. 125.

FIG. 127 is a top elevation view of the demerge tool shown in FIG. 125, further showing a retracted spindle.

FIG. 128 is a front elevation view of a demerge roller.

Figure 129:
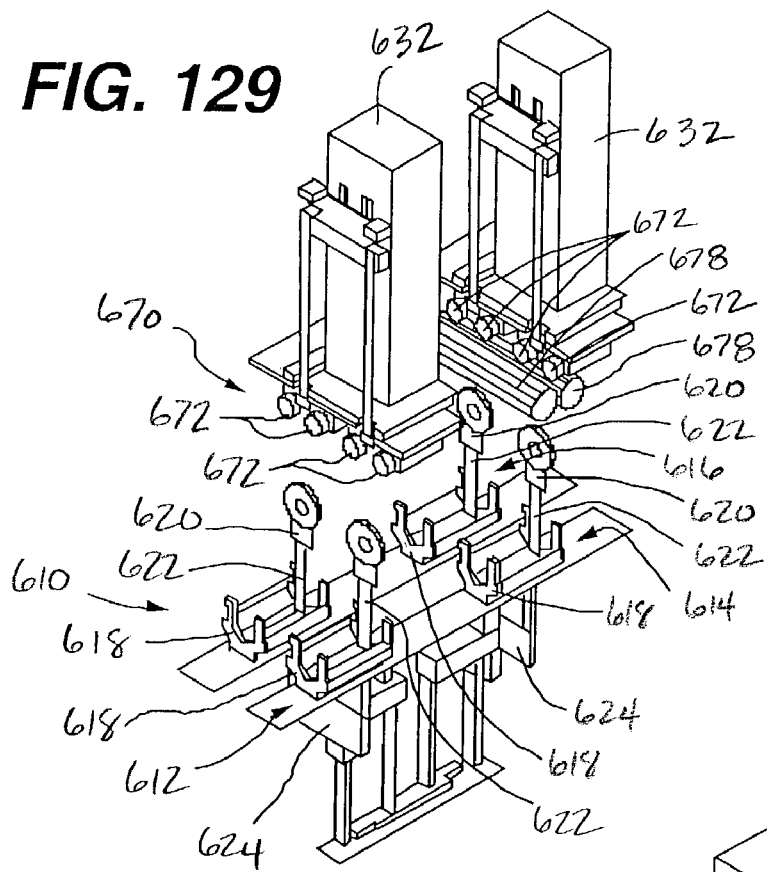

FIG. 129 is a perspective view of one embodiment of a disk scrubbing apparatus.

Figure 130:
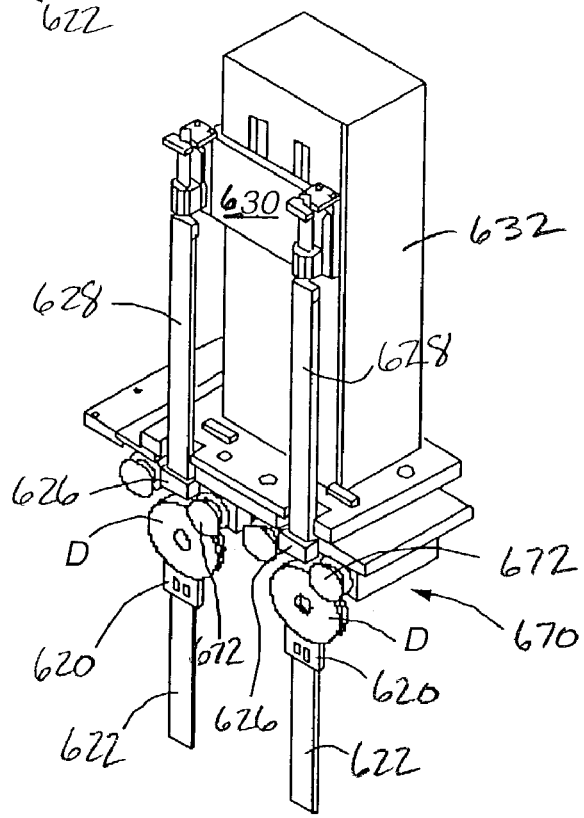

FIG. 130 is a perspective view of a portion of the scrubbing apparatus shown in FIG. 129, showing two pairs of disks positioned for scrubbing, although certain components have been removed, such as the scrubbing brushes, to better show the position of disks.

Figure 131:
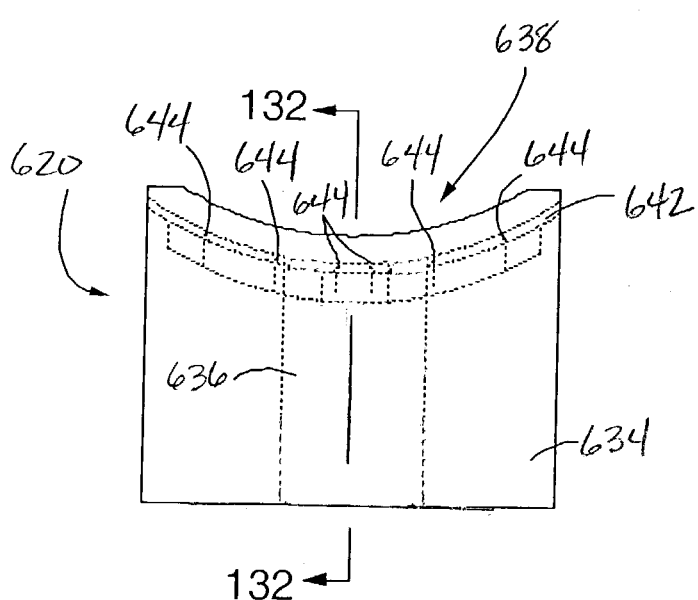

FIG. 131 is a front plan view of a lift saddle of the scrubbing apparatus of FIG. 129.

Figure 132:
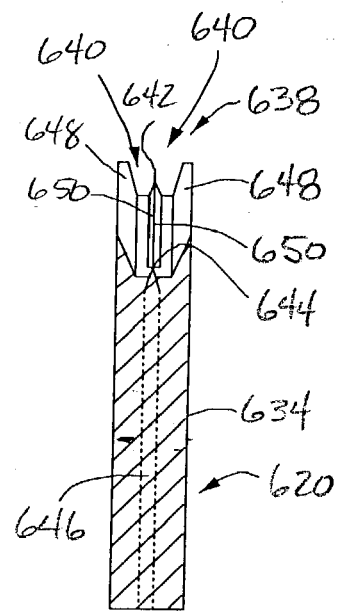

FIG. 132 is a cross-section taken along line 132-132 of FIG. 131.

Figure 133:
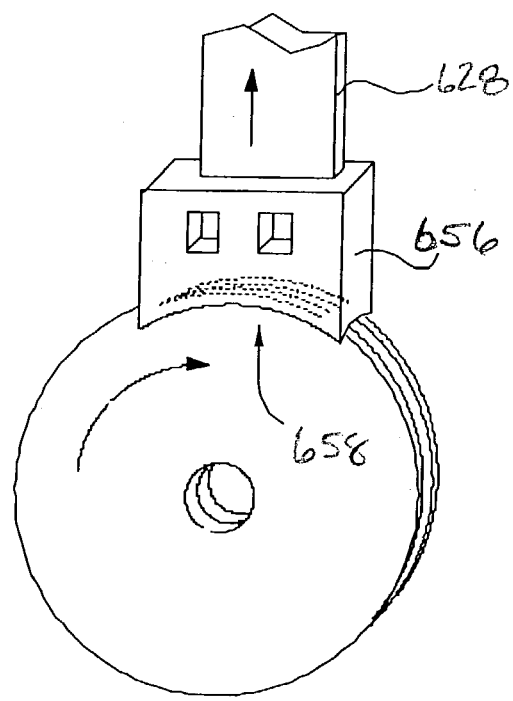

FIG. 133 is a perspective view of a pair of gap merge single-sided disks engaged by an upper demerge saddle of the scrubbing apparatus of FIG. 129.

Figure 134:
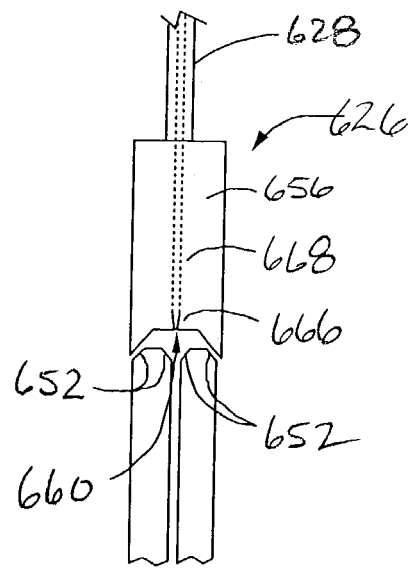

FIG. 134 is an end plan view of the embodiment shown in FIG. 133, further showing a fluid delivery path and water nozzle.

Figure 135:
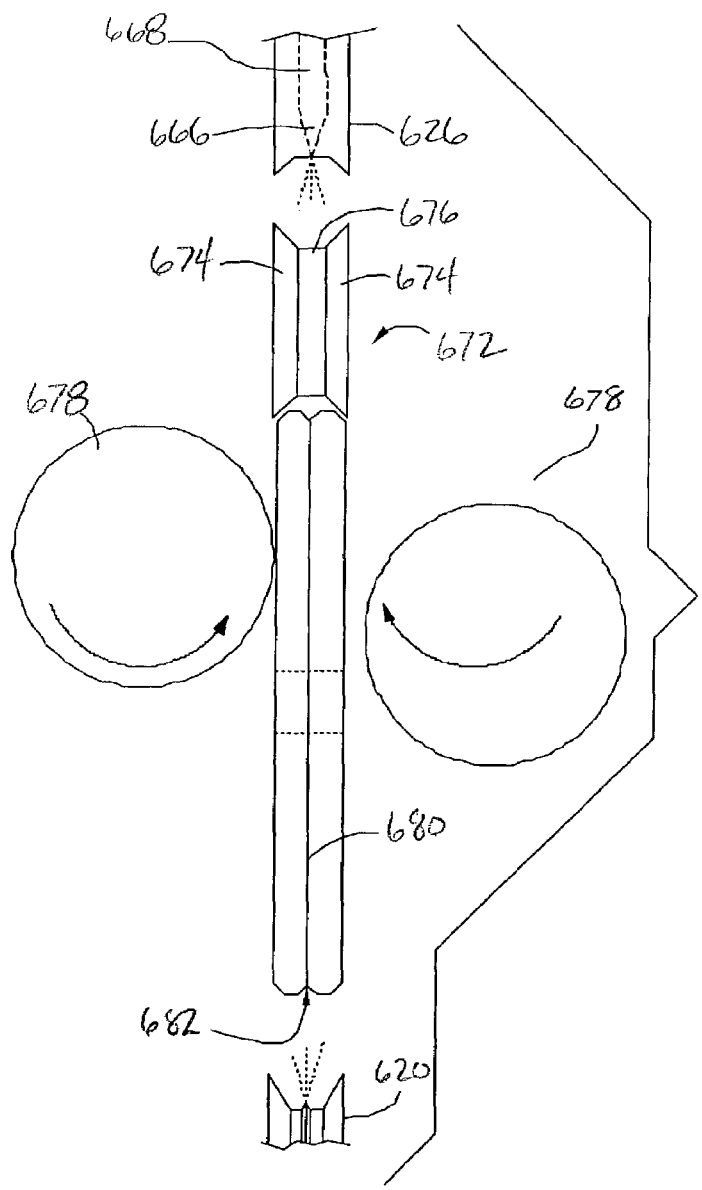

FIG. 135 is a schematic side elevation view showing a scrubbing operation.

Figure 136:
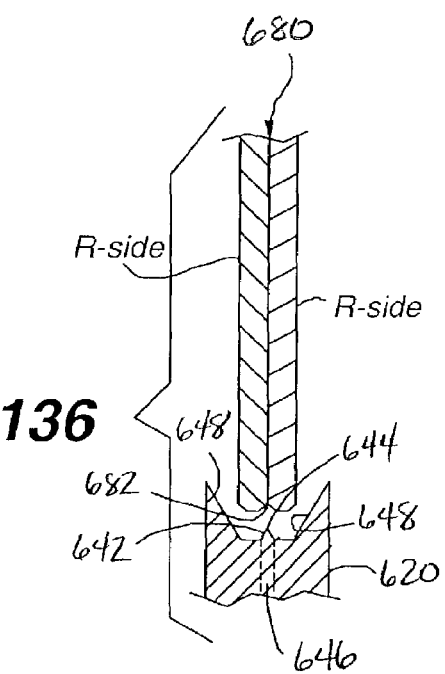

FIG. 136 is an enlarged cross-sectional view of a pair of concentric contact merge disks just prior to demerging by the lower lift saddle.

FIG. 137 is a perspective of one embodiment of a mandrel for handling and transporting disks.

FIG. 138 is a side elevation view of the embodiment of FIG. 137, further magnifying a portion of the mandrel.

FIG. 139 is a front elevation view of the embodiment of FIG. 137.

Figure 140:
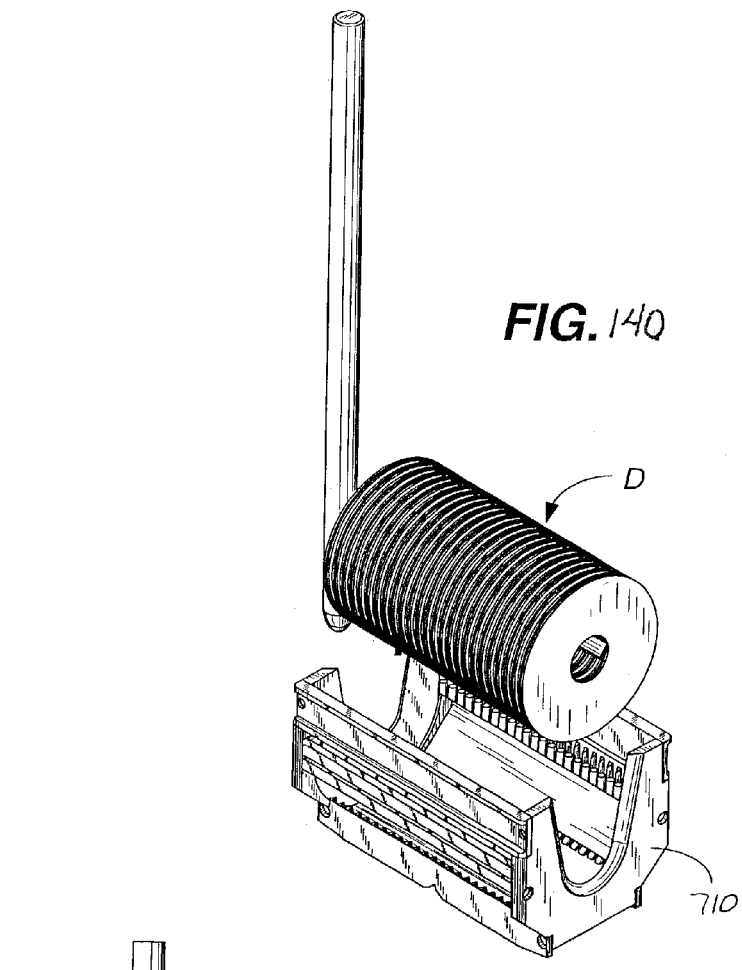

FIG. 140 is a perspective view of one embodiment of the mandrel of the present invention holding a plurality of gap merge pairs of disks above a cassette.

Figure 141:
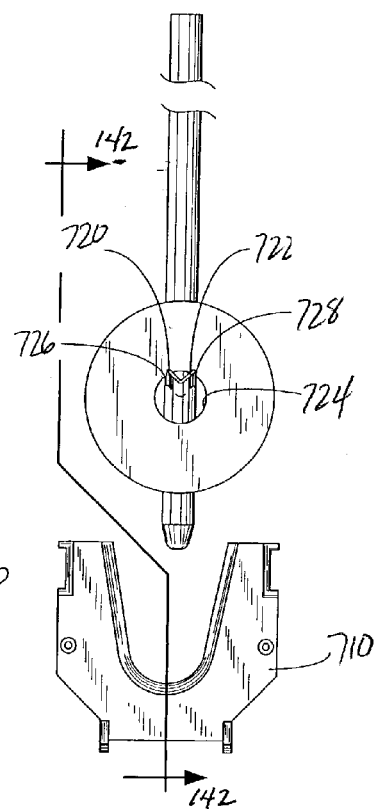

FIG. 141 is a front elevation view of the embodiment of FIG. 140.

Figure 142:
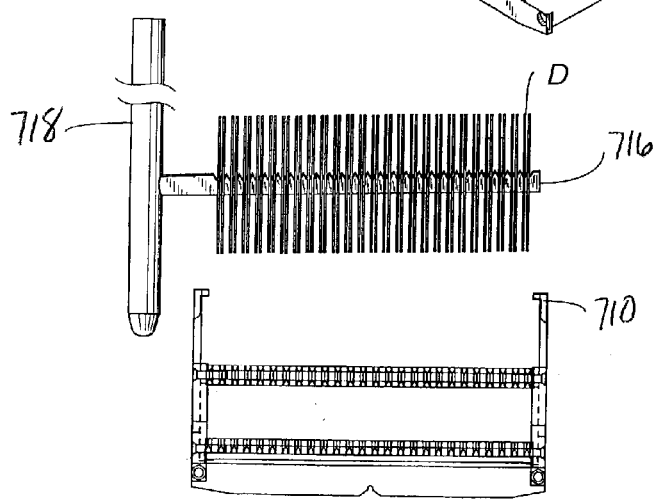

FIG. 142 is a side view of the embodiment of FIG. 140 taken along line 142-142 of FIG. 141, but showing a different cassette embodiment in cross-section.

FIG. 143 is a side elevation view of a plurality of pairs of gap merge disks seated on a mandrel and positioned in a lubrication tank.

FIG. 144 is a front elevation view of one embodiment of a mandrel of the present invention, returning a plurality of lubricated disks to a contact merge cassette.

FIG. 145 is a cross-section view taken along line 145-145 of FIG. 144.

FIG. 146 is a partial exploded view taken from FIG. 145 showing the lower perimeter edges of a few disk pairs.

FIG. 147 is a partial exploded view taken from FIG. 145 showing the upper perimeter edges of a few disk pairs.

Figure 148:
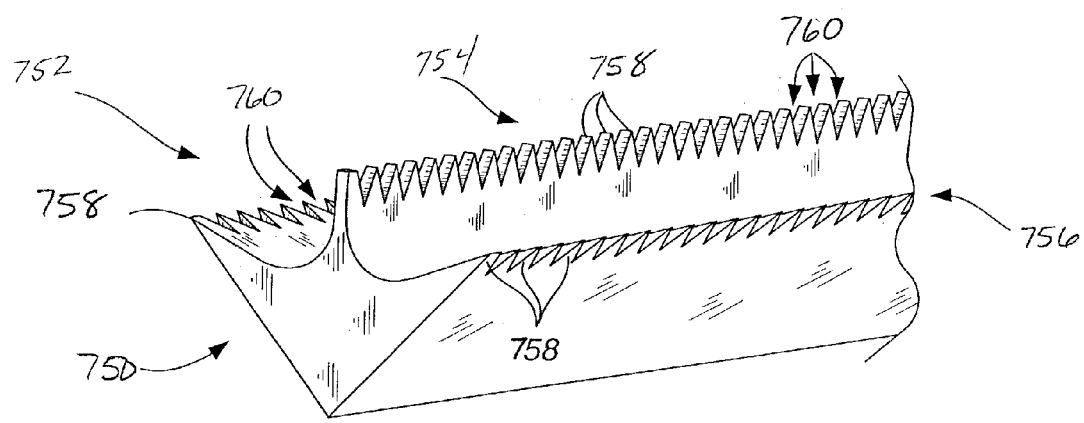

FIG. 148 is a partial perspective view of a second embodiment of the mandrel for handling and transporting disks.

Figure 149:
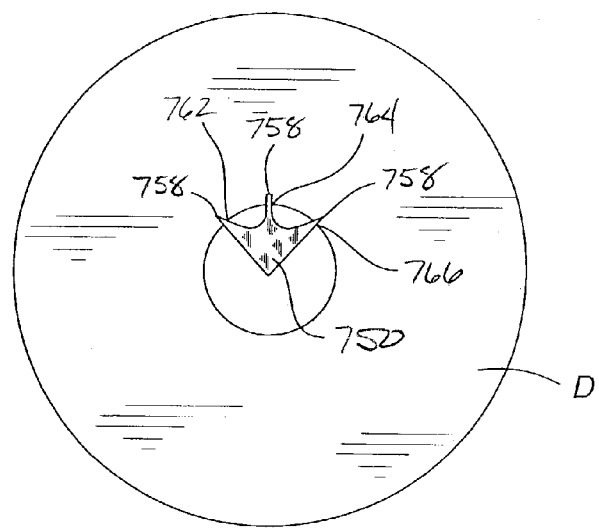

FIG. 149 is a front elevation view of the mandrel of FIG. 148 engaging a disk.

FIG. 150 is a side elevation view of a plurality of evenly spaced disks seated on the mandrel of FIG. 148.

FIG. 151A is a partial perspective view of the distal end of the mandrel of FIG. 148.

FIG. 151B is a top plan view of the embodiment of FIG. 151A.

Figure 152:
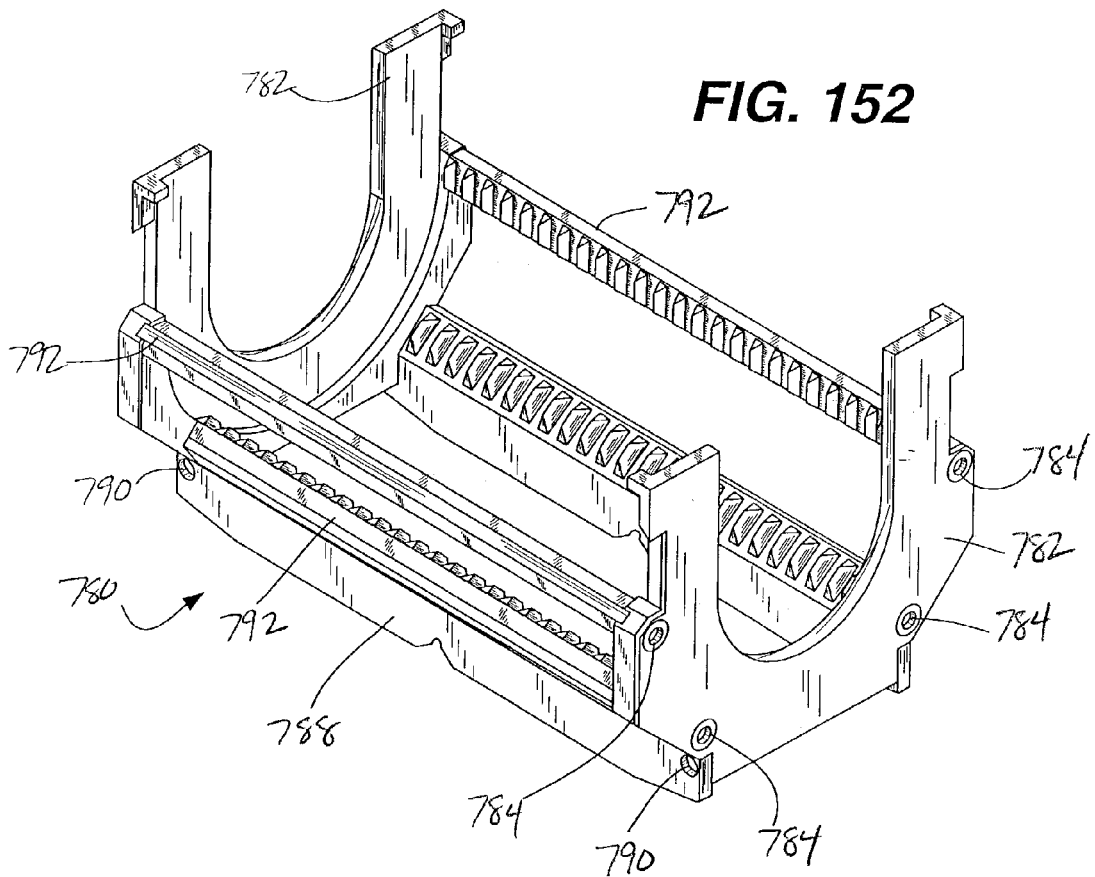

FIG. 152 is a perspective of one embodiment of a disk handling and transport apparatus configured for concentric contact merge orientation of disk pairs.

Figure 153:
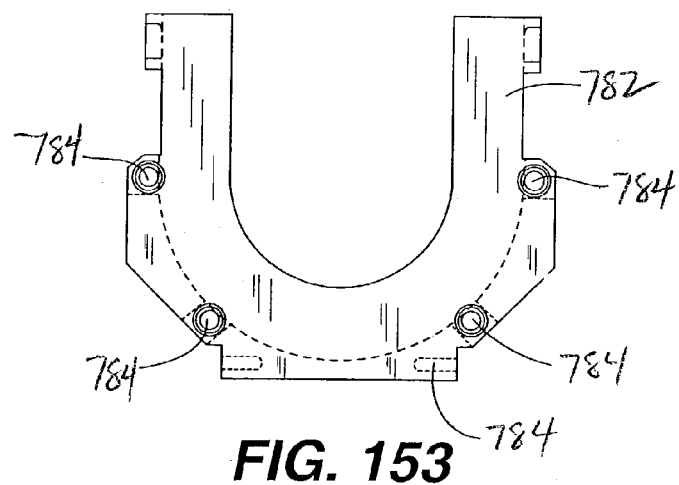

FIG. 153 is an end view of the embodiment of FIG. 152.

Figure 154:
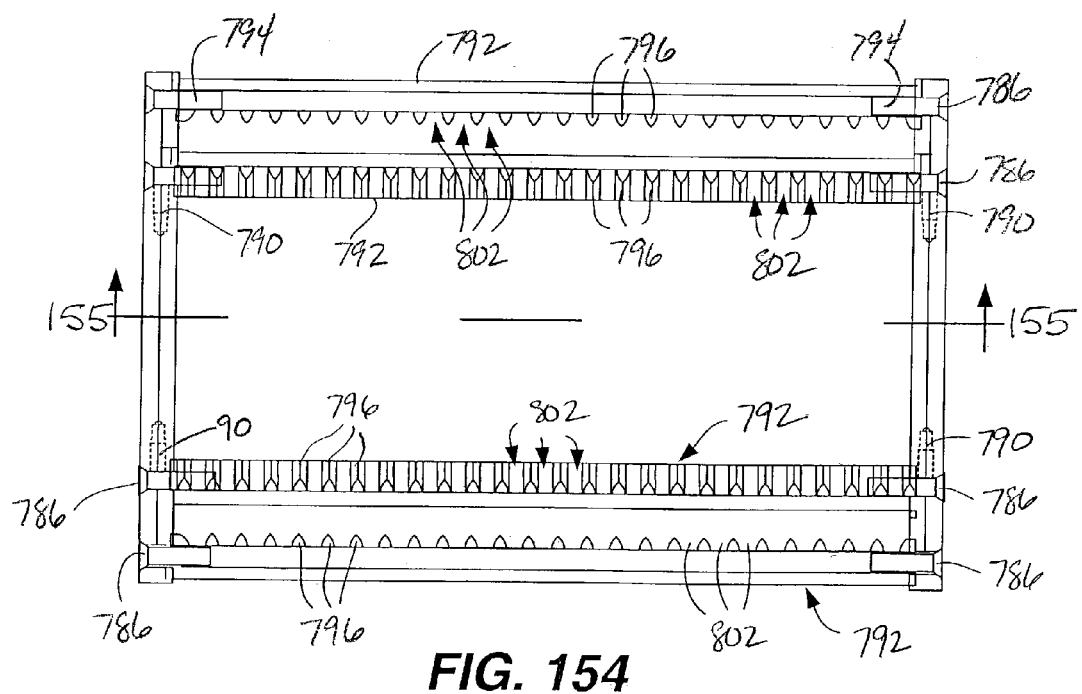

FIG. 154 is a top view of the embodiment of FIG. 152.

Figure 155:
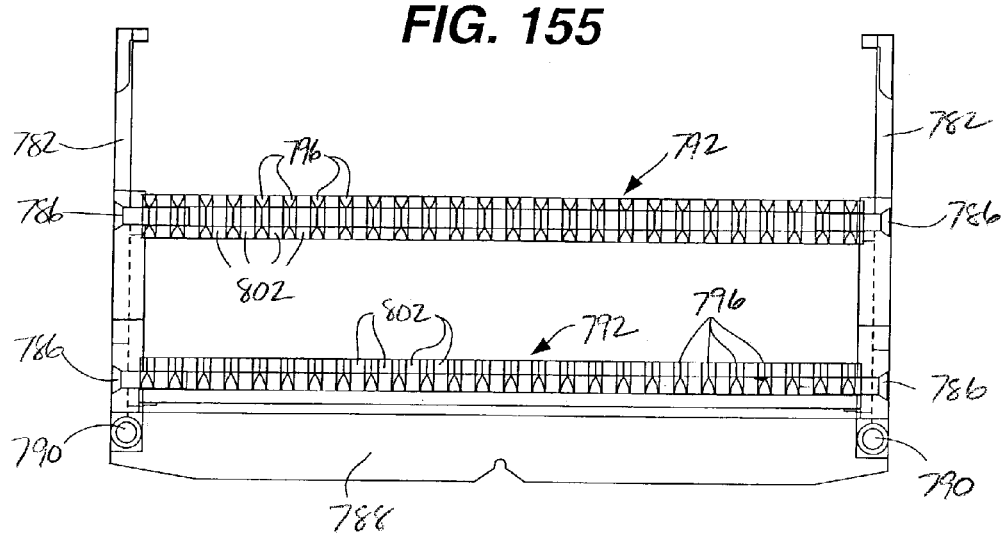

FIG. 155 is a cross-section taken along line 155-155 of FIG. 154.

FIG. 156 is a top elevation view of a base wall member of the cassette of FIG. 152.

FIG. 157 is an end elevation view of the base wall member shown in FIG. 156.

FIG. 158 is a front elevation view of the embodiment shown in FIG. 156.

Figure 159:
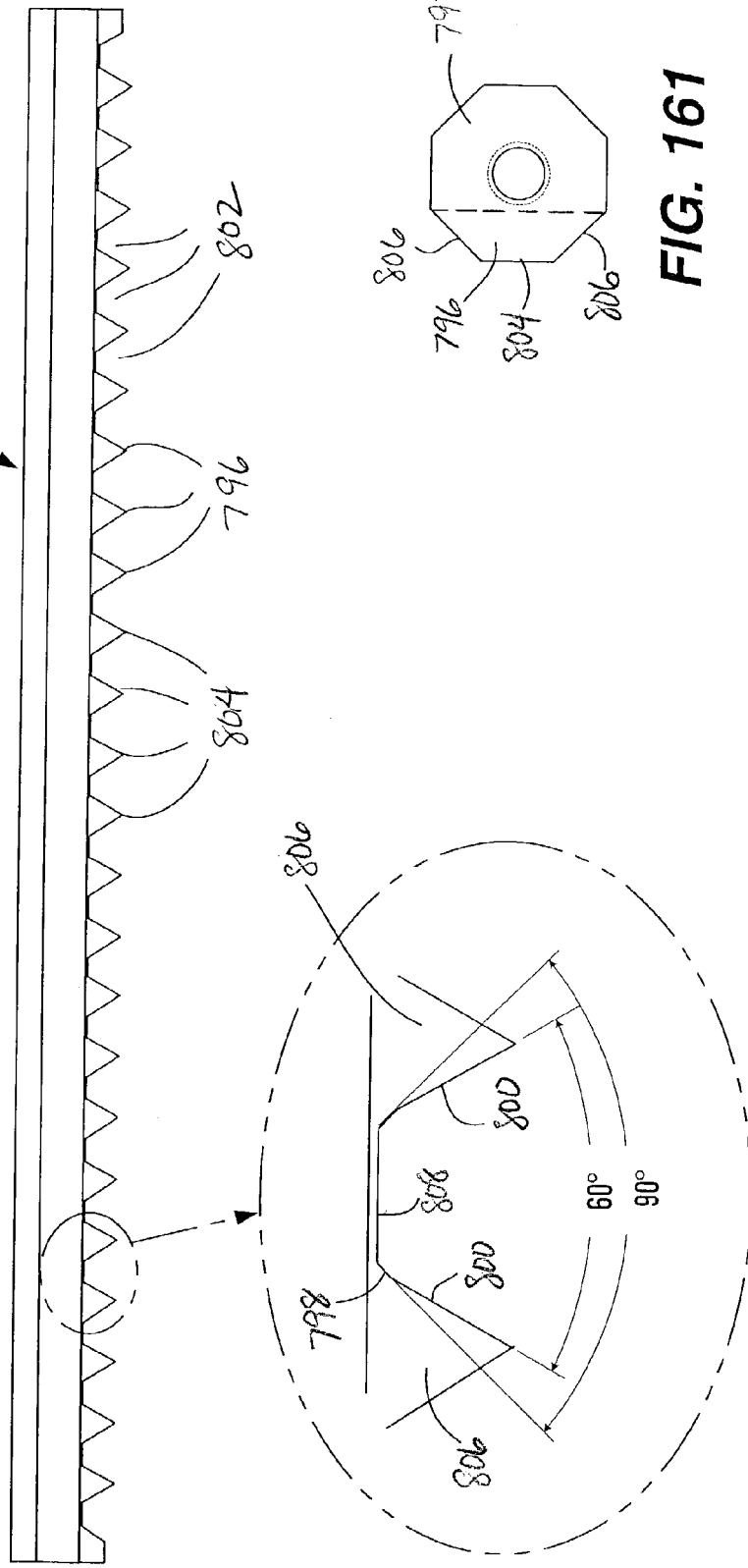

FIG. 159 is a top elevation view of a side wall member of the cassette shown in FIG. 152.

Figure 160:
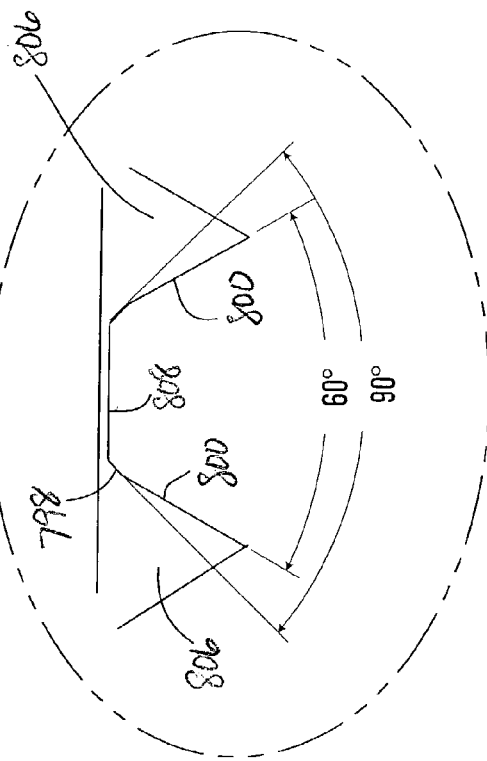

FIG. 160 is an enlarged view of a portion of the side wall of FIG. 159.

Figure 161:
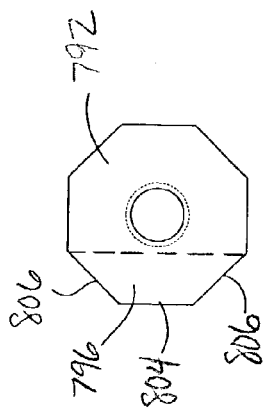

FIG. 161 is an end elevation view of the embodiment shown in FIG. 159.

FIGS. 162A, B and C are a sequence of partial top elevation views showing a pair of disks interacting with adjacent ribs of the side wall member of the cassette of FIG. 152.

FIGS. 163A, B and C are a sequence of partial front elevation views corresponding with FIGS. 162A, B and C.

Figure 164:
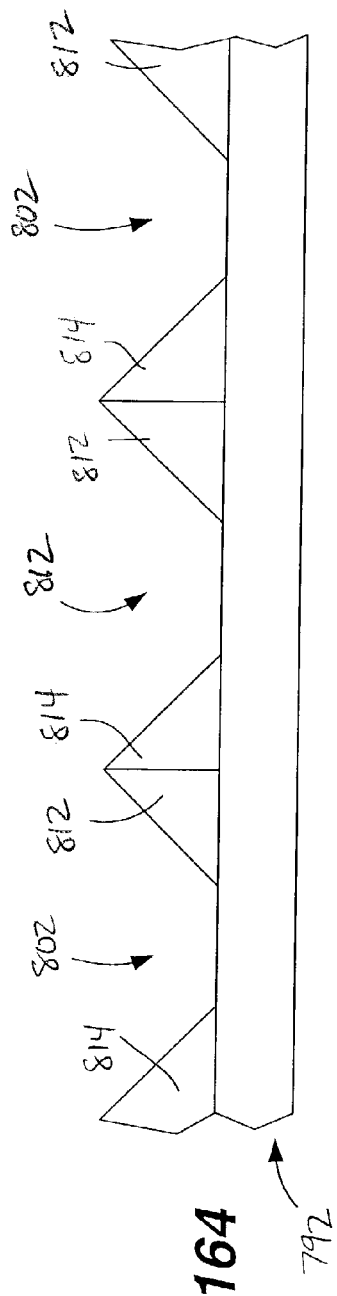

FIG. 164 is a top elevation view of a second embodiment of the side wall member of the cassette shown in FIG. 152.

Figure 165:
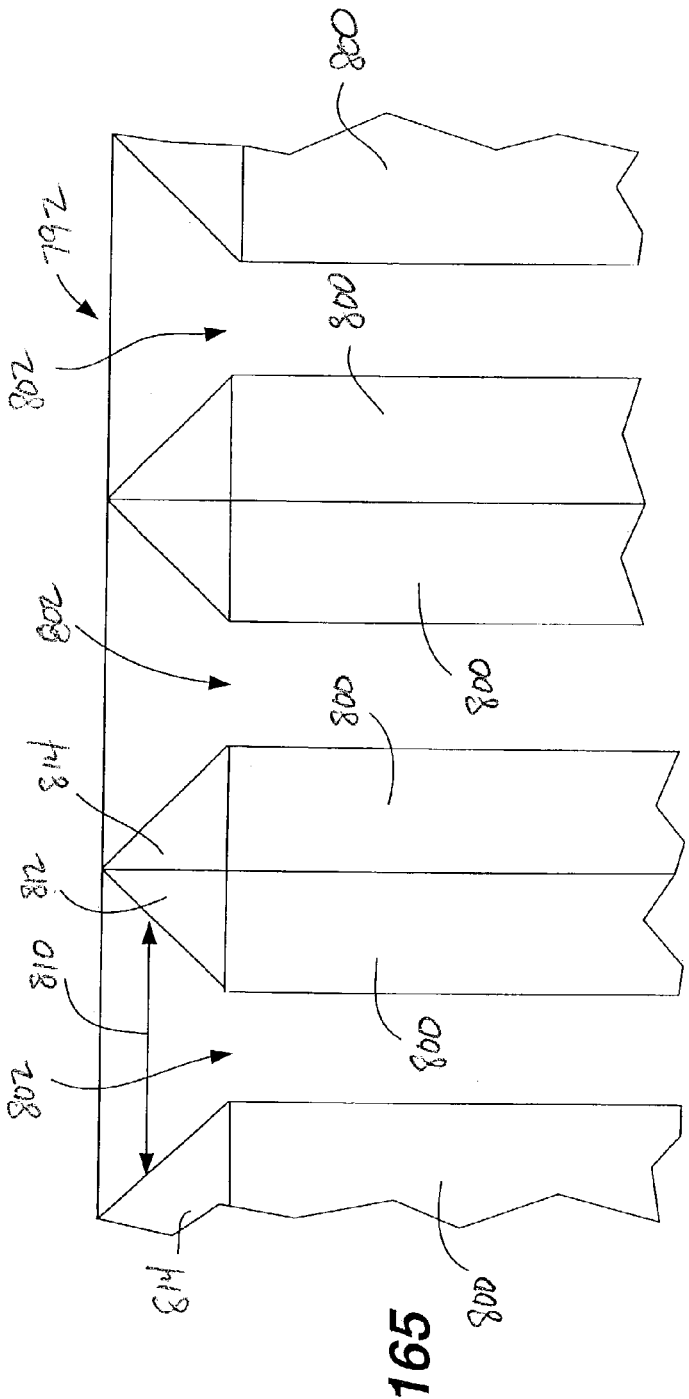

FIG. 165 is a front elevation view of the side wall member of FIG. 164.

Figure 166:
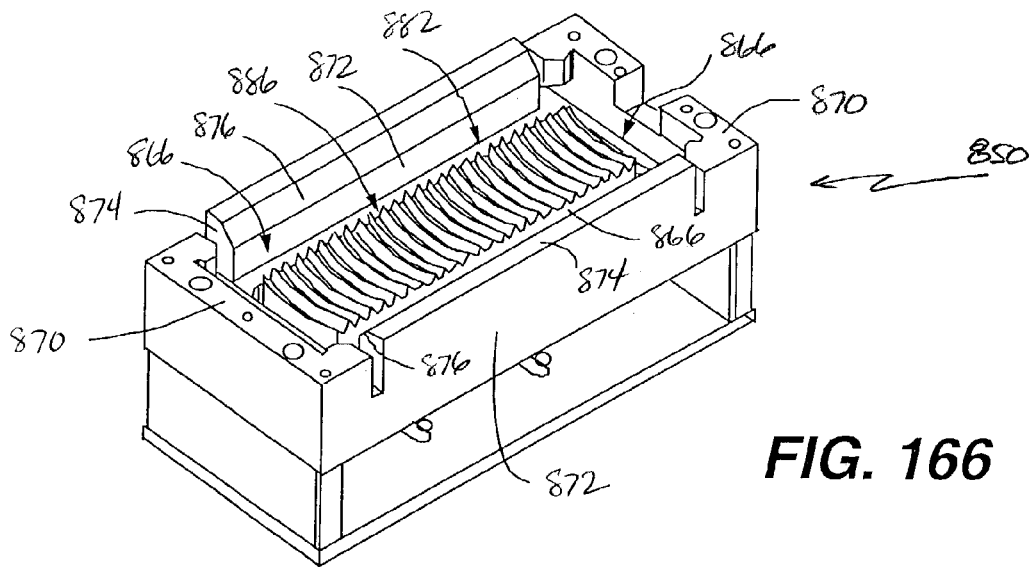

FIG. 166 is a perspective view of one embodiment of a merging station.

Figure 167:
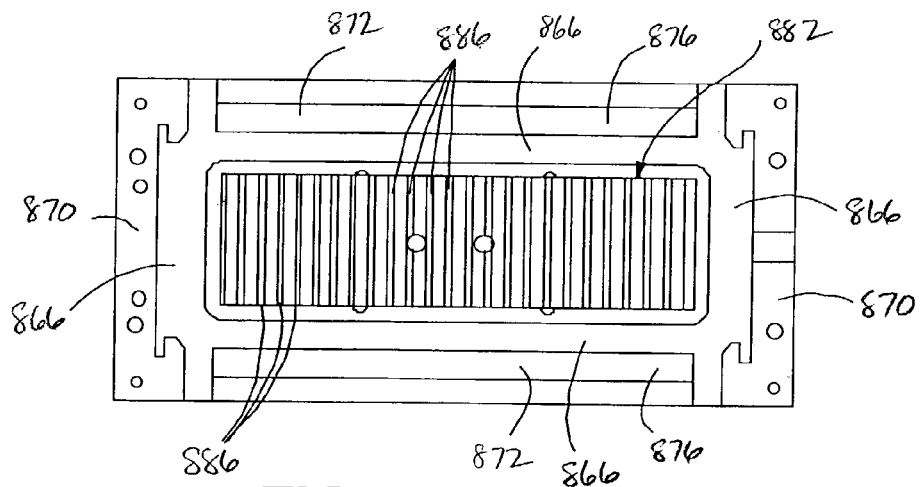

FIG. 167 is a top plan view of the merging station of FIG. 166.

Figure 168:
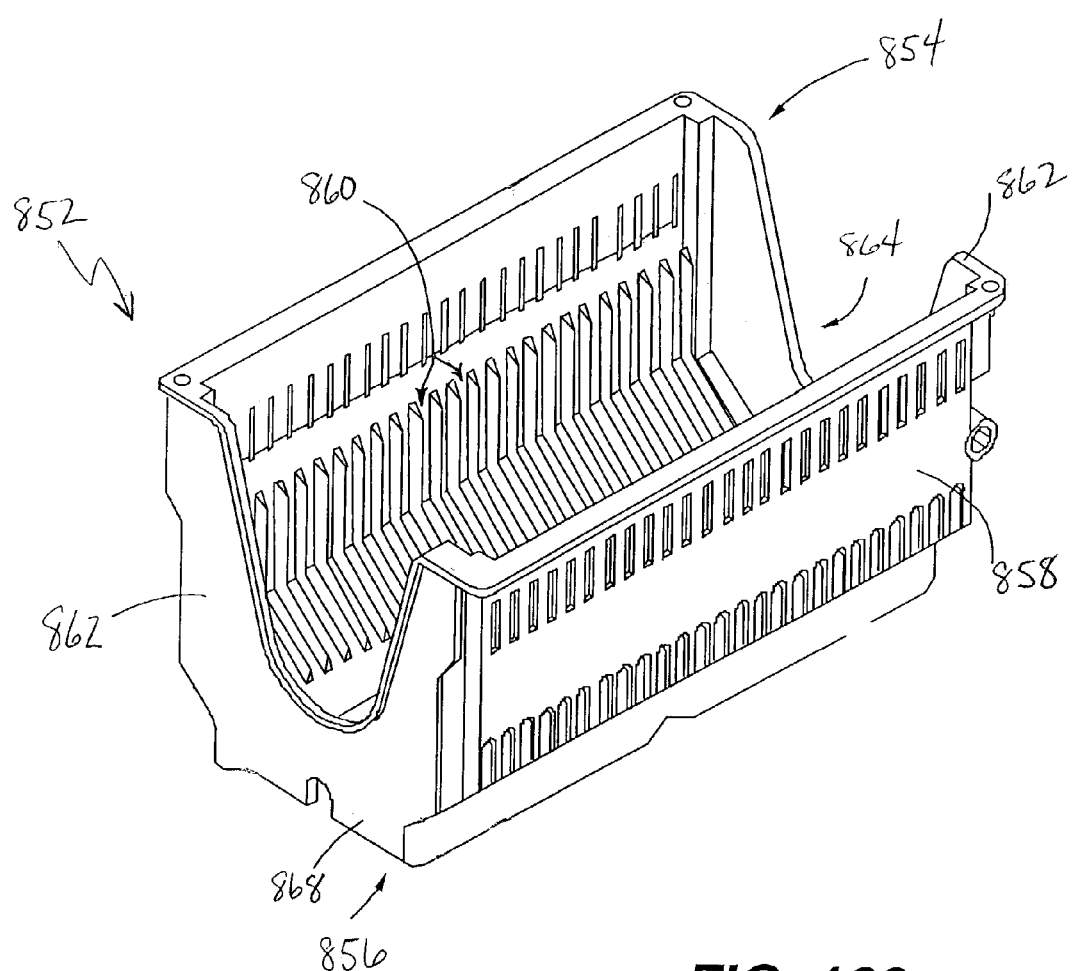

FIG. 168 is a perspective view of a disk cassette configured to position disks in a concentric contact merge orientation.

Figure 169:
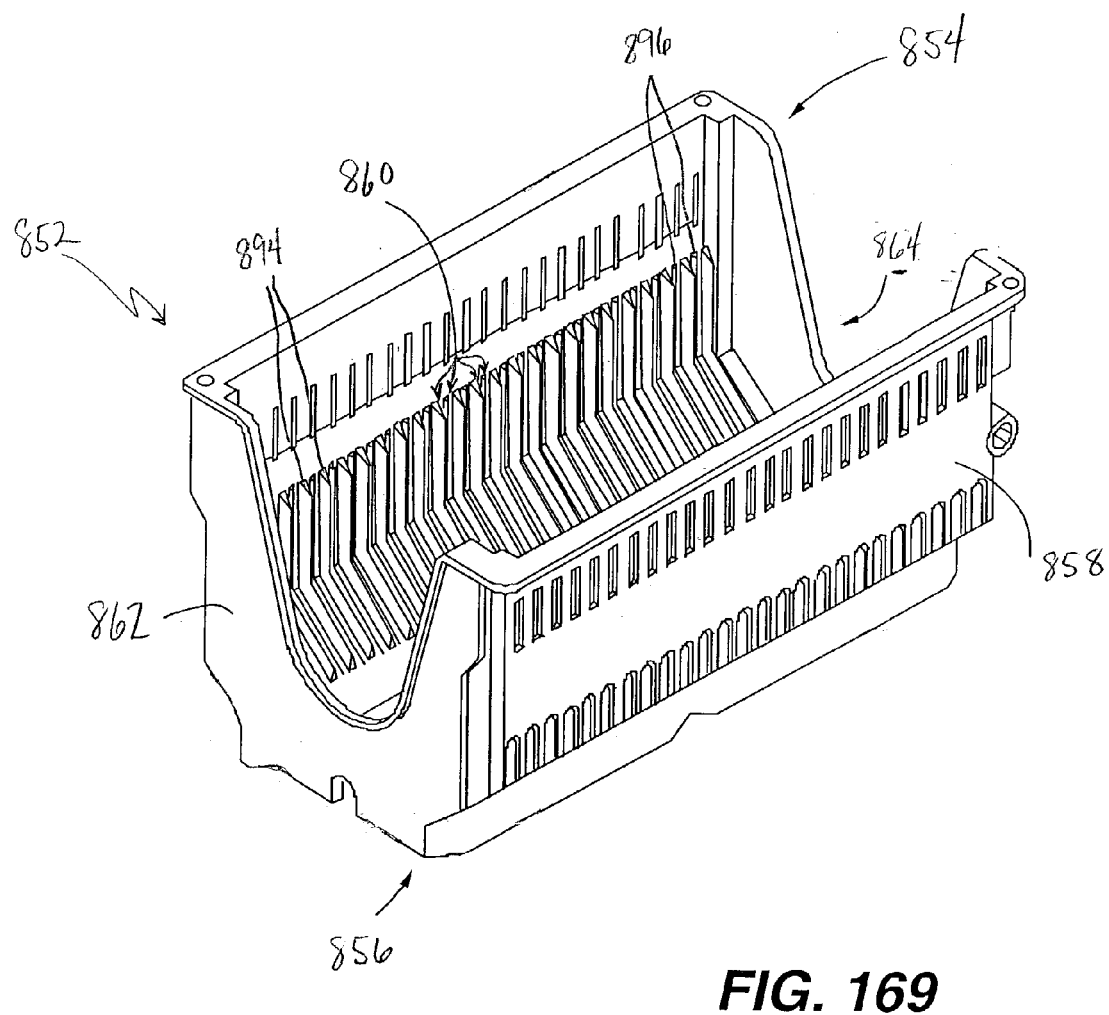

FIG. 169 is a perspective view of a disk cassette configured to position disks in a gap merge orientation.

Figure 170:
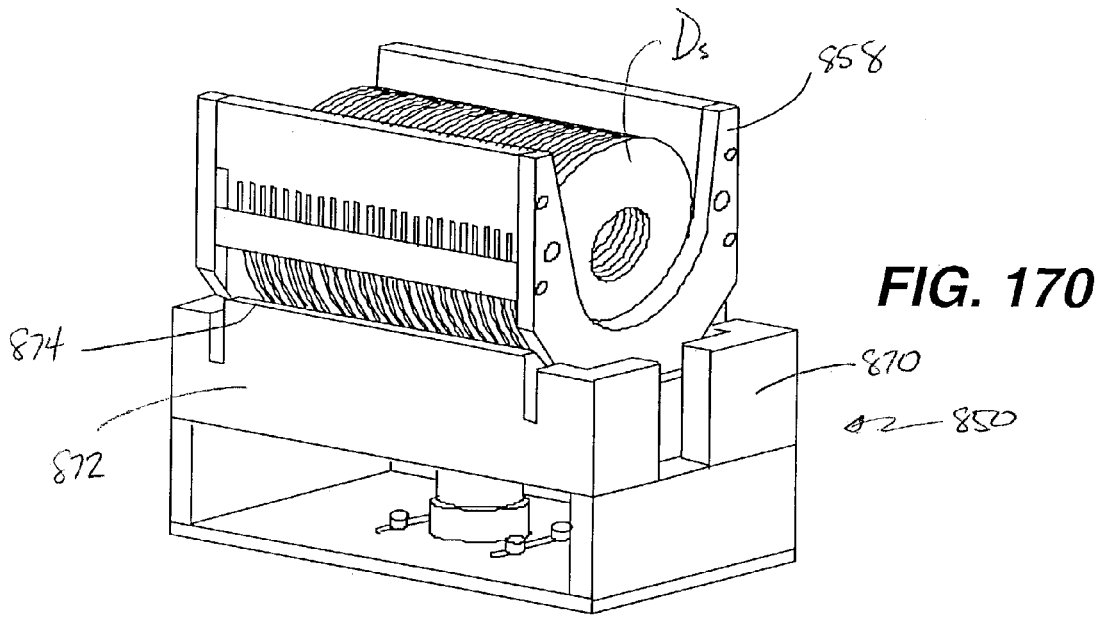

FIG. 170 is a perspective view of a merge station of the present invention with a contact merge cassette loaded with disks mounted thereon.

Figure 171:
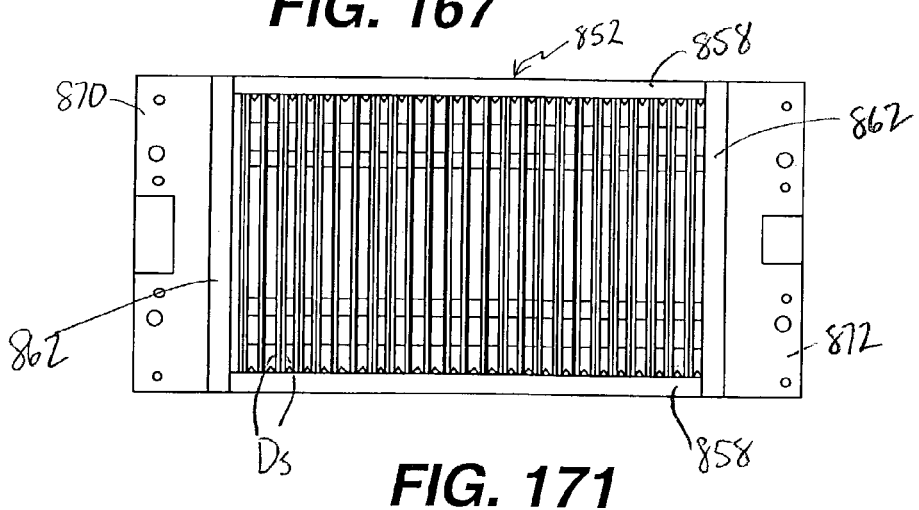

FIG. 171 is a top plan view of the embodiment shown in FIG. 170.

Figure 172:
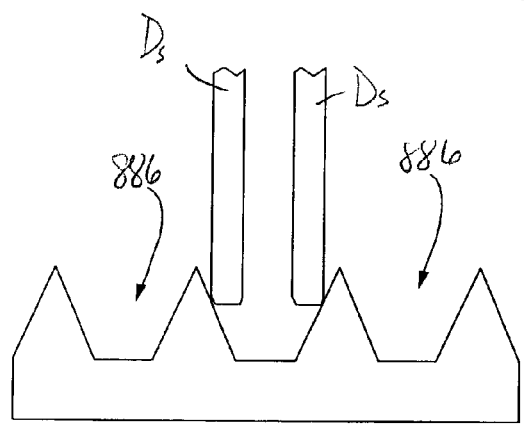

FIG. 172 is a side elevation view of a disk pair engaging a merge nest.

Figure 173:
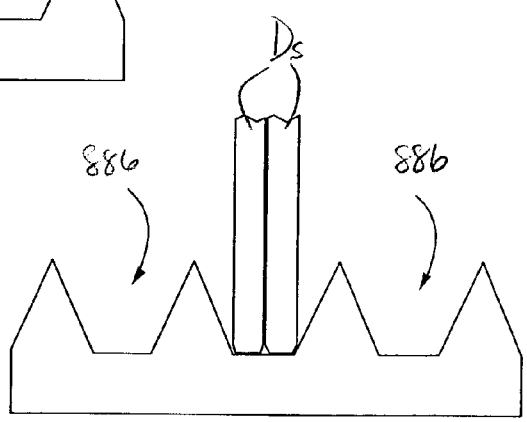

FIG. 173 is a side elevation view of a pair of concentric contact merge disks fully engaged by the merge nest.

Figure 174:
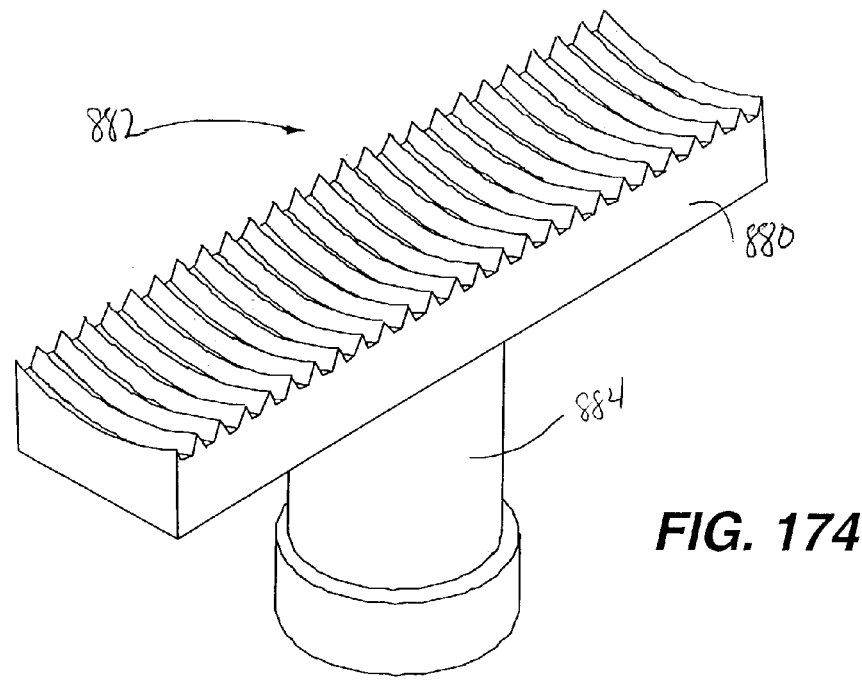

FIG. 174 is a perspective view of one embodiment of the merge nest of the present invention, configured to facilitate concentric contact merge orientation.

Figure 175:
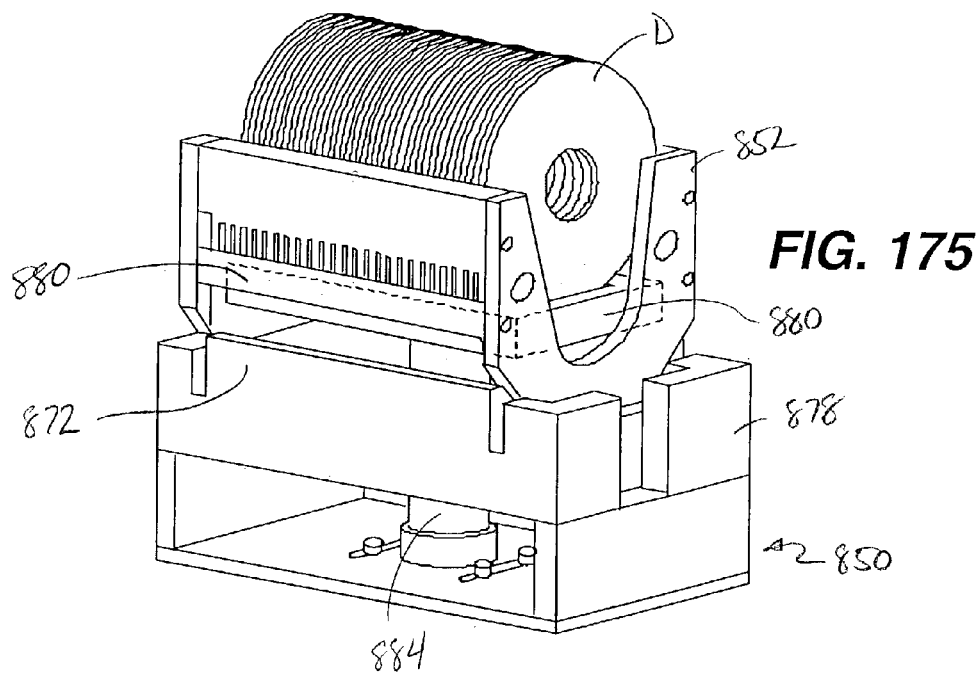

FIG. 175 is a perspective view of a merge station of the present invention in an elevated or fixed position where the disks are not fully engaged by the cassette.

Figures 176, 177:
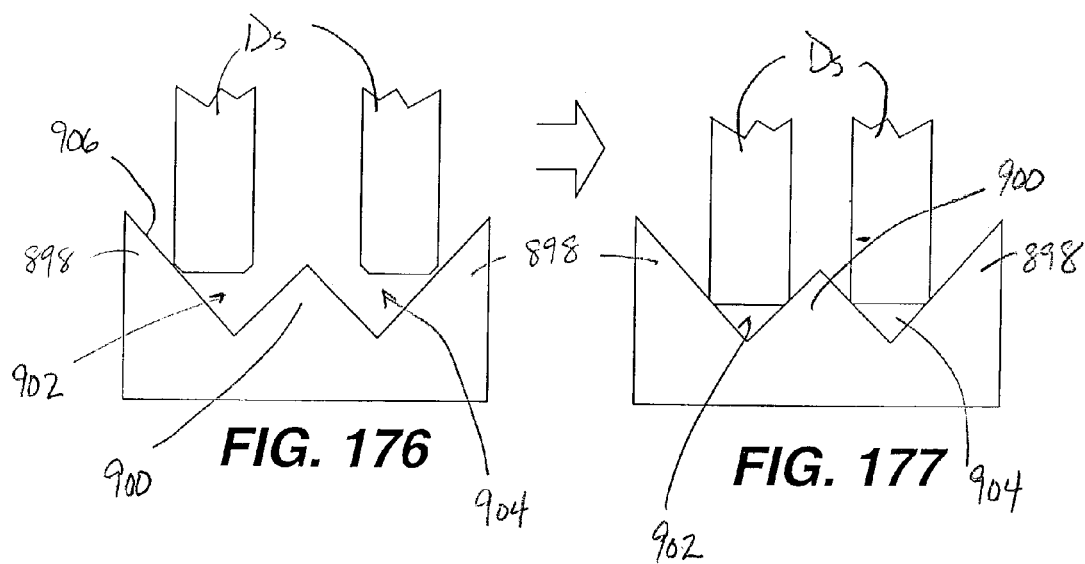

FIG. 176 is a schematic side elevation of a pair of disks engaging an alternative embodiment of the merge nest.

FIG. 177 is a schematic side elevation view of a pair of gap merge disks fully engaged by the merge nest of FIG. 176.

Figure 178:
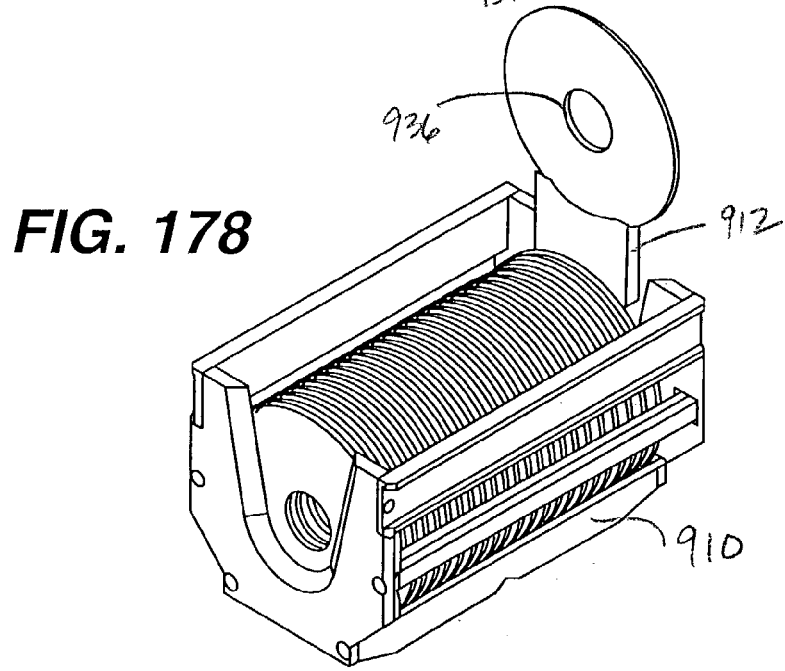

FIG. 178 is a perspective view of a lift saddle removing a pair of gap merge disks from a cassette prior to tape burnishing.

Figure 179:
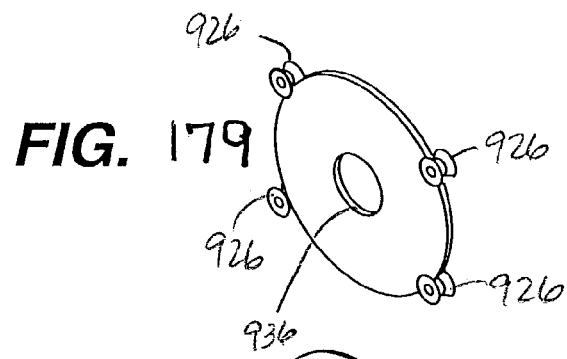

FIG. 179 is a partial perspective of the disk pair of FIG. 178 engaged by merge rollers.

Figure 180:
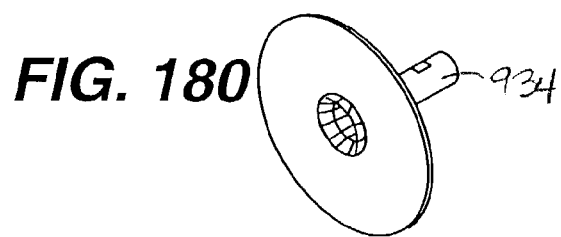

FIG. 180 is a partial perspective view of the disk pair of FIG. 179 engaged by a spindle assembly.

Figure 181:
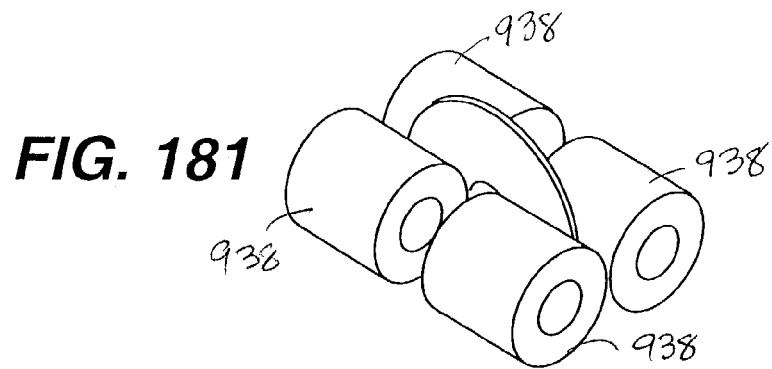

FIG. 181 is a partial perspective view of the disk pair of FIG. 180 undergoing a tape burnishing process.

FIG. 182 is a front plan view of the lift saddle of FIG. 178.

FIG. 183 is a top plan view of the embodiment of FIG. 179.

FIG. 184 is a cross-section taken along line 184-184 of FIG. 182.

FIG. 185 is an end elevation of the embodiment of FIG. 182.

FIG. 186 is a partial exploded view of the disk contact portion of the embodiment of FIG. 182.

FIG. 187 is a perspective view of one embodiment of a contact or merge roller.

FIG. 188 is a front elevation of the embodiment of FIG. 187.

Figure 189:
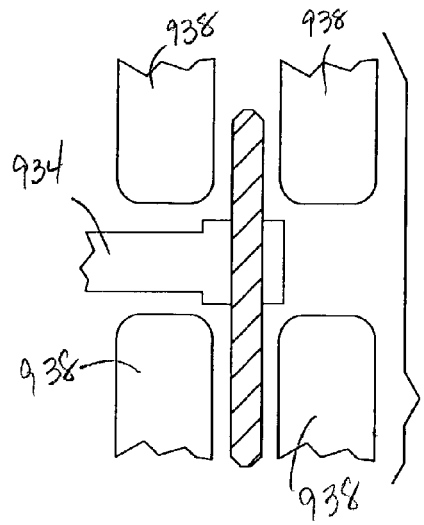

FIG. 189 is a schematic view of a double-sided disk undergoing laser zone texturing.

Figure 190:
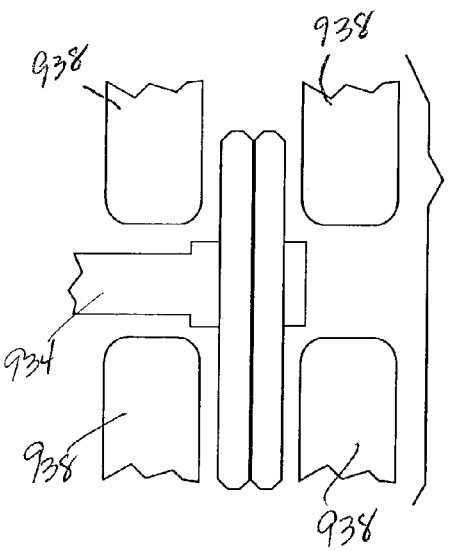

FIG. 190 is a schematic view of two single-sided disks undergoing simultaneous laser zone texturing.

Figure 191:
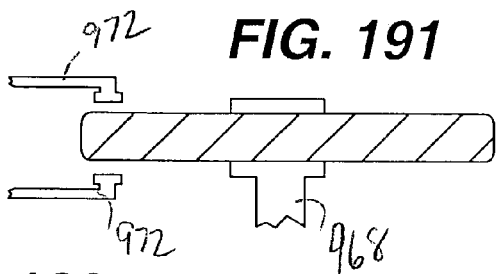

FIG. 191 is a schematic view of a double-sided disk undergoing testing.

Figure 192:
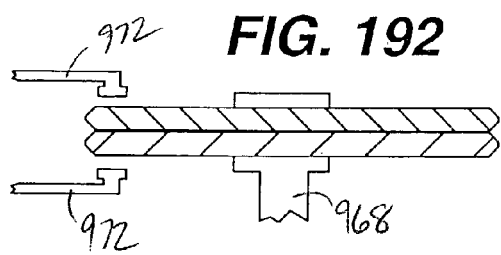

FIG. 192 is a schematic view of a pair of concentric contact merge disks undergoing testing.

Figure 193:
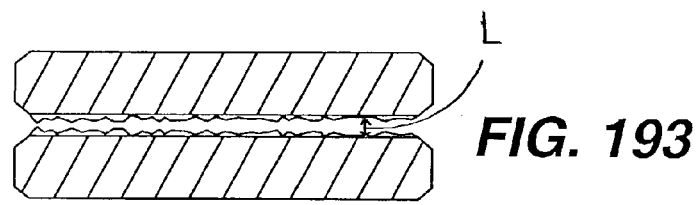

FIG. 193 is a cross-section of a pair of disk with a liquid layer applied to the inside surface of each disk.

FIG. 194 is a perspective view of the disk handling apparatus engaging a pair of disks in a cassette.

Figure 50:
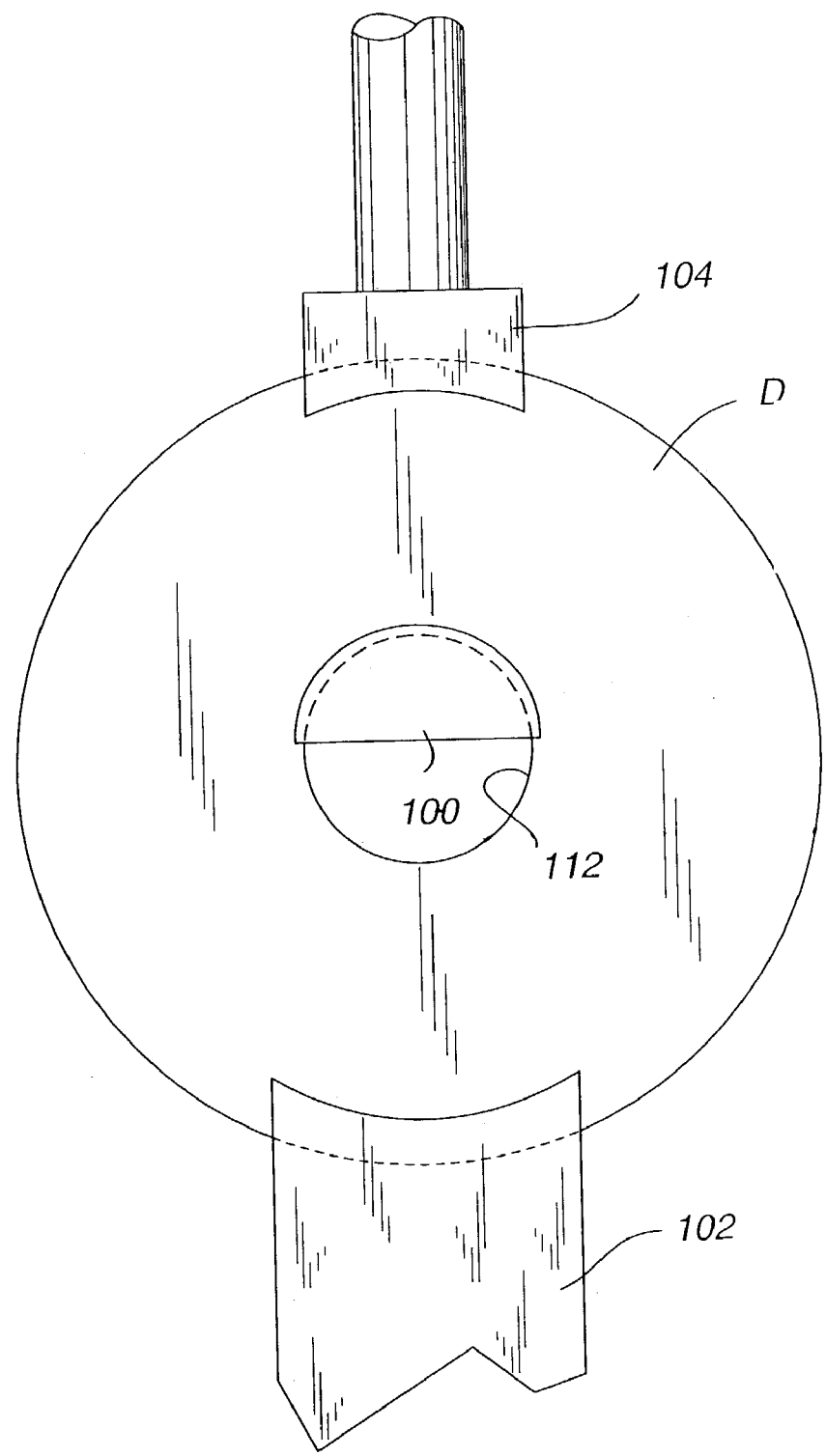
FIG. 50 is a front elevation view of the embodiment of FIG. 49.

FIG. 195 is a perspective view of the disk handling apparatus repositioning the disks removed from a cassette shown in FIG. 50.

FIG. 196 is a perspective view of the disks of FIG. 195 aligned for engagement with a spindle assembly.

FIG. 197 is a perspective view of the disk handling apparatus securing a disk pair to the spindle assembly.

FIG. 198 is a perspective view of a pair of disks undergoing testing.

FIG. 199 is a front plan view of the disk handling device of FIGS. 194-198.

FIG. 200 is an end view of the embodiment of FIG. 199.

FIG. 201 is a partial exploded view of the disk handling device of FIG. 199.

FIG. 202 is a cross-section taken along line 202-202 of FIG. 199.

FIG. 203 is a cross-section taken along line 203-203 of FIG. 199.

Figure 204:
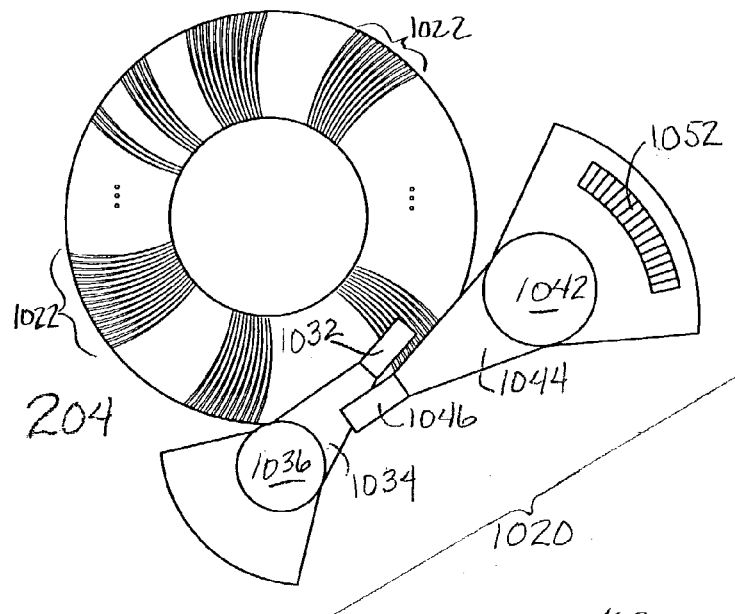

FIG. 204 is a top plan view of a prior art servo-writing apparatus used with a single, double-sided disk.

Figure 205:
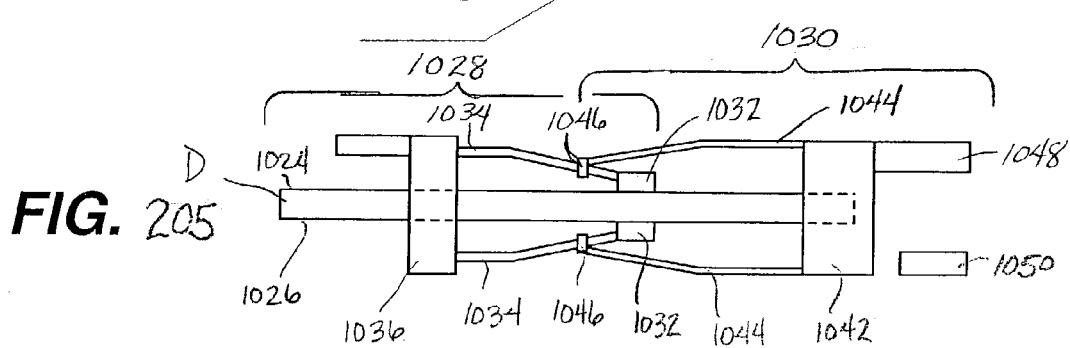

FIG. 205 is an elevational view of the apparatus illustrated in FIG. 204.

Figure 206:
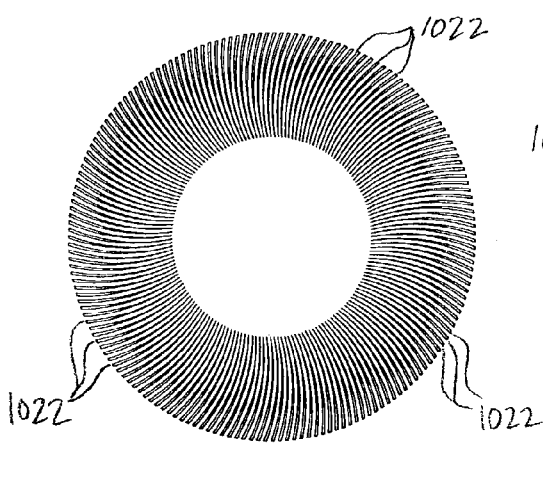

FIG. 206 is an example of a servo-pattern written on the upper surface of a disk by the apparatus illustrated in FIGS. 204 and 205.

Figure 207:
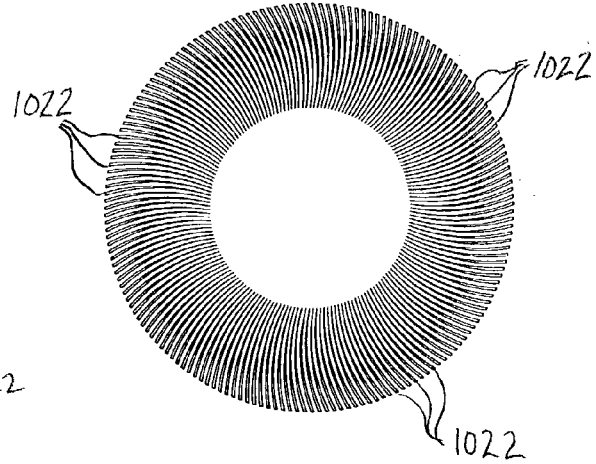

FIG. 207 is an example of a servo-pattern written on the lower surface of a disk by the apparatus illustrated in FIGS. 204 and 205.

Figures 208, 209:
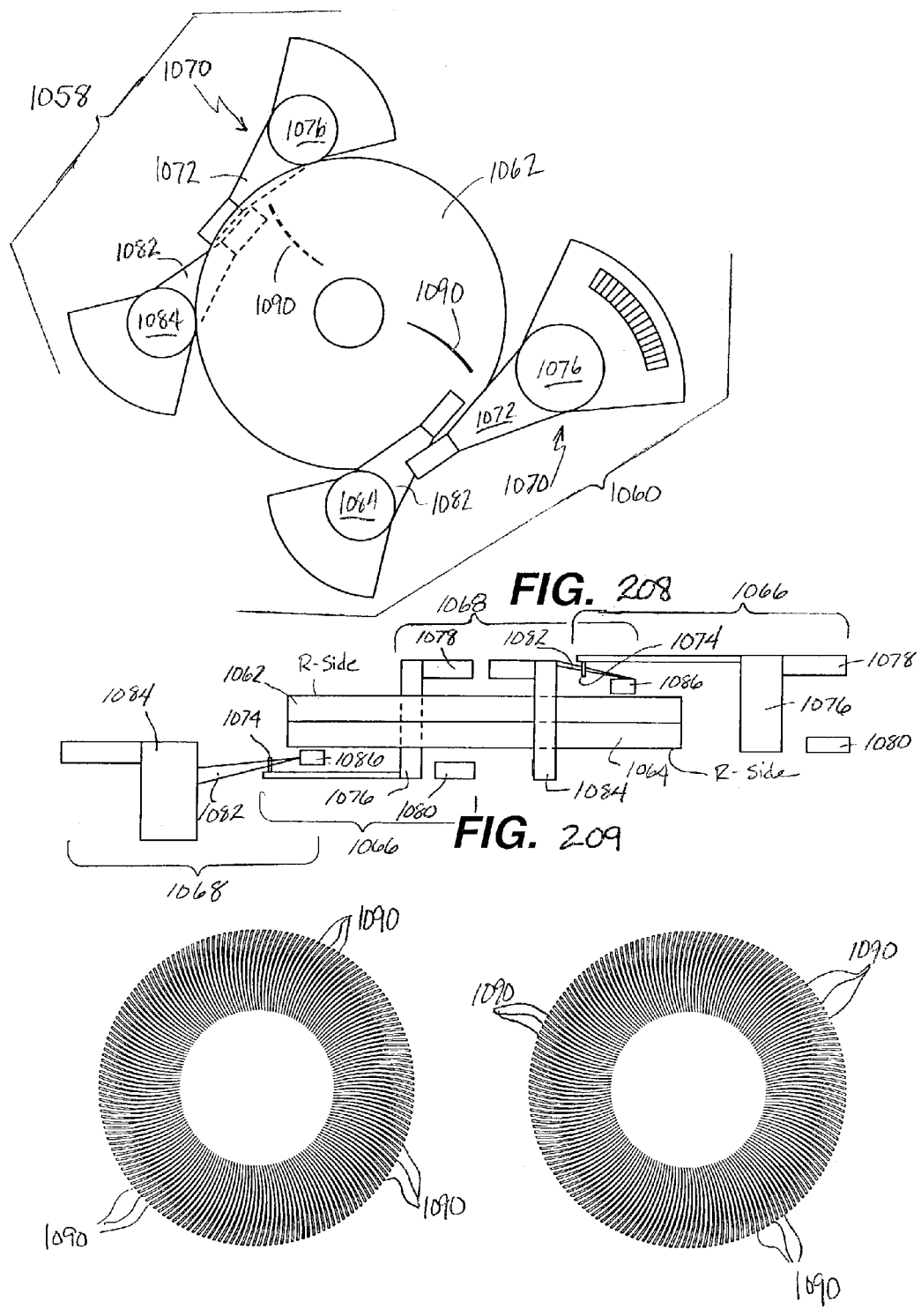

FIG. 208 is a top plan view of a servo-writing apparatus of the present invention used with a pair of merged disks.

FIG. 209 is an elevational view of the apparatus illustrated in FIG. 208.

FIG. 210 is an example of a servo-pattern written on the outer surface of the upper disk of a pair of disks by the apparatus illustrated in FIGS. 208 and 209.

FIG. 211 is an example of a servo-pattern written on the outer surface of the lower disk of a pair of disks by the apparatus illustrated in FIGS. 208 and 209.

Figure 212:
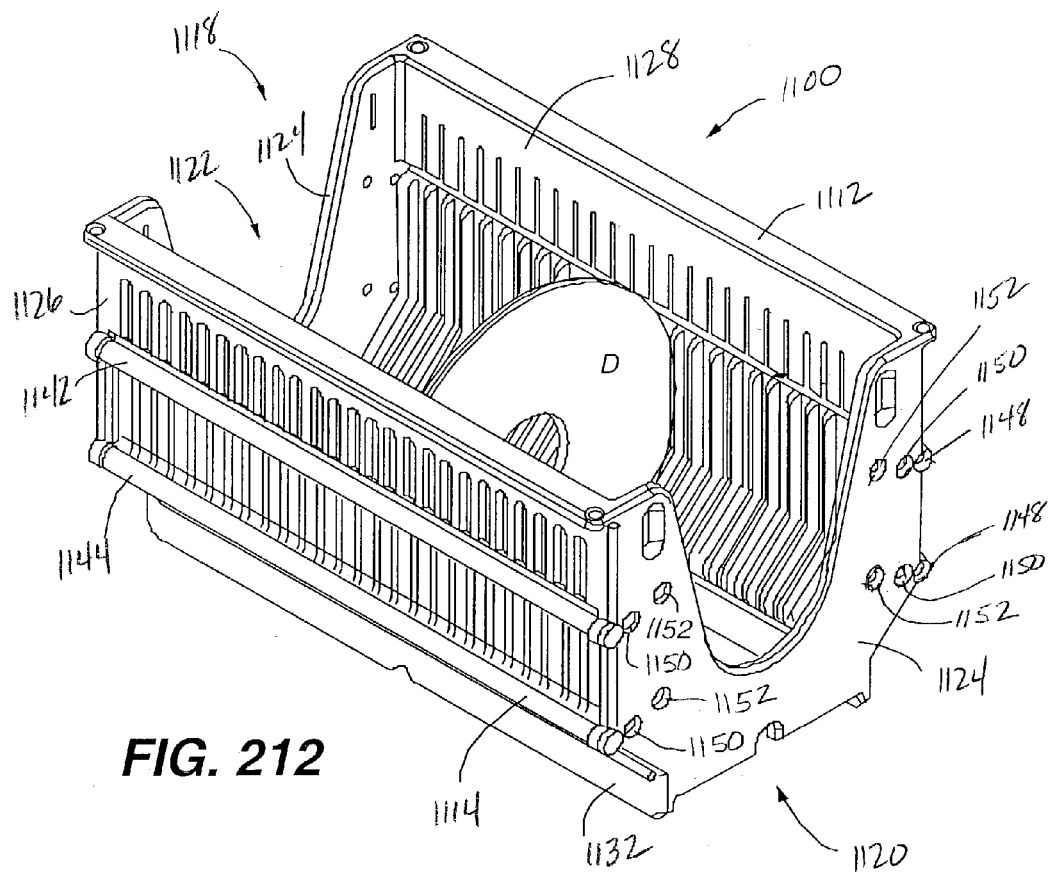

FIG. 212 is a perspective view of an embodiment of a disk handling and transport apparatus of the present invention.

Figure 213:
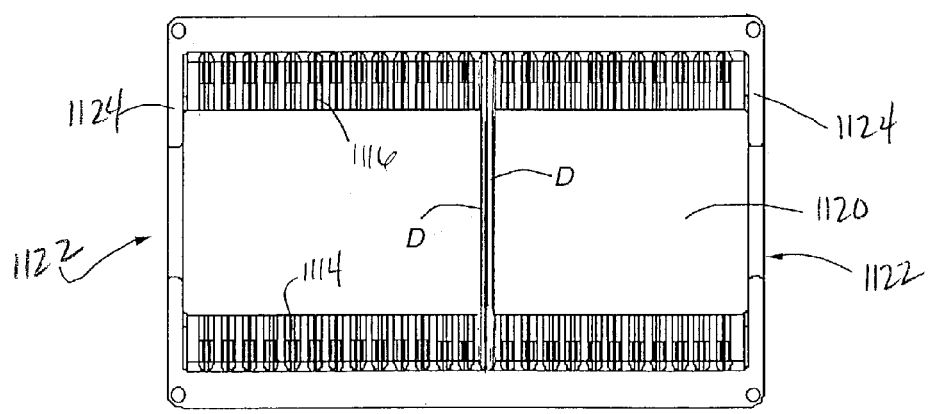

FIG. 213 is a top plan view of the embodiment of FIG. 212.

Figure 214:
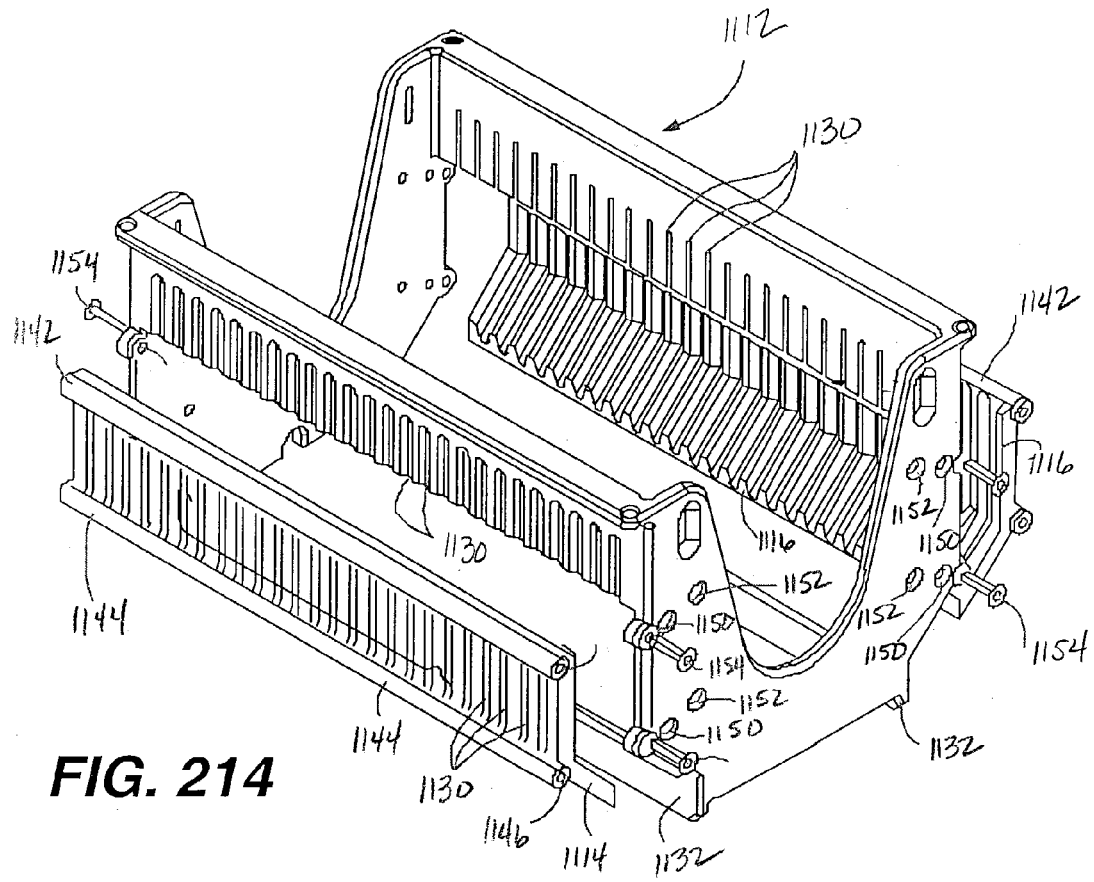

FIG. 214 is an exploded perspective view of the embodiment of FIG. 212.

Figure 215:
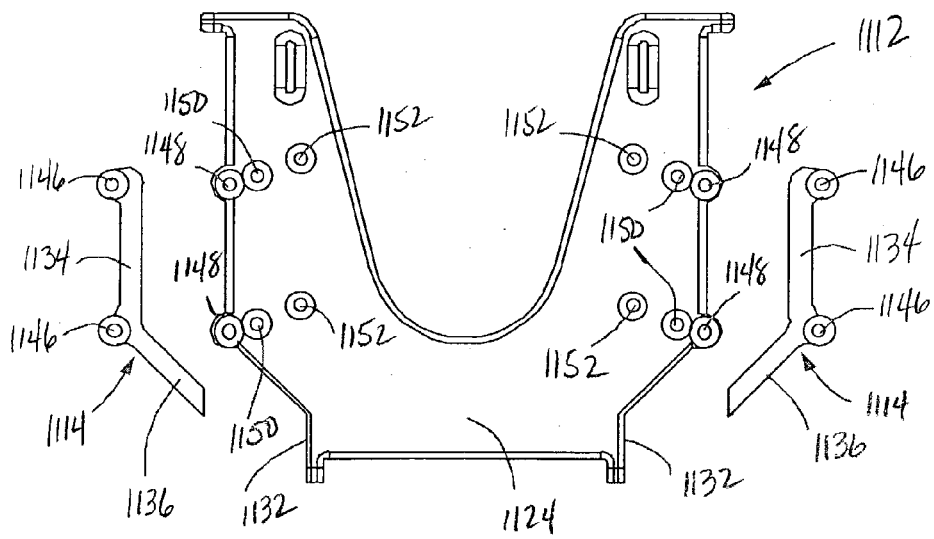

FIG. 215 is an exploded end view of the embodiment of FIG. 214.

FIG. 216 is a side elevation view of the embodiment of FIG. 212.

FIG. 217 is a schematic end view of the embodiment of FIG. 212 in a first configuration.

FIG. 218 is a schematic end view of the embodiment of FIG. 212 in a second configuration.

FIG. 219 is a schematic end view of the embodiment of FIG. 212 in a third configuration.

FIG. 220 is an end view of a side wall insert.

Figure 221:
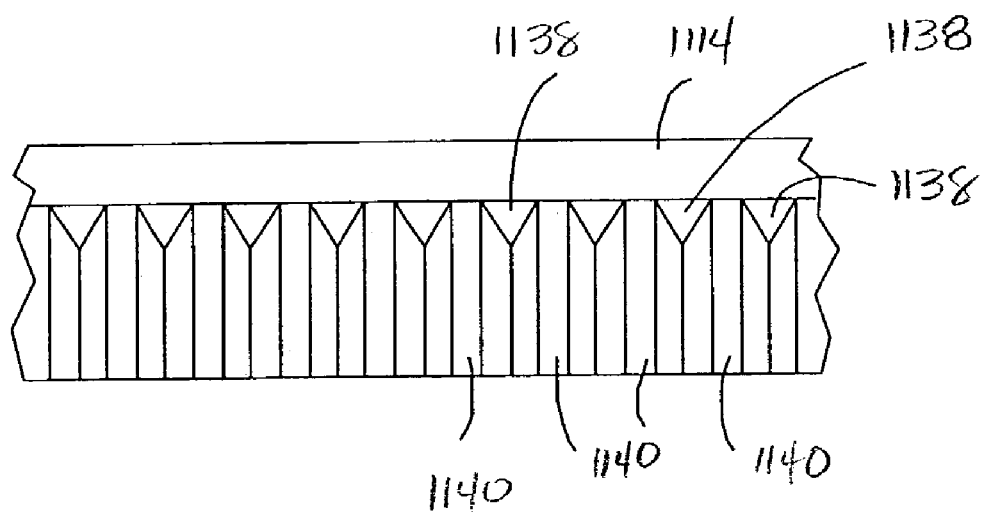

FIG. 221 is a partial top plan view of a side wall insert with ribs configured in a contact merge orientation.

Figure 222:
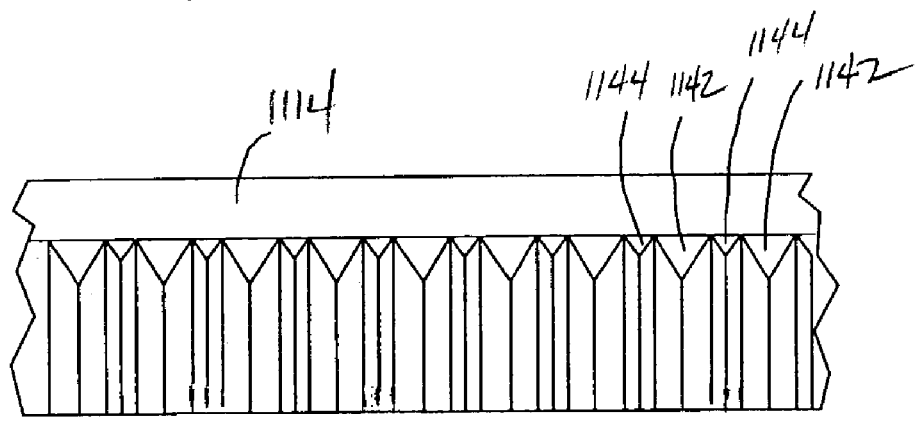

FIG. 222 is a partial top plan view of a side wall insert member with ribs configured in a gap merge orientation.

Figure 223:
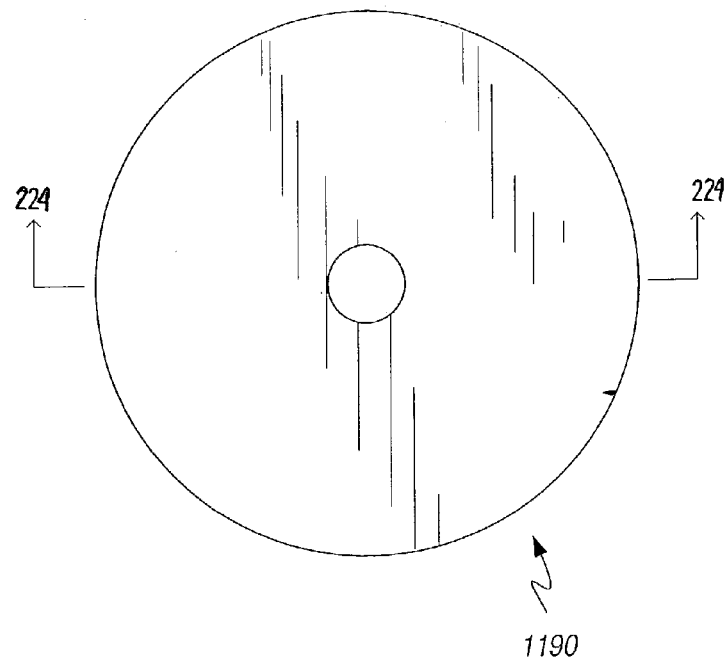

FIG. 223 is a plan view of a disk.

Figure 224:
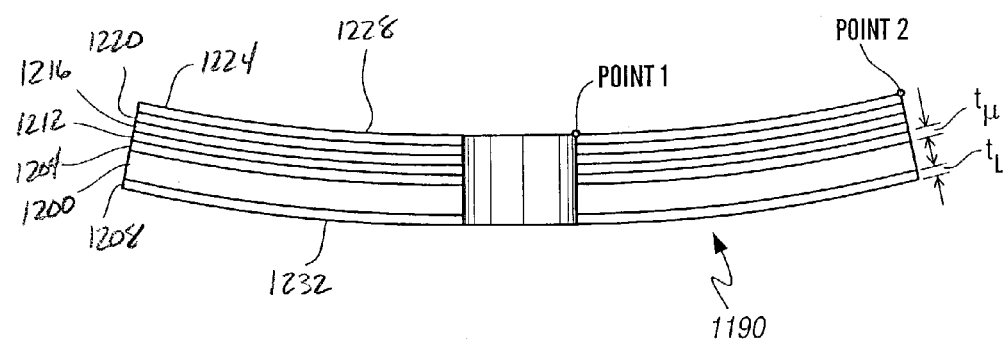

FIG. 224 is a cross-sectional view along disk center line 224-224 of FIG. 223.

Figure 225:
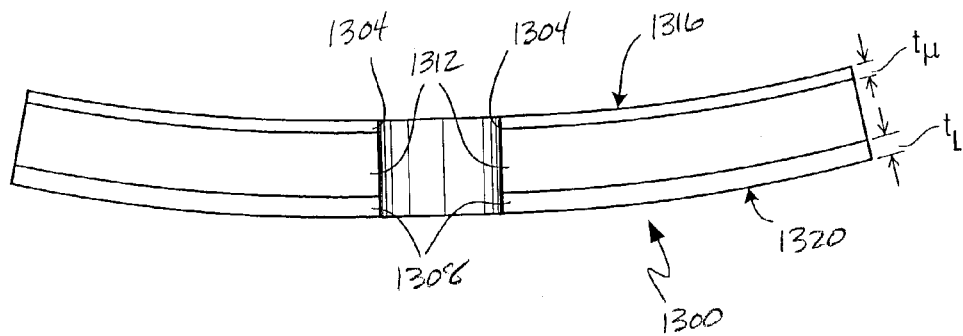

FIG. 225 is a cross-sectional view taken along the disk center line of a plated disk according to an embodiment of the present invention.

Figure 226:
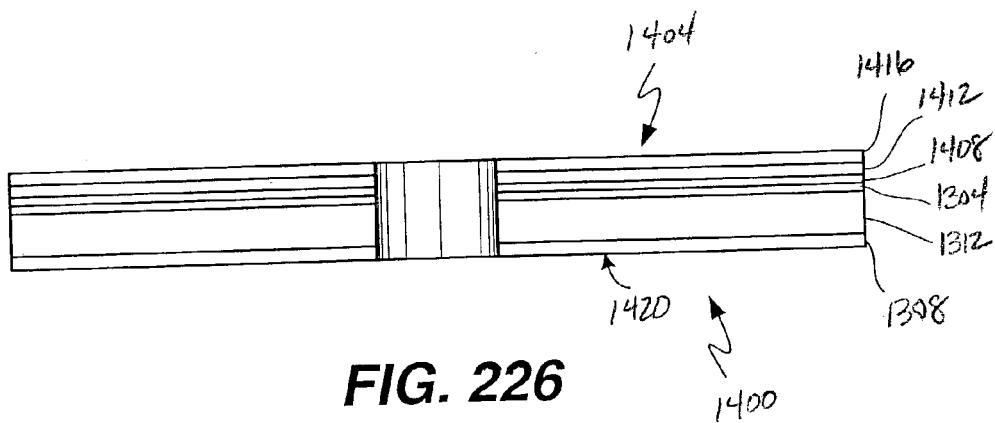

FIG. 226 is a cross-sectional view taken along the disk center line of a sputtered disk based on the plated disk of FIG. 225.

Figure 227:
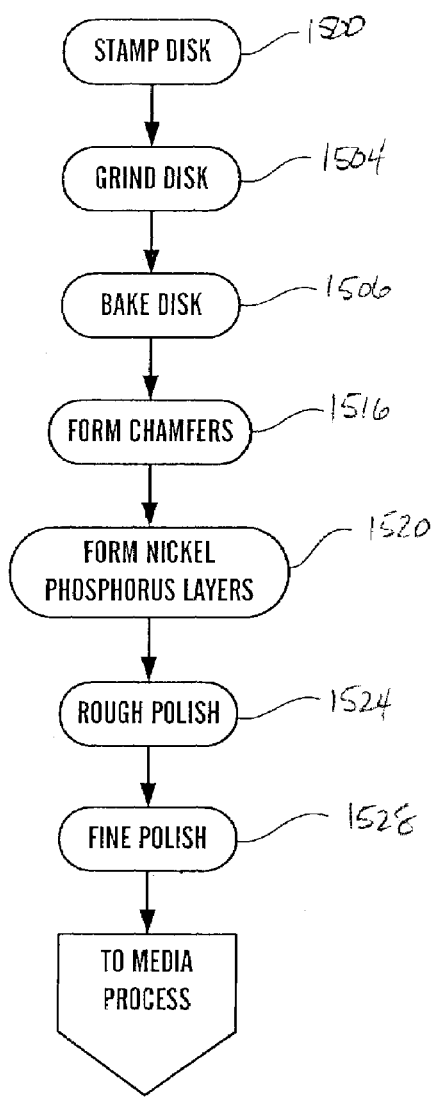

FIG. 227 is a flow chart of a substrate process according to an embodiment of the present invention according to an embodiment of the present invention.

Figure 228A:
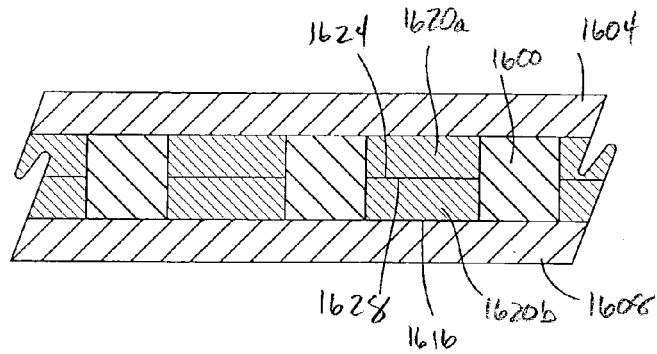

FIG. 228A is a cross-sectional view taken along a center line of a disk polishing assembly.

Figure 228B:
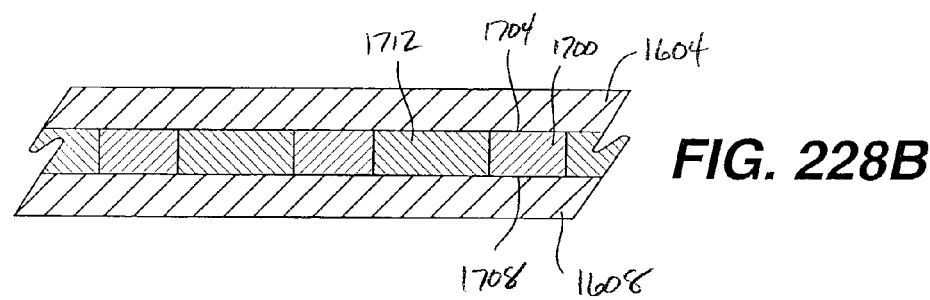

FIG. 228B is a cross-sectional view taken along a center line of a disk polishing assembly.

Figure 229:
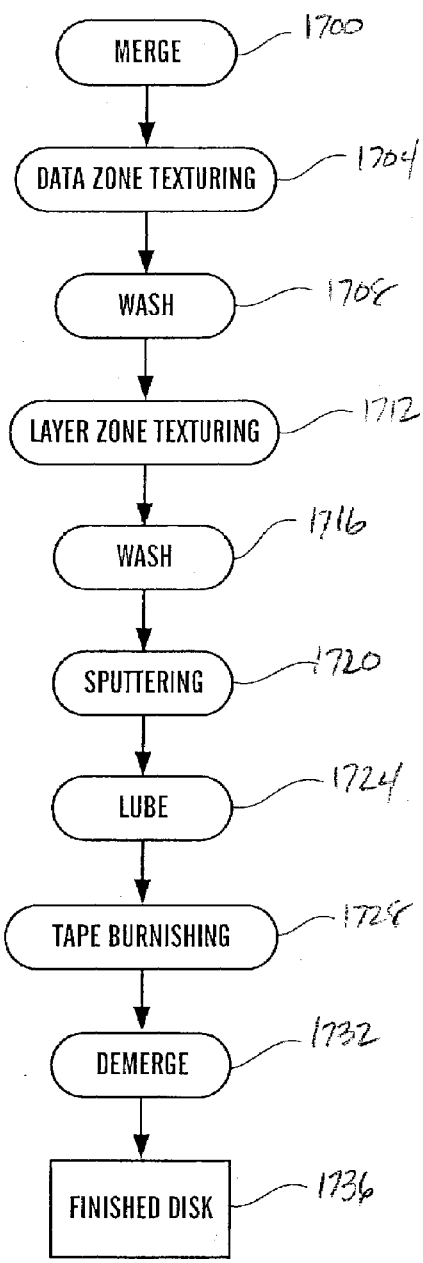

FIG. 229 is a cross-sectional view taken along a center line of a disk polishing assembly.

Figure 230:
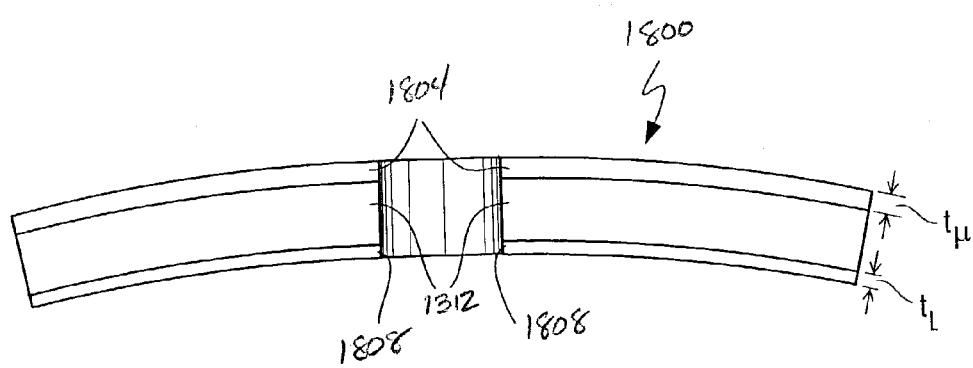

FIG. 230 is a flow chart of a media process according to an embodiment of the present invention.

Figure 231:
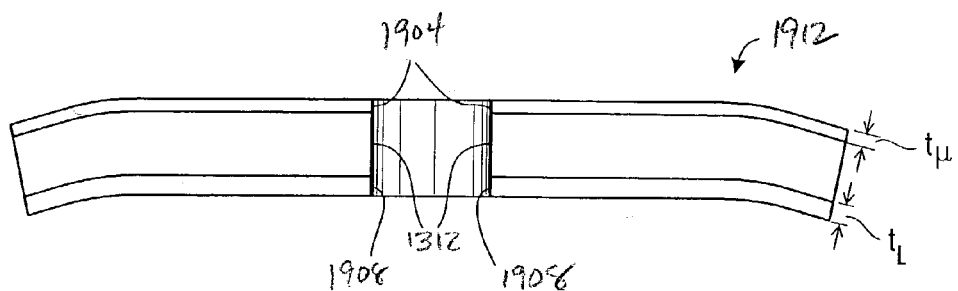

FIG. 231 is a cross-sectional view taken along the disk center line of a plated disk according to an embodiment of the present invention.

Figure 232:
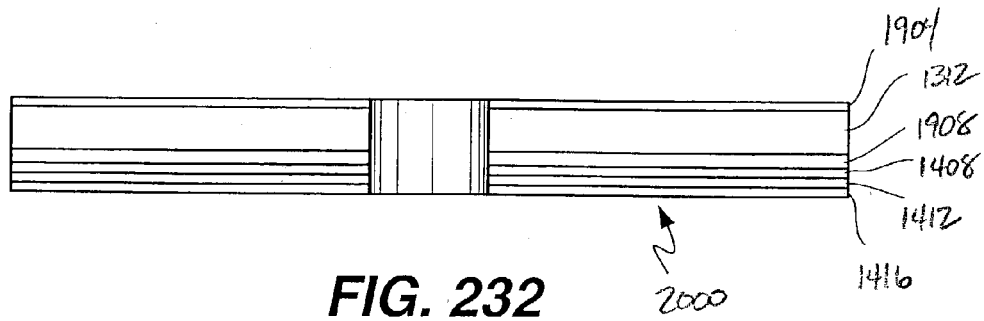

FIG. 232 is a cross-sectional view taken along the disk center line of a plated disk according an embodiment of the present invention.

FIG. 233 is a cross-sectional view taken along the disk center line of a sputtered disk based on the disk of FIG. 231.

FIGS. 233A and 233B depict a plated and polished disk manufactured by a first experimental process.

FIGS. 234A and 234B depict a plated and polished disk manufactured by the first experimental process.

FIGS. 235A and 235B depict a plated and polished disk manufactured by the first experimental process.

FIGS. 236A and 236B depict a plated and polished disk manufactured by the first experimental process.

FIGS. 237A and 237B depict a plated and polished disk manufactured by the first experimental process.

FIGS. 238A and 238B depict a plated and polished disk manufactured by a second experimental process.

FIGS. 239A and 239B depict a plated and polished disk manufactured by the second experimental process.

FIGS. 240A and 240B depict a plated and polished disk manufactured by the second experimental process.

FIGS. 241A and 241B depict a plated and polished disk manufactured by the second experimental process.

FIGS. 242A and 242B depict a plated and polished disk manufactured by the second experimental process.

FIGS. 243A and 243B depict a sputtered disk of a first experimental Type B configuration.

FIGS. 244A and 244B depict a sputtered disk of the first experimental Type B configuration.

FIGS. 245A and 245B depict a sputtered disk of the first experimental Type B configuration.

FIGS. 246A and 246B depict a sputtered disk of the first experimental Type B configuration.

FIGS. 247A and 247B depict a sputtered disk of the first experimental Type B configuration.

FIGS. 248A and 248B depict a sputtered disk of the first experimental Type B configuration.

FIGS. 249A and 249B depict a sputtered disk of a second experimental Type B configuration.

FIGS. 250A and 250B depict a sputtered disk of the second experimental Type B configuration.

FIGS. 251A and 251B depict a sputtered disk of the second experimental Type B configuration.

FIGS. 252A and 252B depict a sputtered disk of the second experimental Type B configuration.

FIGS. 253A and 253B depict a sputtered disk of the second experimental Type B configuration.

FIGS. 254A and 254B depict a sputtered disk of the second experimental Type B configuration.

Figure 255:
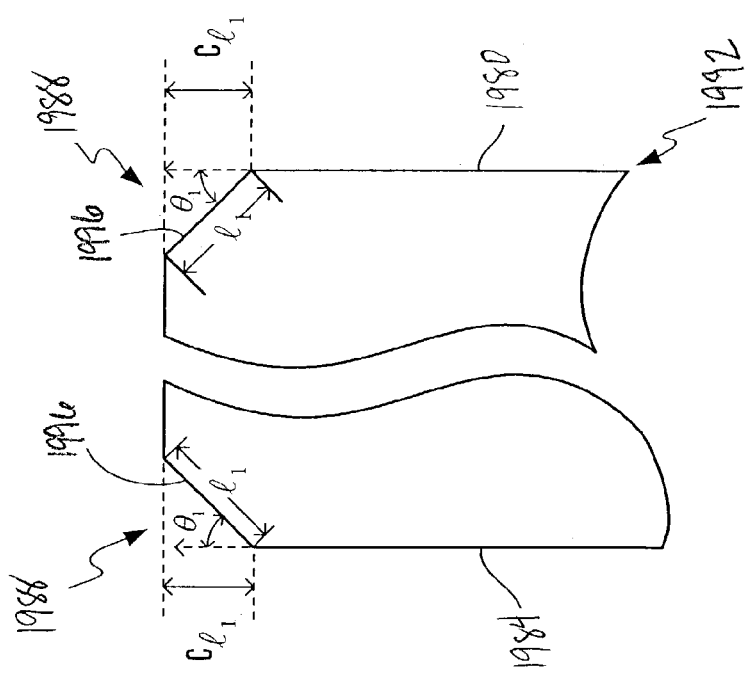

FIG. 255 is a cross-section view of a prior art magnetic disk.

Figure 256:
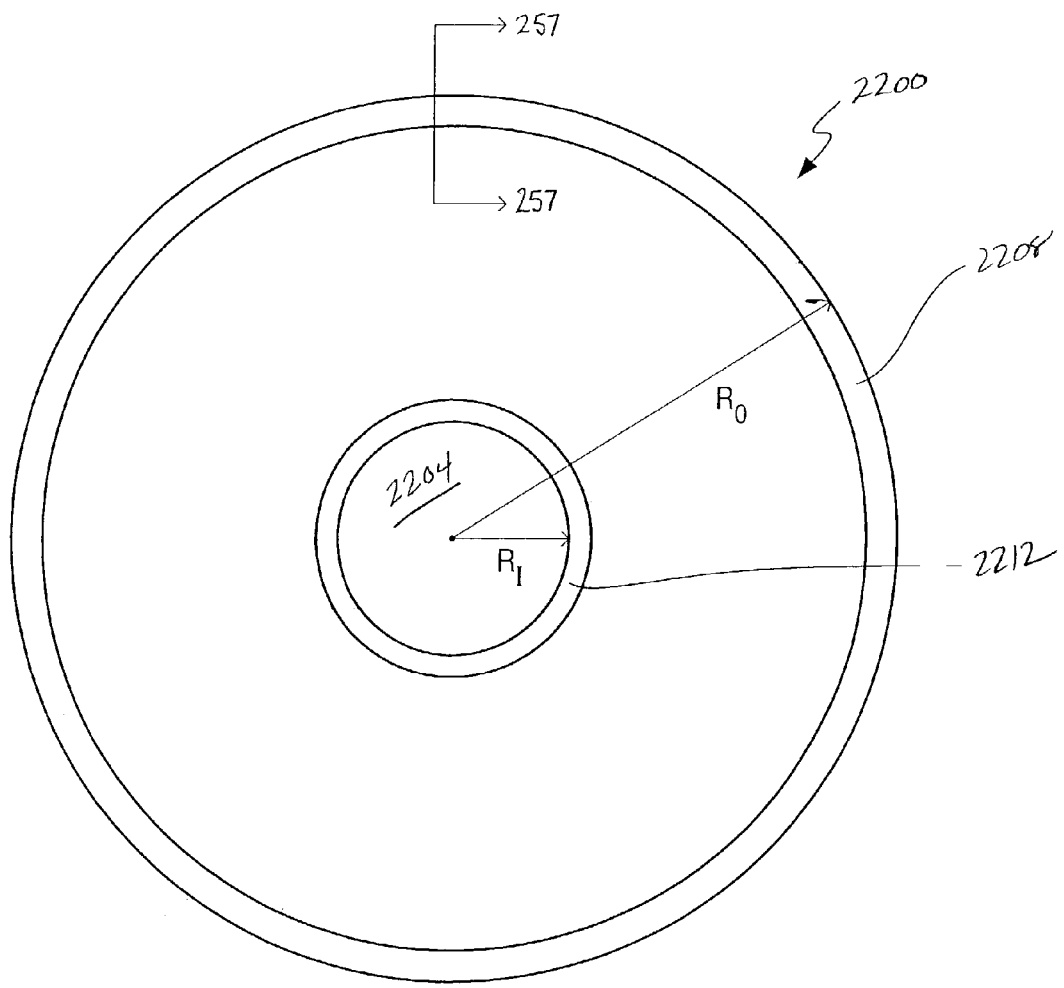

FIG. 256 is a plan view of a magnetic disk according to an embodiment of the present invention.

FIG. 257A is a cross-section view along line 257-257 of FIG. 256.

FIG. 257B is a cross-section view along line 257-257 of FIG. 256.

FIG. 257C is a cross-section view along line 257-257 of FIG. 256.

FIG. 257D is a cross-section view along line 257-257 of FIG. 256.

FIG. 257E is a cross-section view along line 257-257 of FIG. 256.

FIG. 257F is a cross-section view along line 257-257 of FIG. 256.

FIG. 257G is a cross-section view along line 257-257 of FIG. 256.

Figure 258:
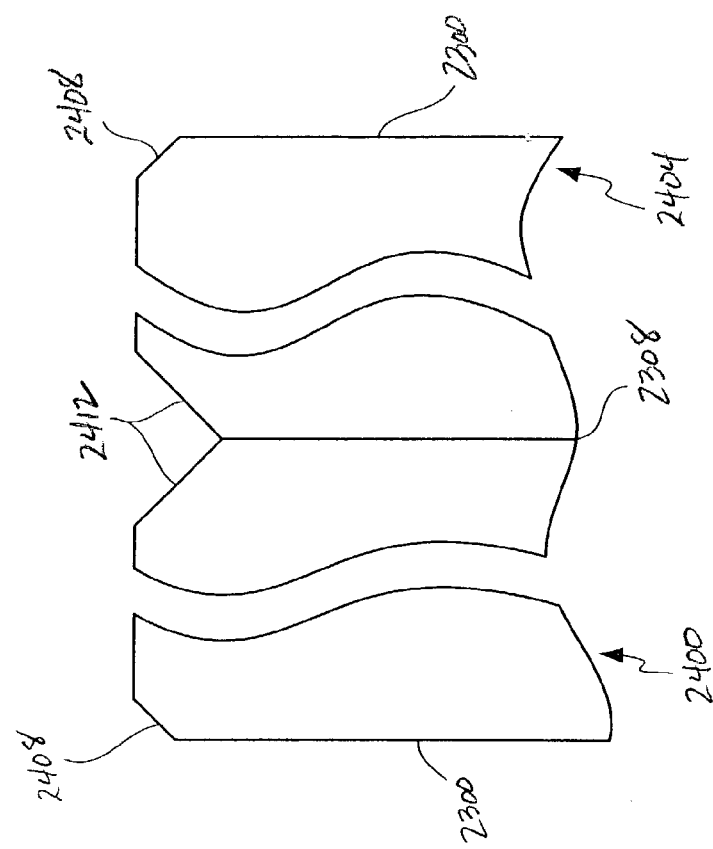

FIG. 258 shows two merged disks according to an embodiment of the present invention.

FIG. 259 shows the line of travel of a diamond tool bit to form dissimilar chamfers according to an embodiment of the present invention.

Figure 260:
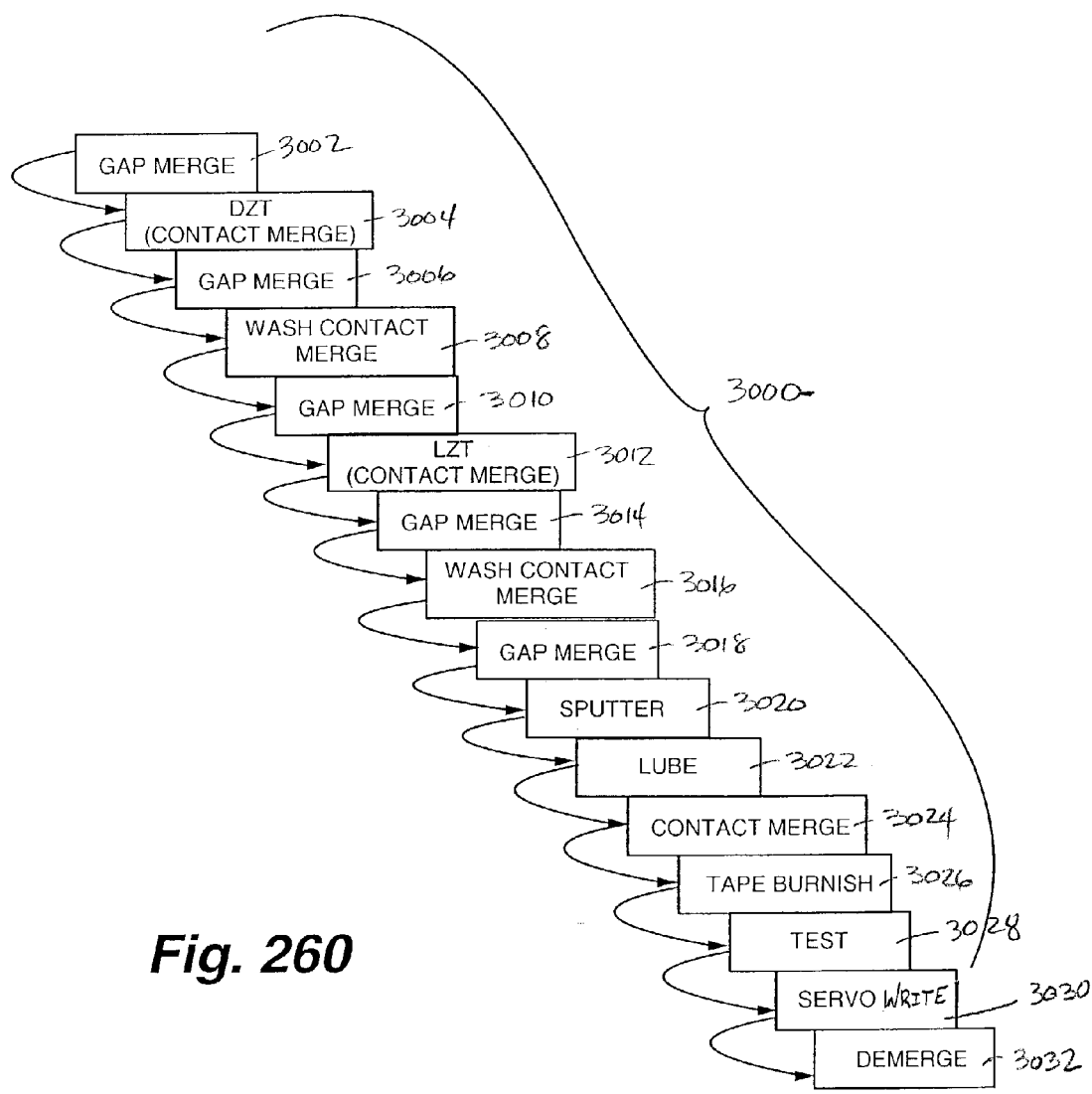

FIG. 260 is a flow chart of one embodiment of a simultaneous single-sided disk manufacturing process.

Figures 261, 262, 263, 264, 265:
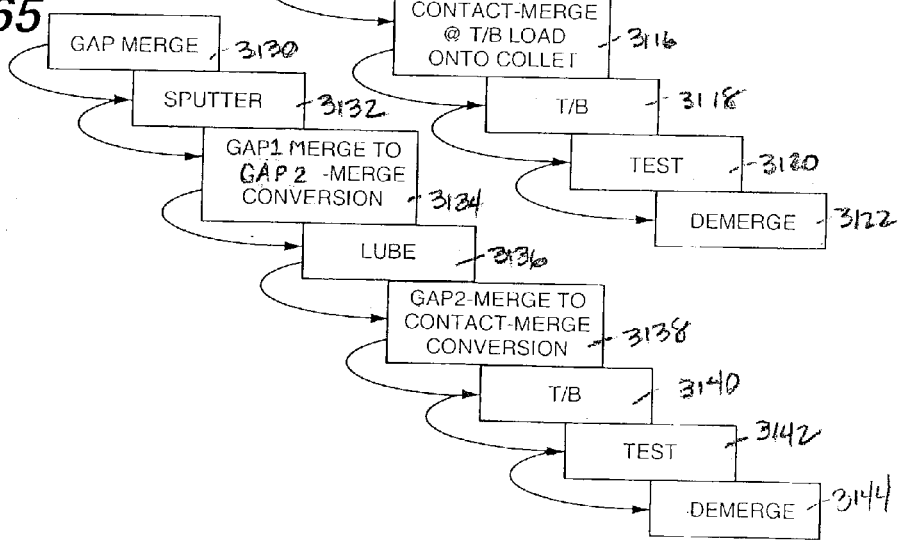

FIG. 261 is a flow chart of a second embodiment of a simultaneous single-sided disk manufacturing process.

FIG. 262 is a flow chart of a third embodiment of a simultaneous single-sided disk manufacturing process.

FIG. 263 is a flow chart of a fourth embodiment of a simultaneous single-sided disk manufacturing process.

FIG. 264 is a flow chart of a fifth embodiment of a simultaneous single-sided disk manufacturing process.

FIG. 265 is a flow chart of a sixth embodiment of a simultaneous single-sided disk manufacturing process.

Figure 266:
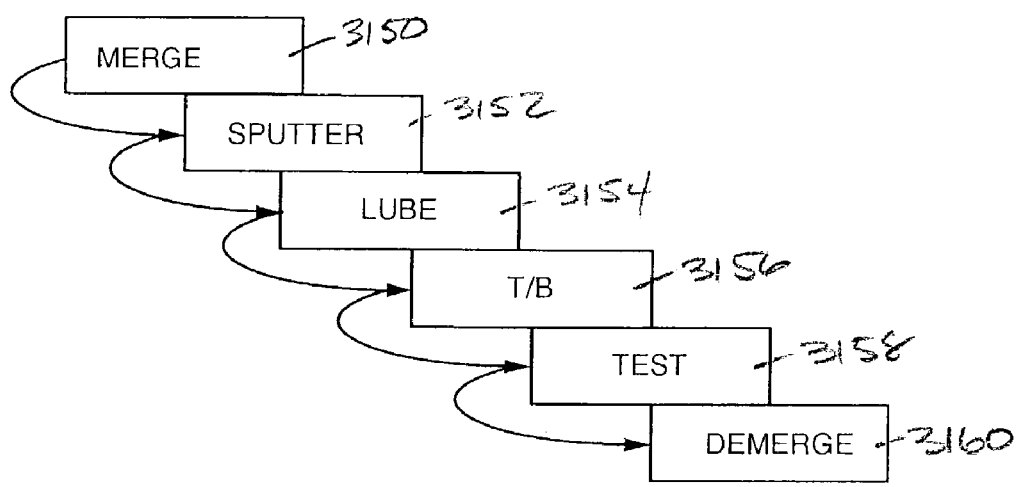

FIG. 266 is a flow chart of a seventh embodiment of a simultaneous single-sided disk manufacturing process.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

For illustrative purposes, the embodiments and examples described herein are in the context of disks having a 95-millimeter diameter, a 25-millimeter center aperture and a 0.050 inch thickness. The present invention should not be construed as limited to the particular sized disk. It should be appreciated that the present invention can be used with disks of different sizes. For example, the diameter of the disks may be smaller or larger, and the thickness may vary as well. It should also be appreciated that the present invention can be used with a varying number of pairs of disks, from one pair to a plurality of pairs.

A. Merging and Demerging Disks

Generally, there are two ways in which to handle or transport hard memory disks. These are by engaging the outside perimeter edge of the disk or by engaging the inside perimeter edge of the disk formed by the center aperture. Disks may be engaged at their outer perimeter edge when they are positioned in cassettes or carriers, or when they are removed from cassettes for processing, such as by a lift tool or similar mechanism which engages the outer perimeter edge of the disk through an opening in the bottom of a cassette and vertically lifts the disk to a position above the cassette. Disks positioned in a cassette also may be engaged at the upper outer perimeter edge by a gripping mechanism which accesses the disks through the open top of a cassette. Disks are engaged at their inside diameter by a mandrel or similar mechanism. Two illustrations of disk handling mechanisms are shown in FIGS. 11 and 12. As shown, a disk handling mechanism 10, whether it be the side wall of a cassette, a mandrel, or a lift tool typically comprises a groove or channel 12 formed between raised ribs or teeth 14. The channel walls may be rounded as shown in FIG. 11 or may be straight as shown in FIG. 12. In either case, the outer perimeter edge or inside perimeter edge of the disk sits within the channel and is restricted in movement by the walls of the surrounding ribs or teeth.

Figure 13:
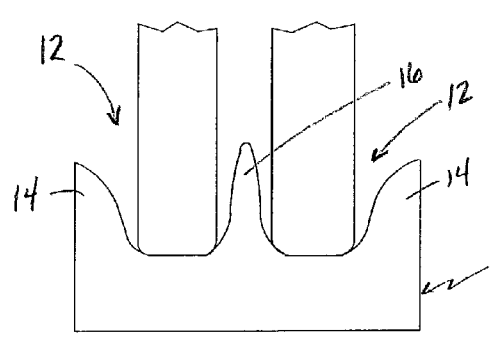
FIG. 13 is a schematic view of a disk handling tool positioning a pair of disks in a gap merge orientation.
Figure 14:
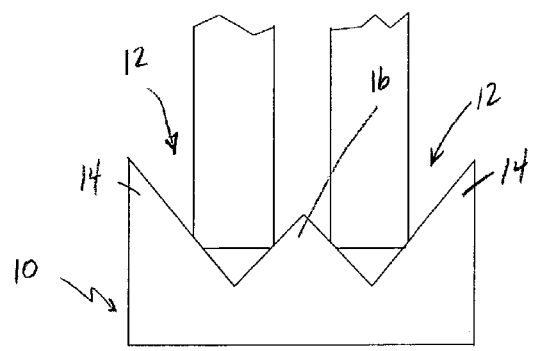
FIG. 14 is a schematic view of a second embodiment of the disk handling tool of FIG. 13.

Modification to disk handling mechanisms is needed in order to handle and/or transport pairs of disks for simultaneous processing. FIGS. 13 and 14 illustrate two mechanical ways in which to handle or transport a pair of disks in a gap merge orientation. These embodiments include a smaller rib or tooth 16 positioned between larger ribs or teeth 14. The smaller profile rib maintains desired spacing between the two disks. The larger teeth, positioned outside each pair of disks, maintain desired spacing between adjacent pairs of disks of each pair. The ribs also define grooves or channels 12 for engaging either the outside perimeter edge of the disk or the inside perimeter edge of the disk. The grooves may be rounded as shown in FIG. 13, or they may be V-shaped (or W-shaped) as shown in FIG. 14.

Figure 15:
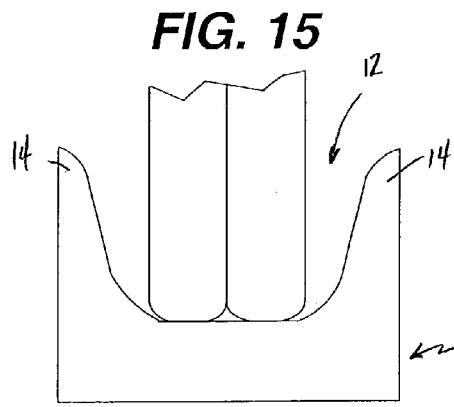
FIG. 15 is a schematic view of a disk handling tool positioning a pair of disks in concentric contact merge orientation.
Figure 16:
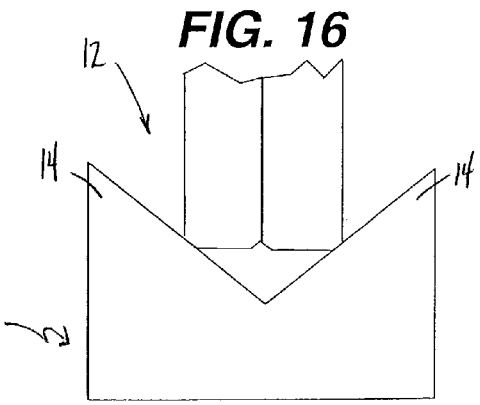
FIG. 16 is a schematic view of an alternative embodiment of the disk handling tool of FIG. 15.

Apparatus for handling or transporting pairs of contact merge or concentric contact merge disks are shown in FIGS. 15 and 16. Because the L-side surfaces of the disks are in contact, a single channel or groove 12 is formed between raised ribs or teeth 14. However, the channel width is dimensioned to support two disks, rather than a single disk. The respective channels maybe U-shaped or rounded as shown in FIG. 15, or V-shaped as shown in FIG. 16.

For simultaneously processing two disks at a time, it is also necessary to be able to change the orientation of disks. In general terms, one method of merging a pair of disks is shown in FIGS. 17A, 17B, 18A and 18B. FIGS. 17A and 17B show two disks being brought closer together to form a disk pair in gap merge orientation. The edge of the disks, either the outside perimeter edge or the inside perimeter edge, engages the slanted surfaces 18 of the large ribs and slide to the position shown in FIG. 17B. This merge process decreases the spacing between two disks. This process can be used to create a gap merge orientation or to reduce the space between disks already in a gap merge orientation. Similarly, as shown in FIGS. 18A and 18B, a pair of spaced disks are merged into a contact merge orientation by interaction between the outside perimeter edge or inside edge of the disk and the side walls 18 of the ribs forming the groove 12. The space between the two disks is completely eliminated and the pair of disks are in a contact merge orientation.

In the simultaneous processing of two single-sided disks, there are times when the disk pairs must also be demerged. Examples of two mechanisms for demerging pairs of disks are shown in FIGS. 19A and 19B, and 20A and 20B. With reference to FIGS. 19A, 19B, a gap merge pair of disks is demerged utilizing a tool having a smaller raised tooth or rib 16 which interacts with the existing gap between the disks to create a larger space or gap between the disks. As the L-side surfaces of the disks engage the intervening rib or tooth 16, the disks slide along the outside face 20 of the rib until they are positioned fully within the channel or groove with a larger space between them. The shape of the ribs or teeth dictate how far apart the disks can be spaced. Demerging a pair of contact merge disks is slightly different because the L-side surfaces of the disks are in contact. With reference to FIGS. 20A and 20B, the demerge tool 22 includes a wedge 24. In addition, it is preferred that the disks have a chamfered outside perimeter edge C to create a guide 26 for the demerge tool. Forcing the demerge tool between the pair of disks creates a gap between the disk pair. The gap permits other tools, such as a mandrel, to complete the demerge process and form a uniform gap between the disks. The disks may also be transferred to a cassette configured to position the disks in the desired orientation.

One example of where disk merging techniques are utilized is the beginning of the single-sided disk manufacturing process. Typically, the first process is data zone texturing.

Data zone texturing begins with conventional, highly polished, two-sided substrate disks. The direction the substrate disks face is irrelevant; both sides of the substrate disk are the same. However, for handling purposes, the relative orientation of the substrate disks is important. Preferably, the substrate disks are arranged in a cassette in pairs, in a gap merge orientation. Therefore, it is necessary to combine two conventional cassettes of substrate disks into a single cassette of substrate disk pairs, with the pairs in gap merge orientation. Using conventional double-sided processing cassettes, the substrate disks will be spaced 0.25 inches apart, with 25 substrate disks in a cassette. Once combined in a single cassette, in gap merge orientation, the 50 substrate disks will be arranged in 25 pairs, in gap merge orientation with approximately 0.025 to 0.035 inches between the disks of each pair and one pair every 0.25 inches along the length of the cassette.

The below described apparatus may also be used to merge substrate disks or disks at other times in the manufacturing process. For example, the substrate disks may be individually subjected to conventional, double-sided texturing and washing and then merged into pairs in a gap merge orientation prior to undergoing sputtering.

An apparatus or workstation for simultaneously combining or separating disks is illustrated in FIG. 21. The apparatus consists of a three-axis robot 30 with a vertical arm 32 with a disk carrying mandrel 34. In one embodiment, the mandrel is configured to accommodate 25 pairs of disks (50 total). However, it should be appreciated that the number of disks can vary from one pair to as many pairs as are contained in a cassette or disk container. The mandrel may be circular in cross-section, as shown in many of the figures herein. The mandrel may also be semi-circular in cross-section as shown in FIG. 50, or it may be a two-pronged V-shape or a three-pronged shape as shown in FIGS. 137 or 148, respectively. The apparatus also includes a load lifter 36, a transfer lifter 84, a demerge tool 40, and four disk handling stations 42, 44, 46 and 48. Station 44 is a fixed transfer station.

Figure 40:
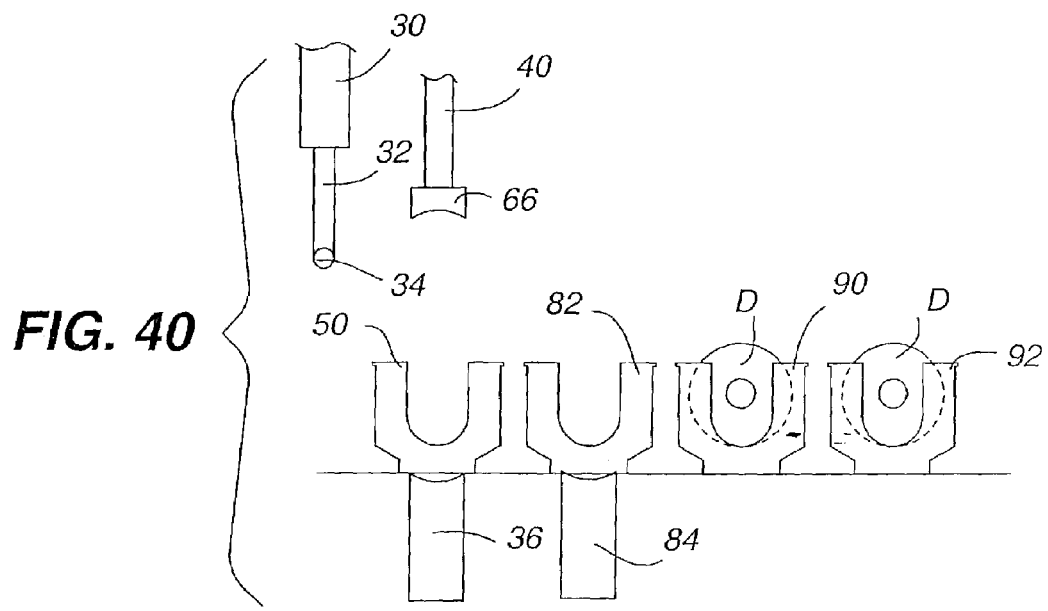
FIG. 40 is a schematic end view of the embodiment of FIG. 22, showing 25 disks aligned in one direction in a cassette, and 25 disks aligned in the opposite direction in a second cassette. it also illustrates the first stage of a second embodiment of the merging/demerging station used for merging disks or substrate disks.

The merge process begins by placing two cassettes of equal number of substrate disks or disks at input stations 46 and 48 as shown in FIG. 40. If the cassettes 90, 92 contain virgin substrate disks, it does not matter how they are positioned at stations 46 and 48. However, if the cassettes contain partially or fully processed single-sided disks, orientation of the cassettes 90, 92 is critical. In such a case, cassettes 90 and 92 are loaded such that the orientation of the R-side of the disks in each cassette face oppositely of the disks in the other cassette. For example, the cassettes are loaded so that the orientation of the R-side (the active side) of the disks in cassette 90 at station 46 face toward the front in FIG. 40, and the R-side (the active side) for disks in cassette 92 at station 48 face toward the rear in FIG. 40. This orientation is required so that when combined, each disk pair will have their R-sides (the active surfaces) facing outward and the L-side (the inactive or nonfunctional side) facing inwardly of the pair.

Figure 41:
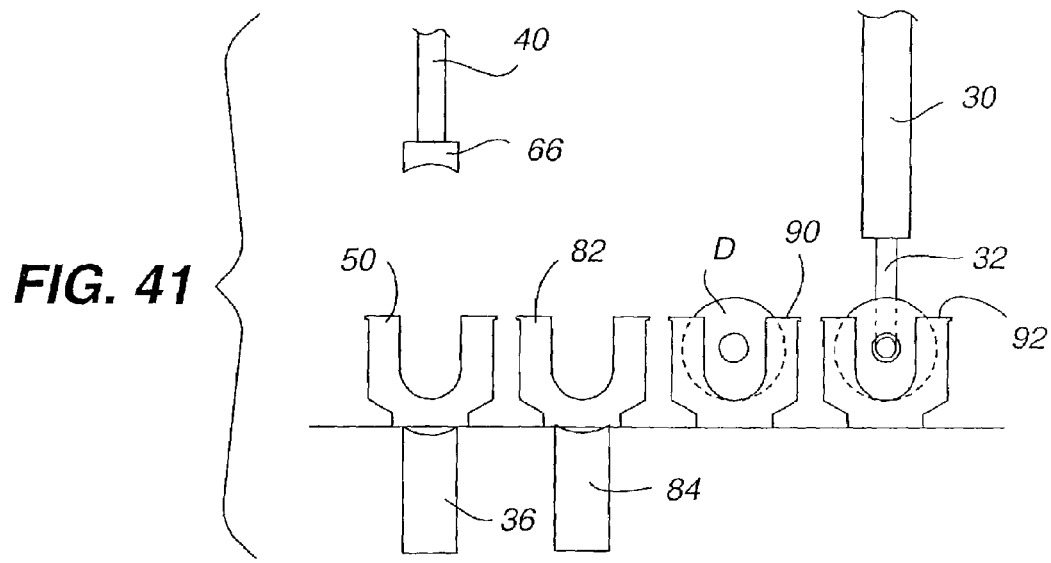
FIG. 41 is a schematic end view of the embodiment of FIG. 40, showing the disks of one cassette engaged by a mandrel.
Figure 42:
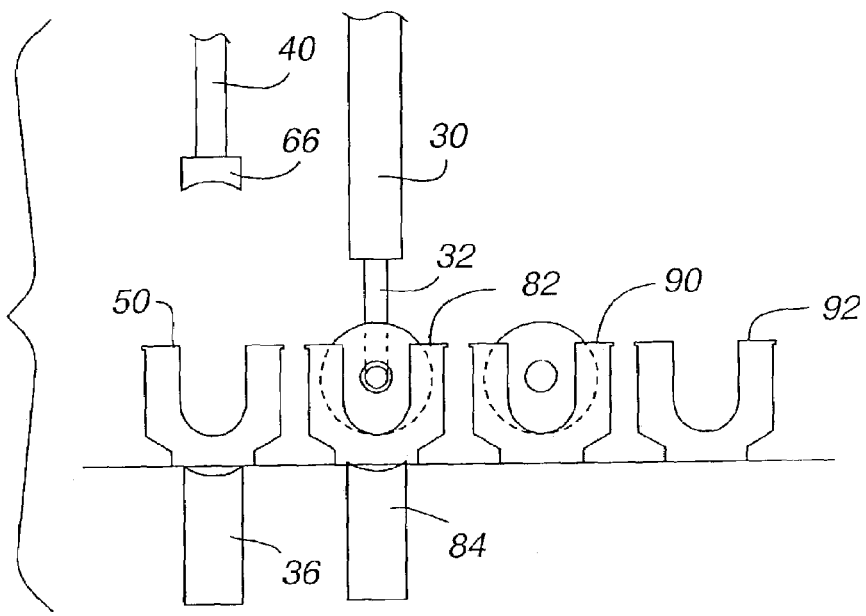
FIG. 42 is a schematic end view of the embodiment of FIG. 40, showing all of the disks from a first cassette positioned in a transfer station cassette.
Figure 43:
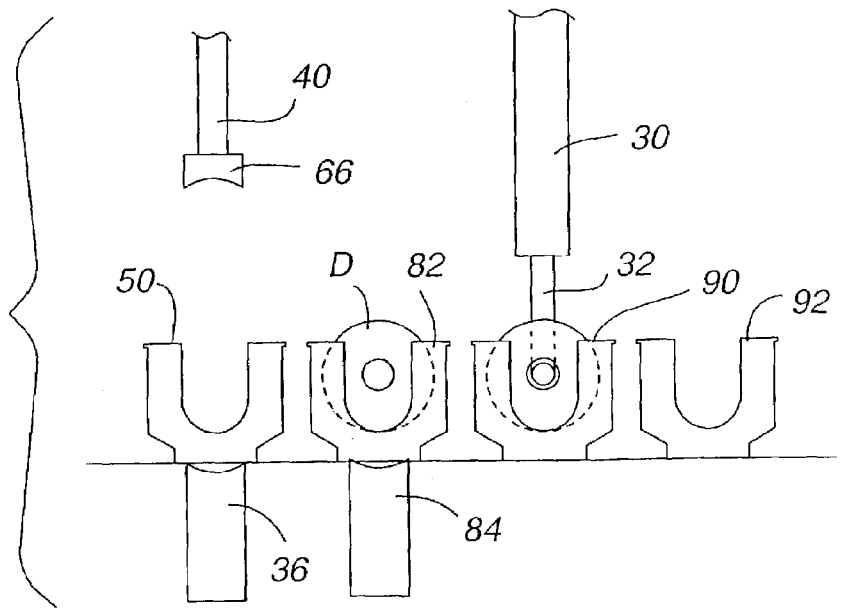
FIG. 43 is a schematic end view of the embodiment of FIG. 40, showing a mandrel engaging all of the disks in a second cassette.
Figure 44:
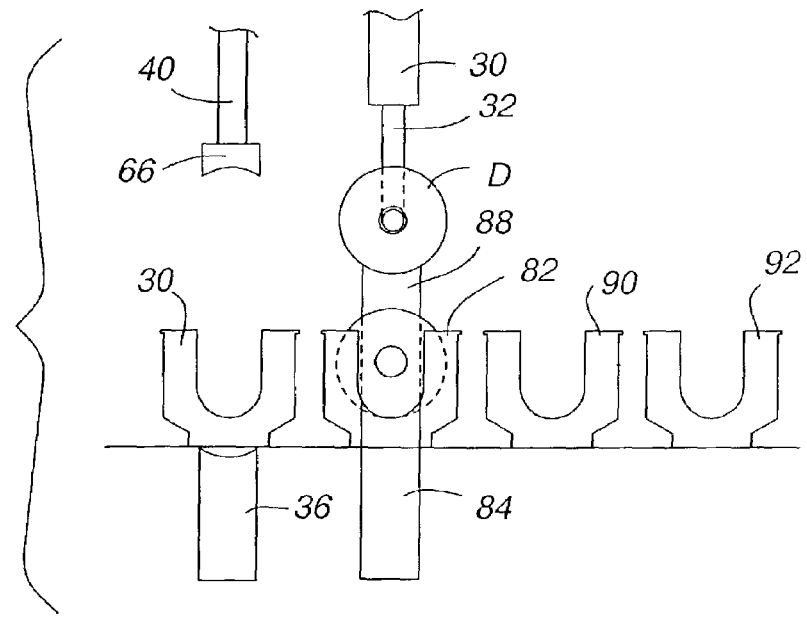
FIG. 44 is a schematic end view of the embodiment of FIG. 40, further showing the disks from the second cassette engaged by the transfer lifter.

With reference to FIG. 41, the robot 30 proceeds to station 48, inserts the mandrel 34 into the center aperture of the disks or substrate disks, engages all disks in the cassette 92 and removes them from the cassette. The robot 30 then loads these disks into the transfer cassette 82 at station 44 (FIG. 42). Next, the robot 30 will similarly engage the disks and the cassette 90 at station 46 (FIG. 43) and transport them to a position above the transfer station 44 (FIG. 44). A transfer lifter 84 is positioned beneath the transfer cassette 82 at station 44.

Figure 34:
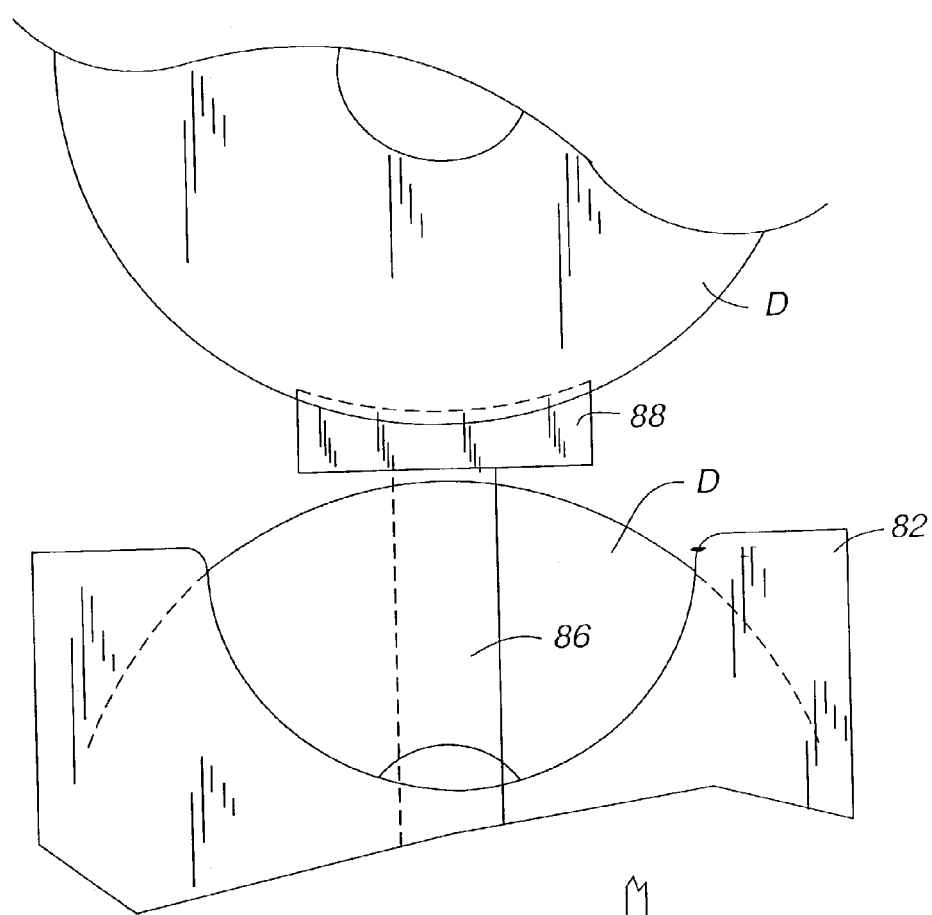
FIG. 34 is a partial end elevation of FIG. 33, showing the disks removed from the transfer assembly by the transfer lifter.
Figure 35:
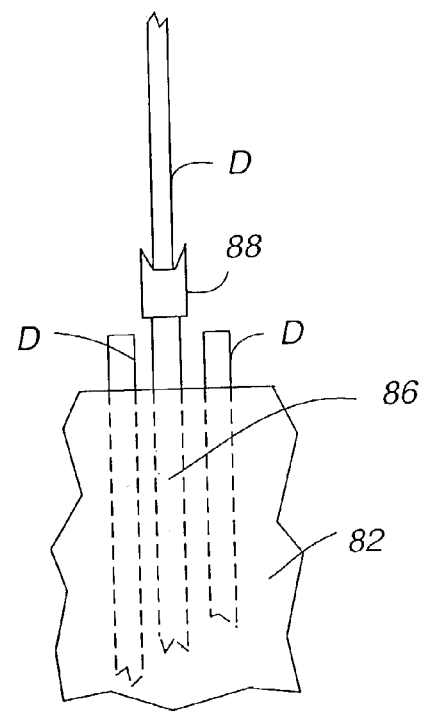
FIG. 35 is a partial front view of FIG. 34, showing one disk removed from the transfer cassette by the transfer lifter.
Figure 36:
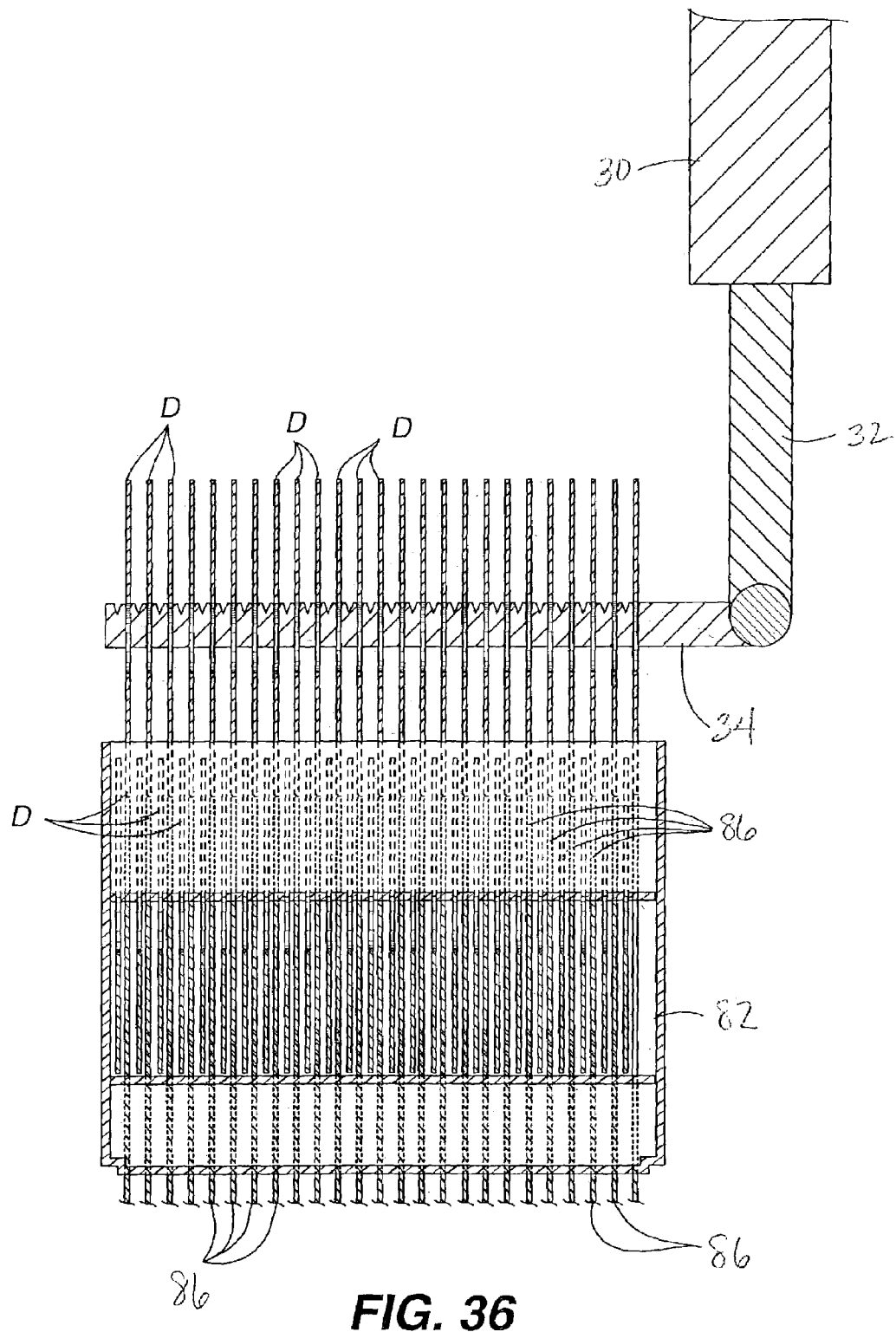
FIG. 36 is a cross-section taken along the line 36-36 of FIG. 33.
Figure 45:
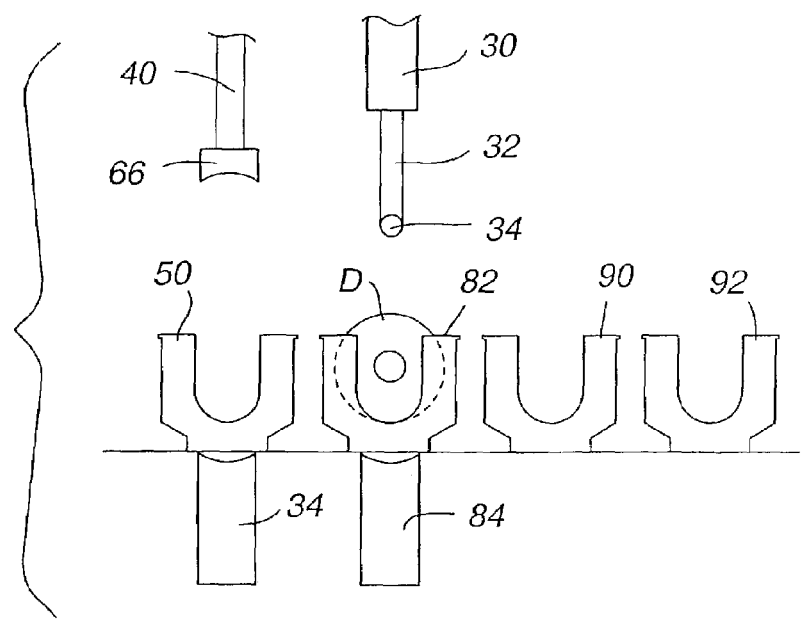
FIG. 45 is a schematic end view of the embodiment of FIG. 40, showing all of the disks from the first and second cassettes positioned in a transfer cassette.

A transfer lifter 84 includes a plurality of lift rods 86 with individual disk saddles 88 disposed at the top of each lift rod 86. The number of lift rods and load lifters is equal to one-half the number of disks in the cassette. More specifically, the individual lift rods 86 and load lifters 88 are positioned beneath every other disk in the transfer cassette 82. The load lifters extend to a position above the previously loaded disks at station 44 and engage the disks suspended from the mandrel 34 (FIGS. 34-36). The disks are transferred from the mandrel to the load lifter. The robot 30 then retracts the mandrel 34. The load lifters 88 then lower the disks into the transfer cassette 82 at station 44 (FIG. 45). Compared to a conventional cassette 90, 92 where the substrate disks are positioned one every 0.25 inches, the transfer cassette positions two disks or substrate disks every 0.25 inches. Transfer cassette 82 now contains twice the number of substrate disks or disks positioned in a conventional double-sided disk cassette.

Figure 46:
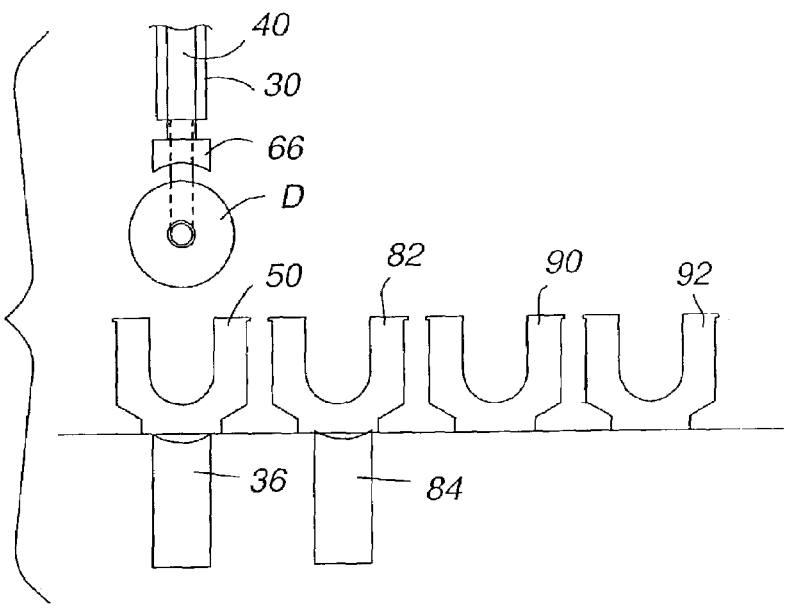
FIG. 46 is a schematic end view of the embodiment of FIG. 40, showing all of the pairs of disks from the transfer cassette engaged by a mandrel.
Figure 47:
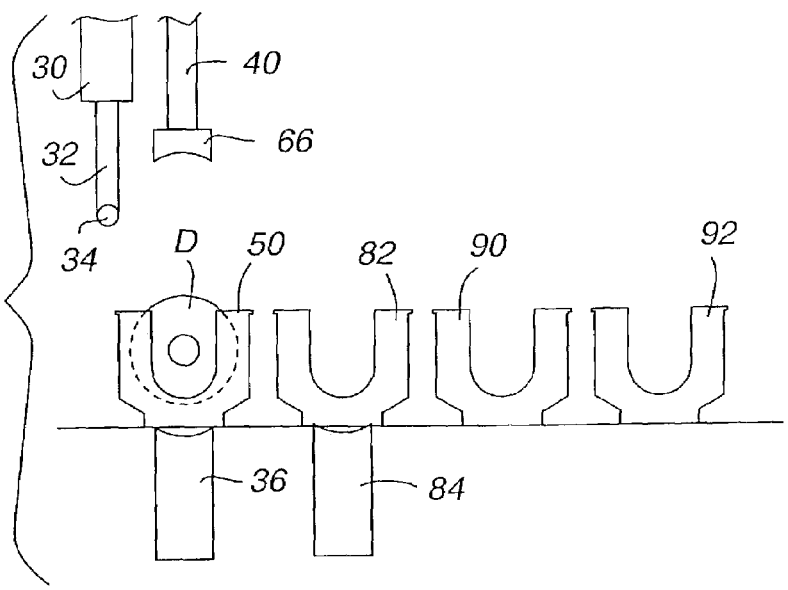
FIG. 47 is a schematic end view of the embodiment of FIG. 40, showing all of the disks from the first and second cassettes merged as disk or substrate pairs in a single cassette.

The robot 30 moves to the center of the transfer cassette 82. The mandrel 34 is inserted through the aperture of all disks and engages and removes all disks. (FIG. 46.) The robot 30 moves all of the disks to station 42, and lowers the disks into a cassette 50. (FIG. 47.)

The configuration of the merge cassette 50 will influence orientation of the disks in cassette 50. The merge cassette may be configured to position the substrate disks or disks in equal spacing, or in pairs having a gap merge orientation or a contact merge orientation. If equal spacing is desired, the merge cassette 50 is configured identical to the transfer cassette 82 and the mandrel 34 makes a simple transfer from the transfer cassette to the merge cassette. If gap merge orientation is desired, a cassette having side wall ribs such as is shown in FIGS. 17A, 17B is needed. As the disks are lowered into the cassette, FIG. 17A, the side walls of the ribs force the disks into gap merge orientation, FIG. 17B. Similarly, if contact merge orientation is desired, the cassette will have side walls configured as shown in FIGS. 18A, 18B.

The same apparatus and process can be used for demerging pairs of single-sided disks. The end of the manufacturing process is one example of when separation of disk pairs is needed. Fully processed disks arrive at the demerge work station in cassettes 50. The disks will be arranged in pairs in the cassette with the R-side of each disk facing outwardly of the pair (see FIGS. 8, 9). Thus, the position of each disk is reversed compared to the disk next to it. The objective is to separate the disk pairs and place them in cassettes such that their orientation in each cassette is the same. Repositioning the disks will facilitate subsequent automated handling, such as removing the disks from a cassette and placing them in disk drives. Because the disks are single-sided, it is critical that their orientation be known. Placing a single-sided disk upside down in a disk drive would result in a non-functional drive.

Figure 22:
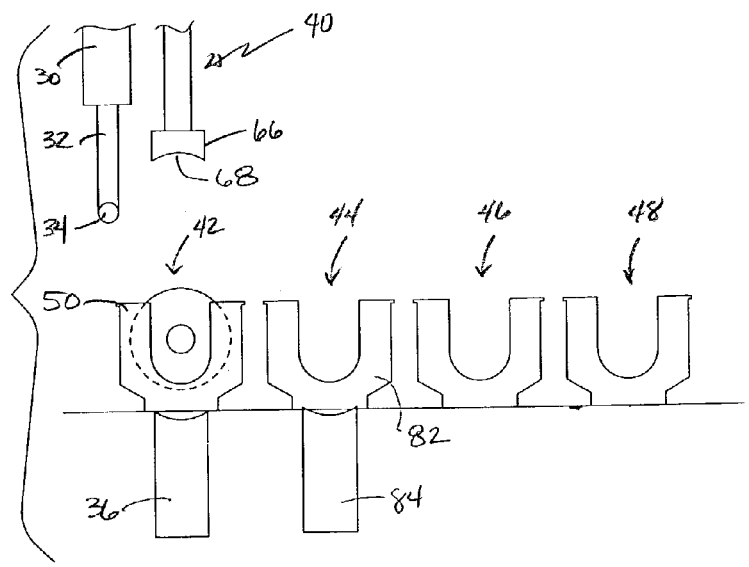
FIG. 22 is a schematic end view of one embodiment of the merging/demerging station showing a cassette containing 25 pairs of contact merge disks ready for demerging.
Figure 23:
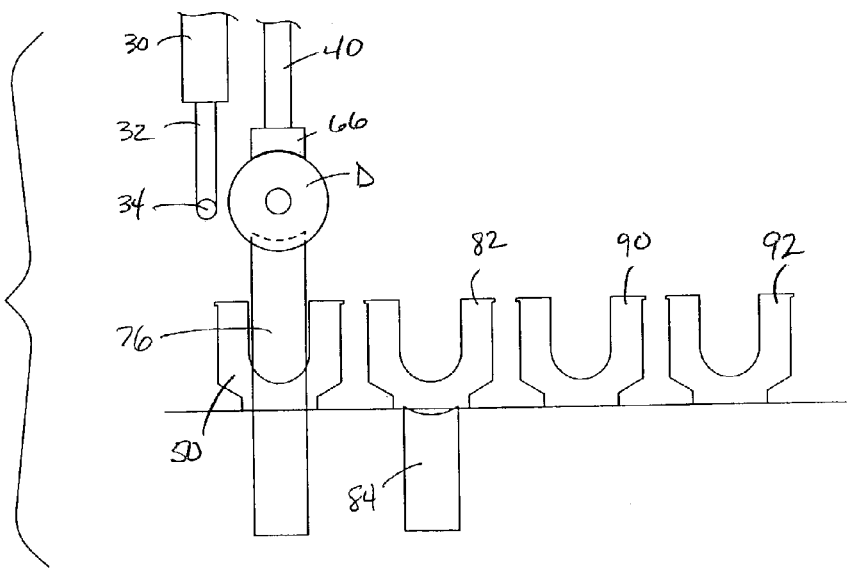
FIG. 23 is a schematic end view of the embodiment of FIG. 22 showing 25 pairs of disks engaging a demerge tool.

In one embodiment, the cassette of finished single-sided disks will arrive from testing with the pairs of disks in a contact merge orientation. As shown in FIG. 22, a cassette 50 containing pairs of contact merge disks is positioned at the load station 40. A load lifter 36 is located underneath the cassette. The load lifter 36 is configured to engage and accommodate all of the pairs of contact merged disks in the cassette 50.

Figure 24:
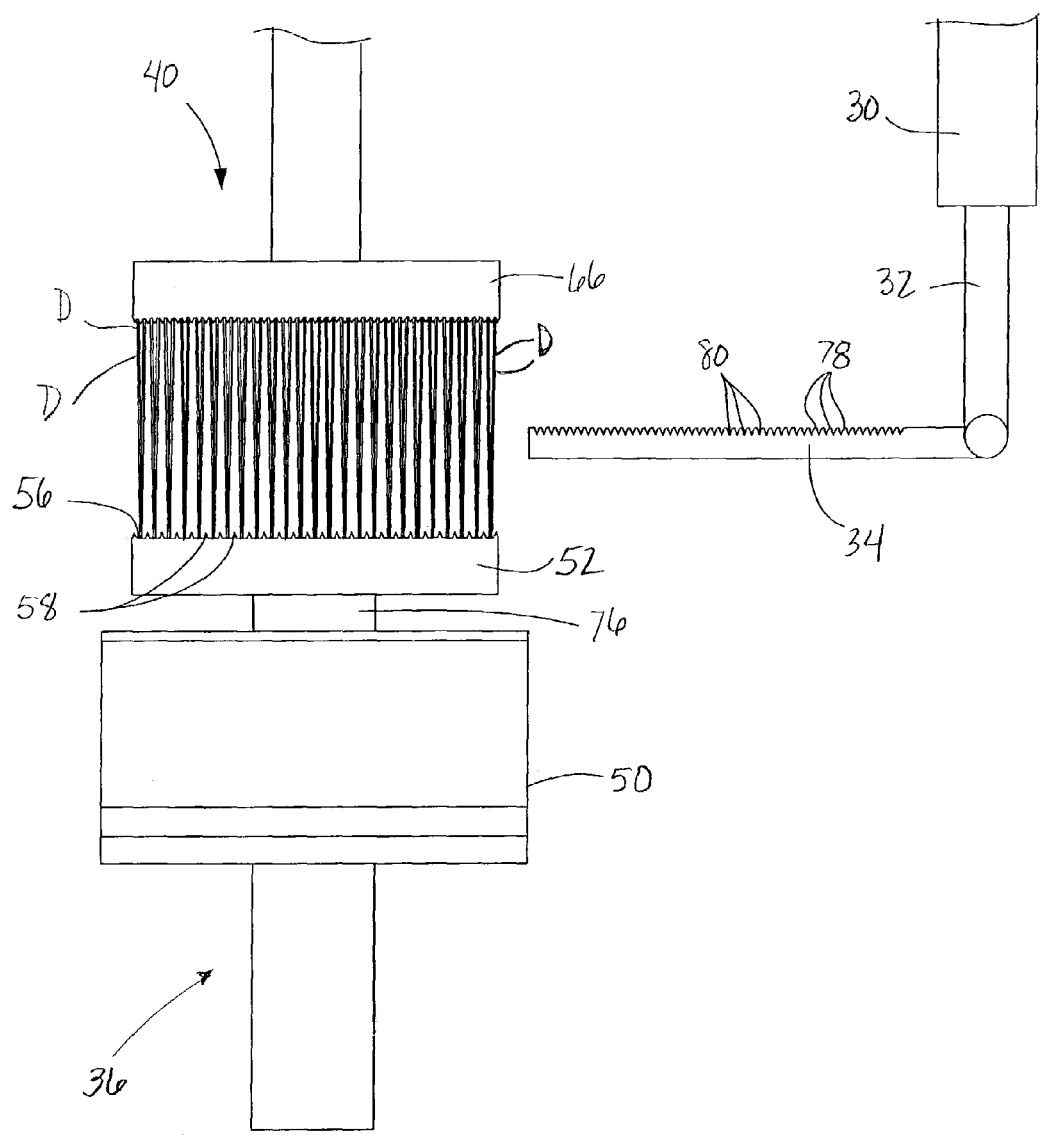
FIG. 24 is a schematic front view of the embodiment shown in FIG. 23.
Figure 25:
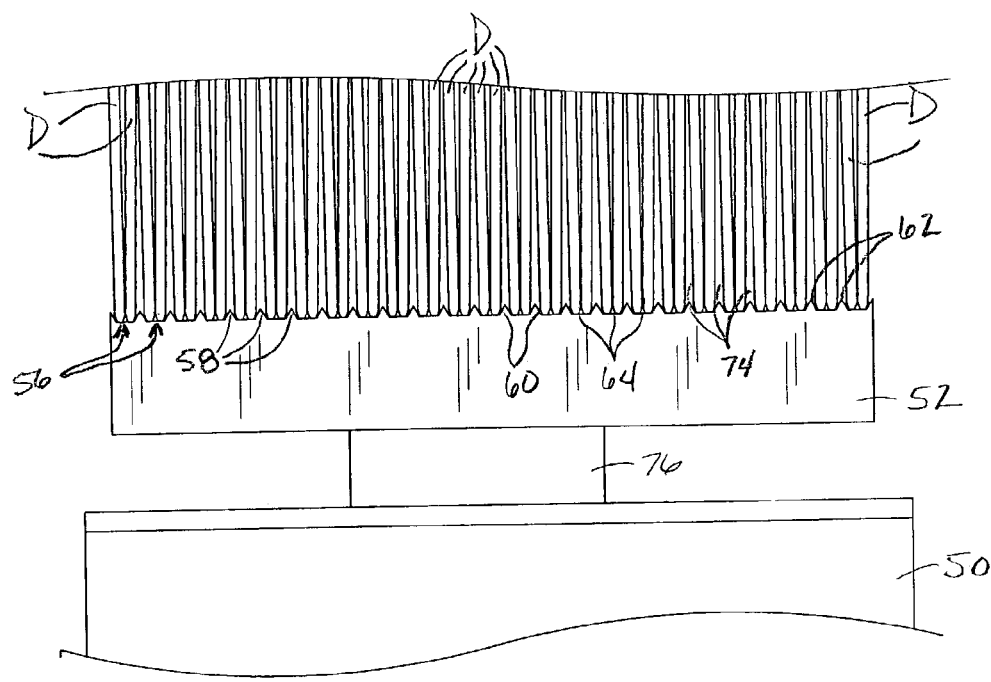
FIG. 25 is a partial front elevation of the lift saddle of the embodiment shown in FIG. 24.
Figure 26:
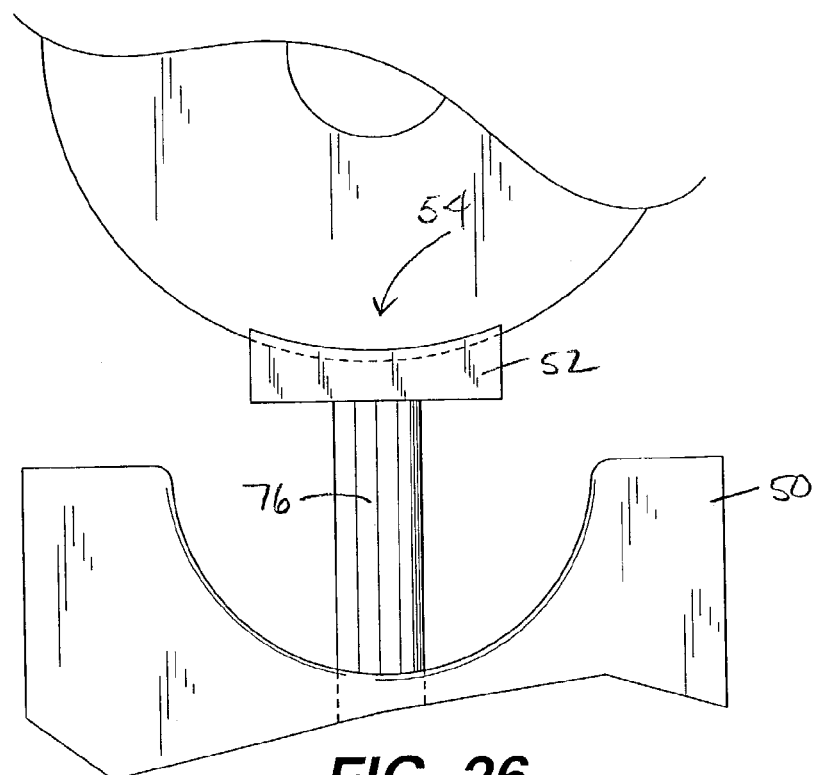
FIG. 26 is a partial end elevation of the lift saddle shown in FIG. 25.

With reference to FIGS. 24-26, the load lifter 36 includes a main body portion 52 with a disk contacting surface 54. The disk contacting surface 54 is curved to correspond with the radius of the disks. The disk contacting surface 54 further includes a series of grooves or channels 56 formed by wedges or ribs 58. As the disks resident in the cassette 50 are in a contact merge orientation, the width of each groove 56 corresponds to approximately the thickness of two disks. Each groove 56 is formed between the sloped sidewalls 60 of adjacent wedges 58. The sidewalls 60 join at a top ridge 62. The distance between adjacent ridges 62 is 0.25 inches.

Figure 27:
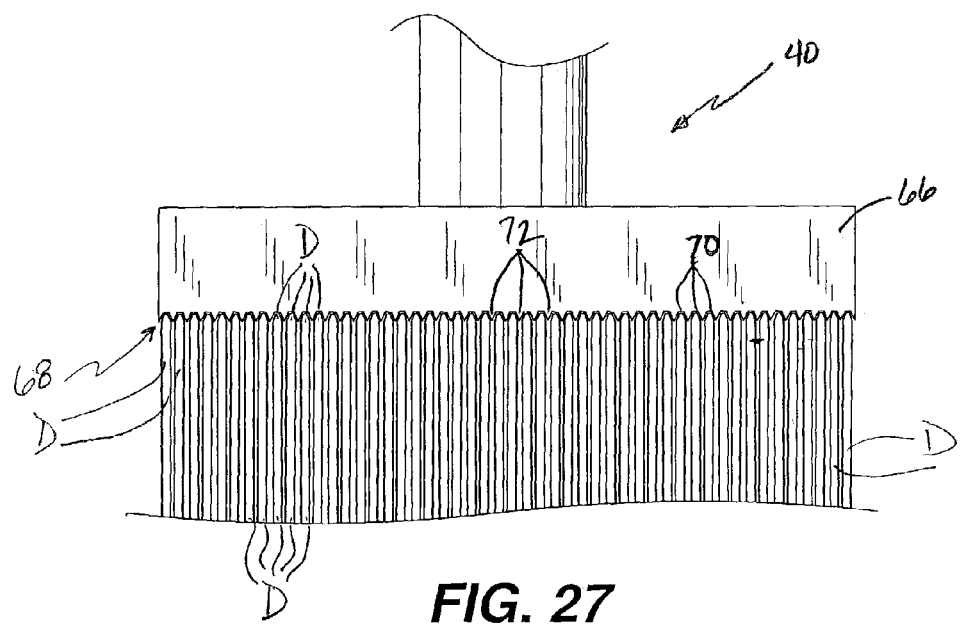
FIG. 27 is a partial front elevation view of the demerge tool of FIG. 24.
Figure 28:
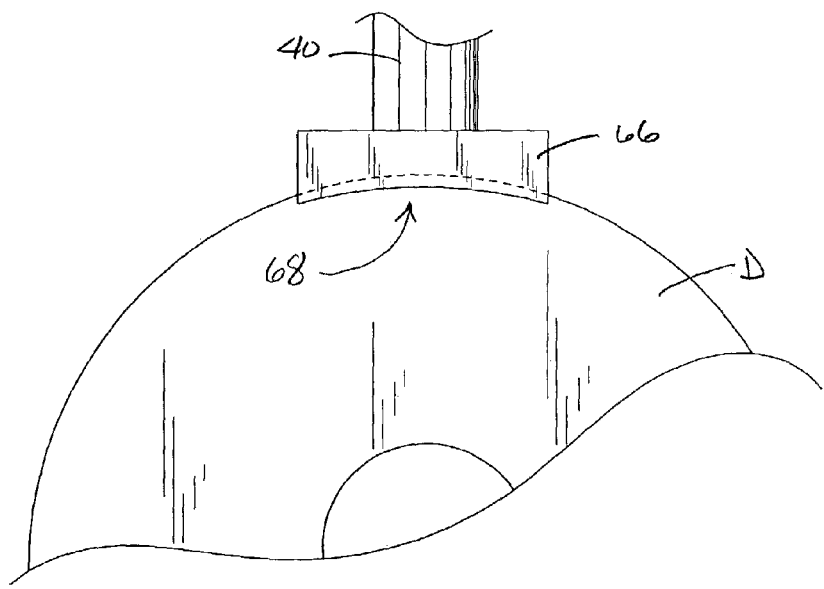
FIG. 28 is a partial end elevation view of the demerge tool of FIG. 27.

As illustrated in FIGS. 24, 27 and 28, a demerge tool is positioned above the load station 42. The demerge tool has a main body 66 with a disk contacting surface 68 curved to correspond with the radius of the disks. The disk contacting surface 68 also includes a series of grooves or channels 70 formed by a series of triangular ribs or wedges 72. These wedges 72 are spaced in a predetermined manner to align with the interface 64 between the L-side surfaces of each pair of contact merged disks and the space 74 between each pair of disks. As can be appreciated, there are twice as many ribs 72 as ribs 58 because the demerge tool 40 places a rib 72 between every disk and the load lifter 36 places a rib 58 between pairs of disks.

In operation, and as shown in FIGS. 23-30, a lift rod 76 lifts the main body portion 52 while the demerge tool 40 remains stationary. As the contact merged disks are brought into contact with the wedges 72 of the demerge tool 40, the wedges 72 force the disks to separate. Since the active side (the R-side) of each disk within a pair faces outwardly of the pair, there is little chance of damaging the active surface of the disk during the demerge process. Chamfered outside perimeter edges of the disks facilitate demerge and separation of the disks.

Figure 31:
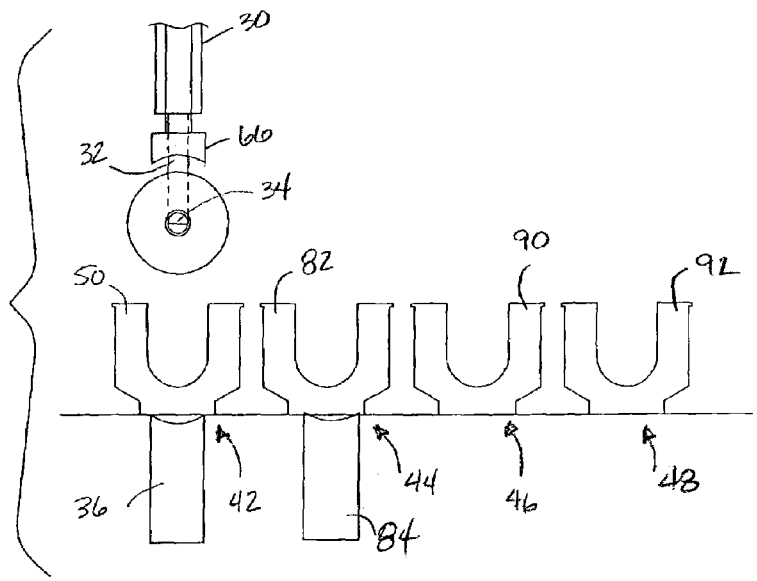
FIG. 31 is a schematic end view of the embodiment shown in FIG. 22, showing the 25 pairs of demerged disks engaged by a mandrel.
Figure 32:
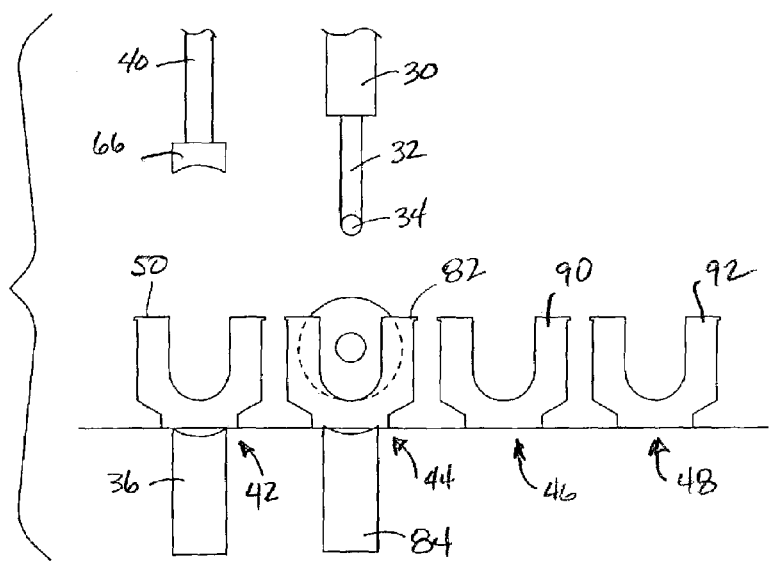
FIG. 32 is a schematic end view of the embodiment shown in FIG. 22, showing 25 pairs of disks positioned in a transfer cassette.

Next, as shown in FIG. 24, the robot 30 moves to insert the mandrel 34 through the center aperture on all disks while they are maintained between the demerge tool 40 and the load lifter 36. Due to the separation between the disks created by the demerge tool 40, a gap now exists between every disk. The mandrel 34 is then raised slightly to contact the upper internal edge of the aperture of each disk. The mandrel 34 may be circular or semi-circular in cross-section and have at least one row of ribs 78. The mandrel may alternatively be V-shaped, have two rows of ribs or may be three-pronged and have three rows of ribs. In one embodiment, the ribs 78 are 0.125 inches apart, spaced evenly. One rib 78 is positioned between each disk and each disk is positioned in a separate disk receiving groove 80. As seen in FIG. 31, once the disks are supported by the mandrel 34, the load lifter 36 lowers the lift rod 76 and body portion 52 and leaves the disks suspended from the mandrel. The robot 30 then moves all disk pairs to a position above the transfer station 44 where it lowers the disks into a transfer cassette 82 (FIG. 32). The transfer cassette is configured to support the disks in an evenly spaced distribution. The robot 30 retracts from the center aperture of the disks, leaving the disks supported in the transfer cassette 82 as seen in FIG. 32.

As previously described, a transfer lifter 84 is positioned beneath the transfer cassette. The lift rods raise the load lifters and thereby remove all of the disks in the transfer cassette having the same orientation, i.e. every other disk. Thus, all of the disks that are oriented with their R-side facing in the same direction are elevated above the cassette, leaving behind all of the disks with their R-side facing in the opposite direction. (See FIG. 36.)

Figure 33:
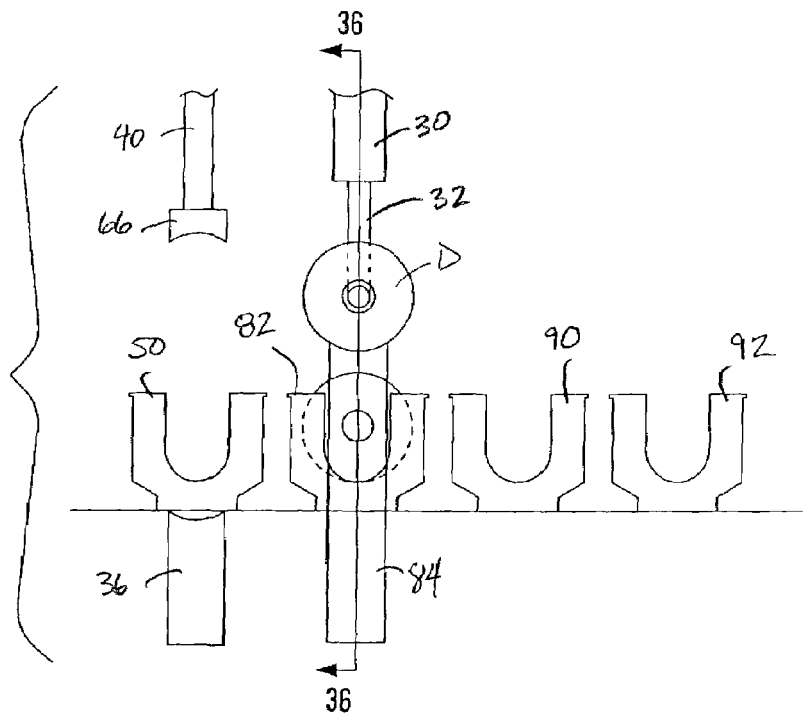
FIG. 33 is a schematic end view of the embodiment of FIG. 22, showing every other disk removed from the transfer cassette by a transfer lifter.
Figure 37:
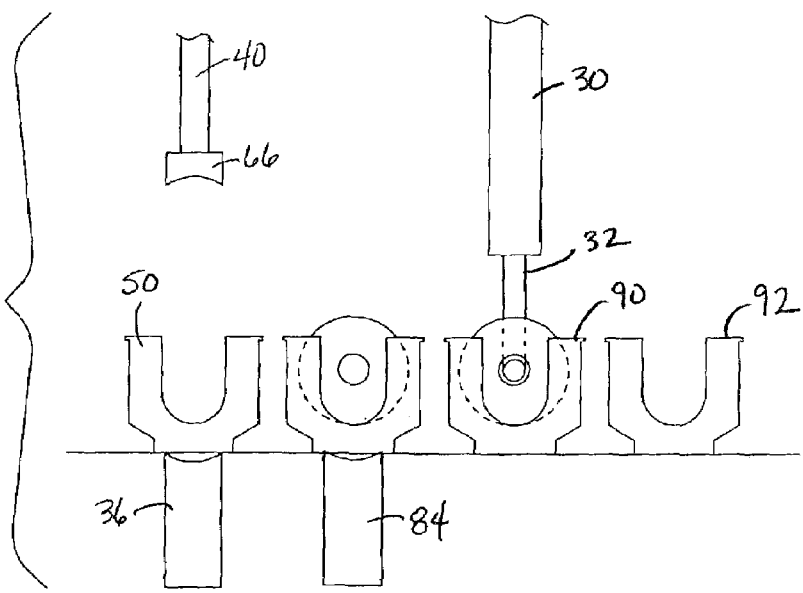
FIG. 37 is a schematic end view of the embodiment of FIG. 32, showing one-half of the disks being placed in a cassette.
Figure 38:
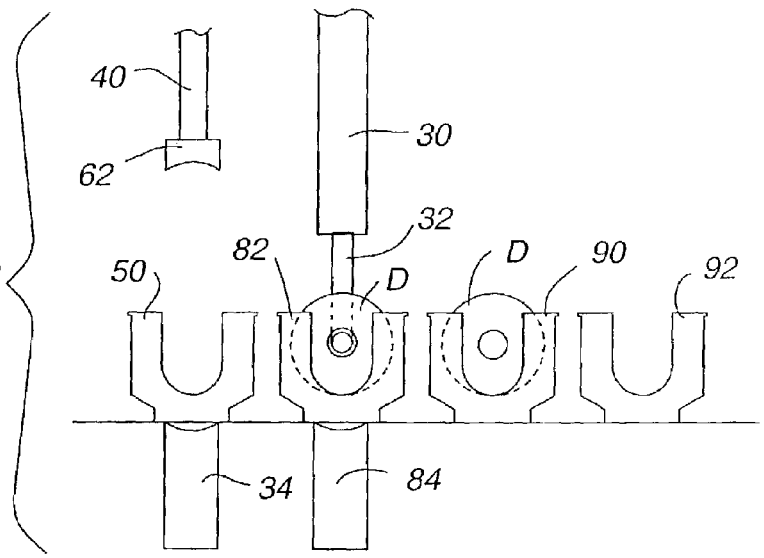
FIG. 38 is a schematic end view of the embodiment of FIG. 22, showing a mandrel engaging the remaining disks in the transfer cassette.
Figure 39:
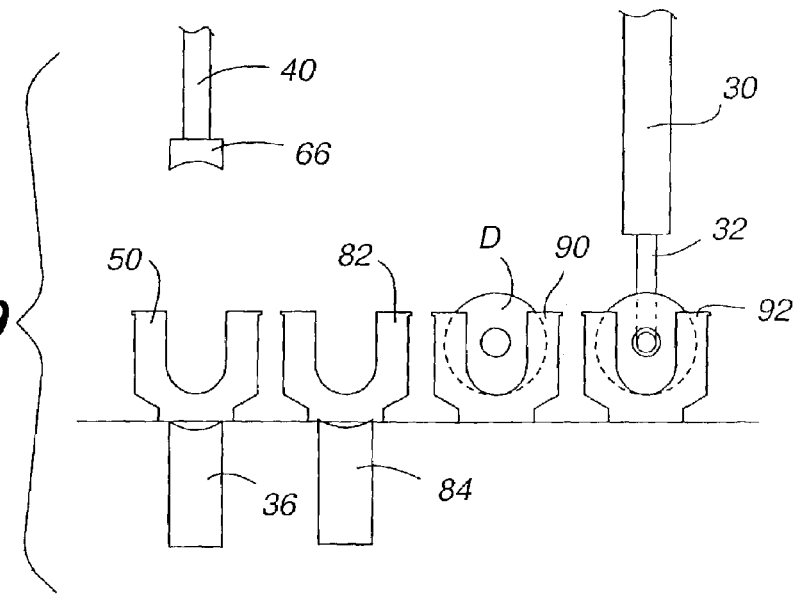
FIG. 39 is a schematic end view of the embodiment of FIG. 22, showing the remaining disks placed in a cassette.

The robot 30 positions the mandrel 34 in the center aperture of the elevated disks to engage these disks with the mandrel 34. (See FIGS. 33, 36.) Once the disks are loaded on the mandrel 34, the transfer lifter 84 lowers to a position beneath the transfer cassette 82. The robot 30 moves to station 46 where a disk cassette 90 is positioned. The disks supported on the mandrel 34 are loaded in this cassette 90 (FIG. 37). The robot 30 then returns to the transfer station 44 and engages the remaining, oppositely oriented disks (FIG. 38). The robot 30 moves these disks to station 48 and loads these disks in a cassette 92 positioned at that location (FIG. 39). The previous pairs of contact merge disks are now separated and loaded in two separate cassettes, with the disks in each cassette oriented in the same direction.

The removal and placement of single-sided disks from a cassette into a disk drive is simplified if the disks in the cassette are similarly oriented, i.e., all the disks in the cassette have their R-side facing the same direction. Such is not the orientation when a full cassette arrives at the demerge station containing pairs of finished single-sided disks. However, at the end of the demerge or separation operation, the disks have been placed in two cassettes 90, 92 with the R-side of every disk in the same cassette facing the same direction. These disks can more easily be loaded in disk drives without misorienting the disk in the drive.

As a further embodiment, the mandrel 100, load lifter 102 and demerge tool 104 may be configured to manipulate fewer than all the disks in a cassette. As illustrated in FIGS. 48-50, one embodiment of the alternative design is configured to handle one pair of disks at a time, rather than an entire cassette. With reference to FIG. 48 and with respect to demerging, the load lifter 102 lifts a pair of contact merge disks from a cassette until the upper perimeter edge of the disks engage the demerge tool. The load lifter has a single channel or groove 106 to hold the disk pair in a contact merge orientation. The demerge tool has two channels or grooves 108, separated by a wedge 110. The wedge will create an initial separation of the disks as the load lifter 102 raises the disk pair into contact with the demerge tool. Once a separation has occurred between the disks, a mandrel 100 will engage the disks at the center aperture 112. The mandrel has two grooves 114 separated by a wedge 116. The wedge will fit between the separated disks, as shown in FIG. 49, to support the disk pair and allow the load lifter to return to its position beneath the cassette. The physical spacing created between the disks by the wedge 116 is dictated by the orientation of the cassette where the disks will be deposited. The mandrel 100 will then move the disk pair to a receiving cassette.

For merging purposes, the mandrel 100 will engage two adjacent disks in the same cassette. Again, the spacing of the two grooves and center wedge will determine the spacing of the two disks on the mandrel. The mandrel can act like a merging tool and bring two disks closer together, such as into a gap merge orientation. This spacing should match the spacing of the target cassette. In one embodiment, when working with substrate disks at the beginning of the manufacturing process, it will be desired to position the two substrate disks in a gap merge orientation. Therefore, the mandrel will merge the two disks into a gap merge orientation and then deposit them in a cassette having the same gap merge orientation. By working with two disks at a time, there is no need to use a transfer cassette.

B. Simultaneous Handling and Transfer Tools for Two Single-Sided Hard Disks

Figure 51:
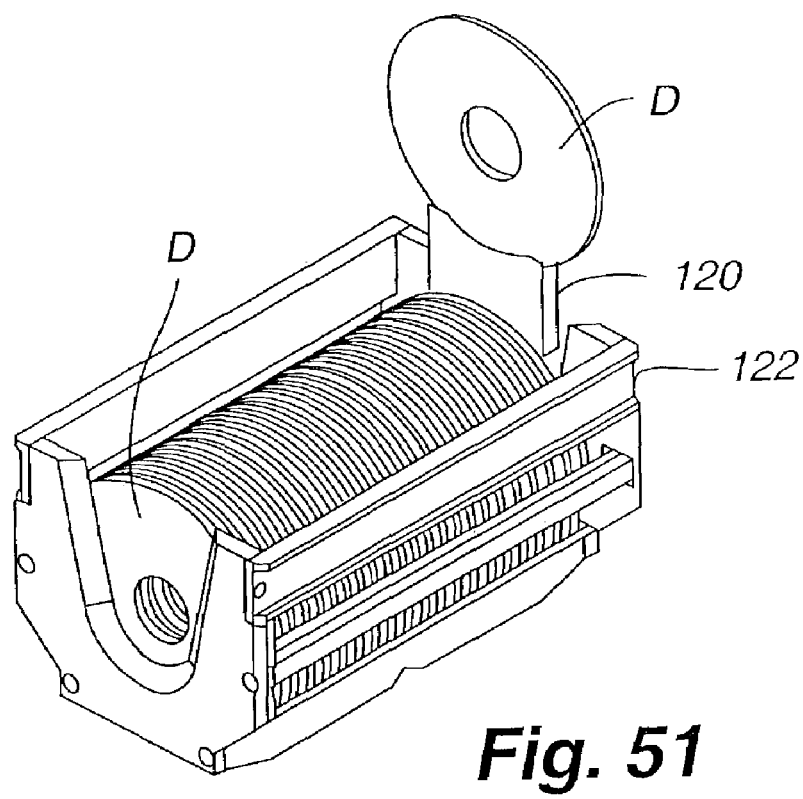
FIG. 51 is a perspective view of an embodiment of a tool for handling disk pairs removing a pair of disks from a cassette.

Another aspect of simultaneous disk processing is handling disks in individual pairs or in multiple pairs. A variety of tools for accomplishing this are described herein. In one embodiment, a transfer tool or lift saddle 120 is provided for transferring a pair of disks in a gap merge orientation either from or to a cassette or container 122. As shown in FIG. 51, the lift saddle moves vertically through the bottom and top openings of the cassette between a first position beneath the cassette to a second position generally at or near the top of the cassette. In its movement between lower to upper positions, the lift saddle engages and lifts two disks from a cassette and transfers them to a position where the pair of disks are engaged by other automated processing equipment. The other processing equipment may include a second transfer tool which moves the pair of disks to another location for processing. Alternatively, the disks may be processed on the lift saddle at its upper position. The lift saddle is also used to return the pairs of disks to a cassette following processing.

Figure 57:
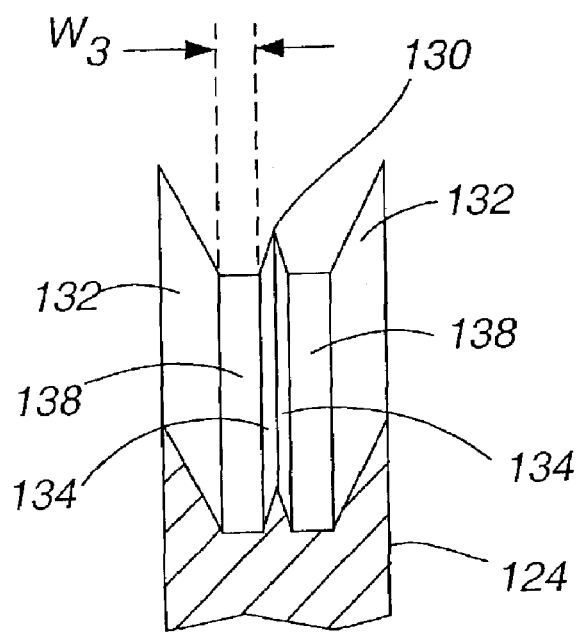
FIG. 57 is an enlarged partial cross-section of a second embodiment of a tool for handling disk pairs.

With reference to FIGS. 52-56, the lift saddle comprises a main body 124 with a curved or arcuate disk engaging portion 126. The radius of the curved or arcuate shape is intended to approximate the radius of the disks. However, if the lift saddle will be used in processes that increase the temperature of the disks, such as sputtering, the curve should be slightly larger than the radius of the disk to accommodate thermal expansion of the disks. As best seen in FIG. 54, the disk engaging portion has a generally W-shaped cross-section comprising two adjacent parallel grooves 128. More specifically, a center ridge or rib 130 is provided to maintain the prescribed spacing between the pair of disks. Thus, two channels are provided, each designed for separately engaging and holding one disk of the pair in a gap merge orientation. The bottom of each channel, formed by the outer side wall 132 and inner side wall 134, terminates at an apex 136, as shown in FIGS. 52, 54. The angle formed by the inside and outside walls of each channel is designed to provide a width to the channel sufficient to accommodate the particular thickness of the disks, as well as to generally match any chamfer formed in the outer perimeter edges of the disks. (See FIG. 52.) If the disks are chamfered, the angle of the side walls and chamfer preferably match, providing additional stability in holding the disk during transport operations. In a second embodiment of the lift saddle, shown in cross-section in FIG. 57, the channels 128 may be formed with a flat bottom surface 138. The width $W_3$ of the flat portion preferably matches the thickness of the disk, minus the chamfered portions of the disk perimeter edge, if any.

A cutout or hollow portion 140 is provided in one side of the main body 124 of the lift saddle to accommodate the distal end of a lift rod 142. The lift rod moves the saddle vertically between its lower and upper positions. A pair of apertures 142 are provided in the main body of the lift saddle to accommodate locking screws or other securement devices to secure the lift saddle to the lift rod. As best illustrated in FIG. 54, the cutout portion 140 allows the lift rod to fit flush within the main body portion to minimize the width of the lift saddle. This permits the lift saddle to be utilized with conventional double-sided disk processing equipment and to move a pair of single-sided disks within spaces originally designed and built to accommodate a single double-sided disk. For example, the width $W_1$ of the saddle illustrated in FIG. 54 is 0.250 inches. The center-to-center distance of the two channels $W_2$ is 0.085 inches and the angle formed between the side walls 132 and 134 is approximately 30 degrees (FIG. 54). This geometry will accommodate two disks with a thickness of 0.050 inches, as shown in FIG. 52, or slightly larger disks. This is important because the disk temperature is ambient (room temperature) at the beginning of the sputtering process and may approach 300 degrees Celsius during the sputtering process. At this elevated temperature, the disk will expand, perhaps by as much as seven percent. This thermal expansion should be accounted for.

It should be appreciated that the dimensions of the disk engaging portions of the lift saddle can change depending upon the size of the disks involved. In addition, the lift saddle may be machined from a single block of high-temperature-resistant material to not only provide greater precision and accuracy in forming the disk engaging portions 126 of the saddle, but to allow the lift saddle to operate in high temperature environments during disk processing. During processing of hard memory disks, the disks are subjected to temperatures that can reach 350 degrees Celsius. One example of a high temperature environment is the sputtering process where pairs of disks will be removed from a cassette, subjected to numerous sputtering steps and ultimately returned to a cassette. Machining of the disk contact surfaces, such as inside and outside walls 132, 134 of the two channels 128, allows the lift saddle to handle both hot or cold disks. Acceptable metals that can withstand these extreme temperature changes include 304 and 316 stainless steel (full hard). Alternatively, depending upon the application environment, the disk saddle may be made from plastic. In high temperature environments, such as up to 350 degrees Celsius, the lift saddle may be made from polyesteresterketone (PEEK). An example of this is sold under the trade names Ultem or Vespel. For low temperature environments, such as below 40 degrees Celsius, the lift saddle may still be molded from PEEK. PEEK provides good rigidity and is not abrasive. However, PEEK is a relatively expensive, high performance plastic. Other acceptable high performance plastics for low temperature environments include polybutylene terephthalate (PBT) or polyethylene terephthalate (PET). PET offers the best injection molding characteristics and is the least costly of these three plastics. PET also has the least favorable abrasion characteristics. Abrasion is an important factor in manufacturing disks.

Figure 58:
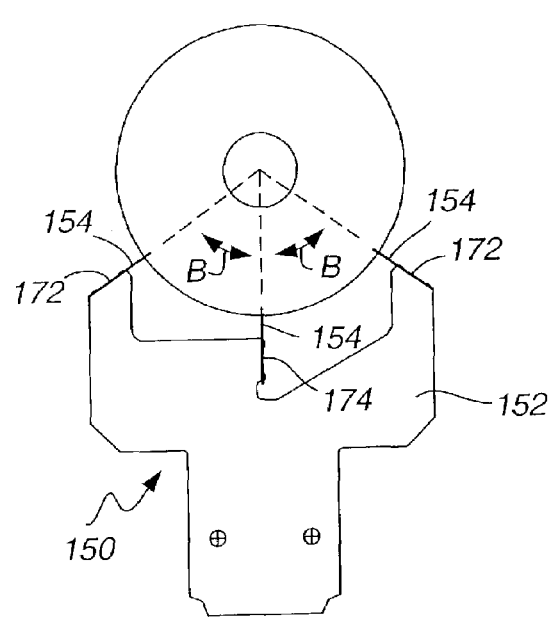
FIG. 58 is a front plan view of a third embodiment of a tool for handling disk pairs.
Figure 59:
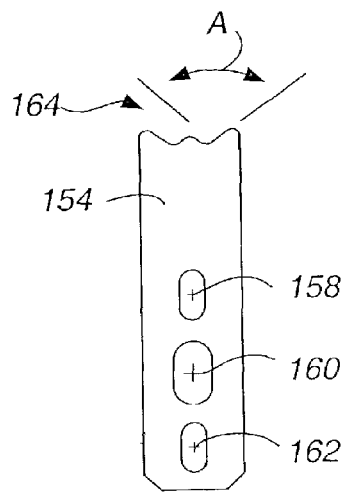
FIG. 59 is a front elevation of a blade element.
Figure 60:
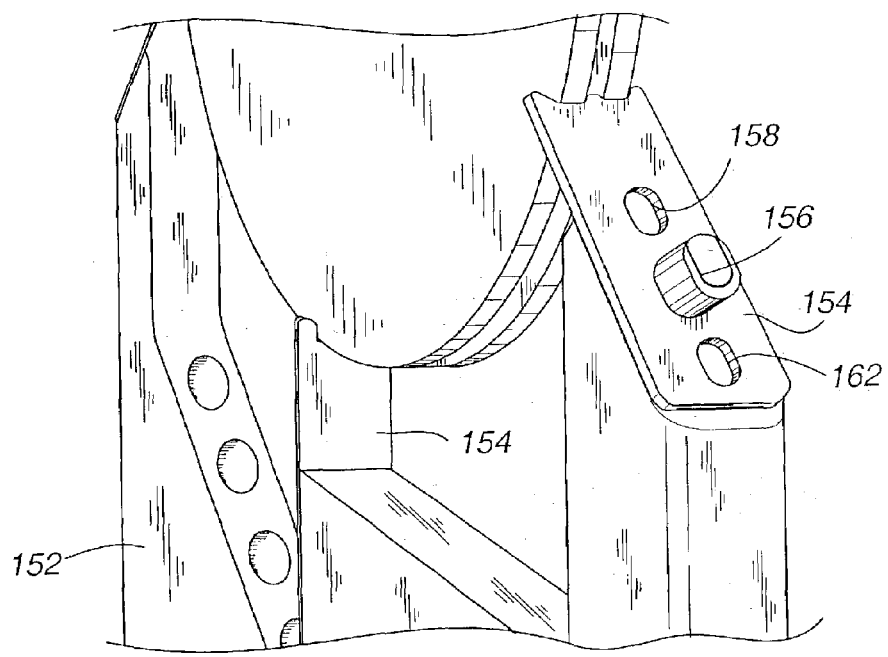
FIG. 60 is an enlarged partial perspective of the embodiment of FIG. 58.
Figure 68:
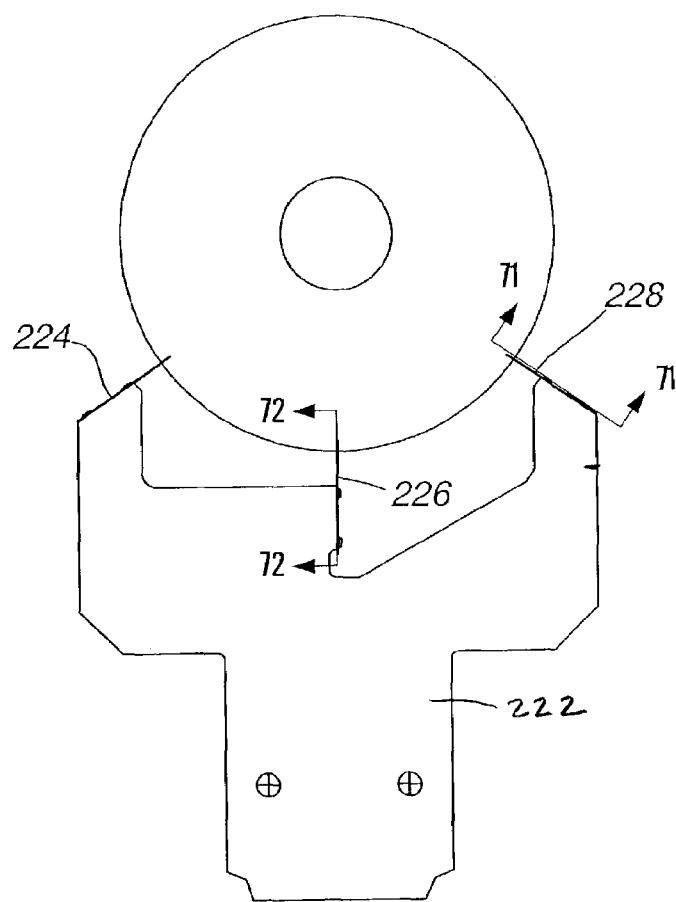
FIG. 68 is a front plan view of a fifth embodiment of a tool for handling disk pairs.
Figure 69:
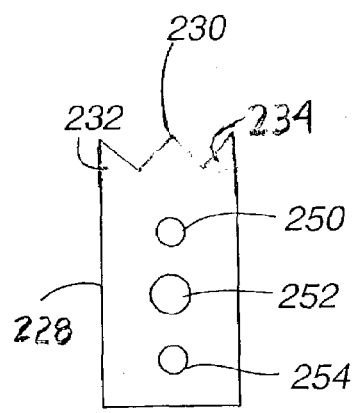
FIG. 69 is a front plan view of a disk engaging blade.
Figure 70:
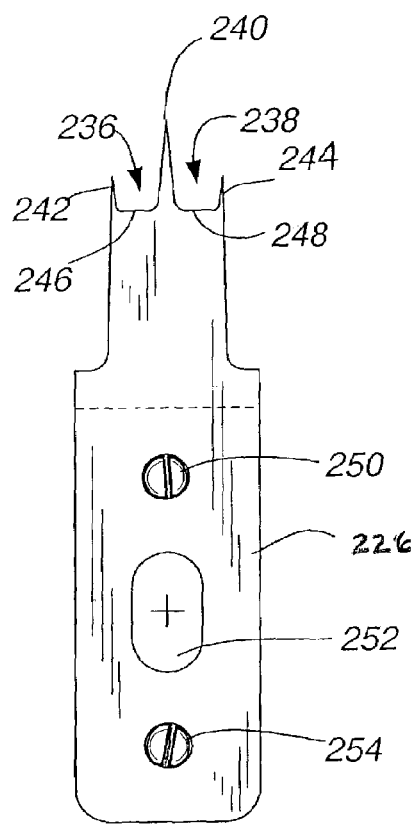
FIG. 70 is a front plan view of a second embodiment of a disk engaging blade of the present invention.
Figure 71:
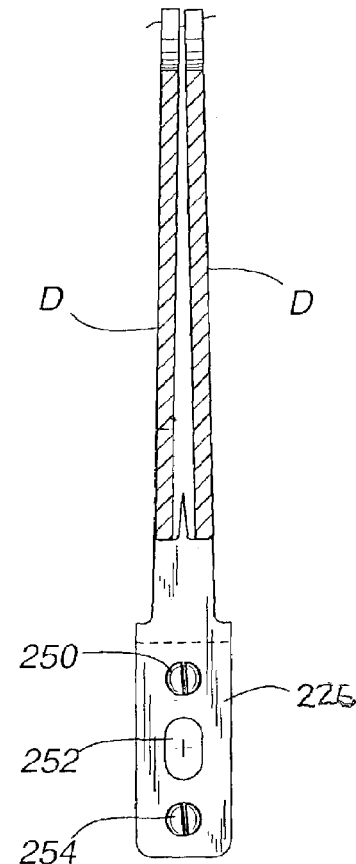
FIG. 71 is a cross-section view taken along line 71-71 of FIG. 68.
Figure 72:
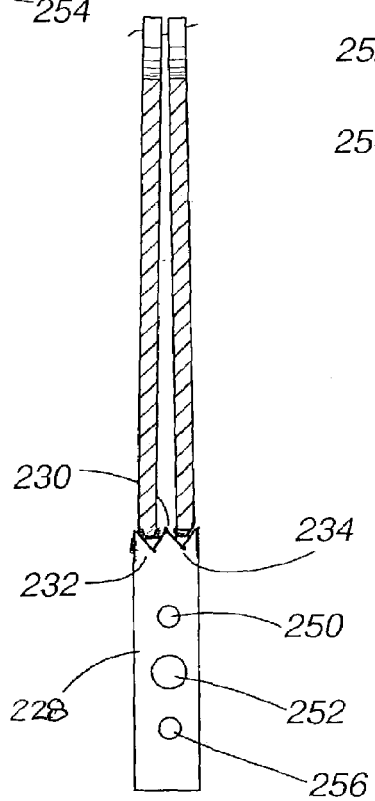
FIG. 72 is a cross-section view taken along line 72-72 of FIG. 68.

A second embodiment of a transfer tool or lift member 150 is shown in FIGS. 58-60. Unlike the transfer tool of the first embodiment, the lift member shown here contacts each disk in three discrete locations rather than over an extended perimeter edge. Thus, the amount of physical contact between the lift member 150 and the disks is substantially reduced compared to the lift saddle 120. As a result, the lift member 150 is more suitable for sputtering or other processes which add material to the surface of each disk. Such processes can proceed in a less obstructed manner relative to the R-side of the disks.

The second lift member includes a body 152 and three single-piece disk engaging members or blades 154. In the preferred embodiment, the blades are permanently fixed to the lift member 150 and are not capable of adjustment. However, in one alternative embodiment, the blades are adjustably attached to the lift member by set screws 156 or other means to allow positioned adjustment of the blade relative to the body. The blade may include three apertures 158, 160, 162 for this purpose. The center aperture 160 may be enlarged to permit fine adjustment of the blade's position. This also permits the three blades to be properly aligned relative to each other to optimally secure the disks. The outer apertures 158, 162 may be secured to any of a series of securement holes in the lift body (not shown), whose relative positions are predetermined to accommodate disks of different diameters. The removeability permits replacement of the blades due to wear or for other reasons.

As shown in FIG. 59, the blades 154 have a disk engaging edge 164 that is generally W-shaped for engaging, holding and maintaining the desired gap merge orientation of the pair of disks. As shown in FIG. 60, the edge of the blade is designed with teeth 166, 168, 170 to permit cradling of each disk along the perimeter or outer edge of the disk. As should be appreciated, the profile of the blade can vary for different purposes, such as maintaining different spacing between the disks or accommodating different thickness of disks. Also, the profile of the blade edge may be designed to match or maintain spacing imparted to disk pairs by other equipment. For example, in the sputtering process, pairs of disks may be transferred from a cassette to a lift member 150 to other processing or transfer equipment and back through this chain of handling equipment to the cassette. In such a context, it would be preferable that the spacing of the disks be consistent to facilitate transfer among the various pieces of equipment. As a result, disks may be transferred without change of spacing or orientation of the disks.

In one embodiment primarily intended for sputtering, the angle A, shown in FIG. 59, is between approximately 100 and 110 degrees. A wide angle such as this intentionally avoids contact between the blade edge 154 and the data zone of the disks so that the sputtering process is not impeded on the R-side of each disk. With reference to FIG. 58, the outer blades 172 are disposed at an angle B relative to the vertical center line of the disk, which is defined by the center blade 174. In this embodiment, angle B is 55 degrees. The lift member and blades may be made from high temperature resistant material, such as 304 or 316 stainless steel (full hard), in order that it may withstand high temperature environments. When working with disks having a thickness of about 0.050 inches, the blade is preferably 0.250 inches wide and 0.015 inches thick.

A third embodiment of a lift saddle is shown in FIGS. 63-66. The gap is not uniform between the disks D, as is the case with the first and second embodiments. Rather, the spacing gradually decreases from the one perimeter edge of the opposite perimeter edge when the two disks D are at an angle relative to each other because the upper perimeter edges of the disks are in contact and the bottom perimeter edges are spaced apart. An example of this orientation is illustrated in FIG. 62. While it should be appreciated that this third embodiment may be used with disks of other sizes, shapes, diameter and/or thickness, for illustrative purposes, the present description addresses disks or substrate disks of one size, namely, 95-millimeter diameter disks having a 25 millimeter diameter center aperture 10 and a thickness of 0.05 inches. A gap merge pair of disks of this size which are parallel (FIG. 61) will preferably have a spacing or gap $W_1$ of approximately 0.025 inches. If the pair of disks are angled relative to each other, such as when the top edge of the disks are in contact (FIG. 62), the preferred spacing or gap $Y_3$ at the bottom outside perimeter is approximately 0.075 inches and the spacing $Y_1$ at the upper edge of the central aperture 180 of the disks is approximately 0.025 inches. In this latter gap merge orientation, it is preferred that each disk is tilted at an angle θ of approximately 0.6 degrees, creating an angle 2θ between both disks of approximately 1.2 degrees. Either gap merge orientation is sufficiently stable to allow the disk pairs to be handled and transported without concern for dropping one or both disks. However, the gap merge orientation with the top inside edge of each disk in contact (FIG. 62) provides additional stability because it provides an additional point of contact for each disk. Moreover, one theory of simultaneous single-sided disk manufacture suggests that, if one disk of a pair falls from a handling mechanism, it is preferred that both disks of the pair fall. Orienting the disks at an angle induces instability in a second disk should the first disk dislodge and fall.

With reference to FIGS. 63-66, a disk handling or transport device maintains disk pairs in a gap merge orientation where the disks are angled slightly toward each other, allowing the upper inside edge of the disks to contact. The lift body 182 contacts the outside lower perimeter edges of the disks in three locations. Three disk blades 184, 186 and 188 are connected to the lift body and engage the perimeter edges of each disk. In this embodiment, the outer two disk blades 184, 188, shown in FIG. 64, have a different shape than the central disk blade 186, shown in FIG. 65. These blades are designed to maintain the orientation and spacing shown in FIG. 62. Thus, as can be appreciated, the shape of the disk contacting edge must be different for the outer blades 184, 188 than the central blade 186 because the disks are spaced differently at those two locations. It should also be appreciated that the center blade 186 can have a W-shaped disk contacting edge, like shown in FIG. 64, for the outer blades 184 and 188.

With reference to FIG. 64, the outer blades 184, 188 have a W-shaped disk contacting edge. They are preferably positioned at 55 degrees from the vertical centerline of the disk (α in FIG. 63). Three teeth 190, 192, 194 form two adjacent slots 196, 198 in which the outer perimeter edges of the two disks rest. The distance $GCC_2$ represents the distance between the centerline of the two disks (the gap center-to-center distance: GCC). It is also a measure of the distance between the centerline of the two slots 196, 198 at this point. With 95 millimeter diameter disks having a 0.05 inch thickness and tilted at 0.6 degrees, the distance $GCC_2$ will be 0.110 inches. The distance measured from L-side to L-side at this same position, $Y_2$ in FIG. 62, will be 0.060 inches. The difference is one-half the thickness of the two disks (or the thickness t of one disk).

With reference to FIG. 65, one embodiment of the center blade 186 is shown. The disk contacting edge includes a single center tooth 200. This tooth serves to separate the two disks, imparting the angular tilt to each one. The center tooth 192 on the outer blades serve the same purpose. The outer teeth 190, 194 on the outer blades restrain the disks and prevent the disks from tilting more than intended. The shoulders 202, 204 also provide some support for the disks. The center blade is positioned at the bottom perimeter edge of the two disks where the separation is the largest. As shown in FIG. 62, the distance $Y_3$ between the L-sides of the two disks at this point is 0.75 inches. In comparison, the distance $GCC_3$ between centerlines of the two disks, given their 0.05 inch thickness, is 0.125 inches. As shown in FIG. 66, a mandrel can also be used to engage the disk pair. The mandrel 206, sometimes also referred to as a transfer arm button, serves the purpose of transporting a disk from a first location to a second location, explained in more detail below. The mandrel comprises an arm 208 with two grooves 210, 212 at the distal end for engaging the upper inside diameter edges of the disks formed by the aperture 180 at the center of the disks. A center tooth 214 maintains separation of the disks and an outer tooth 216 prevents the outer disk from dislodging from the arm 208. The orientation of these grooves are similarly designed to maintain the gap orientation shown in FIG. 62 while permitting engagement of the tilted disks. As previously noted in connection with FIG. 62, the distance $Y_1$ between the L-sides of each disk at this point is 0.025 inches. The distance $GCC_1$, measured between the centerlines of the disks or between the apexes of the two grooves, is 0.075 inches.

FIG. 67 depicts a transfer system in which a moveable transport arm 218 with a mandrel or transfer arm button 206 is disposed at its distal end. The transfer system typically performs at least two tasks. In one scenario, it removes a pair of disks from a cassette at a first location and transfers the disk pair to a second location where the disk pair is transferred to a lift body 182 (shown in phantom). In a second scenario, a first lift member removes the disk pair from a cassette and the transfer system moves the disk pair from the first lift body to a second lift body at a second location (shown in phantom). In each scenario, the mandrel 206 engages the disks at their central aperture, such as shown in FIG. 66. The transfer system then moves the pair of disks to a second location where the disks are transferred to a lift member. An example where a transfer of these types occurs is in a sputtering process where pairs of disks must be moved among a plurality of processing stations. For example, there are 184 stations in the Intevac NDP 250B sputter system. Each pair of disks is removed from a disk cassette and transferred to a lift body 182 which sequentially moves between each of the 184 stations. When the processing is complete, the pairs of disks are transferred from the lift body back to a cassette.

The gap merge orientation shown in FIG. 62, with a portion of the top perimeter edge of each disk in contact, is accomplished by the aid of a tilted mounting mechanism, whether it be the mandrel which engages the disks of the center aperture or the blades of the lift member which engages the disks at three points along the lower perimeter edge of the disks. The groove or channel designs are such that, when picking up disks, they create a tilt from vertical at an angle θ:

$$\text{where } \theta = \sin^{-1}\left(\frac{G/2}{X_1}\right),$$

where G is the gap distance measured between the L-side of each disk in a gap merge pair (and is selected by the disk manufacturer to meet manufacturing needs, such as machine tolerances) (G is $W_1$ in FIG. 5 and $Y_1$ in FIG. 6), where $X_1$ is the distance from the outside edge to the inside edge of the disk, and where a tilt angle between the two disks in the pair would be 2θ.

These dimensions are shown in FIGS. 62-66. In the case of 95 millimeter diameter disks with a desired or selected gap distance G of 0.025 inches and a disk thickness of 0.050 inches, θ is approximately 0.6 degrees and 2θ is approximately 1.2 degrees.

The wider gap created at the bottom perimeter or edge of the disks provides an advantage when the two disks are transferred onto the three blades of a lift member 182. The wider gap at the bottom facilitates placement of one disk in one groove 196 of the blade, and placement of the other disk in the other groove 198. The wider spread orientation technique allows a margin for error in transfers between the lift member 182 and the mandrel 206.

When two disks are placed on the three blades of the lift member 182 by the mandrel 206, the center or lower level blade 186, disposed along the vertical centerline of the disks, should have a wider gap center-to-center distance than the outer blades 184, 188. The best positioning stability is achieved by adopting blade designs with gap center-to-center distances that are proportionate to the vertical distances from the top perimeter edge of the disks to the location of the blade in question. The following formula applies:

X1:X2: X3=Y1: Y2:Y3 where X1 is the distance from the disk outside diameter (OD) to inside diameter (ID)

X2 is the distance from the disk top edge to the outside blade 184 or 186 disk contacting points X3 is the disk outside diameter Y1 is the predetermined gap between the two disks Y2 is the disk gap at the outside blade 184, 188 disk contacting points Y3 is the disk gap at the center blade 186 disk contacting points and then GCC (gap center-to-center) distance=Y+t, where t is the disk thickness.

A wider gap center-to-center design for the center blade 186 facilitates keeping the two disks in contact at the top. A four-point contact (FIG. 62) is more stable during transport compared to parallel gap merge (FIG. 61) transport where there are only three contacts between the disks and the blades.

The examples and illustrations given herein are for one embodiment where the predetermined space between the gap merge disks is 0.025 inches, the disks are 0.050 inches thick, have a 95 millimeter outside diameter (OD) and a 25 millimeter inside diameter (ID). The concept of moving two gap merge disks simultaneously with the two disks touching at the top is extendable to other gap merge transport involving wider or narrower gaps (e.g. 0.010 to 0.10 inches) and other disk form factors. For example, using the same size disks, the tilt angle θ for the case of a predetermining gap merge space $Y_1$ of 0.050 inches will change to approximately 1 degree and the upper or outer blades 184, 188 will have gap center-to-center distances $GCC_2$ of approximately 0.170 inches and a lower or center blade 186 gap center-to-center distance $GCC_3$ of approximately 0.20 inches.

An alternative of this third embodiment is shown in FIGS. 68-72. The lift member comprises a main body 222 with three disk engaging blades 224, 226, 228. The outer blades 224, 228, shown in FIG. 69, contact the outer perimeter edge of the disk pair at an angle of 55 degrees from the vertical center line of the disks. The center tooth 230 primarily serves to force the two disks apart. Outer teeth 232, 234 restrain the disk from falling off the blade. The outer blades 224, 228 are identical to the outer blades 184 and 188 shown in FIGS. 63 and 64. The center blade 226 is different from center blade 186 in the first embodiment. The disk engaging edge provides two grooves 236, 238 separated by a central wedge 240 which maintains the disks at the determined spacing. Outer edges or teeth 242, 244 maintain the disks within the grooves. The flat bottom portion 246, 248 of each groove or channel is dimensioned to allow engagement with the outer edge of the disk and, therefore is the same as or slightly wider than the thickness of a disk. As mentioned previously in connection with the embodiment of FIGS. 63-66, the angled surfaces of the teeth 230 and 240 assist in aligning the disks within each groove and at the desired tilt or angle.

Three apertures 250, 252, 254 are provided to secure the blades to the main body and to permit adjusting of the position of each blade relative to the main body. The adjustability permits each blade to be properly positioned relative to the others to properly and securely hold the disks. It further allows replacement of damaged blades or to position disks at different angles. Although not shown in FIGS. 63-66, the blades 184, 186, 188 would have similar features to allow replacement and adjustable positioning. Alternatively, the blades may be permanently attached to the lift body 222 and not capable of change.

The blades and lifter body of both embodiments may be made from appropriate materials to be utilized in any process within the overall disk manufacturing processes. For example, if used in a high temperature environment, such as sputtering, they can be made with an etching process from 304 or 316 stainless steel (full hard). Alternatively, the blades may be permanently attached to the lift body 182 and not capable of change.

C. Handling, Transporting and Merging Disks in Gap Merge Orientation Using Cassettes At various points in the manufacturing process it will be desirable to place pairs of disks in a gap merge orientation. For example, as previously explained in connection with merging two cassettes of substrate disks into one cassette of pairs of disks in a gap merge orientation. Also, in connection with the texturing and washing processes, pairs of disks are stored and transported in gap merge orientation. In each of these scenarios a cassette can facilitate merging disk pairs into a gap merge orientation, maintaining the desired gap merge orientation and transporting a plurality of disk pairs in gap merge orientation.

Figure 73:
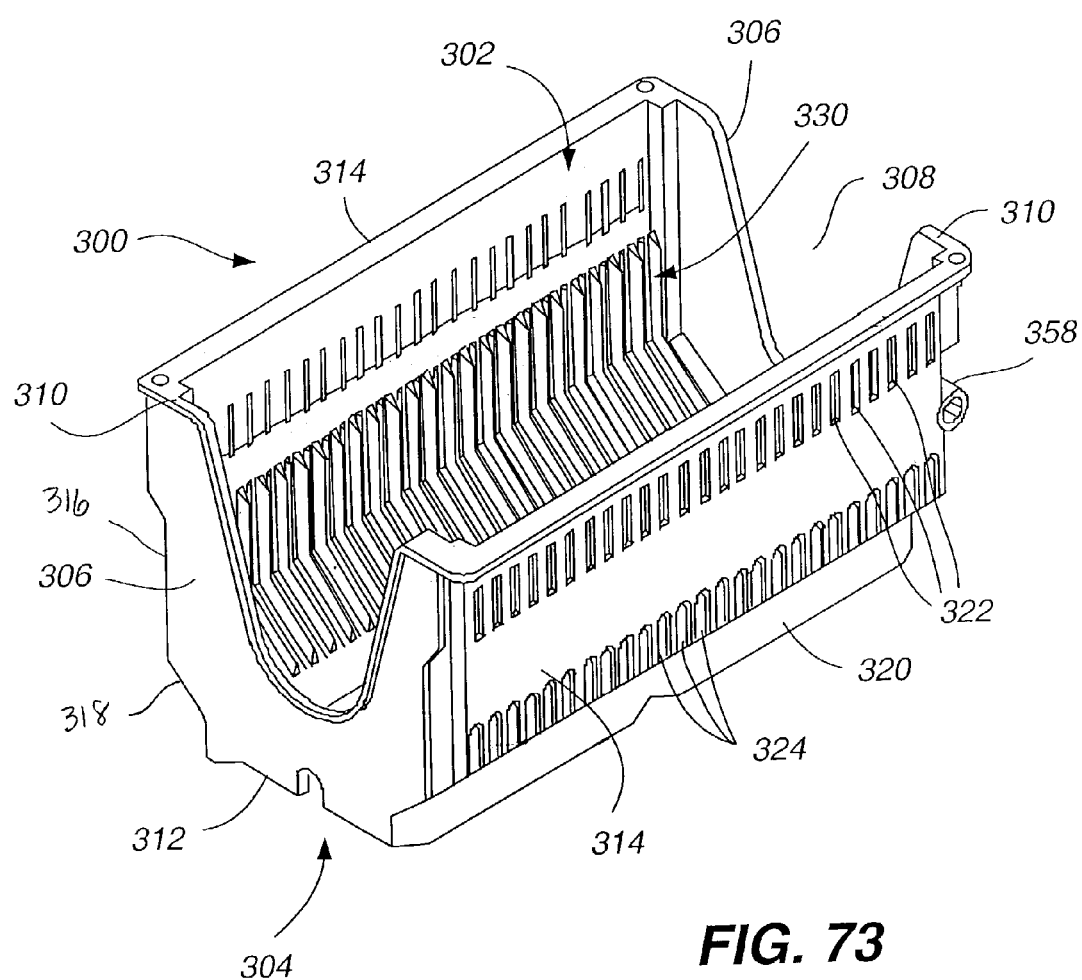
FIG. 73 is a perspective view of one embodiment of a disk handling and transport apparatus.
Figure 74:
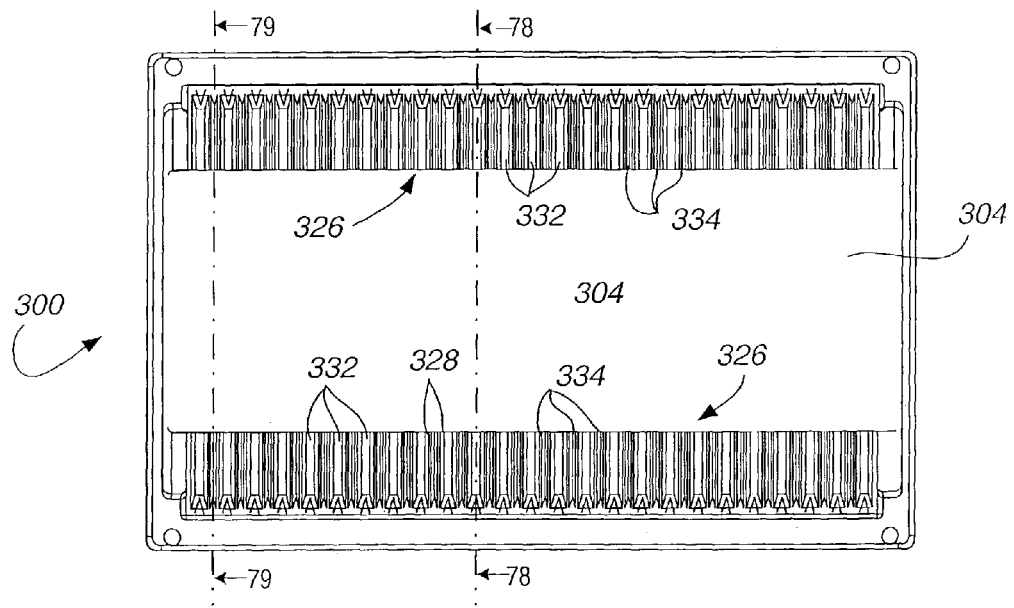
FIG. 74 is a top plan view of the embodiment of FIG. 73.
Figure 75:
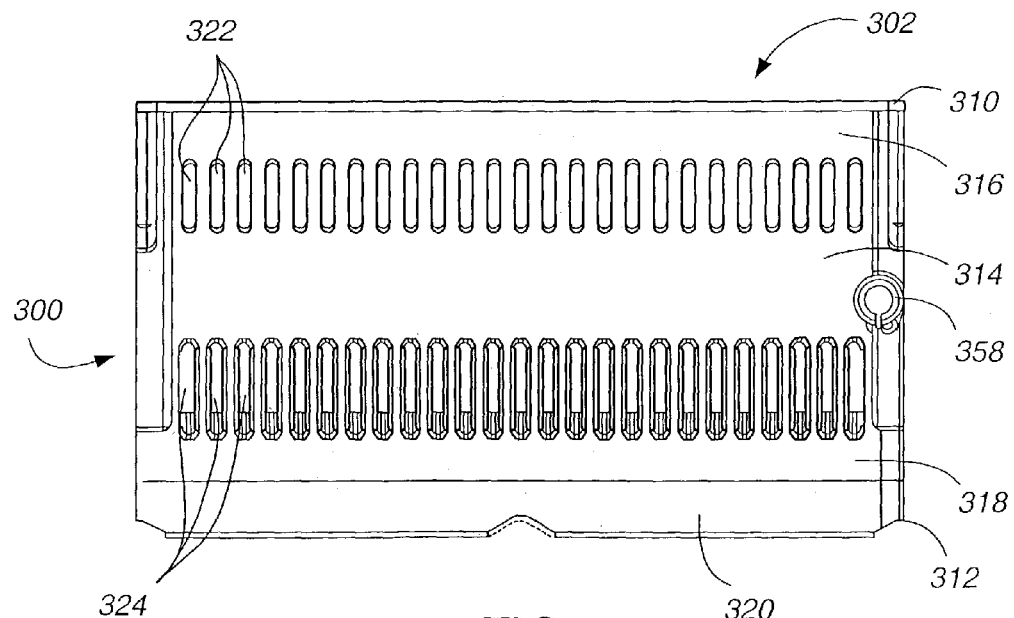
FIG. 75 is a side elevation view of the embodiment of FIG. 73.
Figure 76:
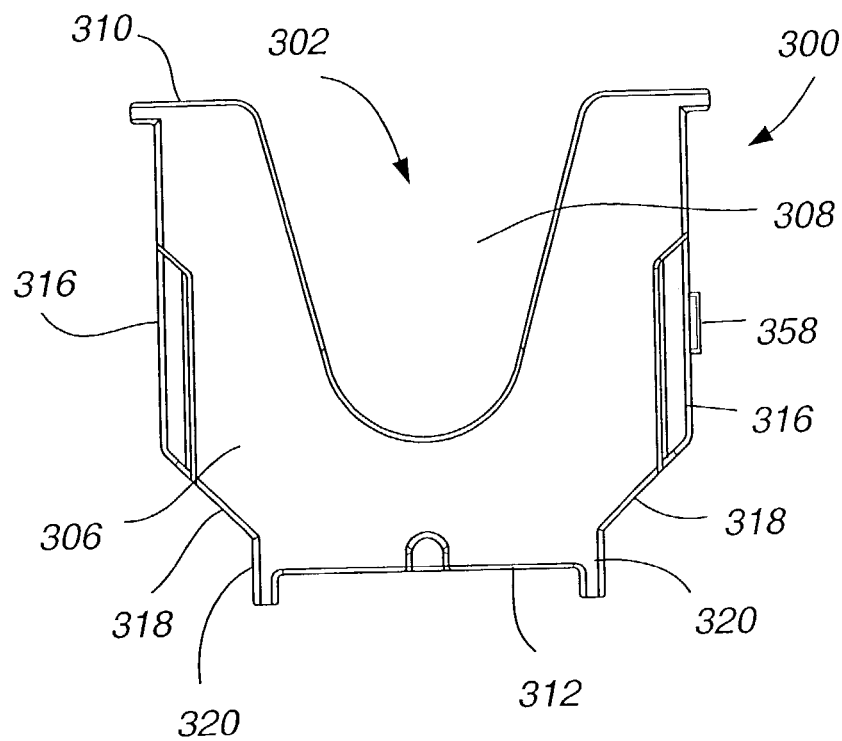
FIG. 76 is an end view of the embodiment of FIG. 73.

One embodiment of a gap merge cassette 300 is illustrated in FIG. 73. The cassette has an open top 302 and open bottom 304. The cassette has two end walls 306 with a U-shaped opening 308 extending from the top edge 310 of the end wall toward the bottom edge 312. The side walls 314 comprise an upper portion 316, a lower portion 318 and a base portion 320. The upper portion 316 is substantially vertical, and the lower portion 318 angles inwardly from the upper side wall portion to the base portion 320. The lower portion 318 may be straight, as shown in FIGS. 75 and 76, or it may be curved to generally match the profile of the hard disks (not shown).

A series of vertical indexing slots or openings 322 are disposed along the upper side wall portion 316 to allow indexing and movement of the cassette relative to the various process machinery that comprises the disk manufacturing process. (See FIGS. 75, 79, 80.) For example, a cassette may be positioned at a specific station and disk pairs removed and processed one pair at a time. As disks are returned, the cassette may be repositioned using the indexing slots. Similarly, the indexing slots can be used to align the cassette with processing equipment, such as a mandrel for engaging the disks along their center apertures or other types of equipment used to engage the outer edge of the disks. In the preferred embodiment, there are 25 indexing slots evenly spaced along the upper portion of each side wall which correspond to the location of 25 pairs of disks. The indexing may be accomplished with mechanical or optical feedback.

In addition, rows of slots 324 are disposed along the side walls at the junction of the upper side wall and lower side wall. These slots allow liquids used in the various processes to drain and escape from the cassette. For example, in some processes, such as data zone texturing, the entire cassette is submerged under water. The slots 324 allow the water to enter and escape from the cassette before the cassette is moved to the next work station.

Figure 78:
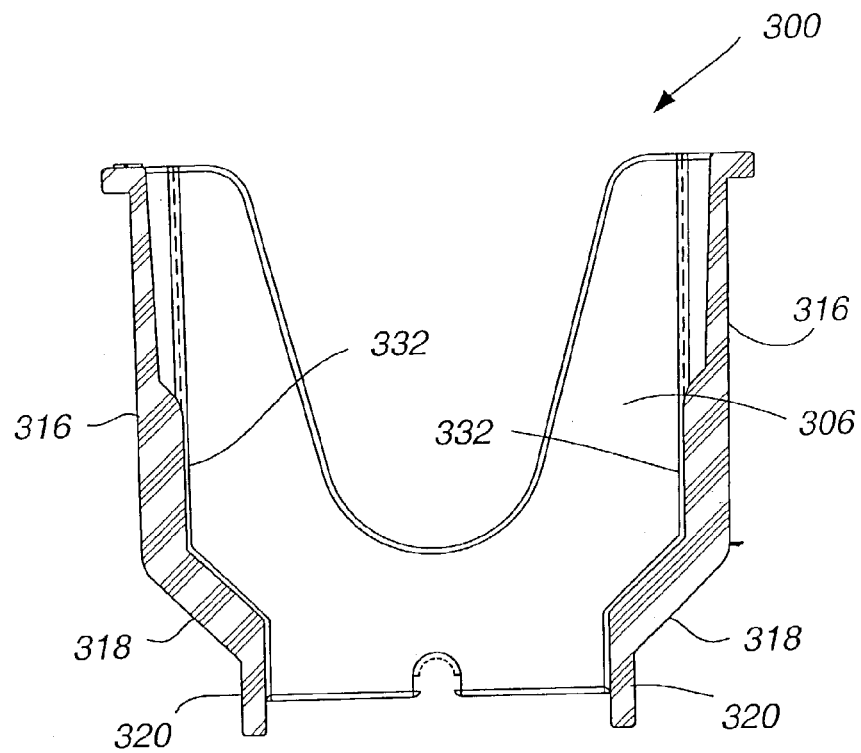
FIG. 78 is a cross-section taken along line 78-78 of FIG. 74.
Figure 79:
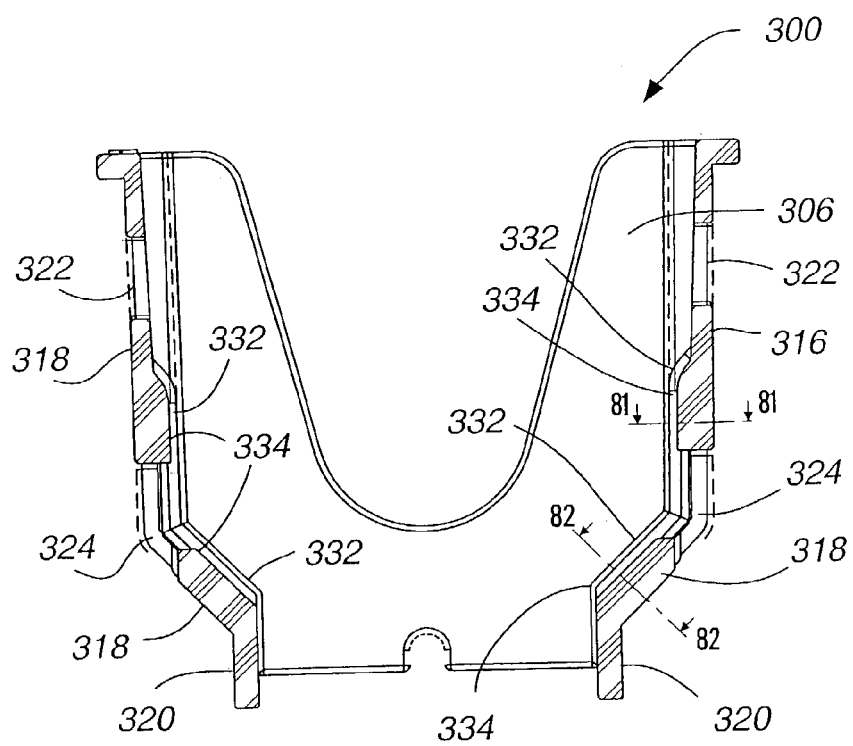
FIG. 79 is a cross-section taken along line 79-79 of FIG. 74.
Figure 82:
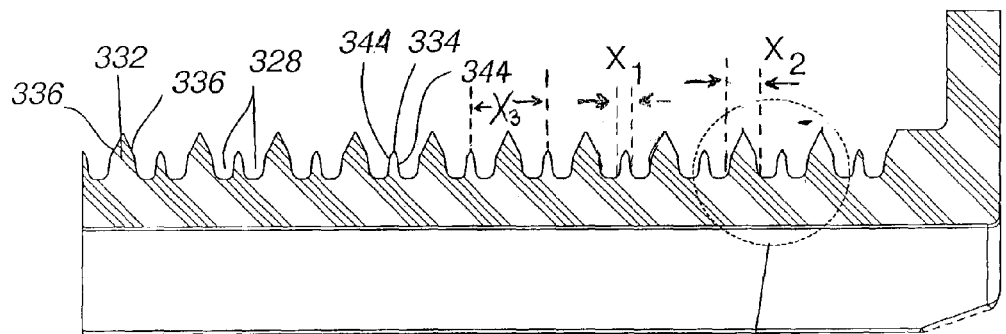
FIG. 82 is a partial cross-section taken along line 82-82 of FIG. 79.
Figure 83:
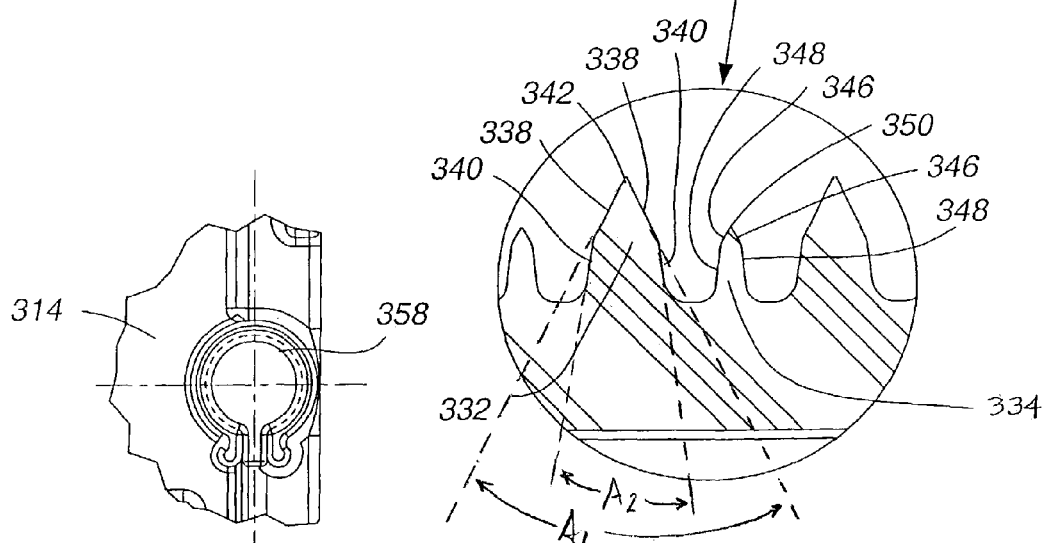
FIG. 83 is a partial exploded view taken from FIG. 82.

Turning to FIGS. 74, 78, 79, 82 and 83, the inside surface 326 of the upper and lower portions 316, 318 of the side walls 314 comprise at least one row of grooves 328 for positioning disks in pairs and in gap merge orientation. The grooves may be formed by recessing channels in the side walls or by extending ribs 330 from the side walls, or perhaps by both. In the first embodiment, designed for pairs of gap merge disks, the ribs 330 alternate between large and small raised ribs 332, 334, respectively. The larger ribs 332 are disposed between and separate disk pairs. The larger ribs 332 have side walls 336 formed by two surfaces 338 and 340 joined at an obtuse angle, as best seen in FIG. 83. The side walls 336 merge to form a ridge 342. A single small rib 334 is disposed between consecutive large ribs 332. Like the large ribs, the small ribs also have side walls 344 formed by two surfaces 346, 348 joined at an obtuse angle. Surfaces 346 merge to form a raised ridge 350. The small ribs maintain the separation between the two disks comprising a disk pair. The spacing between a pair of gap merge disks may range between 0.075 and 0.025 inches, and most preferably is 0.035 inches. In addition, as shown in FIG. 79, the large ribs 332 extend closer to the open top 302 than do the smaller ribs 334. As illustrated in FIGS. 82 and 83, the bottom surface 352 of each channel is substantially flat. Although, it should be appreciated that the channel may be V-shaped, with an apex at the bottom rather than a flat surface, provided the width of the V-shaped channel is sufficient to accommodate the width of a disk.

Figure 77:
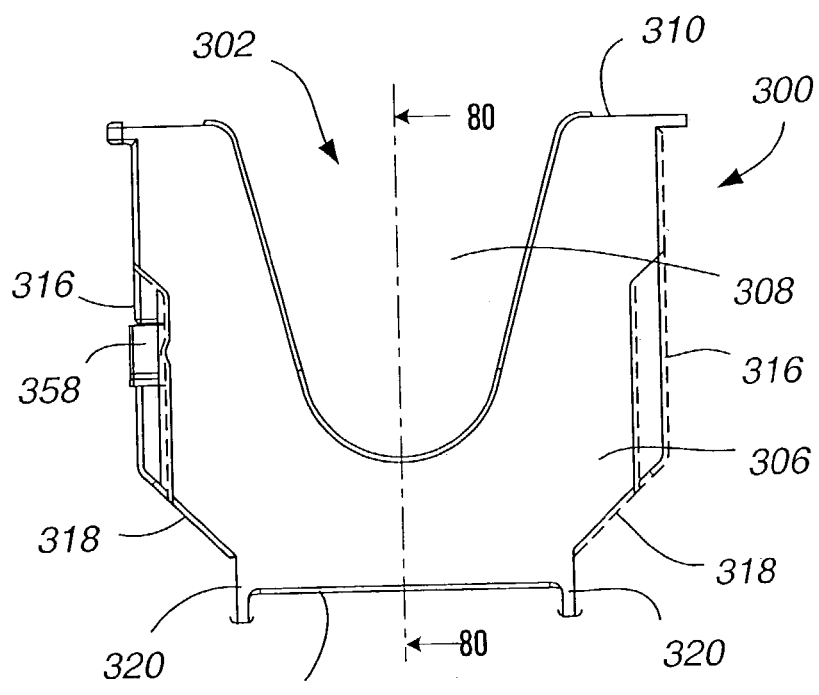
FIG. 77 is an end view of the opposite end of the embodiment of FIG. 73.

It is desirable to facilitate a smooth transfer of disks into the cassette 300 and accomplish positioning the disks in a gap merge orientation. One way to accomplish this is to form various tapers in the configuration of the side wall 314 and the ribs 332 and 334. As illustrated in FIGS. 77 and 78, the opposed inside surface 326 of the side walls 314 gradually taper inwardly from the open top until the point where the large ribs 332 start. This allows disks to be partially lowered into the cassette prior to any interaction between the disks and the ribs 332, 334.

Figure 80:
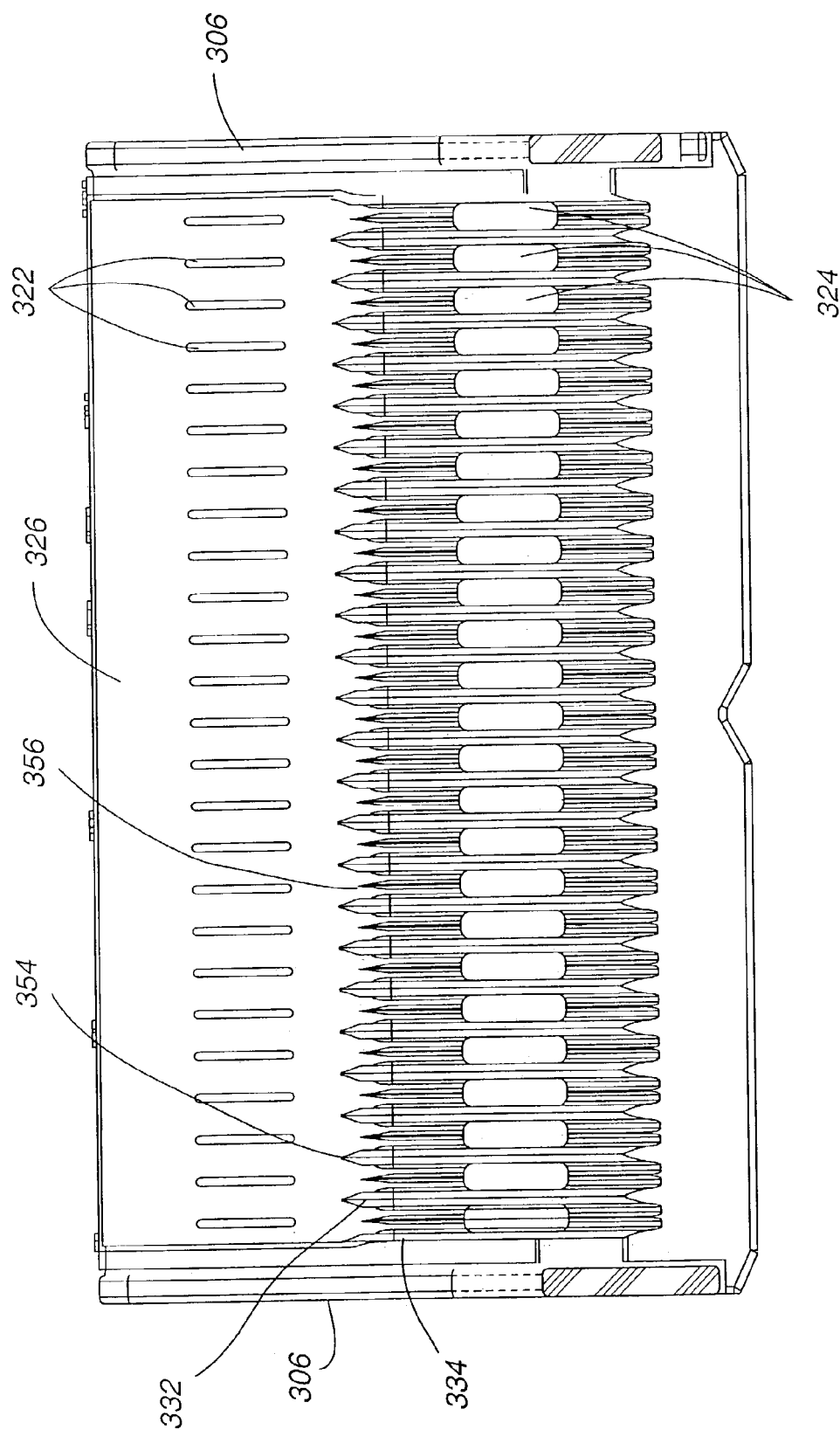
FIG. 80 is a cross-section taken along line 80-80 of FIG. 77.
Figure 81:
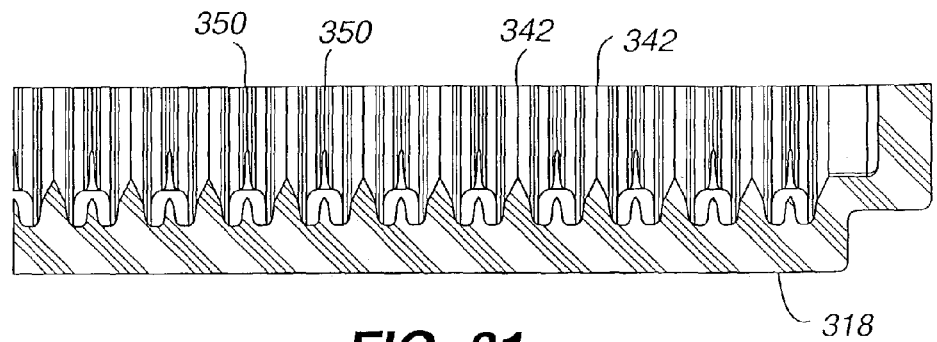
FIG. 81 is a partial cross-section taken along line 81-81 of FIG. 79.

Next, as the disks are lowered further into the cassette, two different tapers formed in the ribs 332, 334 will also facilitate a smooth transition into a gap merge orientation. The first taper is best illustrated in FIG. 80, where the upper or leading edge of each rib 332 and 334 is tapered to a point at 354 and 356, respectively. Thus, the leading edge 354 of the large ribs will initially segregate the disks into pairs by positioning two disks between adjacent large ribs before the disks interact with the small ribs 334. At the same time, the gap between each pair of disks will have narrowed. The narrowing of the gap between the disks will be further facilitated by the taper formed by the upper side wall surfaces 338 and lower side wall surfaces 340 of the large ribs 332, best seen in FIGS. 81 and 82. In one embodiment, shown in FIG. 83, the upper side wall surfaces form an angle $A_1$ of approximately 52 degrees which provides a wide opening to facilitate disk transition. As shown in FIG. 83, the lower side walls 340 form an angle $A_2$ of approximately 20 degrees which also facilitates receiving the disks but also assists in limiting disk movement. In the same embodiment, the gap or distance between two disks of the same pair $X_1$, or the width of a small rib 334, is 0.035 inches. The distance between the R-side of two adjacent disks of different pairs $X_2$, or the thickness of a large rib 332, is 0.115 inches. The gap center-to-center distance $X_3$, or the distance between the ridge of two adjacent small ribs, is 0.25 inches. It should be appreciated that based upon the thickness of the disks used, the edge-to-edge separation (gap separation) distance may vary between approximately 0.020 inches to 0.075 inches. Thus, the disks can be transitioned smoothly into the cassette 300 and maintained by the cassette as pairs of gap merge disks.

Figure 84:
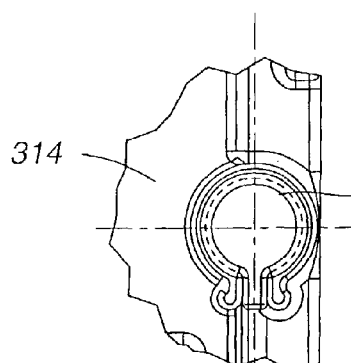
FIG. 84 is a partial exploded view of a cavity for supporting a radio frequency identification tag.

The cassette may also include a tubular cavity 358, positioned at one end of the cassette. The cavity is designed to securely receive a radio frequency identification (RFID) tag which enables the cassette and its contents to be tracked by automated equipment. (FIGS. 77, 84) Each RFID tag would contain its own unique identification number, different from all other cassettes. In this manner, a batch of disks can be tracked through the entire manufacturing process, and even on to the customer. The RFID tag could further include a read/write memory that would allow it to store confirmation of the completion of each process step which could be written to the chip by a transmitter associated with each process station. If defects were later discovered, it would also permit tracking down the location of other batches processed at the same time.

The cassette may be injection molded of suitable plastic, selected based upon the particular use of the cassette in the overall manufacturing process. One appropriate technique would be injection molding. High performance plastics, such as polybutylene terephthalate (PBT) could be used as it has acceptable strength and durability characteristics. Polyethylene terephthalate (PET) has good injection molding techniques, but does not have as good abrasion characteristics. Alternatively, polyesteresterketone (PEEK) may be used if the cassette will be used in a high temperature environment, such as sputtering where temperatures can reach 350 degrees Celsius. Examples of PEEK are sold under the trade names Ultem and Vespel.

A second embodiment of a gap merge cassette, shown in FIGS. 85-89, is designed for use in the sputtering process. It is shorter in height than the embodiment shown in FIGS. 73-84, and is preferably made from metal to accommodate the elevated disk temperatures resulting from the high temperatures of the sputtering process. The cassette may be die cast, stamped or machined from a single block of metal. Construction from a single piece of metal avoids the need to fasten multiple component pieces together, thereby reducing the opportunity of contamination being introduced into the sputtering process by the cassette. Joints and fastening apertures are sources of contaminants. Contaminants can ruin a batch of disks. The cassette may also be plated to improve abrasion resistance. An appropriate plating material is nickel. Abrasion is another source of contamination. Appropriate metals include 304 or 316 stainless steel or aluminum, which can maintain integrity in high temperature environments and when holding high temperature disks. Although the temperatures in the sputtering chambers may reach 350 degrees Celsius, the disk temperatures in the cassettes do not typically exceed 270 degrees Celsius.

The cassette 370 has two side walls 372, two end walls 374, an open top 376 and an open bottom 378. The end walls have a U-shaped or semi-circular opening 380 to permit access to the center aperture of the disks. The side walls are curved at 382 to correspond to the curvature of the disks and the inside surface 384 of the side walls are configured with an alternating pattern of large ribs 386 and small ribs 388. The ribs define a pair of side-by-side channels 390. As best seen in FIG. 19, the small ribs 388 separate pairs of disks and the large ribs 386 maintain the gap between the two disks of each pair. The size of the ribs and dimensions of the gaps can change depending upon the size of the disks and the desired spacing. With disks having a thickness of 0.05 inches, the gap between disks of the same pair can range between 0.025 inches and 0.07 inches. Preferably, the gap is approximately 0.035 inches. The gap spacing between adjacent pairs may also range between 0.085 and 0.130 inches. The preferred spacing is 0.115 inches. Ideally, each disk pair will occupy a space no greater than 0.25 inches with a distance of 0.135 inches measured from R-side to R-side for a gap merge pair of disks.

Referring to FIGS. 85 and 87, a series of marks or holes 394, precisely aligned, are machined along the top edge 396 of the side walls 372 of the illustrated cassette to allow positive positioning of the cassette relative to the processing machinery. Ideally, one alignment mark 394 is positioned adjacent each pair of gap merge disks. In FIG. 87, the marks are positioned adjacent the gap between the two disks comprising each pair of disks. Known optical and mechanical systems may be used for positioning the cassette based on these alignment marks. They may also be used to index the position of the cassette relative to the processing equipment as successive pairs of disks are removed and returned, until the entire batch of disks has been processed. The alignment holes are machined to allow bi-directional alignment of the cassette relative to the processing equipment and other machinery.

A third cassette 400 for holding a plurality of pairs of disks in gap merge orientation is shown in FIGS. 90-100. The cassette is made from three modular pieces, eight pieces in total. Its modular nature allows for the replacement of worn pieces or interchangeability of differently configured pieces. Thus, as will be apparent to one skilled in the art, the cassette can be reconfigured to position disks in different orientations, such as gap merge or other configuration needed during disk processing. In addition, the length of the cassette can be changed to carry different numbers of disk pairs. In a preferred embodiment, this cassette would be made from plastic and, therefore, have its use limited by the characteristics of the plastic employed to make the cassette.

Figure 99:
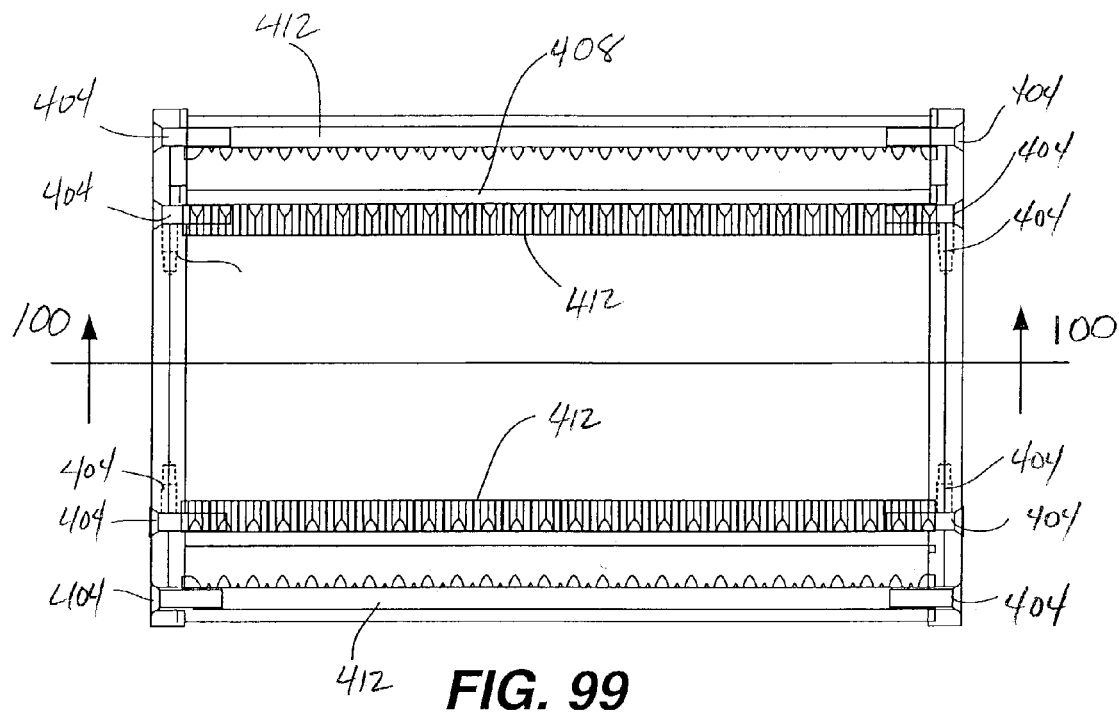
FIG. 99 is a top plan view of the embodiment in FIG. 98.
Figure 100:
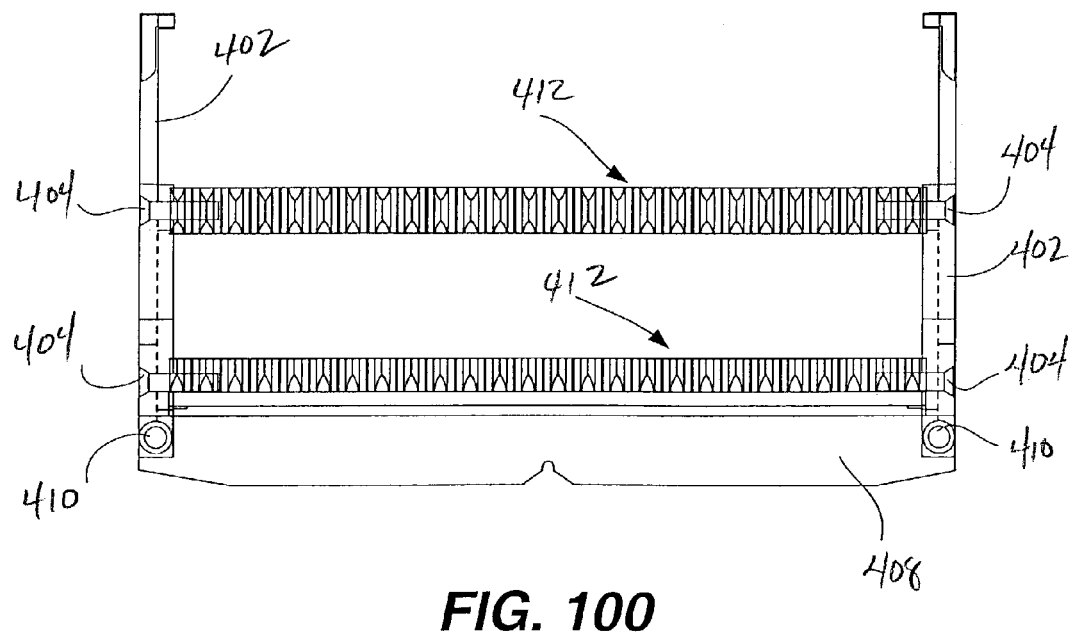
FIG. 100 is a cross-section taken along line 100-100 of FIG. 99.

The end walls 402 are generally U-shaped to allow access to the disks and include six apertures 404 for attachment of the other component pieces. The U-shaped opening 406 provides access to the disks. A pair of base wall members 408, shown in FIGS. 95, 96, are attached to the end walls through securement holes 410 in the base wall members and in the end walls. Screws or other fasteners are used to attach the base wall to the end walls. In addition, four side wall members 412 are attached between each end wall to provide disk support surfaces. All four side wall members shown in FIGS. 98-100 are identical to each other. A single side wall member is shown in FIGS. 92, 93.

The inside surface 414 of the side walls, shown in FIGS. 92 and 98-100, include a row of teeth, alternating between a large size 416 and a smaller size 418. In the preferred embodiment, and as shown in FIG. 93, each side wall is octagonal in cross-section.

With reference to FIG. 94, an enlarged view of the profile of one gap merge disk support groove 420 is shown. A pair of large teeth 422 are separated by an interspaced smaller tooth 424. The side wall of the large teeth have two surfaces, a base portion 426 and an upper portion 428. The angle formed by the upper portion of the side walls of the adjacent large teeth is 60 degrees. The base portions of the side walls form a 90 degree angle. The angle of the base portion is designed to accommodate chamfers in the outer perimeter edges of the disks. Precision manufacture of these grooves allows maintaining consistent and accurate alignment of the disks, which is necessary for the precise handling required for single surface processing. It should be appreciated that the configuration of the teeth or ribs can be modified to accommodate different alignment, orientation or spacing among the disks. Thus, side walls 412 having disk support surfaces that accommodate other disk orientations may also be utilized.

Merging of disks may be further facilitated by use of a merge nest. A merge nest works in association with a disk cassette and assists in merging pairs of disks into a desired orientation, such as gap merge orientation. Merge nests are discussed in greater detail below.

D. Simultaneous Texturing of Two Single-Sided Hard Disks

Figure 101A:
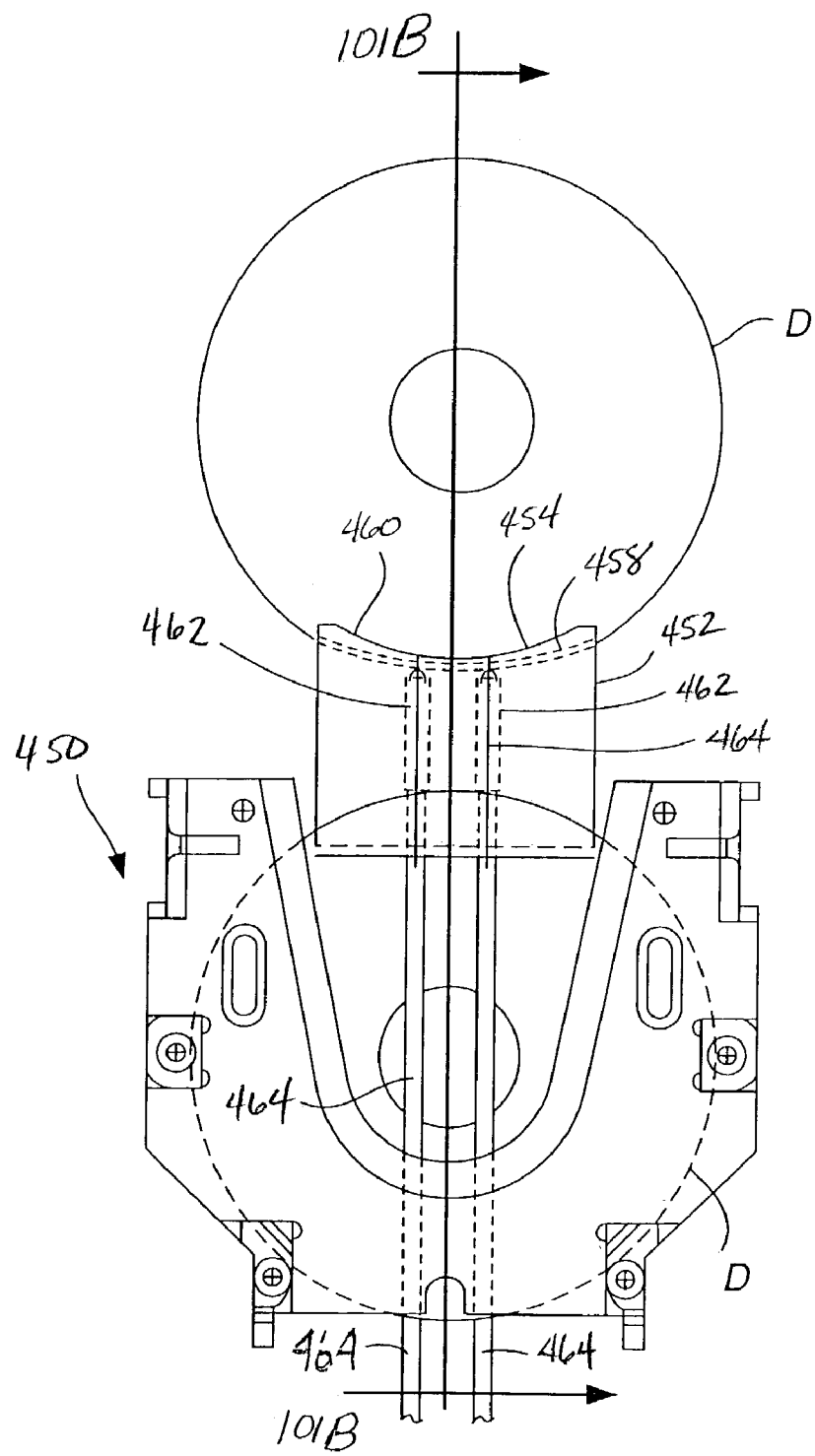
FIG. 101A is a front elevation view of an apparatus for handling disk pairs removing a pair of disks from a cassette.
Figure 103:
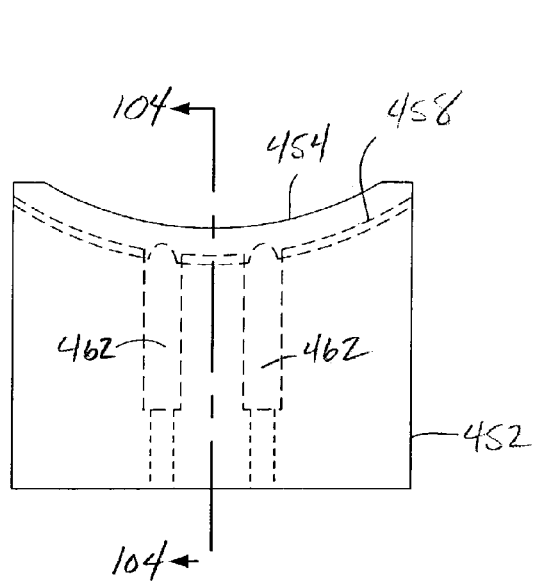
FIG. 103 is a front elevation view of the apparatus for handling pairs of disks shown in FIGS. 101A and 101B.
Figure 104:
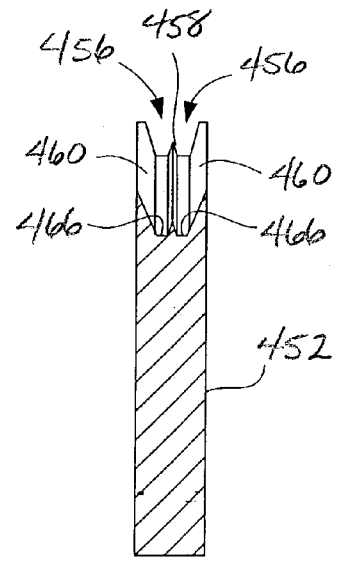
FIG. 104 is a cross-sectional view of the apparatus of FIG. 103 taken along line 104-104 of FIG. 103.

Turning to FIGS. 101A, 101B, a cassette 450 is shown holding multiple pairs of gap merge disks D. A gap merge orientation is preferred for the disks at the beginning of the texturing process. One embodiment of a lift saddle 452 is utilized to remove and return pairs of disks from and to the cassette. The lift saddle 452 has an arcuate shaped disk engaging portion 454 comprising two channels or grooves 456 separated by a raised center ridge or rib 458 (FIGS. 102-105). The outer walls 460 of the disk engaging portion 454 support the outside edge of the disks. The saddle 452 includes two recesses or bores 462 positioned central to its body for receiving and securing push rods 464. The push rods 464 move the lift saddle 452 between a first position beneath the cassette 450 and a second position extended through and above the cassette, as seen in FIGS. 101A, 101B. As a result, the lift saddle 452 can remove and return pairs of disks from and to the same or a different cassette.

The push rods 464 will move the lift saddle 452 to a position where it will engage a first pair of gap merge disks and remove the pair to a position above the cassette (FIGS. 101A, 101B). In the raised position, shown in FIG. 101B; the pair of disks will be engaged by additional processing equipment, discussed below. In the embodiment shown, primarily used in connection with data zone texturing, and in connection with a 95 millimeter diameter disks having a thickness of 0.050 inches, the flat portion 466 of each channel of the lift saddle has a width ($W_1$ in FIG. 105) of approximately 0.046 inches. The center to center distance between the channels is 0.075 inches ($W_2$ in FIG. 105). Therefore, the width of the center ridge 16 is 0.025 inches; this is also the gap distance between the L-side of each disk in a pair. The angle of the side walls 460 for each channel 456 is approximately 40 degrees, and the angle formed by the walls of the center ridge or rib 458 is approximately 40 degrees. If the disks include a chamfered outer perimeter edge that matches or closely matches the angle of the rib and outer walls, the flat portion 466 will have a width less than the thickness of the disk. The dimensions of the disk engaging portion of the lift saddle can be altered to accommodate disks of different size, diameter and thickness.

In order to process two R-sides (active sides) simultaneously, the non-functional or non-active sides (L-sides) of the disk pair are merged. For texturing, the disk pair is preferably positioned in a concentric contact merge orientation. It is preferable when texturing two disks simultaneously that there be no relative movement or slippage between the two contact merge disks. To enhance the ability of two disks to move in unison, i.e. not to slip relative to each other, a fluid layer is uniformly deposited between the inactive side (L-side) of each disk. The fluid layer acts as a binding agent to keep the disks together. This may be accomplished by submerging the disks in a pool of deionized water. When the lift saddle removes two disks from the cassette, the water will drain away, leaving the desired water or film layer on the surface of the disks. The layer is preferably between 0.1 and 10 microns thick. Because the disks are polished substrate disks at this point in the manufacturing process, the relative flatness of the surface will increase stiction between the two disks.

With reference to FIGS. 106-109, once a pair of gap merge disks are positioned above the cassette 450 by the lift saddle 452, the pair is engaged by a plurality of rollers or grip fingers 418. The rollers 418 are rotatably mounted on merge arms 470. The merge arms 470, in turn, are mounted for lateral movement on a rotatable housing 472. As illustrated in FIGS. 107 and 108, the rollers 468 are shaped to remove the gap between the disks and create a concentric contact merge orientation, i.e., to merge the disks. More specifically, the channel 474 formed in the rollers has a flat base portion 476 having a width $W_3$ similar to that of the flat portion 466 of the channel 456 of the lift saddle 452 (approximately double thickness of a single disk). The beveled inside walls 478 are oriented at a preferred angle of approximately 94 degrees to accommodate the 45-degree chamfer in the outer perimeter edge of the disks and function to engage the pair of disks along their outer perimeter while the disks are simultaneously supported by the lift saddle 452 in a gap merge orientation. It should be appreciated that the angle of the rollers can change to complement the angle of the chamfer in the disk perimeter. As the merge arms 470 move laterally inwardly, the lift saddle 452 retracts. This lateral inward movement of the merge arms 470 moves the rollers 468 laterally inwardly and into engagement with the disks. As a result, the space between the pair of disks is removed. A flexible or plastic cup 480 is mounted on the housing 472 and applies an outward force F, seen in FIG. 106B, which also facilitates removal of the gap between the disks and assists in squeezing some of the deionized water out from between the disks. The force applied by the cup is typically no more than ten pounds and further increases the stiction between the disks. The plastic cup may be used in either data zone texturing or laser zone texturing. The disks are also drawn together or merged by the capillary action created as the deionized water drains out from between the disk pair as the lift saddle 452 removes the disk pair from their submerged position in the cassette 450. Although four rollers are shown, three rollers are sufficient to securely hold and merge the pair of disks and allow the lift saddle to retract.

Figure 110A:
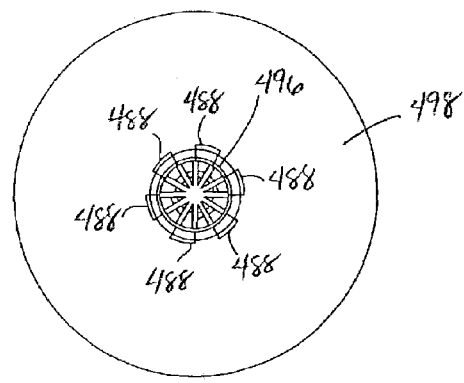
FIG. 110A is a front elevation view of a pair of disks engaged at their central aperture by a spindle.
Figure 110B:
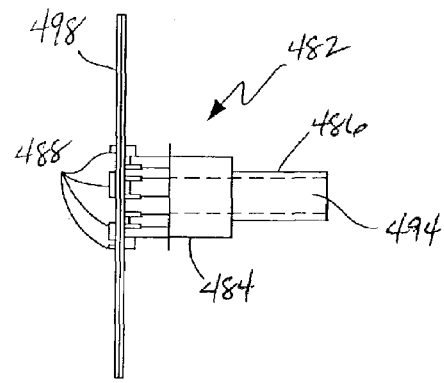
FIG. 110B is a side elevation view of the disks and spindle shown in FIG. 110A.
Figure 111A:
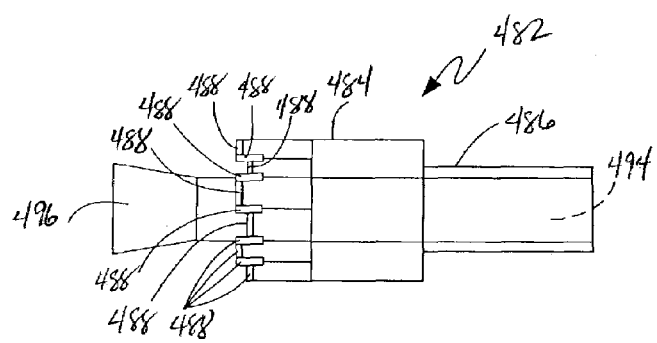
FIG. 111A is a side elevation view of the spindle shown in FIGS. 110A and 110B, but extended to permit engagement with a pair of disks.
Figure 111B:
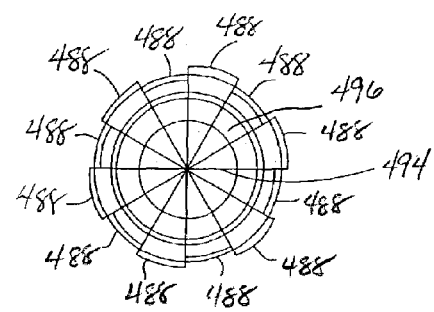

Once the rollers 468 have securely grasped the disk pair and the saddle 452 has retracted, the housing rotates 90 degrees. (Clockwise in FIG. 109.) The disks are now positioned to be engaged by a spindle assembly 482. The spindle assembly 482, illustrated in FIGS. 110A, 110B, 111A, 111B, 112A and 112B, is primarily used in connection with data zone texturing, although any suitable spindle assembly would work, and this spindle assembly could also be used for laser zone texturing. The spindle assembly 482 includes an expandable collet 488 positioned at the end of a spindle shaft 486. The collet 484 includes a series of teeth or a jaw set 488 alternately offset to engage the internal edge 490 formed by the central aperture 492 of each disk. Thus, every other tooth engages one disk and the remaining teeth engage the other disk. The spindle assembly 482 further includes a longitudinally extendable cam shaft 494 with a camming member 496 disposed on the distal end of the shaft 494. In operation, with the cam shaft 494 extended as shown in FIG. 111A, the diameter of the collet 484 is less than the diameter of the central aperture 492 of the disks. When the cam shaft 494 is retracted, the cam member 496 interacts with inside of the collet 484 to expand the collet 484, causing the teeth 488 to engage the internal edge 490 of the central aperture 492 of both disks. Alternatively, as shown in FIGS. 110A, 110B and 111A, some of the teeth 448 may extend through the central aperture 492 of both disks and engage the outer surface 498 of the outer disk to further facilitate securement of the disk pair and prevent disk to disk slippage. Once the spindle shaft 486 is secured to the disks, the grip fingers or rollers 468 release and the disk pair is fully supported by the spindle shaft 486 in concentric contact merge orientation. In the preferred embodiment, a flexible cup 480 is also utilized as a counterbalance to the spindle assembly 482. The cup 480 is positioned on the housing 472 opposite the spindle assembly 482. The cup 480 is hollow to allow the spindle assembly 482 to expand through the central aperture 492 of the disks. The cup 480 provides a surface which pushes against the disks to counterbalance engagement of the disks by the spindle. The cooperation of all elements creates a concentric contact merge pair of disks securely affixed to the spindle assembly 482.

Figure 112A:
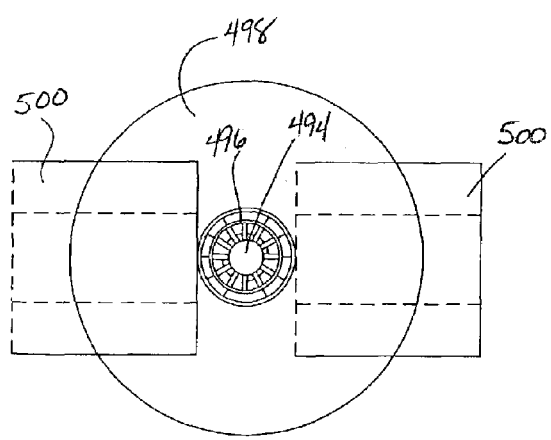
Figure 112B:
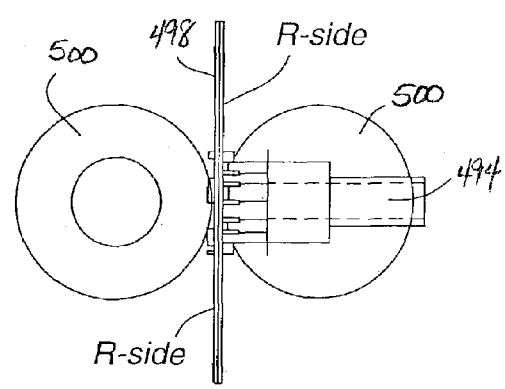

Once the pair of disks is secured on the spindle assembly 482, the rollers 468 disengage and move away from the disks. The housing 472 then rotates back to its original position. Four texturing rollers 500 are then positioned as shown in FIGS. 112A and 112B; two on each side of the spindle and two in contact with each disk. If fixed abrasive texturing is utilized, an abrasive tape or fabric, not shown, is wrapped around the rollers 500. The abrasive tape contains fine grit or diamond particulate. If free abrasive texturing is utilized, a rough woven fabric is wrapped around each roller and a slurry is applied to the fabric and rotating disks to texture the disks. The slurry contains diamond particulates to texturize the disk surfaces, coolant to maintain lower temperatures and a deionized water base solution. In either texturing process, each of the rollers 500 is pressed against a portion of a disk surface with approximately 2.75 pounds of force while the spindle assembly spins the pair of disks at approximately 1,000 revolutions per minute. This action textures the data zone of the R-side of each disk. Optimum texturing is achieved if the two disks do not slip relative to each other. The inward pressure on the disk pair created by the opposed action of the texturing rollers further increases stiction between the disks.

Figure 115:
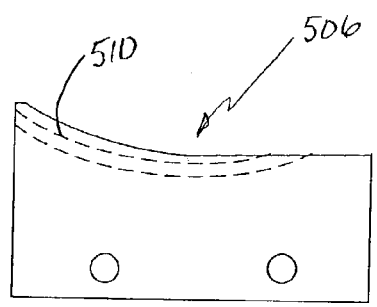
Figure 116:
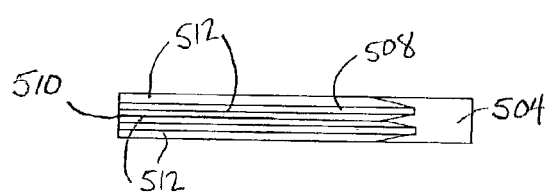
Figure 117:
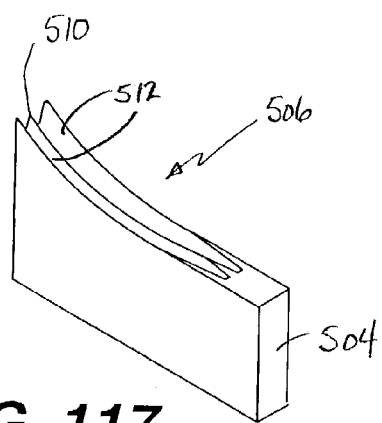
Figure 118:
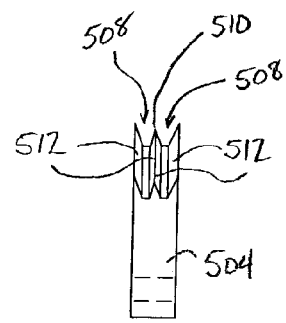

A demerge tool 502 is used to unload the pair of textured disks from the spindle assembly 482. The demerge tool 502 is illustrated in FIGS. 109 and 113-118. The demerge tool includes a pair of demerge saddles 504 that are mounted on the housing 472 such that they can move laterally relative to the housing to engage opposite outer perimeter edges of the disks. As best seen in FIGS. 115 and 118, the demerge saddles 504 include a curved portion 506. The curved portion 506 includes a pair of parallel channels or grooves 508 with a ridge or wedge 510 separating the two channels. Similar to the lift saddle 462, the channels 508 are curved to follow the radius of the disk pair. The channels 508 may have a V-shape in cross-section, or, as shown in FIG. 118, the demerge saddle channels 508 may have a flat bottom portion. The walls 512 of the channels 508 are angled to match the angle of the chamfer of the outer perimeter edge of the disks. Thus, if the disks have a 45-degree chamfer, the side walls 512 will be formed at about 90 degrees.

In addition to engaging the disk pair, a function of the demerge saddle 504 is to demerge the disk pair and reposition the disk pair from a concentric contact merge orientation to a gap merge orientation. Accordingly, the wedge 510 abuts the groove 514 formed by the chamfers of the abutting L-side disk surfaces (FIG. 114B). To successfully demerge the pair of disks, the demerge tool 502 must overcome the stiction between the pair of disks. In this circumstance, the stiction is increased due to the pressure applied against the disk surfaces, such as by the tape rollers 500 against the disks, due to the water layer between the disks and due to the relative flatness of the L-side disk surfaces. In this embodiment, the demerge saddles 504 are designed to apply up to approximately 10 pounds of force to demerge the disk pair, although it is preferred to use less force to minimize potential damage to the disks. The amount of force needed can be reduced by applying the demerge tool against a larger perimeter edge of the disks. The demerge tool 502 is also designed to support the disk pair in order to allow the spindle assembly 482 to disengage before the demerge force is applied. The lower, inwardly extending portion 516 of each demerge saddle 504 supports the disk pair after the spindle assembly 482 has disengaged (FIG. 114A).

With the disk pair securely engaged by the demerge tool 502, the housing 472 rotates to position the demerge tool 502 above the cassette as shown in FIGS. 119A and 119B. The lift saddle 452 raises and engages the lower perimeter edge of the disk pair. The gap merge spacing of the channels 456 of the lift saddle 452 correspond to the gap merge spacing of the channels 508 of the demerge saddles 504 as shown in FIG. 118. When the disk pair is re-engaged by the lift saddle 452 (FIGS. 119A, 119B, 120), the demerge saddles 508 disengage. The lift saddle 452 lowers the disk pair and seats them in the cassette 450. The cassette 450 then indexes to a new position and the lift saddle 452 engages and removes a new pair of disks from the cassette 450. The preferred sequence has one pair of disks engaged on the spindle assembly 482 and being textured while a second pair that has just completed texturing is returned to the cassette and a new, untextured pair is loaded between the rollers 488.

As previously stated, the present invention can also be utilized for laser zone texturing the R-side surfaces of the disks. With laser zone texturing, the disk surfaces are not mechanically contacted. As a result, there is even less stiction between the disks. Therefore, the demerge tool 502 may be configured differently for a laser zone texture process than for a data zone texture process.

FIGS. 121-128 illustrate a second embodiment of a disk handling assembly 518. This disk handling assembly is primarily designed for laser zone texturing operations, although it could also be used for handling disks at other points in the manufacturing process. In laser zone texturing, a pair of gap merge disks are engaged by a lift saddle 452 and removed from a cassette. The lift saddle, shown in FIG. 105B, has subtle differences with respect to the disk engaging portion 454 compared to the lift saddle illustrated in FIG. 105A and is primarily intended for use in data zone texturing processes. In particular, outer walls 460 include an upper surface 406a and a lower surface 460b. The upper surfaces of the opposed side walls form a 40-degree angle, the lower surfaces of the opposed side walls form a 20-degree angle. The interface between the upper surface 460a and lower surface 460b occurs at 0.040 inches above the flat portion 466 which forms the base of the channels 456 ($H_1$ in FIG. 105B). The width of each channel $W_1$ is 0.046 inches for disks having a thickness of 0.050 inches. The height $H_2$ of the center ridge 458 is 0.097 inches. The width of the center ridge $W_3$ is 0.045 inches.

Figure 105A:
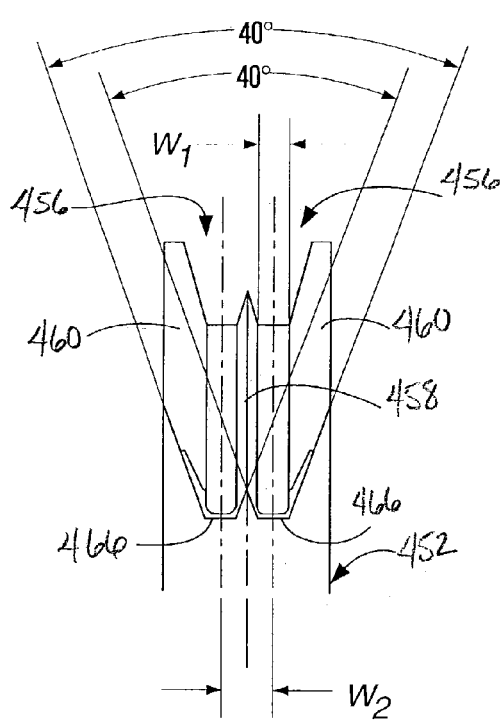
FIG. 105B is an enlarged view of the upper portion of an alternative embodiment of the disk handling apparatus of FIG. 105A.
Figure 105B:
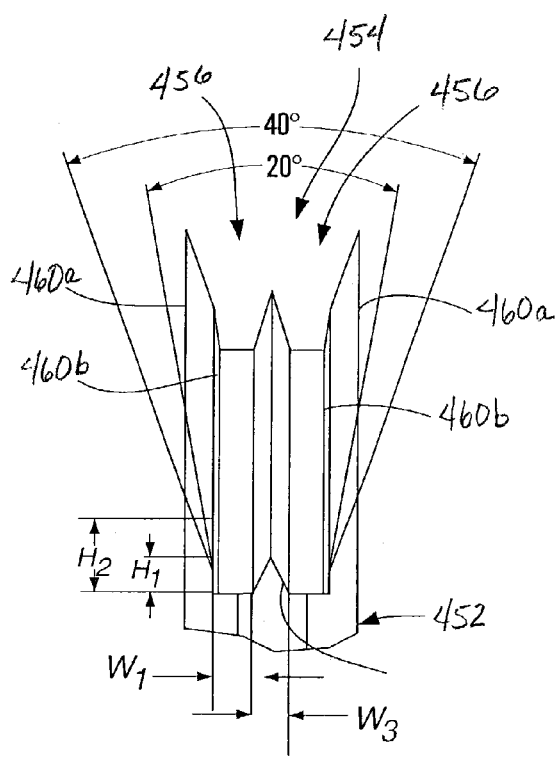
Figure 109:
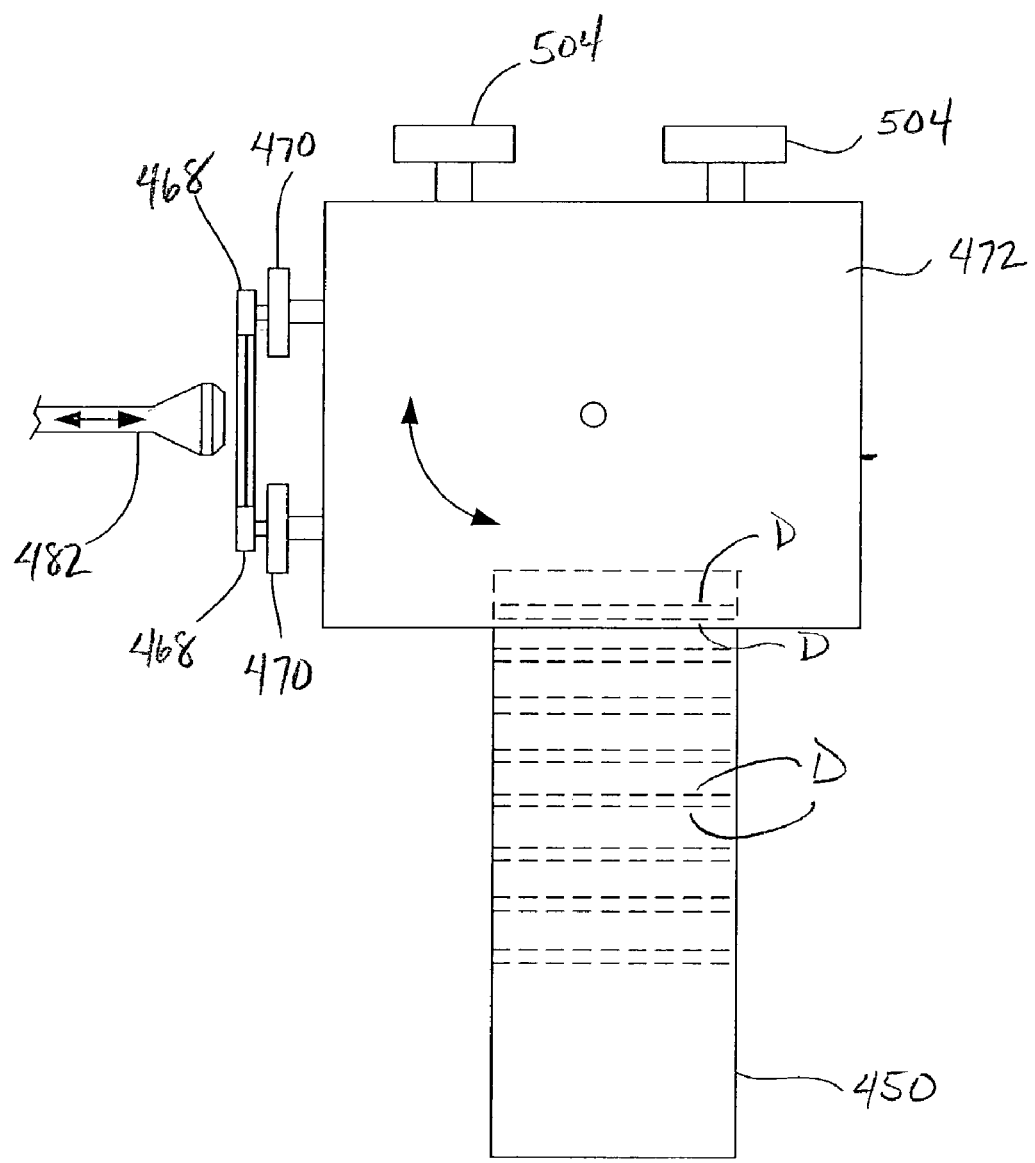
FIG. 109 is a top elevation view of the disk handling apparatus shown in FIG. 106A, further showing a disk carrying cassette and a spindle for engaging disk pairs.

The disk handling apparatus 518 of FIGS. 121-128 can be used to engage and remove disks from a lift saddle 452, such as shown in FIG. 105B, can be used to engage and remove disks from a lift saddle 452 and to return disks to a lift saddle 452 and is primarily intended for use in laser zone texturing. The disk handling assembly 518 includes two separate but identical disk handling mechanisms 520 positioned at opposite ends of a rotatable plate 522. Thus, the disk handling assembly 518 can simultaneously handle two different pairs of disks. The rotatable plate 522 has a pivot point 524 at its center which allows the plate to move through a 180-degree motion moving each disk pair between a first and second position. The first position is located above a cassette such that a lift saddle can lift a pair of disks to the first position and the disk pair can be engaged by a first disk handling mechanism 520 disposed at one end of plate 522. Simultaneously, the second disk handling mechanism 520, disposed at the opposite end of the plate 522, has transported a second disk pair to a second position for processing. When the processing is completed, the plate 522 rotates and the second disk handling mechanism returns the processed disks to the first position where the disk pair is loaded on the lift saddle 452 and returned to a cassette and the first disk handling mechanism 450 moves the unprocessed disks to the second position for processing.

The mechanism includes four gap rollers 526 rotatably mounted on arms 528 (FIGS. 121, 123, 125-127.) The arms 528 move laterally on a rotatable plate 512, allowing the rollers 526 to engage and disengage the disk pair. A gap roller 526 is shown in FIG. 128. As shown, the roller 516 has a pair of channels 550 separated by a control wedge 552. Each channel has a flat bottom portion 554, although each channel could also be V-shaped in cross-section instead. As with the other rollers described herein, the angle formed by the inner side walls 556 and the walls 558 of the wedge 552 correspond to the angles of the outer perimeter edge chamfer of the disks. As shown in FIG. 122, the rollers 546 are designed to maintain gap merge orientation of the disks.

FIGS. 121 and 123 show a disk handling mechanism 520 engaging a pair of disks, such as following disengagement of the pair by a lift saddle 452. In this context, the plate 522 will rotate the disk handling mechanism to the second or processing location for presentation of the disk pair to a spindle assembly 482. As shown in FIG. 127, the disk assembly will engage the pair and position the disk pair for engagement by a spindle assembly 482 for subsequent processing. The disk handling mechanism 520 will disengage the disk pair, as shown in FIGS. 125, 126. As shown in FIG. 124, such processing may include laser zone texturing performed by a pair of laser beams 550. The lasers perform laser zone texturing on the R-side surface of each disk. Following processing, the disk handling mechanism 520 will re-engage the disk pair (FIGS. 121-123) and the spindle assembly 482 will disengage. As shown in FIGS. 126 and 127, the grip rollers 526 will position themselves at the outer perimeter of the pair of contact merged disks. The arms 528 will press inwardly on the disk pair, forcing the wedge 532 between the pair of disks. Because the stiction is less than that formed between the disks during data zone texturing, the gap rollers 526 are mechanically sufficient to demerge the disks, allowing the spindle assembly to fully disengage. In this embodiment, approximately four pounds of force applied by the gap rollers will demerge the disks. In contrast, because the stiction between the contact merged disk pair is greater in the data zone texturing context, the demerge tools 502 engage the disks over a much greater perimeter length than do the gap rollers 526. The larger contact area provides greater mechanical leverage to more readily separate the contact merge pair.

E. Simultaneous Scrubbing and Washing of Two Single-Sided Hard Disks

As partially illustrated in FIG. 129, one embodiment of the apparatus for scrubbing and washing provides four stations 610, 612, 614, 616 at which cassettes 618 containing a plurality of disks D are positioned. The cassettes 618 have an open top and open bottom to allow pairs of disks to be removed from and returned to the cassettes 610. A lift saddle 620 is positioned below each cassette and is affixed to a lifter rod 622. Each shaft 622 moves the lift saddle 620 vertically between a lower position, beneath the cassettes, and an upper position, above the cassettes and within a scrubbing zone where the disk pairs are subjected to scrubbing and washing. The individual shafts 622 may be interconnected, such as by plate 624, to facilitate uniform movement of each lift saddle. Thus, the actions of multiple scrubbing zones can be coordinated, and uniform efficient throughput achieved.

A complementary set of demerge saddles 626, affixed on demerge shafts 628, are vertically aligned with and positioned above the lifter saddles, as best illustrated in FIG. 130. The demerge saddles 626 and demerge shafts 628 move vertically between a first position and a second position. The demerge shafts 628 may also be interconnected by a plate or bracket 630 to facilitate uniform movement. As illustrated in FIGS. 129 and 130, the upper interconnector plate 630 is attached to a servo actuator 632 which moves the demerge saddle 626 and demerge shafts 628 between the first and second positions. Although not shown in FIG. 129 due to the complexity of the apparatus, the lower interconnect plates 624 are connected to similar actuators. The servo actuators provide precise, uniform and coordinated movement of the saddles 620 and 626. It should be appreciated that other means for moving the lifter saddle 620 and demerge saddle 626, such as pneumatic or hydraulic systems, may be utilized as would be known by persons of skill in the art.

Turning to FIGS. 131 and 132, the lift saddle 620 comprises a main body portion 634 attached to a shaft 622. In the preferred embodiment, a cavity 636 is formed in the body 634 of the lift saddle 620 to receive a shaft 622. The lift saddle 620 also includes a disk engagement portion 638 which engages the bottom perimeter edge of two disks. The engagement portion 638 includes two curved grooves or channels 640 separated by a center tooth or wedge 642. In addition, the center tooth or wedge 642 may include multiple high pressure jet openings or nozzles 644. The jet openings are connected to a manifold or fluid delivery system 646 which delivers deionized water or other appropriate fluids to the nozzles 644. A fluid source (not shown) is attached to the fluid delivery system 646. Alternative fluids include air or nitrogen.

The grooves or channels 640 in the disk engagement portion 638 of the lift saddle 620 are designed to maintain a pair of disks in gap merge orientation. Each channel 640 is formed by the inside surface 648 of the saddle 620 side wall and by the side wall 650 of the center wedge. These two surfaces are formed at an angle that approximates the angle of the chamfer 652 on the outer perimeter edge of a disk. The flat base portion 654 of the channel 640 approximates the width of the disk, less the chamfer portion. In one embodiment, the disks may be 95 millimeter in diameter and 0.050 inches thick, with a 45-degree chamfer. It should be appreciated that the present invention can be configured to work with a variety of disk sizes.

Four cassettes 610 are positioned at work station locations 610, 612, 614, 616. Additional work stations could be added or fewer could be employed. The cassettes contain a plurality of disks positioned in a single row, axially aligned. The disks are also preferably arranged in gap merge orientation (FIG. 9). With 95 millimeter diameter disks having a thickness of approximately 0.050 inches, the space or gap between the disks comprising a pair may range from about 0.025 to 0.035 inches, with the preferable gap being about 0.035 inches. This gap allows a disk pair to utilize cleaning and scrubbing equipment originally designed and built to handle a single double-sided disk, without significant modifications. The cassettes 610 are also positioned in an indexing mechanism, not shown, which moves or advances the cassette incrementally over the lift saddle 620 after a processed pair of disks is returned to the cassette such that the next pair of disks can be removed and processed.

One embodiment of the demerge saddles 626 is best seen in FIGS. 133 and 134. The demerge saddle 626 includes a main body portion 656 and a disk engaging portion 658. The disk engaging portion 658 comprises a single groove or channel 660 formed by two angled side wall surfaces 662 and a flat bottom portion 664. The demerge saddle also includes a plurality of high pressure jets or nozzles 666 along the center of the flat portion 664. The nozzles 666 receive deionized water or other suitable liquid through a fluid delivery system 668.

In unison, the servo actuators 632 move the demerge saddle 626 and lift saddle 620 into a position of engagement with a pair of disks in each cassette 610. The lift saddle 620 and demerge saddle 626 then move vertically upwardly, in unison, to remove the pair of disks from the cassette and move the pair to a disk scrubbing zone 670. Alternatively, the pair of disks may be transported to the scrubbing zone 670 solely by the lift saddle 620. The demerge saddle 626 may remain positioned above the scrubbing zone 670 and engage the disk pair following scrubbing for purposes of stabilizing and demerging the disks prior to the lift saddle returning the pair to the cassette.

A fine mist may be applied throughout the scrubbing zone in order to form a liquid layer on the L-side of each disk prior to changing the orientation of the disk pair into a contact merge orientation. The mist may be continuously applied or intermittently applied as disk pairs move from the cassette to the scrubbing zone. The liquid layer assists in adhering the disks together so there is no relative movement between them.

With reference to FIGS. 129, 130 and 135, as a pair of disks enters the disk scrubbing zone 670 from below by way of the lift saddle 620, the upper outer perimeter edges of the disks are engaged by a pair of edge rollers 672. The edge rollers 672 have angled inside walls 674 and a flat base portion 676. The edge rollers 672 partially convert the orientation of the disk pair into a concentric contact merge orientation by forcing the top portion of the disks together. A pair of scrubbing brushes 678 are positioned on each side of the disk pair, but initially spaced away from the disk pair in order that the upward movement of the disk pair is not impeded.

As noted above, it should be appreciated that one benefit of the present invention is achieving scrubbing and cleaning of two single-sided disks utilizing equipment designed and built to handle one double-sided disk. In this context, a conventional 95 millimeter double-sided disk generally has a thickness of approximately 0.050 inches, while a single-sided disk of the same diameter generally has a thickness of approximately 0.050 inches (or 0.10 inches for a pair). These dimensions become relevant when determining the permissible gap between two single-sided disks in a gap merge orientation. For example, two single-sided disks must travel vertically from the cassette 610 to the scrubbing zone 670 and between the scrubbing brushes 678. To avoid significant modifications to existing double-sided disk manufacturing equipment, the pair of disks must travel in a space created for a single double-sided disk. Therefore, the gap or space between the two single-sided disks must not be so large as to create an interference between the disks and the lift saddle on one hand, and the existing equipment on the other hand. An acceptable sized gap may range between 0.025 inches and 0.035 inches for disks having a thickness of 0.050 inches. Therefore, the overall thickness of the disk pair is no greater than approximately 0.135 inches, which permits existing processing equipment to be used. It should be appreciated that the spacing between the disks may vary depending upon the thickness of the disks.

The pair of rotating brushes 678 are brought in contact with the outward facing surfaces (R-side) of each disk in each pair of disks. This opposed and inward movement of the brushes 678 fully removes the spacing between the disks, as the lift saddle 620 and demerge tool 626 simultaneously disengage the pair of disks. In the embodiment shown in FIG. 129, two brushes are utilized for each disk pair, one on each side of the pair. In other embodiments, more than one brush could be used on each side of the disks. The brushes 678 rotate upwardly, as shown in FIG. 135, which forces the disks against the edge rollers 672 and secures the disks without the support of the lift saddle 620. The brushes also apply an inwardly directed force against the R-side surface of each disk. In one embodiment, the inward pressure applied by the brushes is between 20 and 30 pounds per square inch, and preferably 25 pounds per square inch. The edge rollers 672 are driven to impart rotation to the disk pair during scrubbing. In unison, the edge rollers 672 rotate the pair of disks and the brushes 678 rotate to scrub the rotating disks. Cleaning solution is applied to the disks in a manner known to those of skill in the art. The upward rotation of the brushes 678 against the disks maintains the concentric contact merge orientation of the disks against the edge rollers 672. The edge rollers 672 also maintain the disks in a concentric merge orientation due to the profile of the walls 674 and base 676. More precisely, the angled walls 674 correspond to the chamfer 652 of the outer edge of the disks and the width of the flat portion 676 corresponds to the thickness of the disk pair, less the chamfer portion 654. The flat bottom portion 676 also prevents lateral motion of one disk relative to the other.

Relative movement or slippage between the disks during cleaning and scrubbing can result in non-uniform and unacceptable cleaning, requiring the disks to be recleaned or scrapped. Therefore, a certain amount of stiction between the disks is desired to prevent such relative movement or slippage. Submerging the disk cassette in deionized water or another appropriate liquid creates a liquid film between the concentric contact merge disk pair which acts as an adhesive to hold the disks together without relative motion or slippage. The relative flatness of the unprocessed L-side surface of the disk, or substrate disk, also enhances stiction, as does the inwardly and opposed forces applied against the disks by the scrubbing brushes.

When scrubbing is complete, the servo actuators 632 move the lift saddle 620 and demerge saddle 626 into close proximity with the disks. FIG. 135 shows the lift saddle 620 and demerge saddle 626 removed from the scrubbing zone, such as during cleaning and scrubbing. FIG. 136 shows the lift saddle 620 positioned proximate the disk pair just before the scrubbing brushes 678 release the disks and move away. The demerge saddle 626 is similarly positioned proximate the upper perimeter edge of the disks. An important aspect of the transfer of disk support from the brushes 678 and edge rollers 672 to the lift saddle 620 and demerge saddle 626 is that the outer perimeter of the disks be positioned within the channels 640 and 660 of the lift saddle and demerge saddle such that when the brushes 678 disengage the disks, the disks cannot be dropped. Rather, the disks are captured within the channels 640 and 660.

At this point, the disk pair is returned to a gap merge orientation. This is necessary in order that the lift saddle 620 can secure the pair of disks and return them to the cassette 618, which is configured to receive disk pairs in a gap merge orientation. Initially, before the lift saddle 620 and demerge saddle 626 move towards each other the last incremental amount, shown in FIG. 136, to physically engage and secure the disk pair, water jets 644 and 666 are activated and directed at the interface 680 between the disks to force the disks apart. Facilitated by the groove 682 created by the inside chamfer on the perimeter edge of the disks, the jets will create approximately a 0.005 inch gap between the disks. Using this nozzle, a water pressure of 60 pounds per square inch is adequate to overcome stiction and separate the disk pair. The center wedge 642 of the lift saddle 620 will then mechanically increase the separation as the lift saddle and demerge saddle move toward each other and physically engage the disk pair. The beveled or angled sides of the wedge will force the disks into the two channels 640 of the lift saddle and the disks will be demerged. In a second embodiment, the demerge saddle 626 may include a wedge to assist in mechanical separation of the disk pair. In tandem, the servo actuators 632 move the lift saddle 620 and demerge saddle 626, together with gap merge disks, back to the cassette 618. Each cassette is then indexed to a new position to allow the process to be repeated with a new set of disk pairs. Alternatively, the demerge saddle 626 may remain in place, or withdraw slightly, while the lift saddle 620 returns the disks to the cassette 618.

The dual servo actuator systems 632 are programmable, accurate and offer simultaneous handling of disk pairs throughout the process.

The scrubbing process is only a part of the overall cleaning of the disks or substrate disks. Also, cleaning may occur at one or more times during the overall manufacturing process. For example, cleaning may follow data zone texturing or laser zone texturing. Typically, before scrubbing, the disks are initially subjected to a pre-soak in soapy water to loosen and remove organic materials and other particulates. While in the pre-soak, the liquid is subjected to ultrasound which turbulates the liquid and assists in removing unwanted particulate. The process is conducted while the disks are in cassettes. Next the disks, still within the cassettes, are subjected to a rinse of clean water. Scrubbing, as described above, typically follows the initial soak and rinse. Following scrubbing, the cassettes and disks proceed through a series of additional rinse steps and are then subjected to a drying cycle. The drying is preferably performed in a spin dryer, with the disks still in the cassettes. It should be appreciated, in order to achieve optimum drying, the disks should not be in a contact merge orientation, rather, at a minimum they should be in a gap merge orientation. Moreover, placing the disk pairs in a gap merge orientation may be efficient for processing purposes because the next process may preferably utilize disks in a gap merge orientation. Accordingly, placing the disks in a gap merge orientation following cleaning may not require reorienting the disks for the next process.

F. Simultaneous Lubrication of Single-Sided Hard Disks

At some point during the manufacture of hard memory disks, the disks are subjected to a lubrication. FIG. 137 shows a single row of disks D axially aligned in a cassette 710 or other suitable container. Although the disks are illustrated in a gap merge orientation, they could be equally spaced within the container or in some other orientation. As the lubrication process typically follows sputtering, the disks would likely exit the sputtering process in either a gap merge orientation or in an orientation with some space between the disks. This is because the sputtering process subjects the disks to significantly elevated temperatures which could cause the disks to physically weld themselves together if they were in contact. The gap spacing may vary depending upon the thickness and size of disks as would be appreciated by a person of skill in the art. In the context of 95-millimeter diameter disks having a 0.050 inch thickness, the gap between a pair of disks in gap merge orientation is preferably between 0.025 inches to 0.035 inches, although this dimension may vary from this range. With disks of this size, a gap space in this range allows pairs of disks to utilize disk manufacturing equipment designed and configured for handling one double-sided disk with limited, if any, modifications.

A mandrel 712 engages all of the disks D in a cassette 710 via the center aperture 714. As shown in FIGS. 137-139, one embodiment of the mandrel 712 comprises an elongate member 716 extending from a support post 718. The elongate member 716, shown in FIGS. 139 and 141, is M-shaped to provide two contact points 720 and 722 with the interior edge 724 of the disks. The two side walls 726 and 728 of the elongate member provide structural rigidity. Alternatively, as shown in FIGS. 137 and 138, the elongate member 716 may be V-shaped by eliminating the two side walls. In either case, the two contact points 720 and 722 remain. The elongate member 716 is preferably disposed at an upwardly inclined angle from the main support post. The preferred angle of incline is approximately two degrees above horizontal. The inclined angle helps reduce lubrication ripples on the surfaces of the disks which can occur during draining of the lubricant from the tank or removal of the disks following lubrication.

As seen in FIGS. 137 and 138, a row of teeth 730 are disposed on the upper two edges of the mandrel with each row comprising a small tooth 732 disposed between a pair of larger teeth 734. This arrangement of teeth maintains a gap merge orientation of the disks. As shown in FIGS. 137-142, the elongate portion 716 of the mandrel 712 is inserted through the center aperture 714 of the disks and accurately positioned such that the two rows of teeth 730 align with the spaces between the disks. More specifically, there is a larger space between pairs of disks than between the two disks of each pair. The small teeth are aligned with the gap formed between the disks comprising each pair and the large teeth are aligned with the space between each pairs of disks. Once fully and accurately positioned inside the apertures of the disks, the mandrel 712 raises until the interior edge 724 of each disk is positioned in the channel 736 formed between the successive teeth 730. As shown in FIG. 140, further lifting raises the disks from the cassette 710. The pairs of disks shown in FIGS. 137, 138, 140 and 142 are in a gap merge orientation (see FIG. 9.)

The mandrel 712 then moves to a position above a lubrication tank 740 and lowers itself and the disks into the tank. In the preferred embodiment, lubricant L then fills the tank until the disks are completely submerged (FIG. 143). After an appropriate amount of time passes, the lubricant is removed from the tank 740 and the mandrel 712 lifts the now lubricated disks out of the tank. In the preferred embodiment, the mandrel then moves to a second position at the lubrication workstation and returns the disks to a cassette as shown in FIGS. 144 and 145. As addressed below, a variety of different cassettes could be used to receive the lubricated disks. For optimum efficiency, the disks should be transferred to a cassette configured to position the disks in the orientation needed for the next process. Depending upon the orientation desired for subsequent processing, the cassettes could be configured to position the disks in a contact merge orientation, gap merge orientation or some other orientation. Of course, the disks may also be returned to the cassette in which they arrived. As should also be appreciated, multiple mandrels working in cooperation with multiple lubrication tanks can be employed simultaneously to increase throughput of the system.

A typical lubricant is perfluoropolyethers (PFPE). With this lubricant, and with 95 millimeter diameter disks having a 0.050 inch thickness, the disks remain in the lubricant for approximately 30 to 120 seconds. The type of lubricant and length of time the disks are exposed to the lubricant may also vary depending upon the desired final lubrication on the disks and the size of the disks. As the lubricant drains from the tank, a layer of lubricant provide lubrication to the disks and remains on the surfaces of the disks. The layer of lubricant will primarily serve as protection for the disk surfaces during operation of the disk drive. However, it can also advantageously act as an adhesive on the L-side of disk pairs to maintain a contact merge orientation between pairs of disks during subsequent processing. Tape burnishing or testing are examples of potential subsequent processing which could require contact merge orientation where the adhesive characteristics of the lubricant may be advantageously used.

As should also be appreciated, lubricant may be added to the tank following placement of the disks in the tank, or the lubricant may be present before the disks are added. If the liquid is in the tank when the disks are added, the rate at which the disks descend into the liquid should be controlled to prevent the liquid from dislodging one or more disks from the mandrel or from unintentionally merging pairs of disks into a contact merge orientation. If a pair of disks were to shift into a contact merge orientation upon entry into the lubricant, the contact orientation may prevent lubricant from contacting all or part of the contacting surfaces of the disks.

As discussed above, the cassette for receiving the now lubricated disks may vary, depending upon the subsequent processing for the disks. In the preferred embodiment, the post-lubrication disk receiving cassette will be configured for concentric contact merge orientation of the disks because the next process would typically be tape burnishing, which is optimally performed on concentric contact merged disks. Although the concentric contact merge orientation may be accomplished at the tape burnishing station rather than at the lubrication station, it is more efficient to place the disks in a concentric contact merge orientation when returning them to a cassette following lubrication, rather than repositioning the disks again at the tape burnishing station. Therefore, the post-lubrication receiving cassettes should be configured to position the disks in the orientation required by the next process.

An alternative to the V or M-shaped mandrel design is a three-prong mandrel design shown in FIGS. 148-151. The three-prong mandrel 750 applies equal contact pressure at three different contact points along the inner circumference of a disk as opposed to two-prong mandrel designs. The three-pronged mandrel 750 may be configured to create equal spacing between the disks, a gap merge orientation, or any other desired orientation. As previously mentioned, when disks are closely spaced on a mandrel, a capillary action or wicking can occur between disks, particularly if the disks are in closely spaced pairs in a gap merge orientation. This phenomenon is based upon how closely adjacent disks are positioned to each other, not whether the disks are in a gap merge or equal spacing orientation. Therefore, for at least the lubrication process, it is believed that an orientation of equally spaced disks is preferred over a gap merge orientation. The embodiment illustrated in FIG. 150 is configured for equal spacing between disks. In the case of 95 millimeter diameter disks having a 0.050 inch thickness, the space between each disk as shown in FIG. 150 is approximately 0.075 inches.

As shown in FIGS. 148, 149, the three-pronged mandrel 750 has three rows of teeth 752, 754, 756. The teeth 758 are created by V-shaped notches 760. When handling disks having a 0.050 inch thickness, the distance $W_1$ between the apex of adjacent teeth 758 (or between the apex of adjacent notches), as shown in FIG. 151A, is preferably 0.125 inches. It should be appreciated that the notches 760 or teeth 758 may be cut in different sizes to accommodate different thickness disks. The notches are formed on each of three rows 752, 754, 756 of the mandrel 750 to match the inner diameter radius of the disk as shown in FIG. 149. This creates three contact points, 762, 764, and 766 on the disk, rather than two contact points created with a V or M shaped mandrel. In one embodiment, the outer rows of teeth 752 and 756 are formed at a forty-five degree angle relative to the middle row 754. The mandrel is preferably disposed at an angle θ, shown in FIG. 151A, preferably approximately two degrees. This helps reduce ripples of lubricant forming on the disk surfaces when the lubricant drains from the disks. The preferred angle of each notch 760 is 60 degrees as shown in FIG. 151A. The angle of the notch can also be altered to complement a chamfer formed on the inside edge of the disk at the central aperture. For example, the chamfer angle and notch angle can both be formed at sixty degrees to give enhanced stability to the disks.

Because of the incline or tilt angle of the mandrel, in order to maintain vertical orientation of the disks on the mandrel, the center row of teeth 754 must be slightly forward of the outer rows of teeth 742, 756. This is seen in FIG. 151B. In addition, for optimum stability, the notches on all three rows of teeth should be rotated forward, relative to the mandrel, by the same angle as the tilt angle. The tilt angle can be between 0.5 and 10 degrees above horizontal.

In the two-blade configuration, the disks are more susceptible to swinging on the mandrel 712 and potentially dislodging and falling. The added third or center row of teeth 754 in the three-prong mandrel 750 inhibits disk swing and reduces the risk of the disks coming into contact with each other during processing by more rigidly securing the disks on the mandrel. The more rigid design geometry of three-point contact also inhibits disk attraction due to the capillary action created as the lubricant drains away from between the disks.

Following lubrication, the newly lubricated disks are returned to a cassette. As previously mentioned, the post-lubrication cassette may be configured to hold the disks in any desired orientation. As the next process following lubrication is typically tape burnishing, in which the disk pairs are preferably in concentric contact merge orientation, the post-lubrication cassette is preferably configured to position the disk pairs in a concentric contact merge orientation.

G. Handling Transporting and Merging Single-Sided Hard Disks Into Concentric Contact Merge Orientation Using Cassettes During the manufacture of single-sided hard memory disks, it will be desirable to reposition pairs of disks into concentric contact merge orientation. For example, following lubrication, in which the disks are spaced apart, it is desirable to position the disk pairs in a concentric merge orientation. This is because the process which typically follows lubrication is tape burnishing. In tape burnishing, the disks are preferably in a concentric contact merge orientation. This change in disk orientation may be accomplished with a suitably configured cassette.

Turning to FIGS. 152-161, one embodiment of a post-lubrication disk receiving cassette 780 is shown. The disk cassette 780 comprises eight pieces. These include two end walls 782 with six apertures 784 for receiving securing elements 786, two base members 788 which interconnect the two end walls 782 and are secured to the end walls through apertures 790 which align with securement apertures 784 in the end walls 782, and four side walls 792 which also interconnect the end walls 782 and are secured to the end walls 782 through similar securement apertures 794. In this version of this embodiment, the four side walls 792, the two end walls 782 and the two base members 788 are identical. This provides modularity and interchangeability. For example, the interchangeability allows the disk manufacturer to maintain an inventory of the side walls 792 to replace individual side walls damaged or worn out during use. The modularity allows side walls configured to hold disks in different orientations to be substituted for each other. Thus, in one embodiment the cassette may be configured to hold disks in a contact merge orientation, and in another embodiment the side walls may be substituted for side walls to hold the disks in a gap merge orientation.

The cassette 780 and its component pieces are preferably made of plastic by injection molding processes. Different plastics, having different characteristics, can be selected depending upon the environment in which the cassette will be used. High performance plastics are preferred. In typical environments such as texturing, cleaning, lubricating, servo writing, testing and general handling of disks around the manufacturing facilities, the plastic may be polyethylene terephthalate (PET), polybutylene terephthalate (PBT) or polyesteresterketone (PEEK). PBT is the easiest to mold, but has the least desirable abrasion characteristics. PET provides better abrasion characteristics. PEEK provides the best abrasion characteristics, is the most durable and can withstand the highest temperatures. It is also the most expensive of the three. It would also be possible to cast, forge, etch or machine the component pieces from metal, although the cost would likely be prohibitive.

As illustrated in FIG. 161, the side walls 792 may have an octagonal cross-sectional shape. A row of ribs 796 is disposed along one side of the side wall for engaging disks, as is shown in FIGS. 152, 154, 155 and 159. In this embodiment, the ribs 796 have two side surfaces 798, 800 which form channels or grooves 802 for receiving the disks. The grooves 802 are designed to position the pairs of disks in concentric contact merge orientation. The two surfaces 798, 800 are formed at different angles. As shown in FIG. 160, the lower side walls 798 form a first angle of 90 degrees. The 90 degree angle of the lower side walls 798 complement the chamfered outer edges of disks, formed at 45 degrees. These angles may change to accommodate different chamfers. The upper side wall 800 forms an angle of 60 degrees. The 60 degree angle formed by the upper side walls 800 creates a funnel-like opening that facilitates merging of a pair of gap merge disks to a pair that is in a contact merge orientation. These angles may also change to accommodate different sized disks. The upper side walls 800 of each rib 796 also converge to create a ridge line 804 which forms the apex of each rib. Each rib also has an angled front and rear surface 806. The width of the flat base portion 808, together with the incremental additional width provided by the angle of the lower side walls 798, correspond to match the thickness of two disks. Thus, each pair of adjacent ribs 792 hold a disk pair in concentric merge.

The merging of pairs of disks by the configuration of the side walls of a cassette is illustrated in FIGS. 162 and 163. For simplicity in illustration, the side walls of the ribs 796 are depicted as only having one surface 800. Lower surface 798 is not shown. FIG. 162 is a top view, looking down from the top of a cassette at the perimeter edge of a pair of disks D. The chamfer of the disks is designated C in the figures. FIG. 163 is a front view showing the disks moving vertically downwardly into a cassette with ribs 796 positioned behind the disks. The distance $W_2$, shown in 162A, between the ridge line 804 of two adjacent ribs, is designed to be wider than the thickness of two disks in a gap merge orientation. Thus, if the disks are 0.050 inches thick and the gap is 0.035 inches thick, the distance $W_2$ should be 0.135 inches or wider.

In operation, the inwardly angled surfaces 800 facilitate movement of the disks toward each other as the disks are lowered into the cassette and contact the surfaces 800. Thus, as the mandrel 712 or 750 lowers the lubricated disks into the cassette 780, the side walls 800 of each side wall 792 act to force the disks together. The disks will slowly move into a concentric contact merge orientation, shown in FIGS. 162C and 1631C, as they are lowered into the cassette. Once the disks become fully seated in the cassette, the mandrel can be withdrawn from the center apertures of the disks.

In an alternative embodiment, shown in FIGS. 163 and 164, the ribs 796 may also be angled at their leading edges to create a widened entry way 810 not present in the embodiment of FIGS. 162 and 163. The widened entry way formed by the beveled surfaces 812, 814 of each rib 796, further facilitates merging of disks. This widened entry way 810 facilitates movement of two disks into each channel 802 to ensure that disks spaced apart on the mandrel 712 or 750 properly realign into pairs of contact merge disks, with one pair of disks in each channel 802.

In much the same way, the pairs of gap merge disks shown in FIGS. 140-143 can be repositioned into a concentric contact merge orientation as shown in FIGS. 145-147. The rows of ribs 796 disposed along the inside of the cassette 710 are sized to force the disks into a contact merge orientation. The ribs have angled side walls 800 which gradually force the disks into contact, which is illustrated in FIGS. 146 and 147.

The cassette 780 may be used in various manufacturing processes where pairs of disks are removed from the cassette one pair at a time for processing and returned to the cassette following processing. As each pair is returned, the position of the cassette relative to the processing equipment may be adjusted to facilitate removal of the next pair. Adjustment of the position of the cassette may be accomplished by placing the cassette in a guide or holder which is preprogrammed to adjust the position of the cassette the desired incremental amount. Alternatively, the cassette may include one or more reference or index marks which are used to adjust and align the cassette relative to the processing equipment. The index mark may be a hole or mark on the cassette body or, with available optical systems, an existing feature of the cassette, such as a corner of the end wall or other edge, may serve as the reference mark.

It should also be understood that the present invention will also work with one disk pair at a time. There is no reason, other than for greater throughput, that requires an entire cassette load of disks be merged simultaneously. The cassette design would remain unchanged. Instead of using a mandrel as shown in FIGS. 137 or 148, a mechanism for handling single-sided disk pairs (2 disks) may be used. Such a disk pair mechanism may include a two-disk mandrel design and a two-disk saddle. The saddle is positioned beneath the open bottom of the cassette and moves vertically through the cassette to a position above the open top of the cassette. In its raised position, the lift saddle may receive a pair of disks from a two-disk mandrel and lower them into the cassette, or the mandrel may simply lower the disks into the cassette without use of the lift saddle.

H. Merge Nest to Facilitate Merging of Single-Sided Hard Disks

Merging of disks may be further facilitated by use of a merge nest. A merge nest works in association with a disk cassette and assists in merging pairs of disks into a contact merge, gap merge or concentric contact merge orientation.

Turning to FIGS. 166 and 167, a cassette platform or merging station 850 is shown. The platform is configured to receive a disk cassette or disk carrier 852. Cassettes configured for contact merge orientation of disk pairs are shown in FIGS. 167 and 168. These disk cassettes typically have an open top 854 and open bottom 856, two side walls 858 with grooves or channels 860 for holding a plurality of disks in a parallel axial alignment and in concentric contact merge orientation, a pair of end walls 862 with U-shaped openings 864 for accessing the disks. The platform 850 has a generally rectangular channel 866 into which the bottom portions 868 of the cassette side walls 858 and end walls 862 are seated. The outer end walls 870 and side walls 872 of the platform support the cassette. In addition, the platform side walls may include elevated portions 874 configured, for example, with a beveled or sloped portion 876, to match the configuration of the exterior side walls 858 of the cassette and to provide added stability during processing operations.

The present invention also utilizes a nest or multi-disk merge saddle 880 having an arcuate shaped upper surface 882 to assist in merging the pairs of disks and in seating the disks in a cassette. The nest is shown in FIGS. 166, 167, 174 and 175. The shape of the curved upper surface preferably matches the radius of curvature of the disks. The nest 880 is positioned in the center area of the platform 850 and, in one embodiment, below the open bottom of a cassette seated on the platform. In this same embodiment, the nest 880 is connected to an actuator 884 which moves the nest vertically, through the bottom opening of the cassette, between a first retracted position (FIG. 170) and a second extended position (FIG. 175). Grooves 886 are formed on the upper surface 882 of the nest are dimensioned to support a pair of disks in each groove (FIGS. 166 and 172-174). In addition, the grooves are formed by a row of teeth 888 having angled side walls 890. The angled side walls 890 create a taper to the channel 886 such that each channel is wider at the top than the bottom. If the objective is to create a concentric contact merge between pairs of disks, the width of the bottom of each groove 886 corresponds to the thickness of two disks. In operation, as each pair of spaced disks is lowered onto the nest 880, the side walls 890 of each tooth 888 will force the two disks into contact as they are lowered onto the nest (FIGS. 172, 173). In the preferred embodiment, the angle formed by each pair of side walls 890 will match or be slightly wider than the chamfer formed at the outer perimeter edge 892 of the disks.

In operation, a mandrel or similar transport device (not shown) delivers a plurality of disks to a cassette 852 seated on platform 850. Initially, the nest will rise through the open bottom of the cassette to a position above the bottom of the cassette. (See, FIG. 175.) As the mandrel lowers the disks, and depending upon the relative position of the nest 880, the disks may contact the nest before contacting the side walls of the cassette, or vice versa. For example, if the nest is relatively high, the disks may contact the nest before contacting the side wall of the cassette or, if the nest is relatively low, the disks may contact the side walls of the cassette first. In the preferred embodiment, the disks will contact the platform first. In either case, the grooves in the nest either initiate the desired merge orientation by causing the lower portion of the disks to merge into the desired orientation or continue the merge process initiated by the similarly configured grooves 860 on the side walls of the cassette. Once the disks are fully engaged by the nest, they should be independently supported in a vertical orientation, allowing the mandrel to disengage. Disks in a contact merge orientation are shown in FIGS. 171 and 173.

In one embodiment, the nest and mandrel are lowered relative to the stationary cassette until such time as the disks engage the grooves 860 on the side walls of the cassette. When the disks are sufficiently stabilized, the mandrel may be removed. Alternatively, once the disks are sufficiently stabilized in the nest but not fully seated in the cassette, such as shown in FIG. 175, the nest may lower without the mandrel until the disks are fully seated in the cassette. In a second embodiment, the nest 880 may remain in an elevated position, or may be permanently fixed in an elevated position. In this case, the disks are not fully seated in the cassette, but are adequately supported to permit removal of the mandrel. When the cassette is lifted off the platform, for example, to transport the cassette to another processing location, the disks become fully seated within the cassette. In either case, the nest facilitates the desired orientation change from the positioning of the disks on the mandrel to the desired positioning in the cassette. When the cassette is lifted off the platform, the disk become fully seated in the cassette.

The present invention may also be utilized to position disks in a gap merge orientation or to alter the size of the gap, such as by repositioning the disks from a first gap merge orientation to a second and different gap merge orientation. In this case, the curved upper portion 882 of the nest will have a configuration similar to that of the side walls of a gap merge cassette which will receive the disks. As shown in FIG. 169, the inside surface of the cassette side walls include a row of alternating large teeth 894 and small teeth 896 which define the grooves 860. Thus, the nest 40 will have a pattern of complementary alternating large and small teeth 898 and 900, respectively. The configuration creates two grooves 902, 904 between adjacent large teeth and on opposite sides of the small teeth as shown in FIGS. 176, 177. The disks are positioned relative to the nest such that the large teeth will initially separate disks into pairs as the disks are lowered onto the nest. The side walls 906 of the large teeth will merge the disks into pairs and into a gap merge orientation (FIG. 177). The small teeth 900 will maintain desired separation.

I. Simultaneous Tape Burnishing of Two Single-Sided Hard Disks

The process of burnishing typically follows lubrication. Burnishing is preferably performed on pairs of disks positioned in a concentric contact merge orientation. This is due to the fact that opposed rollers with roughened tape are brought to bear against the outwardly facing, R-side, surfaces of the two disks in the disk pair in order to burnish the surfaces. With reference to FIGS. 178-181, the general sequence of disk handling and transport is shown for the tape burnishing process. In one embodiment, a cassette 910 of disks is deposited at the tape burnishing station with the disk pairs in a concentric contact merge orientation. Positioning the disk pairs in contact merge orientation most logically occurs in post-lubrication handling at the lubrication station, described above. However, it should be appreciated that the disks may arrive at the burnishing station positioned in other orientations and repositioned into a concentric contact merge orientation at the burnishing station. Similarly, while it is preferred that the disk pairs undergo tape burnishing while in a concentric contact merge, it is within the scope of the invention that tape burnishing may occur in other orientations, such as spacer merge, provided the disks are adequately supported such that the burnishing process is uniformly and consistently applied to the surface of both disks in a disk pair.

A lift saddle 912 positioned beneath the cassette 910 is utilized to remove a pair of disks from the cassette. As shown in FIGS. 182-186, the lift saddle comprises a main body 914 with an arcuate or curved shape disk contacting surface 916. (FIG. 182). The arcuate shaped disk contacting surface includes a single groove 918 disposed between raised side walls 920. (FIGS. 184-186.) The groove is dimensioned to hold a pair of single-sided hard memory disks in concentric contact merge orientation. The body of the lift saddle is provided with internal cavities 922 to engage the distal ends of lift rods (not shown). The lift rods move the lift saddle between a first position beneath the cassette and an upper position, shown in FIG. 178, in which the disk pair are accessible by other handling and transport mechanisms. The channel or groove 918 has a flat bottom portion 924 (FIG. 183) which engages and supports the outer perimeter edge of the two disks. The angle of the side walls is preferably oriented to correspond with the chamfer at the outer perimeter edges of the disks and to maintain the vertical alignment of the disk pair.

With reference to FIGS. 178 and 179, following removal of a disk pair from the cassette, the disk pair is engaged by a plurality of concentric contact merge rollers 926. In one embodiment, the rollers move radially inwardly and outwardly to engage and disengage the outer perimeter edges of the two disks at four uniformly spaced locations, for example, 90 degrees apart. One embodiment of a merge roller is shown in FIGS. 187 and 188. The rollers are configured to form a single groove or channel 928 between two angled side walls 930. Like the lift saddle, the roller has a flat bottom portion 932 which engages the outer perimeter edges of the two disks. The channel formed by the side walls 930 and bottom portion 932 maintains the disk pair in a concentric contact merge orientation.

Once the disk pair is engaged by the four merge rollers, the lift saddle 912 disengages and the disk pair is moved to a second location. At the second location, shown in FIG. 180, the pair of disks are engaged at their center aperture by a spindle assembly 934. The spindle assembly securely engages the disks along the inside edge 936 of the center aperture. The spindle is designed to impart a rotation to the disks during the tape burnishing process. Following engagement by the spindle, the four merge rollers disengage.

A schematic diagram of four burnishing rollers 938 engaging opposite sides of a conventional two-sided disk is shown in FIG. 189. In comparison, FIGS. 181 and 190 show four tape burnishing rollers 938 engaging the R-side of a pair of concentric contact merge disks. The prevent invention allows equipment built for burnishing one double-sided disk to burnish two single-sided disks simultaneously. A tape or rough woven fabric is positioned around the rollers and provides the necessary roughness to burnish the surfaces of the disks for purposes of removing asperities and excess lubrication. The rollers apply a force of up to four pounds against the R-side surface of the disk pair from opposite directions.

For uniformity in the results of the tape burnishing process, it is preferred that there be no relative movement between the two disks of the disk pair during the burnishing. Lubricant, previously applied to the disk surfaces, acts as an adhesive between the L-sides of the contact merge disks. FIG. 193 shows, in concept, the lubricant fluid L positioned between the L-side surfaces of the disks prior to repositioning the disks in a contact merge orientation. Testing of different lubricants, some with adhesives added to the lubricant, have yielded good results. One solution used is a mixture of AM3001 Lube, X1P additive and PF5060 solvent. Other lubricants, such as Z-Dol or Z-Tetrol, with and without additives, may yield similar positive results.

Following tape burnishing, the disk pair may remain in a concentric contact merge and are returned to a cassette. The merge rollers 926 engage the outer perimeter edges of the disks which allows the spindle assembly 934 to disengage. The merge rollers transport the disk pair to the lift saddle 912 where the lift saddle places the disks in a cassette. The orientation of the disk pair could also be changed, depending upon further processing of the disk pair. However, if the next process requires the disks to be in a concentric contact merge, it is preferable not to demerge the disk pair but, instead, to transfer the disk pair to the next processing station while maintaining their concentric contact merge orientation.

J. Simultaneous Testing of Two Single-Sided Hard Disks

At many times and/or locations within the process of manufacturing single-sided disks, it may be desirable to perform testing on the disks to ensure the manufacturing process is occurring properly. One location where testing may occur is following tape burnishing, after processing is substantially completed. In some embodiments, tape burnishing may be the final manufacturing step and, therefore, testing is necessary to verify the disks are made correctly. Testing typically includes a glide test which determines the presence of any asperities which could adversely effect the flying of the head/slider assembly. Testing also includes certification testing which performed read and write operations on the disk to determine if there are defects which would preclude use of the disk.

The mechanical process steps for testing are shown in FIGS. 194-198. It is preferable that the disks arrive at the testing station in a concentric contact merge orientation. Therefore, if the testing follows tape burnishing, there is no need to reposition the disk pairs; the disk pairs will be positioned in concentric contact merge orientation. As shown in FIGS. 194 and 195, a vacuum gripper 950 is used to engage the upper outer perimeter edge of a disk pair. One embodiment of the vacuum gripper is shown in FIGS. 200-203. The vacuum gripper comprises a main body 952 with an arcuate shaped disk engaging portion 954. The arcuate disk engaging portion is formed by a single groove or channel 956 configured to hold a pair of disks in concentric contact merge. The channel has a pair of angled side walls 958 and a flat bottom portion 960. A pair of bores or cavities 962 in the main body communicate with the bottom of the channel and form a manifold or vacuum system 964 for the vacuum capabilities of the gripper. In one embodiment the vacuum gripper is constructed from polyesteresterketone (PEEK). The vacuum pressure applied to engage and support a pair of disks of 95 millimeter diameter and 0.05 inches in thickness is between 5 and 20 inches of pressure.

The vacuum gripper removes the disks from a cassette 966 one pair at a time. The vacuum gripper pivots the orientation of the disks 90 degrees (FIG. 51) and transports the disk pair to a second location as shown in FIG. 196. At the second location, the disk pair is engaged by a spindle assembly 968 at their center aperture 970. Following engagement by the spindle assembly, the vacuum gripper disengages and is removed from interference with the testing procedures.

A conventional testing apparatus 972 for a single double-sided disk is shown schematically in FIG. 191. For comparative purposes, FIG. 192 shows the same equipment being used with a pair of concentric contact merge disks. FIG. 198 also shows the same test equipment 972 positioned for simultaneously testing two concentric contact merge disks. The disks are rotated by the spindle assembly and the equipment conducts glide tests and certification tests. At the conclusion of the testing operation, the test apparatus retracts and the disk pair is engaged by the vacuum gripper. The spindle assembly disengages and the vacuum gripper returns the pair of disks to the cassette and engages the next pair of disks in the cassette, wherein the process repeats itself until all disk pairs within the cassette are tested. Disks that fail the test procedures are scrapped.

K. Simultaneous Servo-Writing of Two Single-Sided Hard Disks

Unlike the previous process steps addressed herein, simultaneous servo-writing is optional. The servo-writing may be performed on a single disk at a time, such as after assembly in a disk drive using self-servo-writing techniques. However, simultaneous servo-writing of two disks will maintain the increased output provided by the present invention.

A servo-writer apparatus 1020 for a single double-sided disk with two functional or active surfaces, shown in FIGS. 204 and 205, simultaneously writes servo-tracks 1022 on both surfaces 1024 and 1026 of the single double-sided disk D. The servo-writer apparatus comprises two separate actuator assemblies 1028 and 1030. Typically, one actuator assembly is used to control and position the other actuator assembly relative to the surfaces of the disk. More specifically, the first actuator assembly 1028 includes a pair of transducers or read/write elements 1032 connected by actuator arms 1034 to a single pivot point or shaft 1036, with one head positioned adjacent the upper surface 1024 and the other head positioned to interact the lower surface 1026. The write element or transducer 1032 writes servo-tracks 1022 on both the upper and lower surfaces of the disk and both surfaces are active or functional for memory storage. The two transducers 1030 write the servo-tracks 1022 onto the surfaces of the disk D in an arcuate pattern as the two transducers 1030 pivot about the single axis 1034. In this arrangement, when writing servo-track data on a double-sided disk, it is critical that the two transducers 1030 share a common pivot point and move along a common arc of motion. This is because, once the disk is installed in a disk drive, the heads that will be used to read from and write to the surfaces 1024 and 1026 of the disk D will also share a common pivot point and will move in unison just like the servo-track writer. Indeed, one method of servo-track writing involves using the headactuator assembly of the disk drive to write the servo-tracks after assembly of the disk drive. This technique is known as self-servo writing. The servo pattern 1022 created on the two surfaces 1024 and 1026 of the double-sided disk is shown in FIGS. 206 and 207, respectively.

In this embodiment, the second actuator assembly 1030 includes an encoder 1040 to position the transducers 1030 of the first actuator assembly 1028 relative to the surfaces of the disk. The encoder 1040 includes a single shaft or pivot point 1042 for a pair of actuator arms 1044. A push pin 1046 is disposed at the distal end of the actuator arms 44. A voice coil motor, generally including a coil element 1048 and permanent magnet 1050, is positioned at the opposite end of the actuator arms. A scale or gauge 1052 may also be included as part of the voice coil motor. In this master/slave arrangement, the voice coil motor for the second actuator assembly 1030 causes the actuator arm 1044 and push pin 1046 to rotate about pivot point 1042. In turn, this causes actuator arm 1034 to pivot about shaft 1036 due to the contact of push pin 1046 on actuator arm 1034. This relative movement positions transducers 1032 relative to disk surfaces 1024 and 1026. Thus, the voice coil motor of the second actuator assembly 1030 indirectly positions the heads 1032 of the first actuator assembly 1028 at the proper location to create the desired servo-tracks. The first actuator assembly 1028 may also include a voice coil motor, but it would be inactive during this servo track writing operation.

Such a servo-track writing apparatus will not work for servo-track writing on a pair of single-sided disks in a merge orientation. As previously noted, FIGS. 206 and 207 show exemplary servo patterns for the upper and lower surfaces 1024 and 1026 of the single double-side disk shown in FIGS. 204 and 205. As can be seen, the patterns created by the tracks 1022 are opposite in their direction or orientation. Thus, if the same apparatus were used for writing servo-tracks on the active surfaces (R-side) of a pair of merged disks, the lower disk would not be functional in a conventional disk drive, as the servo patterns would not be positioned in a manner that could be read and understood by a conventionally mounted head disk assembly.

The foregoing problems are overcome by the apparatus and method shown in FIGS. 208 and 209. Therein, two servo-track writers 1058 and 1060 are utilized, with one being positioned for writing on the outer surface (the R-side) of the top disk 1062 and the second for writing on the outer surface (R-side) of the lower disk 1064. As can be seen, the components of the servo-track writing apparatus 1058 and 1060 are identical to those used for conventional servo-track writing on a single double sided disk except, each set of servo-track writers pivot at different locations, rather than a common location.

More specifically, as illustrated in FIGS. 208 and 209, each servo-track writing apparatus 1058 and 1060 includes a master actuator assembly 1066 for positioning a slave actuator assembly 1068 which performs the actual servo-writing. The master actuator assembly 1066 includes a positioning encoder 1070 having a single actuator arm 1072 with a push pin 1074 disposed at the distal end of the actuator arm 1072. The opposite end of the actuator arm includes a voice coil motor which directly positions the actuator assembly 1066, including pin 1074. The actuator arms pivot about a shaft 1076. The voice coil motor includes a coil 1078 and a permanent magnet 1080. The coil is energized under the direction of a controller, not shown, to position the push pin relative the surface of the disks.

The servo-track writing apparatus further includes a second actuator assembly 1084. This second or slave actuator assembly 1068 includes an actuator arm 1082 which pivots about a shaft 1084. A read/write element or transducer 1086 is positioned at the distal end of the actuator arm 1082. The transducers 1086 write the servo-tracks under the positional guidance of the encoder actuator assembly 1066. Thus, the encoder actuator assembly 1066, under the direction of a controller, not shown, move the actuator arms 1072 and push pins 1074 to position the transducers 1086 at desired locations relative to the R-side of disks 1026 and 1068. The transducers 1086 write the desired servo-tracks on the disk surfaces.

The slave actuator assemblies 1068 may also include voice coil motors, but they would be inactive during the servo-track writing procedure. In addition, it is preferred that the shafts 1076 and 1084 use air bearings rather than ball bearings. Air bearings are smoother and introduce less vibration into the actuator arms 1072 and 1082 than would ball bearings. As shown in FIG. 209, it is preferred that the disks be in a concentric contact merge orientation, although a concentric gap merge or concentric spacer merge orientation would also be successful.

An example of the servo-track pattern 1090 created by servo-track writing apparatus 1058 and an example of servo-track pattern 1092 created by servo-track writing apparatus 1060 is shown in FIG. 208. A full set of servo-track patterns 1090 and 1092 are shown in FIGS. 210 and 211, respectively. As can be seen in FIGS. 210 and 211, and in contrast to FIGS. 206 and 207, the servo-track patterns 1090 and 1092 are similarly oriented. Accordingly, the disks shown in FIGS. 208 and 209 can be used interchangeably in the same single-sided disk drive for recording because the servo-track patterns 1090 and 1092 are consistent.

In the preferred embodiment, the encoders 1070 include a laser positioning device, not shown. The laser positioning device establishes a known initial position, such as defining a crash stop for the actuator arms 1072 as a "zero" position. The voice coil motors for the encoder actuator assembly 1066, in combination with the laser positioning device, can incrementally adjust the position of the transducers 1086 to create the desired servo-track pattern. Laser position devices such as these are known to those of skill in the art. In addition, an advantage of having the second set of voice coil motors associated with the second or slave actuator assemblies 1068 is that once a sufficient number or volume of servo-tracks 1090 and 1092 are created, the encoders 1070 can disengage and move out of the way of the second actuator assemblies. The voice coil motors associated with the second or slave actuator assemblies can then position the transducers 1086 relative to the R-side surfaces of disks 1062 and 1064, utilizing the previously written servo-tracks, and fill in or create the remaining needed servo-tracks or can be used as a test or double-check of the previously written servo-tracks before removing the disks from the apparatus.

In addition to the methods and apparatus discussed above, at least two alternative methods and apparatus exist for creating servo-tracks on the R-sides of a pair of disks. In a first alternative embodiment, a template with a preformed magnetic pattern corresponding to the desired servo-track patterns is positioned on the R-side surface of each single-sided disk. An example of the magnetic pattern is the servo-track pattern shown in FIGS. 209 and 210. The pattern is made with permanent magnets. The magnetic pattern influences the magnetic layer on the R-side of each disk 1062 and 1064 to be magnetized in the desired pattern. The magnetic pattern can be partial or can be a complete set of servo-track data. The strength of the field produced by permanent magnets comprising the pattern should exceed disk coercivity or, stated differently, should be sufficient to saturate the media at the desired positions. Application of the template to the disks will likely be less than five seconds. To the extent that the template only creates a partial servo-track pattern, the remainder of the pattern can be filled in by the read/write head of the disk drive performing self-servo track writing.

A second alternative embodiment for creating servo-track patterns utilizes a laser projection technique. In this embodiment a template is also used. The template would preferably be made of glass. A desired pattern would be created using transparent and opaque sections on the glass. Opaque sections would preclude laser light from striking the disk surface and transparent sections would allow laser light to contact the disk surface. The pattern may be created using photo lithography techniques. An example of a desired pattern is the servo-track pattern shown in FIGS. 209 and 210. In a first step, a laser light would be applied of sufficient power to elevate the temperature of the exposed areas of the disk. Next, the disk surface would be exposed to a magnetic field. The magnet would magnetize the receptive portions of the disk surface whose coercivity had been altered by heating from the laser beam. This would create the desired servo-track pattern. The magnet could be a permanent or electromagnet. The strength of the magnetic field produced by the magnet would need to be less than the coercivity of the disk at room temperature, but greater than the coercivity of the disk at the elevated temperature. In other words, the laser beam would need to elevate the temperature of select portions of the disk surface high enough above room temperature that a sufficient differential in coercivity will occur on the disk surface to allow a magnetic field to alter the areas of reduced coercivity, but not the remaining areas. Once the disk surface cools from the laser heating, the magnetic pattern would be set. As with the first alternative embodiment, the pattern may be complete or partial. If a partial pattern is created, the remainder of the servo-track pattern can be filled in by self-servo track writing techniques.

L. Variable Form Factor Cassette

An embodiment of multi-form factor cassette 1110 is shown in FIGS. 212-220. The cassette comprises a main body 1112 and a pair of removable or adjustable side wall inserts 1114 and 1116. The cassette has an open top 1118, open bottom 1120 and U-shaped openings 1122 in the end walls 1124. The U-shaped opening allows access to the central aperture of the disks. The open top and open bottom also provide access to the disks. A disk D is shown seated in the cassette. The main body further includes two integral side walls 1126, 1128 which extend between end walls. A plurality of slots or holes 1130 are formed in the integral side walls 1126, 1128 and in the inserts. The slots allow process fluids to be drained from the cassette and disks during processing. While the side walls 1126, 1128 are illustrated as integrally formed with the end walls 1124, they may be separate pieces secured between the end walls. Similarly, a pair of base members 1130 extend between the two end walls along the bottom of the cassette. The base members also provide rigidity to the cassette and form a support structure upon which the cassette rests (FIG. 215). The base members may be integrally formed with the end walls, or may be formed as separate pieces secured to the end walls through appropriate fasteners.

The side wall inserts 1114, 1116 are generally shown in FIGS. 212, 214, 215 and 221. In general terms, the inserts preferably comprise a vertical wall portion 1134 and a second wall portion 1136 forming an obtuse angle with the vertical wall portion and angled inwardly toward the open inside of the cassette. The inside surfaces of both the vertical and second wall portions 1134, 1136, shown in FIGS. 212-214, include a row of ribs 1138, which define a row of disk receiving grooves or channels 1140. The relative size and spacing of the ribs is determined based upon the form factor of the disk to be utilized. In addition, slots 1130 are also formed between the ribs, along both the vertical wall portion 1134 and second wall portion 1136, to allow process fluids to enter into and escape from the cassette.

As best shown in FIGS. 212 and 214, horizontal support members 1142, 1144 extend along the length of each insert. The support members provide structural rigidity to the inserts 1114, 1116 to prevent bending, warpage or breakage. The support members may be hollow, may be solid, or may contain a strengthening rod made of metal or other suitable material for the environment. In addition, each end of the support members is provided with a securement area 1146 which correspond to similar securement areas 1148, 1150 and 1152 formed in the end walls of the cassette. When aligned, appropriate fasteners 1154 can be positioned through securement areas 1148, 1150 or 1152 and into securement area 1146 to secure the inserts 1114, 1116 to the end walls at various positions.

As seen in FIGS. 217-219, the inserts may be secured at various positions relative to the end walls by the predetermined pattern of the securement areas 1148, 1150, 1152 to accommodate disks of different diameter. Thus, inventory issues and cost issues are reduced by allowing a single universal cassette to be utilized which is reconfigurable by repositioning the inserts to accommodate different diameter of disks. For example, using securement areas 1148, the inserts are positioned as shown in FIG. 217 to accommodate a large diameter disk. Using securement areas 1150, the inserts are positioned as shown in FIG. 218 to accommodate a slightly smaller diameter disk. Using securement areas 1152, the inserts are positioned as shown in FIG. 219 to accommodate an even smaller disk. Thus, the cassette as illustrated can be reconfigured to hold disks having at least three different diameters, perhaps 95, 84 and 65 millimeter diameters, although it should be appreciated that more than three options can be provided.

In addition, and/or alternatively, substituting different inserts having differently configured or sized ribs 1138 will allow the cassette to accommodate different thicknesses of disks or to accommodate pairs of disks in different orientations. For example, if the cassette is to be used during processing of single-sided disks, the ribs 1138 could be configured as shown in FIGS. 221 or 222 to accommodate contact merge disk pairs or gap merge disk pairs, respectively. In FIG. 221, ribs 1138 define grooves 1140 for orienting disks in a contact merge orientation. In FIG. 222, the disks are positioned in a gap merge orientation between large ribs 1142 and small ribs 1144.

For most processing applications, a cassette made from polybutylene terephthalate (PBT) plastic will be satisfactory. However, PBT plastic will not withstand the high temperatures associated with the sputtering process where temperatures can reach 350 degrees Celsius. In high temperature areas like this, polyesteresterketone (PEEK) will provide acceptable results, as will an entirely metal cassette. It may also be desirable to utilize an abrasion resistive plastic due to the constant movement of disks into and out of the cassette. Such a plastic is PEEK. Alternatively, an abrasion resistive plastic, such as teflon, may be added as an outer layer over a core material, such as stainless steel or aluminum alloys, providing the advantages of each material.

M. Single-Sided Hard Disk

A single-sided processed disk has been developed to provide a low cost storage media. In such disks, only one side, the active or information-containing side, is typically subjected to various process steps. A recurring problem with single-sided processed disks is the degree of planarity or flatness of the disk. Referring to FIGS. 223 and 224, a single-sided magnetic recording disk 1190 is illustrated. The disk 1190 includes a substrate disk 1200 (which is typically aluminum or an aluminum alloy), upper and lower interface layers 1204 and 1208 (which are typically nickel phosphorus), an underlayer 1212 (which is typically chromium or a chromium alloy), a magnetic layer 1216 (which typically is a cobalt-platinum-based quaternary alloy having the formula CoPtXY or a five element alloy CoPtXYZ, where XY and Z can be tantalum, chromium, nickel or boron), an overcoat layer 1220 (which is typically carbon), and a lubricant layer 1224 (which is typically a perfluoropolyether organic polymer). The nickel phosphorus layers have the same thicknesses, "$t_U$" (upper layer thickness) and "$t_L$ (lower layer thickness), (each of which is typically from about 8 to about 15 micrometers) and are typically deposited by electroless plating techniques. The underlayer, magnetic layer, and overcoat layer have different thicknesses (their total thickness is typically from about 20 to about 100 nm) and are deposited by sputtering techniques. Although nickel phosphorus layers can be deposited in either compression or tension, they are typically deposited in compression and the sputtered layers are also typically deposited in compression. As can be seen from FIG. 224, the compressive forces in the lower nickel phosphorus layer 1208 are more than offset by the compressive forces in the upper nickel phosphorus layer 1204 and the sputtered layers 1212, 1216 and 1220, causing the disk 1190 to be concave on the upper side 1228 of the disk and convex on the lower side 1232.

The disk concavity on the information storing side of the disk can cause problems. Disk concavity can cause problems in read/write operations, such as due to head tracking errors and undesired contact of the head with the disk surface. Because of these issues, typical disk specifications require a flatness on the information-containing or active surface of the disk of no more than about 7 to about 15 microns. As will be appreciated, "flatness" refers to the distance between the highest and lowest points on a disk surface. With reference to FIG. 224, the flatness is the difference in the elevations of points 1 and 2, where point 1 is the lowest point on upper disk surface 1228 while point 2 is the highest point on the upper disk surface 1228.

Referring to FIG. 225, a first embodiment of a disk according to the present invention will be described. Although the invention is described with specific reference to a magnetic recording disk, it is to be understood that the principles of the present invention may be extended to other recording media types, such as optical recording media, and magneto-optical recording media, and can be used for floppy or hard disks.

FIG. 225 depicts a plated disk (or intermediate (disk) structure) 1300 having upper and lower interface layers 1304 and 1308, respectively, on a substrate disk 1312. The substrate disk can be any suitable substrate disk, such as aluminum, aluminum alloys (e.g., AlMg), glass, ceramic materials, titanium, titanium alloys and graphite. The interface layers can be any suitable material for achieving acceptable magnetic recording properties in the overlying magnetic layer(s), such as iron oxide, nickel phosphorus, nickel molybdenum phosphorus, and nickel antimony phosphorus, with the latter three materials being preferred. The interface layers 1304 and 1308 are typically the same chemical composition and have different compositions from the substrate disk to provide an uneven internal stress distribution across the disk cross-section.

As can be seen from FIG. 225, the thicknesses of the upper and lower interface layers 1304 and 1308, which are $t_U$ and $t_L$, respectively, are different. When the interface layers are deposited so as to be in compression or have internal compressive stress, the thickness $t_U$ of the upper interface layer 1304 which is to become the surface for sputtering of the underlayer, magnetic layer, and overcoat layer, is preferably less than the thickness $t_L$ of the lower interface layer 1308. This causes the disk 1300 to be curved (e.g., have a spherical curvature) in cross-section or have a bowl-shape, with the concave side of the disk 1300 being the surface on which the additional layers are to be sputtered.

This is so because the compressive stress in the thicker lower interface layer 1308 exceeds the compressive stress in the thinner upper interface layer 1304, thereby causing the disk to be warped towards the thinner interface layer.

The governing equations for this behavior are set forth below.

The stress $\epsilon$ in a selected layer is determined by the unique physical properties of a material and the technique and conditions of deposition:

The spherical curvature or radius of curvature R of the disk is provided by the following equation.

$$R = t_{sub}^2 / (6 \times \Delta t_{layer} \times \epsilon)$$

where $t_{sub}$ is the thickness of the substrate disk 1312, $\Delta t_{layer}$ is the difference in thicknesses between the upper and lower interface layers 1304 and 1308, and $\epsilon$ is the stress in each of the layers.

While the relative thicknesses of the two layers depends on the magnitude of the internal compressive stress in each layer and the compressive stresses in the sputtered layers, the thickness of the upper interface layer 1304 is typically no more than about 99.3%, more typically from about 98.3 to about 99.3% and even more typically from about 97.7 to about 98.3% of the thickness of the lower interface layer 1308. In absolute terms, the thickness of the upper interface layer 1304 ranges from about 7.5 to about 14.5 microns and that of the lower interface layer 1308 from about 8 to about 15 microns. In other words, the difference in thickness between the upper and lower interface layers is typically at least about 0.075 microns and more typically ranges from about 0.2 to about 2 microns.

The flatness (or first flatness) of the disk 1300 is relatively high and the flatness distribution, $3\sigma$, is relatively low. The flatness of each of the upper and lower surfaces 1316 and 1320, respectively, of the disk 1300 typically is at least about 5 microns and more typically ranges from about 2 to about 10 microns.

FIG. 226 depicts the same disk 1400 after deposition of the overlying layers. Specifically, the upper surface 1404 of the disk 1400 has the underlayer 1408, the magnetic layer 1412, and the overcoat layer 1416 deposited, preferably by sputtering. The underlayer 1408 can be any material capable of providing the desired crystallography in the magnetic layer 1412. Preferably, the underlayer 1408 is chromium or a chromium alloy and has a thickness ranging from about 5 to about 20 nm. The magnetic layer 1412 can be any ferromagnetic material, with the cobalt-platinum-based quaternary alloy having the formula CoPtXY or the five element alloy CoPtXYZ, wherein XY and Z can each be one or more of tantalum, chromium, boron, or nickel The thickness of the magnetic layer typically ranges from about 7 to about 20 nm. The overcoat layer 1416 can be any suitable overcoat material, with carbon being preferred, and the thickness of the layer typically ranges from about 1 to about 6 nm.

The layers are typically in compression or have internal compressive stresses. The stress in each layer can be calculated using the equation above. The cumulative magnitude of the compressive stresses in the upper interface layer 1304, the underlayer 1408, the magnetic layer 1412, and the overcoat layer 1416 counteract the compressive stress in the lower interface layer 1308 to cause the disk to flatten out or become more planar. For a given thickness of the lower interface layer 1308, the resulting radius of curvature of the disk is inversely proportional to the cumulative thicknesses of the layers 1304, 1408, 1412, and 1416. Typically, the flatness of the disk 1400 (or second flatness) is no more than about 17 microns and more typically is no more than about 12 microns.

The relative magnitudes of the cumulative compressive stress in the upper layers 1304, 1408, 1412, and 1416 versus that in the lower interface layer 1308 may be controlled to provide a desired degree of flatness in the final disk. For example, when the cumulative compressive stress in the upper layers exceeds that in the lower interface layer, the upper surface 1404 of the disk will be convex with the opening of the bowl-shape facing downward. When the cumulative compressive stress in the upper layers is less than that in the lower interface layer, the upper surface 1404 of the disk will be concave with the opening of the bowl-shape facing upward. When the cumulative compressive stress in the upper layers is approximately equal to that in the lower interface layer, the upper surface 1404 of the disk will be substantially or completely flat or planar as shown in FIG. 226. By these techniques, disks of varying radii of curvature and flatnesses can be produced. Typically, the flatness values can be made to range from about 1 to about 50 microns.

The control of the radius of curvature or flatness of the disk can be important. Not only is it important for the disk to comply with pertinent flatness specifications but also as the disk temperature fluctuates during read/write operations due to disk rotation the disk curvature changes. For example, the disk may become more concave or convex depending on the rate of change of the compressive stress of each layer due to thermal fluctuations. In one configuration, it is desirable for the disk to be more convex at higher operating temperatures and more concave at lower operating temperatures.

As seen in FIG. 230, for example, the thickness of the upper interface layer 1804 can be selected to be thicker than that of the lower interface layer 1808 to provide a convex upper disk surface 1800. This surface will become even more convex when the underlayer, magnetic layer, and overcoat layer are deposited on the upper disk surface. In one configuration, the underlayer, magnetic layer, and overcoat layer are deposited so as to have a net internal tensile stress. This can be effected by selecting suitable materials for each layer and/or by using a suitable deposition technique other than sputtering. In that configuration, the use of an upper interface layer having a greater thickness than that of the lower interface layer may be used to counteract the tensile stress to provide the desired degree of disk surface flatness.

When nickel phosphorus is the interface layer on both sides of the disk, it is possible to deposit the layers with a desired degree of internal compressive or tensile stress by varying the composition of the electroless plating bath. When the layers are in tensile as opposed to compressive stress, the use of an upper interface layer 1904 that is thinner than the lower interface layer 1908 will, as shown in FIG. 231, cause the upper disk surface 1912 to be convex. To offset this effect, the underlayer, magnetic layer, and overcoat layer, which are in compressive stress, are preferably deposited on the side having the thicker interface layer, which in the configuration of FIG. 231 is the lower interface layer 1908. The tensile force exerted by the sputtered layers and the compressive force exerted by the upper interface layer offsets the tensile force exerted by the lower interface layer to provide a relatively planar disk 1950 as shown in FIG. 232.

An embodiment of the process to produce the disk of FIGS. 225 and 226 will now be discussed with reference to FIGS. 227 and 228.

Referring to FIG. 227, the substrate disk process will first be discussed. In step 1500, the disk substrate disk 1312 is stamped out of a sheet of material. The stamped disk in step 1504 is ground to provide flat or planar upper and lower substrate disk surfaces. In step 1508, the disk is baked, and in step 1516 chamfers are formed on the upper and lower substrate disk surfaces. In step 1520, the upper and lower interface layers, which are nickel phosphorus, are formed on the upper and lower substrate disk surfaces by electroless plating techniques. In this step, the thicknesses of the upper and lower interface layers are the same or substantially the same. Typically, the thickness of the upper interface layer is at least about 95% of the thickness of the lower interface layer and vice versa. Steps 1500 through 1520 are performed using techniques known to those of skill in the art.

In steps 1524 and 1528, the interface layers are rough (step 1524) and fine (step 1528) polished to provide the plated disk configuration of FIG. 225. As shown in FIG. 228A, in each of steps 1524 and 1528 a disk holder 1600 contains compartments (or holes) for receiving two disks simultaneously (referred to as "two-at-a-time disk polishing"). Upper and lower polishing pads 1604 and 1608 polish the outwardly facing surfaces 1612 and 1616 of the adjacent stacked disks 1620a,b. The contacting disk surfaces 1624 and 1628 are not polished. The polished surfaces 1612 and 1616 are the upper disk surface 1316 in FIG. 225. In this manner, two adjacent or stacked disks are polished simultaneously to provide a significant cost savings relative to the costs to produce dual-sided disks.

Preferably, the reduction in thickness of the upper interface layer is at least about 0.70% and more preferably ranges from about 1.0 to about 4.0%.

There are several ways to effect the reduction in layer thickness reduction in the polishing steps. In one approach, all of the thickness difference between the upper and lower interface layers is effected in the rough polishing step 1524. In a second approach, all of the thickness difference between the upper and lower interface layers is effected in the fine polishing step 1528. These two approaches require both sides of the disk to be polished in one of the polishing steps, which can be costly. The polishing in this step is performed using one-disk-at-a-time polishing as shown in FIG. 228B. Referring to FIG. 228B, upper and lower polishing pads 1604 and 1608 engage simultaneously the upper and lower sides 1704 and 1708 of each disk 1700. The carrier 1712 transports the disks through the polishing operation. In a third approach, a portion of the thickness difference between the upper and lower interface layers is effected in each of the rough and fine polishing steps. In this approach, the disks remain in the carrier 1600 (FIG. 228A) through each of the polishing steps, which can represent a significant cost savings relative to the other two approaches.

In one process configuration, the thickness of the upper and lower interface layers 1304 and 1308 is the same after step 1520 and range from about 8 to about 15 microns. In the rough polishing step 1524, from about 70 to about 95% of the desired thickness reduction in the upper interface layer 1304 is realized. The remaining desired thickness reduction in the upper interface layer 1304 is realized in the fine polishing step 1528.

After the fine polishing step 1528, the plated disk is sent to the media process.

The media process will be discussed with reference to FIG. 229.

In step 1700, the plated disks are merged for processing. "Merging" refers to placing the disks back-to-back such that the upper disk surfaces 1316 face outwardly. In other words, the lower disk surfaces 1320 are adjacent to one another. The disks can be contact merged (as shown in FIG. 228A) in which case the lower disk surfaces 1320 of each disk 1300 physically contact one another or gap merged in which case the lower disk surfaces 1320 of each disk 1300 are separated by a gap.

In step 1704, the upper disk surfaces 1316 are data zone textured by known techniques.

In step 1708, the upper disk surfaces 1316 are washed to remove any debris or contaminants from the data zone texturing step.

In step 1712, the upper disk surfaces 1316 are layer zone textured by known techniques followed by washing of the upper disk surfaces in step 1716.

In step 1720, the underlayer 1408, magnetic layer 1412, and overcoat layer 1416 are sputtered onto the upper disk surface by known techniques to produce the disk configuration of FIG. 226. As noted previously, the sputtered layers cause the disk curvature to flatten out. Other techniques can be used to deposit these layers, such as evaporation techniques, ion beam techniques, plating techniques, and the like.

The disk is then subjected to the application of a lubrication layer (such as an organic polymer, e.g., a perfluoropolyether) in step 1724 and tape burnishing in step 1728. Steps 1724 and 1728 are performed by techniques known to one of skill in the art.

In step 1732, the adjacent disks are separated or demerged to provide the finished disk 1736. The lower side 1420 of the disk is the "inactive" or non-information storing side while the upper side 1404 of the disk is the "active" or information storing side.

Experimental

A number of experiments were performed to illustrate the principles of the present invention. In a first series of experiments, various magnetic disks were made using both one-at-a-time and two-at-a-time disk polishing to evaluate the varying degrees of flatness of the disks and the use of such polishing techniques in the fine and rough polishing steps.

Type 1 disks were formed by electroless plating of nickel phosphorous (NiP) on both sides of aluminum magnesium (AlMg) disks. The NiP layers on both sides of the disks were equal and about 500μ. The concavity of the disks was approximately 5μ. The disk thickness was about 50 mil with a 95 mm outer diameter (OD) and 25 mm inner diameter (ID). The Type 1 disks were rough-polished using one-at-a-time polishing (as shown in FIG. 228B) maintaining equal removal of nickel material or both sides. The rough-polished substrate disks were then washed thoroughly and ensured to be virtually free of particulates. Washing of the disks minimizes formation of deep scratches during the final step polishing on the non-information-storing side (or inactive side). Such scratches usually penetrate on the information-storing side (or active side). The washed substrate disks are kept fully immersed in distilled water until ready for the final polishing step.

The final polishing step is performed by loading 2-disks at a time in the carrier hole, as shown in FIG. 228A. The carrier 1600 is designed to accommodate the thickness of the two disks. The removal of the nickel material takes place only on one side of each disk during this final polishing step. By adjusting polishing time, the NiP thickness delta between the active and inactive sides and the resulting degree of concavity of the substrate disk can both be controlled.

The process variables in the rough and fine polishing steps are as follows:
Machine/Process Set-up Conditions:
Pressure: 180~220 dAN
Rotation: 14~20 rpm
Slurry for the Rough Polish: Aluminia (~0.45μ size)
Slurry for Final Polish: Colloidal silica (35~100 nm size)
Machine type used: Peter Wolters AC319™ Disk Polishing Machine The intended thickness differential in the NiP layers on the active and inactive sides was about 10 to about 20μ", with the active side having the thinner NiP layer. The carrier had six carrier holes, each accommodating a single disk, in the rough polishing step and six holes, each accommodating two disks, in the fine polishing step. The thickness of the carrier was about 40 mil for the rough polishing step and about 90 mil for the fine polishing step. For each run, nine carriers were used.

Type 2 disks were formed by electroless plating of nickel phosphorous (NiP) on both sides of aluminum magnesium (AlMg) disks. The NiP layers on both sides of the disks were equal and about 500μ. The concavity of the disks were approximately 35μ. The disk thickness was about 50 mil with a 95 mm outer diameter (OD) and 25 mm inner diameter (ID).

The plated substrate disks were rough-polished by two-disk-at-a-time polishing techniques, such that two disks at a time were loaded in the same or a common carrier hole. The rough polishing step was thus different than the rough polishing step for Type 1 disks, in which one-disk-at-a-time polishing techniques were employed. The removal of the nickel material occurred on only one side of each disk during the rough polishing step. The washing and fine polishing steps were the same as the steps used for the Type 1 disks.

The process variables were the same as those shown above for Type 1 disk fabrication except for the thickness differential between the NiP layers on the active and inactive sides of the disks and the carrier thickness in the rough polishing step. The thickness of the carrier for both the rough and fine polishing steps was the same at about 90 mil.

The intended NiP thickness differential for the active and inactive sides of the disks was about 70 to about 80μ", with the NiP layer on the active side being thinner than the NiP layer on the inactive side.

The shape and flatness of resulting disks are shown in FIGS. 233A through 237B (Type 1 disks) and FIGS. 238A through 242B (Type 2 disks) and are summarized in the table below. It is important to note that the Type 2 disk flatness plots appear to be truncated in some areas because the measurement tool limits were locally exceeded.

| | Shape | Flatness | NiP thickness on A-side | Measured NiP thickness on B-side | Measured NiP thickness Δ (A − B) |
|---|---|---|---|---|---|
| Type 1 | | | | | |
| substrate 1 | concave | 5.167μ | 404 μ" | 415 μ" | −11 μ" |
| substrate 2 | concave | 4.773μ | 368 μ" | 375 μ" | −7 μ" |
| substrate 3 | concave | 2.673μ | 423 μ" | 432 μ" | −9 μ" |
| substrate 4 | concave | 4.417μ | 402 μ" | 416 μ" | −14 μ" |
| substrate 5 | concave | 5.381μ | 400 μ" | 429 μ" | −29 μ" |
| Type 2 | | | | | |
| substrate 1 | concave | 35.69μ | 388 μ" | 476 μ" | −88 μ" |
| substrate 2 | concave | 30.31μ | 410 μ" | 485 μ" | −75 μ" |

-continued

| | Shape | Flatness | NiP thickness on A-side | Measured NiP thickness on B-side | Measured NiP thickness Δ (A − B) |
|---|---|---|---|---|---|
| substrate 3 | concave | 38.72μ | 388 μ" | 480 μ" | −92 μ" |
| substrate 4 | concave | 36.18μ | nda | nda | nda |
| substrate 5 | concave | 36.38μ | nda | nda | nda |

(nda: no data available)

The average NiP thickness differential for Type 1 disk samples is about 14μ" while that for Type 2 disk samples about 85μ". Each value corresponds to the amount of NiP material removed (stock removal) during final polishing (Type 1 disks) and during rough and final polishing (Type 2 disks). Type 1 disks exhibited about 5μ concavity, with simultaneous two-disks-at-a-time polishing being implemented only in the final polishing step. Type 2 disks exhibited about 35μ concavity, with simultaneous two-disks-at-a-time polishing being implemented in both the rough and fine polishing steps.

The degree of concavity induced as a result of uneven material removal on the active/inactive sides appears to be proportional to the NiP layer thickness differential between the two sides. Typical counterpart substrate disks polished utilizing conventional methods (as depicted in FIG. 228B) exhibited average flatness values of about 2μ (~50% of the flatnesses being concave and ~50% of the flatnesses being convex) and the NiP layer thickness differential being less than about 3μ". Strictly speaking, the thickness differential is the average of the absolute values of NiP layer thickness differentials among the various disks.

Further experiments were performed to determine the degree to which sputtered thin films can flatten pre-bent disks, such as the Type 1 and 2 disks above. Two different types of magnetic recording disks were fabricated. The two different types of disks had the following structures:

| Type A disks (control) | NiP layer thickness on right side: | ~415 μ" |
| | NiP layer thickness on left side: | ~415 μ" |
| | Sputtered thin films with total thickness of | ~300 Å |
| | NiP layer thickness differential between the right and left sides: | 0 μ" |
| Type B disks | NiP layer thickness on right (active)-side: | ~415 μ" |
| | NiP layer thickness on left (inactive)-side: | ~435 μ" |
| | Sputtered thin films with total thickness of | ~300 Å |
| | NiP layer thickness differential between right and left sides: | ~20 μ" |

The shapes and flatnesses of resulting disks are shown in FIGS. 243A and 248B (Type A disks) and FIGS. 249A through 254B (Type B disks). The flatnesses of the disks are set forth below:

| Type A | disk 1 (FIGS. 243A–B) | R-convex | 5.645μ |
| | disk 2 (FIGS. 244A–B) | R-convex | 2.870μ |
| | disk 3 (FIGS. 245A–B) | R-convex | 4.808μ |
| | disk 4 (FIGS. 246A–B) | R-convex | 4.822μ |
| | disk 5 (FIGS. 247A–B) | R-convex | 5.317μ |
| | disk 6 (FIGS. 248A–B) | R-convex | 4.192μ |
| Type B | disk 1 (FIGS. 249A–B) | Irregular shape | 0.617μ |
| | disk 2 (FIGS. 250A–B) | R-convex | 2.254μ |
| | disk 3 (FIGS. 251A–B) | R-concave | 0.982μ |
| | disk 4 (FIGS. 252A–B) | R-concave | |
| | disk 5 (FIGS. 253A–B) | R-concave | 2.926μ |
| | disk 6 (FIGS. 254A–B) | R-concave | 2.234μ |

As can be seen from the above test results, Type-A disks exhibited all "cone"-shapes with higher flatness values whereas Type-B disks exhibited some "cone" shapes and some "bowl" shapes but with reduced flatness values. Type-B disks were flatter than Type-A disks because Type-B disks had a NiP layer thickness differential of around ~20μ" whereas Type-A disks had a NiP layer thickness differential of around 0μ". This NiP layer thickness differential can be tailored to achieve specific flatnesses for specific applications, as noted previously.

The experimental results provided above show that pre-bent disks can be utilized in the magnetic media industry when one-side sputtering causes disks to bend and form a convex shape due to compressive stress imbalance within the various layers/films. By depositing sputtered films onto the side of the substrate disk which is already bent to form a concave shape ("bowl"-shape, looking to the side in question), the two bending tendencies in opposite directions (from the thicker NiP layer on one side of the disk and the thinner NiP layer and sputtered films on the other side of the disk) are cancelled. The cancellation (or equalization) of the compressive stresses on both sides of the disks cause the resulting disks (after sputter) to be flatter.

A number of variations and modifications of the invention can be used. It would be possible to provide for some features of the invention without providing others.

For example in one alternative embodiment, the present invention applies to any form-factor disk, whether 95 mm, 84 mm, 65 mm, 48 mm, or 25 mm in diameter and 60 mil, 50 mil, 40 mil, 31.5 mil, or 25 mil in thickness.

In another alternative embodiment, the thicknesses in the upper and lower interface layers 1304 and 1308 is effected during interface layer deposition rather than or in addition to that effected during rough and/or fine polishing. In other words, differing thicknesses of interface layers are applied to the different sides of the disk.

In yet another alternative embodiment, pre-bending or pre-shaping of the substrate disk and interface layers can be accomplished using mechanical techniques (which cause the plated disk to deform plastically), thermal techniques, and combinations thereof.

N. Chamfer Designs for Single-Sided Hard Disks

As can be seen in FIG. 255, which is a cross-section of an outer periphery of a conventional magnetic disk, the inactive side 1980 is indistinguishable from the active side 1984. For example, an identical chamfer 1988 is used on both sides of the disk 1992; in other words, each chamfer has the same angle $\theta_1$, the same chamfer length $l_1$, and the same length $l_1$ of the chamfer surface 1996. As will be appreciated, the chamfer is used for a variety of reasons, including controlling the chipping and distortion of the disk and also minimizing cassette material wear and abrasion during handling and shipment and to facilitate lead in of the read/write head on the disk during read/write operations.

FIG. 256 is a plan view of the active (or inactive) side of a disk according to an exemplary embodiment of the present invention. The disk 2200 comprises an outer diameter $R_O$ and an inner diameter $R_I$. The inner diameter or periphery is defined by a hole 2204 for receiving a hub, spindle, or other rotational mechanism. The outer diameter or outer periphery and the inner periphery each include outer and inner chamfers 2208 and 2212, respectively. The chamfer extends radially around the diameter of the outer and inner peripheries. The same features are located on the reverse side of the disk. As will be appreciated, the disk, in other configurations, may include only the outer chamfer or the inner chamfer, depending on the application.

As can be seen FIGS. 257A through 257G, the outer chamfers on the active and inactive sides of the disk (or inner chamfers on the active and inactive sides of the disk) are dissimilar or differently shaped. The differing shapes permit one to identify or distinguish, typically visually and mechanically, the active and inactive sides from one another. Although FIGS. 257A through 257G illustrate a variety of differing shapes for the chamfers, it is to be understood that the figures are not intended to be exhaustive. An infinite number of other shapes may be employed to identify or distinguish the active and inactive sides.

Referring to a first disk configuration in FIG. 257A, the active side 2300 has a first chamfer 2304 while the inactive side 2308 has a second chamfer 2312. The first and second chamfer angles θ are identical while the chamfer length $C_{L1}$ and chamfer surface length $l_1$ for the first chamfer 2304 are different from the chamfer length $C_{L2}$ and chamfer surface length $l_2$ for the second chamfer 2312. As can be seen from FIG. 257A, it is generally preferred, though not required, that the active side 2300 of the disk 2200 have the smallest chamfer length to provide the active side 2300 with as much surface area as possible for storing information. The first chamfer length typically ranges from about 0.004 to about 0.008 inches while the second chamfer length typically ranges from about 0.003 to about 0.300 inches. Because the inactive side of the disk does not store information, there is considerable freedom in selecting the dimensional parameters of the second chamfer.

Referring to a second disk configuration in FIG. 257B, the first and second chamfer lengths $C_L$ and $C_L$ for the first and second chamfers 2316 and 2320 are identical while the first and second chamfer angles $\theta_1$ and $\theta_2$ and chamfer surface lengths $l_1$ and $l_2$ are different. The first chamfer angle typically ranges from about 25 to about 50° while the second chamfer angle typically ranges from about 2 to about 60°.

Referring to a third disk configuration in FIG. 257C, the surface lengths l of the first and second chamfers 2324 and 2328 are identical while the first and second chamfer lengths $C_{L1}$ and $C_{L2}$ and the first and second chamfer angles $\theta_1$ and $\theta_2$ and chamfer surface lengths $l_1$ and $l_2$ are different. In the depicted configuration, the second chamfer length for the inactive side 2300 of the disk is smaller than the first chamfer length active side 2308 of the disk.

Referring to a fourth disk configuration in FIG. 257D, it is possible to have a nonplanar (or nonflat) surface for a chamfer. The depicted chamfer surface 2330 for the first chamfer 2332 is arcuate in shape while that 2334 for the second chamfer 2336 is planar in shape. The radius R of the first chamfer surface 2330 is shown. As will be appreciated, the first chamfer surface 2330 can be non-circular. Examples include parabolic, and elliptical, in shape. As can be seen, the first and second chamfer lengths $C_{L1}$ and $C_{L2}$ are different.

Referring to a fifth disk configuration in FIG. 257E, it is possible to have a nonplanar (or nonflat) surface for each of the first and second chamfers. The depicted chamfer surfaces 2338 and 2340 for the first and second chamfers 2342 and 2344 are each arcuate in shape. The radii $R_1$ and $R_2$ of the first and second chamfer surfaces 2338 and 2340, respectively, are shown. As will be appreciated, the first and/or second chamfer surfaces can be non-circular. Examples include parabolic and elliptical in shape. As can be seen, the first and second chamfer lengths $C_{L1}$ and $C_{L2}$ are different.

Referring to a sixth disk configuration in FIG. 257F, it is possible to have an identifiable design feature in the first and/or second chamfer to facilitate identification of the active and inactive disk sides. As can be seen from FIG. 257F, the first and second chamfer lengths $C_L$, first and second chamfer surface lengths l, and the first and second chamfer angles θ are identical to one another. Identification of one disk side versus the other is made possible by a groove 2346 on the first chamfer 2350. As will be appreciated, the groove could alternatively or additionally (a differently shaped or positioned groove) be located on the second chamfer 2354. As will also be appreciated, the groove could be replaced by a variety of other differently shaped surface indentations, depending on the application.

Referring to a seventh disk configuration in FIG. 257G, it is possible to have a raised design feature on the first and/or second chamfer to facilitate identification of the active and inactive disk sides. As can be seen from FIG. 257G, the first and second chamfer lengths $C_L$, first and second chamfer surface lengths l, and the first and second chamfer angles θ are identical to one another. Identification of one disk side versus the other is made possible by a step 2358 on the first chamfer 2362. As will be appreciated, the step could alternatively or additionally (a differently shaped or positioned step) be located on the second chamfer 2366. As will also be appreciated, the step could be replaced by a variety of other differently shaped raised surface features, depending on the application.

FIG. 258 depicts first and second disks 2400 and 2404, each having identical sets of first and second chamfers 2408 and 2412 merged for simultaneous processing. The active sides 2300 each face outward while the inactive sides 2308 face each other. The inactive sides may be in contact with (and substantially parallel to) one another as shown (contact merged) or may be separated by a gap (gap merged). The processing of the active sides includes polishing, sputtering, data zone texturing, layer zone texturing, lubing, tape burnishing, testing, and washing. The second chamfers 2412, being differently shaped or dissimilar to the first chamfers 2408, permit ready identification (and disk merging/demerging), by a merging tool or demerging tool or by sight, of the active and the inactive sides.

FIG. 259 depicts a cross-section of a stamped disk 2500 prior to shaping by a suitable cutting/shaping tool, such as a diamond tool bit. Computerized Numerical Control machining programs that determine how machining tool bits (which is normally a single-point, diamond insert in the case of magnetic disk substrate disks) travel may be configured to yield differently shaped first and second chamfers. As illustrated by FIG. 259, the path 2504 of the tool bit (not shown) starts at point "1", moves linearly to point "2", moves linearly at a right angle to point "3", moves linearly at an obtuse angle to point "4" moves linearly vertically to point "5", moves linearly at yet another right angle to point "6", and finally moves linearly at an acute angle to point "7". The depicted path permits a single-point bit to create two dissimilar or differently shaped chamfers on the active and inactive sides 2300 and 2308 of the disk.

O. Single-Sided Processing of Disk Pairs

The foregoing addresses components of an overall single-sided disk manufacturing process in which disks are simultaneously processed in pairs such that only one surface of each disk is fully processed. In a first embodiment, illustrated in FIG. 260, the process 3000 comprises each of the above addressed component processes. First, at 3002, merging substrate are merged into pairs positioned in a gap merge orientation within a cassette or disk carrier. Next, at 3004 the disks are subject to a data zone texturing process in which the gap merged pairs of disks are temporarily positioned in a concentric contact merge orientation for the texturing process, demerged at 3006, and returned to a cassette positioned in the gap merge orientation. Following repositioning in a gap merge orientation, the disks are subject to a washing and cleaning operation at 3008. As part of the washing and scrubbing operation, the disks are temporarily positioned in a concentric contact merge orientation for direct contact surface scrubbing. At 3010, the disks are demerged and returned to a cassette or carrier where they are positioned in a gap merge orientation for additional cleaning and rinsing. The disks are next subjected to laser zone texturing at 3012. Again the disks are temporarily merged into a concentric contact merge orientation for the laser zone texturing process. Following laser zone texturing at 3014, the disks are demerged and repositioned in a cassette in a gap merge orientation. The disks are then subjected to a second washing process at 3016. The disks may be scrubbed a second time in the same manner as previously described. Alternatively, at 3018, the disks may remain in the cassettes in a gap merge orientation, skipping the scrubbing step of 3016, and be subjected to ultrasonic cleaning and rinsing.

Following washing a second time, the disks are ready for sputtering. During the sputtering process at 3020, the disks remain in a gap merge orientation. Pairs of disks are removed from cassettes or carriers in a gap merge orientation. The disk pairs proceed through the various steps of the sputtering process and maintain in gap merge orientation. Following completion of the process, the pairs of disks are returned to a carrier cassette in gap merge orientation.

Cassettes of sputtered disks are next taken to a lubrication process at 3022. The lubrication process is performed on all of the disks of a cassette simultaneously. It is typically not conducted on pairs of disks individually, although it could be. During the lubrication process, in one embodiment, it is preferable to reposition the disks with equal spacing among all of the disks to facilitate lubricant accessing both surfaces of each disk. Numerous options are available for repositioning the disks following lubrication. For efficiency purposes, if the next process is tape burnishing, the disks will preferably be placed in concentric contact merge orientation, such as at 3024. A merge nest may be used.

In the tape burnishing process at 3026, the disks preferably arrive in a concentric contact merge orientation within a carrier. Pairs of disks are removed from the carrier where they are engaged at the center aperture by a spindle and subjected to tape burnishing. Following tape burnishing, the disks may stay in concentric contact merge orientation or they may be demerged. If the next process step is testing, it is preferred that the disks remain in a concentric contact merge orientation.

In the testing process at 3028, the disks are removed from the cassette and are placed upon a spindle assembly where they are rotated and the test apparatus applied. Following testing, the disk pairs are returned to a cassette. Disks that fail testing are scrapped. The disks may be positioned in the cassette in any number of different number of orientations, depending upon the next process step. For simplicity, they will remain in a concentric contact merge orientation.

Servo-writing may next be conducted on the disk surfaces. Simultaneous single-sided disk servo-writing is optional. In the servo-writing process at 3030, the disks are removed from the cassette in a contact merge orientation. The disks are engaged at their center aperture by a spindle assembly which rotates the disk pair while two separate servo-track writers write servo-track data to the surfaces on the disks.

Following the last processing step, once the substrate disks have been turned into finished single-sided hard memory disks, the disks will go through a demerge process at 3032. In the demerge process, the pairs of concentric contact merge disks will initially be separated by a demerge tool. With a gap formed between the disks, they will be positioned in a transfer cassette. From the transfer cassette, the disks will be separated into two cassettes with the R-side surface of each disk in the cassette facing in the same direction. With the disk pairs so separated, the carriers are ready to be shipped to a hard disk drive manufacturing facility where the finished disks may be assembled into hard disk drives.

A first alternative embodiment of the process is shown in FIG. 261. In this process, the disk will be textured and washed, one at a time, in a conventional double-sided process. The disks will be initially positioned in a gap merge orientation at 3040. They will then be subjected to sputtering in a gap merge orientation at 3042. The disks will then be demerged and positioned in cassettes with equal spacing between the disks at 3044. The disks will then be subject to lubrication at 3046. Following lubrication, the disks will be repositioned in a contact merge orientation for tape burnishing and testing at 3048. The disks will be subjected to tape burnishing at 3050 and then to testing at 3052. Following testing, the disks will be demerged and repositioned in two cassettes with the R-side surface of the disks oriented in the same direction in each cassette at 3054.

A second alternative process is shown in FIG. 262. In this process, the disks will be subjected to texturing and scrubbing one disk at a time using double-sided disk processing techniques. The disks will then be positioned in a gap merge orientation at 3060. They will be subjected to sputtering in a gap merge orientation at 3062. They will be subjected to lubrication at 3064 in a gap merge orientation or with equal spacing between the disks. Following removal from the lubrication tanks, the disks will be repositioned into a contact merge orientation at 3066. Once positioned in pairs of contact merge oriented disks, the disk pairs will be subjected to tape burnishing at 3068 and testing at 3070. Following testing, the disks will be demerged at 3072 into cassettes with the R-side surface of each disk in a cassette facing in the same direction.

A third alternative embodiment is shown in FIG. 263. In this process, the disks will be textured and scrubbed in any manner desired. Next, at 3080, the disks will be positioned in a gap merge orientation. The disks will then go through the sputtering process in a gap merge orientation at 3082. They will also go through the lubrication process in a gap merge orientation at 3084. Following lubrication, the disks will proceed to tape burnishing. At the tape burnishing station, at 3086, the disks will be repositioned into a contact merge orientation when loaded onto the spindle or collet at the tape burnishing station. The disks will be subjected to tape burnishing in a concentric contact merge orientation at 3088. They will remain in a concentric contact merge orientation and be subjected to testing at 3090. Following testing, they will be demerged at 3092 into two cassettes such that all of the disks in each cassette will have the R-side surface facing in the same direction.

A fourth alternative embodiment is shown in FIG. 264. In this process, the disks will be textured, scrubbed and washed using any desired process technique. Then, the disks will be positioned in a gap merge orientation at 3100. Sputtering will occur with the disks remaining in a gap merge orientation at 3110. Following sputtering, the disks will be demerged and positioned in regular process cassettes at 3112. In other words, the disks will not be in disk pairs, but will be in cassettes designed to handle double-sided process disks. The disks will then be subjected to lubrication at 3114 using conventional double-sided disk techniques and spacing. Following lubrication, the disks will be repositioned into a contact merge orientation at the tape burnishing station at 3116. This may be accomplished when loading each disk pair on the spindle assembly or collet. The disks will be subjected to tape burnishing at 3118 in a contact merge orientation. The disks will then be subjected to testing at 3120 in a contact merge orientation, without changing the orientation of the disks between tape burnishing and testing. Following testing, the disks will be demerged at 3122 into two cassettes with the R-side surface of each disk in a cassette facing in the same direction.

A fifth alternative embodiment is shown schematically in FIG. 265. In this embodiment, the disk are textured, scrubbed and washed using any desired processing technique. Then, the disks will be positioned in a gap merge orientation at 3130. The disks are then subjected to sputtering at 3132 while maintaining the gap merge orientation. Following sputtering, the disks are repositioned at 3184 from a first gap merge orientation to a second gap merge orientation. In essence, the gap between the disks is widened to facilitate lubrication. The disks are then lubricated in a second gap merge orientation at 3136. Following lubrication, the disks undergo a repositioning from gap merge to contact merge at 3138. In a contact merge orientation, the disks are subjected to tape burnishing at 3140 followed by testing at 3142. The disks are then demerged into two cassettes at 3144 with all of the disks in each cassette having the R-side surface facing in the same direction.

A sixth alternative process is shown schematically in FIG. 266. Here, the disks are textured, scrubbed and washed using any desired processing technique. Then, the disks are initially merged at 3150 into either a gap merge or contact merge orientation. The disks are then subjected to sputtering in their merged orientation at 3152, subjected to lubrication in the merged orientation at 3154, subjected to tape burnishing in the merged orientation at 3156, and subjected to testing in the merge orientation at 3158. Following testing, they are demerged at 3160. As noted, the disks do not change orientation during any of the steps of sputtering, lubrication, burnishing or testing.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of manufacturing single-sided hard memory disks, comprising:
   a. positioning a plurality of disks in pairs, with each pair in a gap merge orientation;
   b. transferring a pair of gap merge oriented disks to a processing station one pair at a time;
   c. simultaneously processing both disks of the disk pair.

2. The method of claim 1, wherein positioning a plurality of disks in pairs, with each pair in gap merge orientation, comprises positioning the plurality of disks in a disk carrier in gap merge orientation.

3. The method of claim 1, wherein said simultaneously processing both disks of the disk pair comprises texturing.

4. A method of manufacturing hard memory disk having only one active side, comprising:
   a. combining individual disks into pairs of disks;
   b. simultaneously processing the pairs of disks one pair at a time.

5. The method of claim 4, further comprising simultaneously processing each pair of disks separate from each other pair of disks.

6. The method of claim 4, wherein simultaneously processing the pairs of disks comprises one or more of texturing, washing, sputtering, burnishing and testing.

7. The method of claim 4, further comprising separating each pair of processed disks following simultaneous processing of the pairs of disks.

8. A method of manufacturing single-sided hard memory disks, comprising:
   a. providing a plurality of disks;
   b. positioning the plurality of disks in pairs in a gap merge orientation in a container;
   c. individually removing the pairs of disks from the container one pair at a time;
   d. simultaneously processing each pair of disks one pair at a time;
   e. returning each pair of disks to a container.

9. The method of claim 8, wherein simultaneous processing each pair of disks comprises one or more of texturing, scrubbing, sputtering, burnishing and testing.

10. The method of claim 9, further comprising positioning each disk pair in a contact merge orientation for processing.

11. The method of claim 10, further comprising demerging each pair of disks following texturing and/or scrubbing.

12. The method of claim 8, wherein simultaneously processing each pair of disks comprises texturing and further comprising positioning the disks of each pair in a contact merge orientation for texturing.

13. The method of claim 12, further comprising demerging each pair of disks following texturing.

14. The method of claim 13, wherein demerging each pair of disks comprises positioning the disks in a gap merge orientation.

15. The method of claim 13, further comprising subjecting each disk pair to additional simultaneous processing following demerging.

16. A method of manufacturing hard memory disks having a single active side on each side, comprising: a. providing a plurality of disks; b. changing the orientation of the disks; c. processing the disks two at a time such that only one surface of each disk is subjected to flail processing.

17. The method of claim 16, wherein processing the disks comprises one or more of data zone texturing, laser zone texturing, scrubbing, sputtering, burnishing, testing and servo-track writing.

18. The method of claim 17, further comprising changing the orientation of the disks following one or more of the processes.

19. The method of claim 16, wherein changing the orientation of the disks occurs following processing.

20. A method of manufacturing single-sided hard memory disks having an outer perimeter edge and a center aperture defining an inside perimeter edge comprising:
   a. providing a plurality of disks;
   b. placing the plurality of disks in a container, in pairs, with the disks in a contact merge orientation;
   c. removing the pairs of disks from the container one pair at a time;
   d. simultaneously burnishing the outwardly facing surface of each disk in a pair;
   e. positioning the pairs in a container.

21. The method of claim 20, wherein removing the pairs of disks from the container one at a time comprises engaging the disk pairs at their lower outer perimeter edge.

22. The method of claim 21, further comprising engaging each pair of disks at their inside perimeter edge prior to burnishing.

23. The method of claim 21, further comprising moving each disk pair to a different location following removing each disk pair from the container and prior to burnishing.

24. The method of claim 23, further comprising maintaining each disk pair in a contact merge orientation while moving each disk pair to a different location.

25. The method of claim 20, further comprising simultaneously testing the outwardly facing surface of each disk in a pair.

26. The method of claim 25, wherein the testing occurs following burnishing.

27. The method of claim 26, wherein the testing occurs following step e, positioning the disk pairs in a container.

28. The method of claim 27, wherein positioning the disk pairs in a container following burnishing comprises positioning the disk pairs in a contact merge orientation.

29. The method of claim 27, further comprising positioning disk pairs in a container following testing.

30. The method of claim 29, further comprising demerging the disk pairs following testing.

31. The method of claim 30, further comprising separating the demerged disk pairs and positioning the individual disks in containers with the active side of each disk in a container having the same orientation in the container.

32. The method of claim 27, further comprising separating disks based upon results of testing.

33. A method of manufacturing single-sided hard memory disks, comprising:
   a. providing a plurality of disks;
   b. merging the plurality of disks into pairs of disks; c
   c. subjecting each pair of disks to a sputtering process wherein the outwardly facing surface of each disk in each pair is simultaneously sputtered;
   d. subjecting each pair of disks to a burnishing process wherein the outwardly facing surface of each disk is simultaneously burnished;
   e. subjecting the pair of disks to a testing process wherein the outwardly facing surface of each disk is simultaneously tested;
   f. placing the disks in a container.

34. The method of claim 33, further comprising maintaining the orientation of the disk pairs for each of the sputtering, burnishing and testing processes.

35. The method of claim 34, wherein the disk pairs are positioned in a gap merge orientation.

36. The method of claim 34, wherein the disk pairs are positioned in a contact merge orientation.

* * * * *